(12) United States Patent
Touran

(10) Patent No.: US 10,593,436 B2
(45) Date of Patent: *Mar. 17, 2020

(54) METHOD AND SYSTEM FOR GENERATING A NUCLEAR REACTOR CORE LOADING DISTRIBUTION

(71) Applicant: TerraPower, LLC, Bellevue, WA (US)

(72) Inventor: Nicholas W. Touran, Seattle, WA (US)

(73) Assignee: TERRAPOWER, LLC, Bellevue, WA (US)

( * ) Notice: Subject to any disclaimer, the term of this patent is extended or adjusted under 35 U.S.C. 154(b) by 1645 days.

This patent is subject to a terminal disclaimer.

(21) Appl. No.: 14/086,474

(22) Filed: Nov. 21, 2013

(65) Prior Publication Data

US 2015/0142411 A1  May 21, 2015

(51) Int. Cl.
*G21D 3/00* (2006.01)
*G21C 19/20* (2006.01)

(52) U.S. Cl.
CPC ........... *G21D 3/001* (2013.01); *G21C 19/205* (2013.01); *G21D 3/004* (2019.01); *Y02E 30/40* (2013.01)

(58) Field of Classification Search
None
See application file for complete search history.

(56) References Cited

U.S. PATENT DOCUMENTS

| | | |
|---|---|---|
| 3,079,315 A | 2/1963 | Le Baud et al. |
| 4,080,251 A | 3/1978 | Musick |
| 4,285,769 A | 8/1981 | Specker et al. |
| 4,508,677 A | 4/1985 | Craig et al. |
| 4,642,213 A | 2/1987 | Impink |

(Continued)

FOREIGN PATENT DOCUMENTS

| | | |
|---|---|---|
| CN | 101241772 A | 8/2008 |
| EP | 1647994 A2 | 4/2006 |

(Continued)

OTHER PUBLICATIONS

Mohseni, N., Boroushaki, M., Ghofrani, M. B., & Raji, M. H. (2007). A new strategy for optimal fuel core loading pattern design in PWR nuclear power reactors. (Year: 2007).*

(Continued)

*Primary Examiner* — Bijan Mapar
(74) *Attorney, Agent, or Firm* — Jeremy P. Sanders

(57) ABSTRACT

The generation of a nuclear core loading distribution includes receiving a reactor core parameter distribution associated with a state of a reference nuclear reactor core, generating an initial fuel loading distribution for a simulated beginning-of-cycle (BOC) nuclear reactor core, selecting an initial set of positions for a set of regions within the simulated BOC core, generating an initial set of fuel design parameter values utilizing a design variable of each of the regions, calculating a reactor core parameter distribution of the simulated BOC core utilizing the generated initial set of fuel design parameter values associated with the set of regions located at the initial set of positions of the simulated BOC core and generating a loading distribution by performing a perturbation process on the set of regions of the simulated BOC core to determine a subsequent set of positions for the set of regions within the simulated BOC core.

43 Claims, 98 Drawing Sheets

(56) References Cited

U.S. PATENT DOCUMENTS

| | | | |
|---|---|---|---|
| 5,141,710 | A | 8/1992 | Stirn et al. |
| 5,158,738 | A | 10/1992 | Trouble et al. |
| 5,225,147 | A | 7/1993 | Lin et al. |
| 5,774,514 | A | 6/1998 | Rubbia |
| 6,931,090 | B2 | 8/2005 | Chao et al. |
| 7,224,761 | B2 | 5/2007 | Popa |
| 7,426,458 | B2 | 9/2008 | Horton et al. |
| 7,574,337 | B2 | 8/2009 | Kropaczek et al. |
| 8,553,829 | B2 | 10/2013 | Farawila et al. |
| 2001/0026603 | A1 | 10/2001 | Hirukawa et al. |
| 2004/0009455 | A1 | 1/2004 | Chiang et al. |
| 2004/0196946 | A1 | 10/2004 | Chao et al. |
| 2006/0149514 | A1 | 7/2006 | Kropaczek et al. |
| 2006/0149515 | A1 | 7/2006 | Horton et al. |
| 2007/0213959 | A1* | 9/2007 | Kropaczek ............ G21C 17/00 703/1 |
| 2008/0123796 | A1 | 5/2008 | Hyde et al. |
| 2008/0123797 | A1 | 5/2008 | Hyde et al. |
| 2008/0192879 | A1 | 8/2008 | Ishii et al. |
| 2008/0240333 | A1 | 10/2008 | Ahlfeld et al. |
| 2009/0041175 | A1 | 2/2009 | Mildrum et al. |
| 2009/0080588 | A1 | 3/2009 | Ahlfeld et al. |
| 2011/0069801 | A1 | 3/2011 | McWhirter et al. |
| 2011/0069803 | A1 | 3/2011 | McWhirter et al. |
| 2011/0110480 | A1* | 5/2011 | Hyde .................... G21C 1/026 376/237 |
| 2011/0246153 | A1 | 10/2011 | Schultz et al. |
| 2013/0173233 | A1 | 7/2013 | Cheatham et al. |
| 2015/0142412 | A1 | 5/2015 | Touran |
| 2015/0142413 | A1 | 5/2015 | Touran |

FOREIGN PATENT DOCUMENTS

| | | |
|---|---|---|
| JP | S57108694 A | 7/1982 |
| JP | S5934194 A | 2/1984 |
| JP | S6138595 A | 2/1986 |
| JP | H04265899 A | 9/1992 |
| JP | 51967773 A2 | 8/1993 |
| JP | 11-264887 A | 9/1999 |
| JP | 2003-177196 A | 6/2003 |
| JP | 2004053599 A | 2/2004 |
| JP | 2005106540 A | 4/2005 |
| JP | 2006189438 A | 7/2006 |
| JP | 2008-151779 A | 7/2008 |
| JP | 2008216242 A | 9/2008 |
| JP | 4309733 B2 | 8/2009 |
| JP | 2010511175 A | 4/2010 |
| JP | 2013525752 A | 6/2013 |
| WO | WO 2004/114321 A2 | 12/2004 |
| WO | WO 2008/132365 A2 | 11/2008 |
| WO | WO 2009/079043 | 6/2009 |
| WO | WO2011013841 A1 | 2/2011 |
| WO | WO 2015/077403 | 5/2015 |
| WO | WO 2015/077404 | 5/2015 |
| WO | WO2015/077406 | 5/2015 |

OTHER PUBLICATIONS

PCT International Search Report; International App. No. PCT/US2014/066531; dated Apr. 10, 2015; pp. 1-3.

PCT International Written Opinion; International App. No. PCT/US2014/066531; dated Apr. 10, 2015; pp. 1-9.

PCT International Search Report; International App. No. PCT/US2014/066528; dated Apr. 10, 2015; pp. 1-3.

PCT International Written Opinion; International App. No. PCT/US2014/066528; dated Apr. 10, 2015; pp. 1-10.

PCT International Search Report; International App. No. PCT/US2014/066525; dated Apr. 9, 2015; pp. 1-3.

PCT International Written Opinion; International App. No. PCT/US2014/066525; dated Apr. 9, 2015; pp. 1-9.

Extended European Search Report dated Jun. 2, 2017 in connection with EP Application No. 14863738.2.

Extended European Search Report for EP Application No. 10839923.9 dated Feb. 18, 2015.

International Preliminary Report on Patentability dated Jun. 2, 2016 for corresponding International Application No. PCT/US2014/066525.

International Preliminary Report on Patentability dated Jun. 2, 2016 for corresponding International Application No. PCT/US2014/066531.

International Search Report and Written Opinion dated Jun. 10, 2011 for International Application No. PCT/US10/02606.

International Search Report and Written Opinion dated Jun. 14, 2011 for International Application No. PCT/US10/02607.

Pautz et al., The Artemis Core Simulator: A Central Component in Areva NP's Code Convergence Project. Joint International Topical Meeting on Mathematics & Computation and Supercomputing in Nuclear Applications. Monterey, California, Apr. 15-19, 2007; 20 pages.

Teller et al., Completely Automated Nuclear Power Reactors for Long-Term Operation: III. Enabling Technology for Large-Scale, Low-Risk Affordable Nuclear Electricity. Energy, The International Journal. Lawrence Livermore Laboratory, U.S. Department of Energy. Nov. 30, 2003, pp. 1-57.

Teller et al., Completely Automated Nuclear Reactors for Long-Term Operation. Frontiers in Physics Symposium, Joint American Physical Society and the America Association of Physics Teachers Texas meeting. Oct. 26-28, 1995. Jan. 1996. Lubbock, Texas. p. 1-15n.

Wilson et al., A Manual for CINDER '90 Version 07.4 Codes and Data LA-UR-07-8412. Los Alamos National Laboratory. Dec. 2008, 210 pages.

X-5 Monte Carlo Team. MCNP—A General Monte Carlo N-Particle Transport Code, Version 5, vol. I: Overview and Theory. Los Alamos National Laboratory. Apr. 24, 2003 (Revised Oct. 3, 2005). 340 pages.

Xie, Nuclear Reactor Physical Analysis. Atomic Energy Press of Xi'An Jiaotong University Press. Version 1, Jul. 2004 (no translation available).

Chinese Office Action dated Apr. 15, 2014 in connection with Chinese Application No. 201080050309.

Japanese Office Action dated Sep. 29, 2014 in connection with Japanese Application No. 2012-530867.

Japanese Office Action dated Sep. 30, 2014 in connection with Japanese Application No. 2012-530868.

Basher, et al, "Autonomous Control of Nuclear Power Plants," Oak Ridge National Laboratory for the U.S. Department of Energy, Oct. 2003, 24 pages.

Faria, et al., "Nuclear Fuel Loading Pattern Optimisation Using a Neural Network," Annals of Nuclear Energy, vol. 30, Issue 5, Mar. 2003, pp. 603-613.

EP 14863738.2, dated Jun. 2, 2017, Extended European Search Report.

* cited by examiner

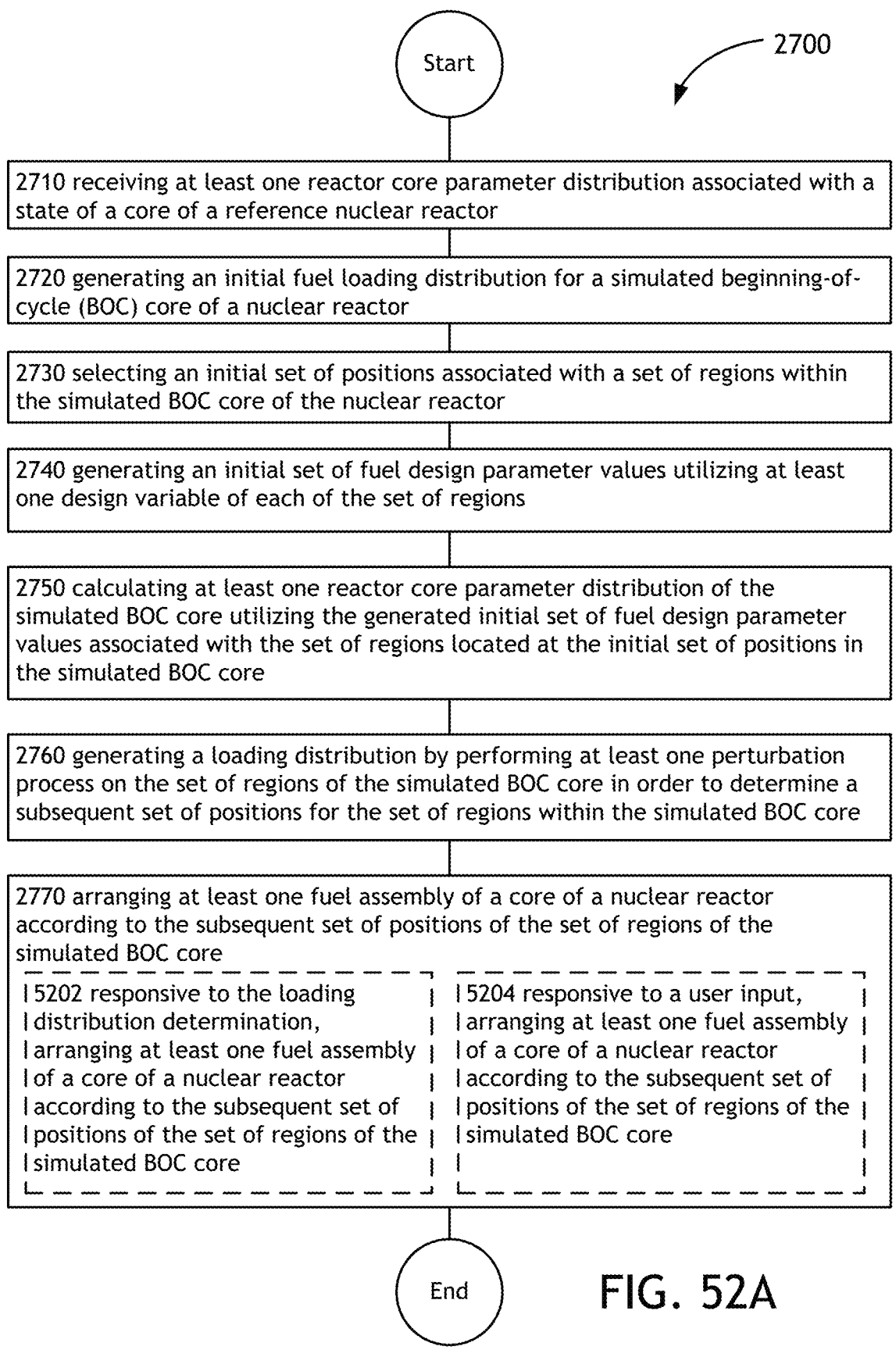

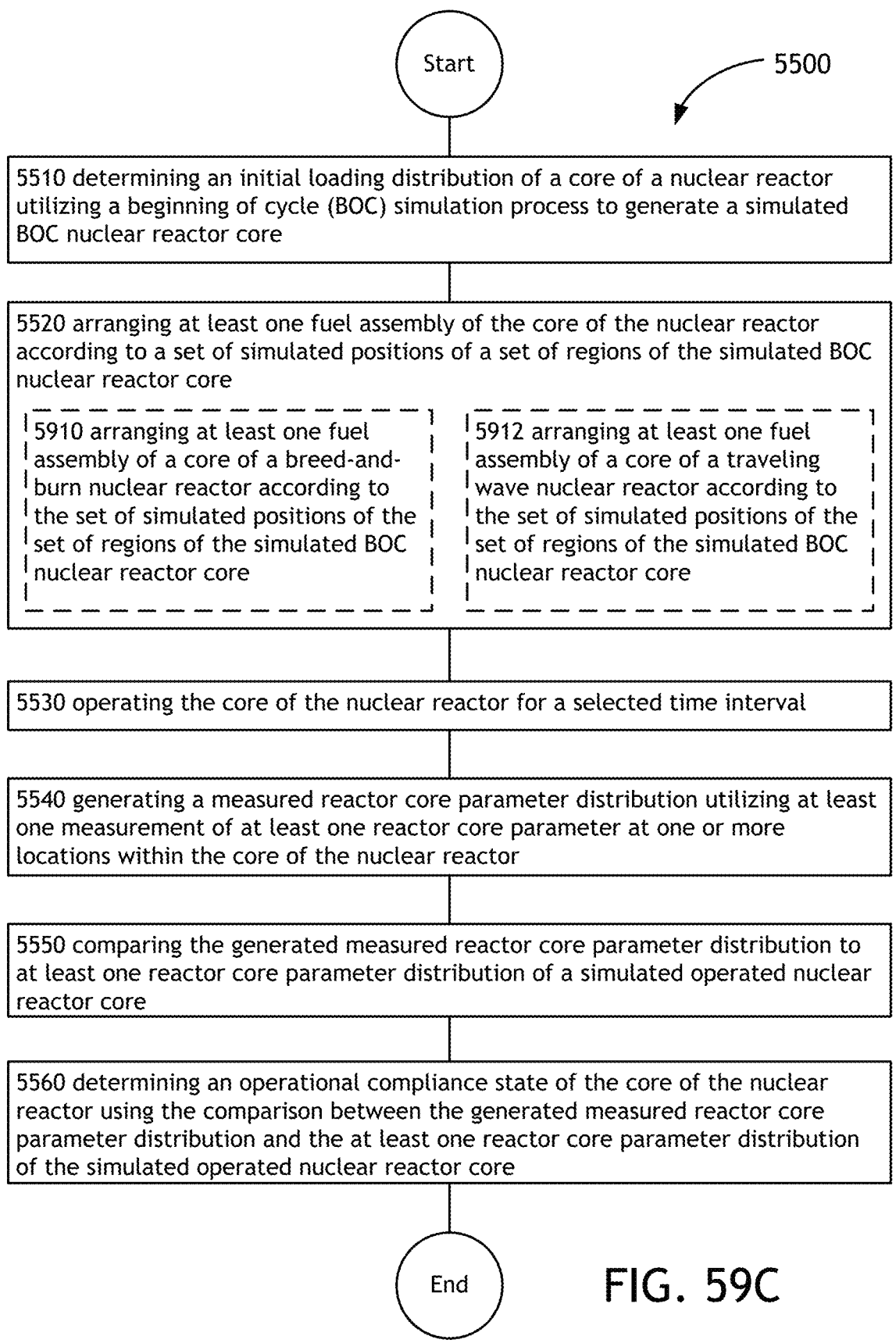

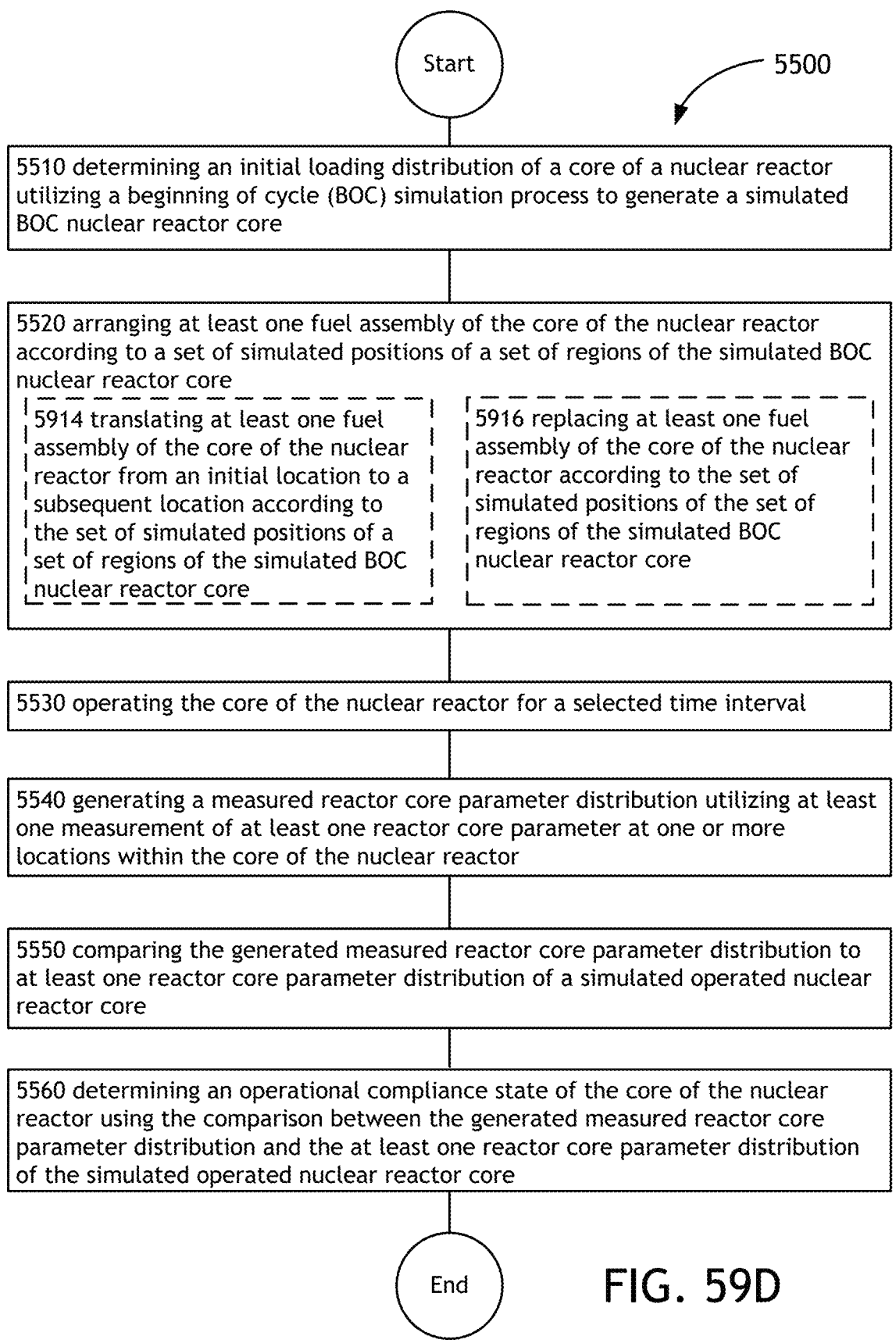

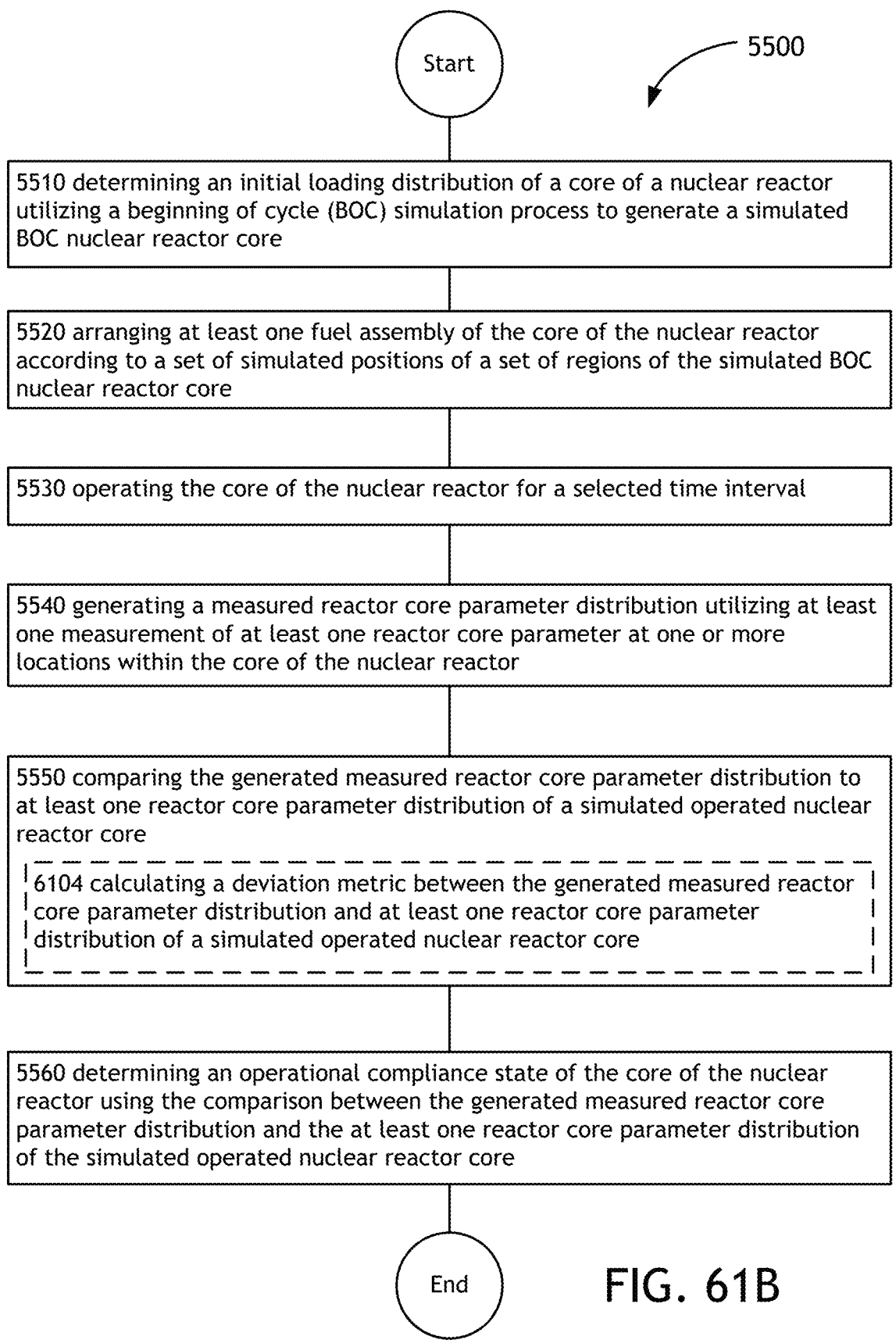

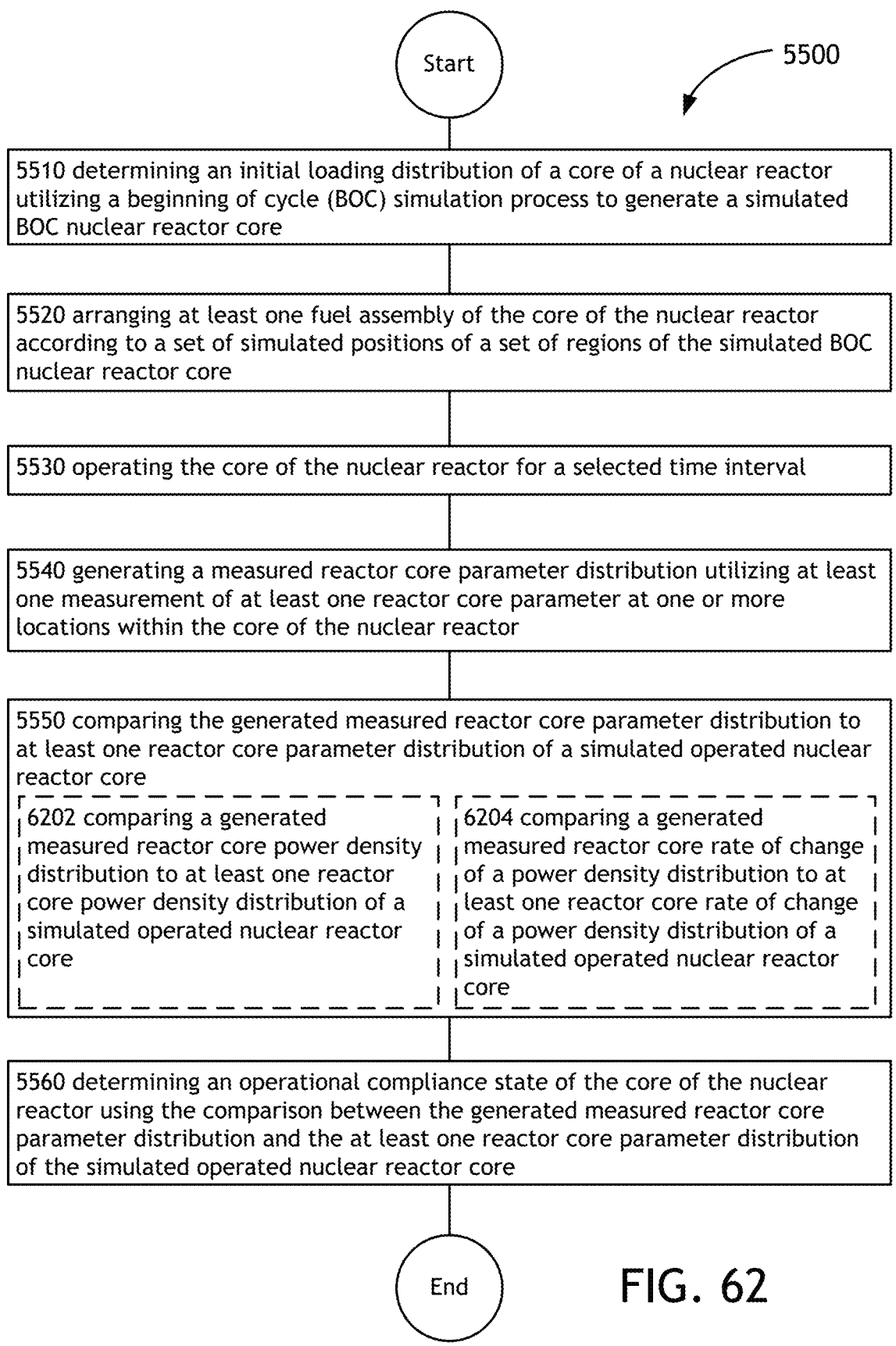

METHOD AND SYSTEM FOR GENERATING A NUCLEAR REACTOR CORE LOADING DISTRIBUTION

TECHNICAL FIELD

The present disclosure generally relates to the determination of a nuclear fuel loading distribution for a nuclear core, and, in particular, the determination of a nuclear fuel loading distribution for a beginning-of-cycle (BOC) nuclear reactor core.

SUMMARY

In one aspect, a method includes, but is not limited to, receiving at least one reactor core parameter distribution associated with a state of a core of a reference nuclear reactor; generating an initial fuel loading distribution for a simulated beginning-of-cycle (BOC) core of a nuclear reactor; selecting an initial set of positions associated within a set of regions within the simulated BOC core of the nuclear reactor; generating an initial set of fuel design parameter values utilizing at least one design variable of each of the set of regions; calculating at least one reactor core parameter distribution of the simulated BOC core utilizing the generated initial set of fuel design parameter values associated with the set of regions located at the initial set of positions of the simulated BOC core; and generating a loading distribution by performing at least one perturbation process on the set of regions of the simulated BOC core in order to determine a subsequent set of positions for the set of regions within the simulated BOC core.

In another aspect, a method includes, but is not limited to, receiving at least one reactor core parameter distribution associated with a state of a core of a reference nuclear reactor; generating an initial fuel loading distribution for a simulated BOC core of a nuclear reactor; selecting an initial set of positions associated within a set of regions within the simulated BOC core of the nuclear reactor; generating an initial set of fuel design parameter values utilizing at least one design variable of each of the set of regions; calculating at least one reactor core parameter distribution of the simulated BOC core utilizing the generated initial set of fuel design parameter values associated with the set of regions located at the initial set of positions of the simulated BOC core; and generating a loading distribution by performing at least one perturbation process on the set of regions of the simulated BOC core in order to determine a subsequent set of positions for the set of regions within the simulated BOC core; and arranging at least one fuel assembly of a core of a nuclear reactor according to the subsequent set of positions of the set of regions of the simulated BOC core.

In another aspect, a method includes, but is not limited to, determining an initial loading distribution of a core of a nuclear reactor utilizing a BOC simulation process to generate a simulated BOC nuclear reactor core; arranging at least one fuel assembly of the core of the nuclear reactor according to a set of simulated positions of a set of regions of the simulated BOC nuclear reactor core; operating the core of the nuclear reactor for a selected time interval; generating a measured reactor core parameter distribution utilizing at least one measurement of at least one reactor core parameter at one or more locations within the core of the nuclear reactor; comparing the generated measured reactor core parameter distribution to at least one reactor core parameter distribution of a simulated operated nuclear reactor core; and determining an operational compliance state of the core of the nuclear reactor using the comparison between the generated measured reactor core parameter distribution and the at least one reactor core parameter distribution of the simulated operated nuclear reactor core.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect, a non-transitory computer-readable medium includes, but is not limited to, program instructions executable to: receive at least one reactor core parameter distribution associated with a state of a core of a reference nuclear reactor; generate an initial fuel loading distribution for a simulated BOC core of a nuclear reactor; select an initial set of positions associated with a set of regions within the simulated BOC core of the nuclear reactor; generate an initial set of fuel design parameter values utilizing at least one design variable of each of the set of regions; calculate at least one reactor core parameter distribution of the simulated BOC core utilizing the generated initial set of fuel design parameter values associated with the set of regions located at the initial set of positions of the simulated BOC core; and generate a subsequent loading distribution by performing at least one perturbation process on the set of regions of the simulated BOC core in order to determine a subsequent set of positions for the set of regions within the simulated BOC core.

In another aspect, a non-transitory computer-readable medium includes, but is not limited to, program instructions executable to: receive at least one reactor core parameter distribution associated with a state of a core of a reference nuclear reactor; generate an initial fuel loading distribution for a simulated BOC core of a nuclear reactor; select an initial set of positions associated with a set of regions within the simulated BOC core of the nuclear reactor; generate an initial set of fuel design parameter values utilizing at least one design variable of each of the set of regions; calculate at least one reactor core parameter distribution of the simulated BOC core utilizing the generated initial set of fuel design parameter values associated with the set of regions located at the initial set of positions of the simulated BOC core; and generate a subsequent loading distribution by performing at least one perturbation process on the set of regions of the simulated BOC core in order to determine a subsequent set of positions for the set of regions within the simulated BOC core; and arrange at least one fuel assembly of a core of a nuclear reactor according to the subsequent set of positions of the set of regions of the simulated BOC core.

In another aspect, a non-transitory computer-readable medium includes, but is not limited to, program instructions executable to: determine an initial loading distribution of a core of a nuclear reactor utilizing a BOC simulation process to generate a simulated BOC nuclear reactor core; arrange at least one fuel assembly of the core of the nuclear reactor according to a set of simulated positions of a set of regions of the simulated BOC nuclear reactor core; operate the core of the nuclear reactor for a selected time interval; generate a measured reactor core parameter distribution utilizing at least one measurement of at least one reactor core parameter at one or more locations within the core of the nuclear reactor; compare the generated measured reactor core parameter distribution to at least one reactor core parameter distribution of a simulated operated nuclear reactor core; and determine an operational compliance state of the core of the nuclear reactor using the comparison between the generated measured reactor core parameter distribution and the at least one reactor core parameter distribution of the simulated operated core.

In another aspect, a system includes, but is not limited to, a controller including one or more processors operable to execute program instructions maintained on a non-transitory computer-readable medium, the program instructions configured to: receive at least one reactor core parameter distribution associated with a state of a core of a reference nuclear reactor; generate an initial fuel loading distribution for a simulated BOC core of a nuclear reactor; select an initial set of positions associated with a set of regions within the simulated BOC core of the nuclear reactor, each of the initial set of positions corresponding to one of the set of regions; generate an initial set of fuel design parameter values utilizing at least one design variable of each of the set of regions, wherein each of the initial set of fuel design parameter values is associated with one of the set of regions of the simulated BOC core of the nuclear reactor; calculate at least one reactor core parameter distribution of the simulated BOC core utilizing the generated initial set of fuel design parameter values associated with the set of regions located at the initial set of positions of the simulated BOC core; and generate a subsequent loading distribution by performing at least one perturbation process on the set of regions of the simulated BOC core in order to determine a subsequent set of positions for the set of regions within the simulated BOC core, the subsequent set of positions defining the loading distribution for the simulated BOC core, wherein the subsequent set of positions reduce the difference between the at least one reactor core parameter distribution of the simulated BOC core and the received at least one reactor core parameter distribution associated with a state of a core of a reference nuclear reactor below a selected tolerance level.

In another aspect, a system includes, but is not limited to, a controller including one or more processors operable to execute program instructions maintained on a non-transitory computer-readable medium, the program instructions configured to: receive at least one reactor core parameter distribution associated with a state of a core of a reference nuclear reactor; generate an initial fuel loading distribution for a simulated BOC core of a nuclear reactor; select an initial set of positions associated with a set of regions within the simulated BOC core of the nuclear reactor, each of the initial set of positions corresponding to one of the set of regions; generate an initial set of fuel design parameter values utilizing at least one design variable of each of the set of regions, wherein each of the initial set of fuel design parameter values is associated with one of the set of regions of the simulated BOC core of the nuclear reactor; calculate at least one reactor core parameter distribution of the simulated BOC core utilizing the generated initial set of fuel design parameter values associated with the set of regions located at the initial set of positions of the simulated BOC core; and generate a subsequent loading distribution by performing at least one perturbation process on the set of regions of the simulated BOC core in order to determine a subsequent set of positions for the set of regions within the simulated BOC core, the subsequent set of positions defining the loading distribution for the simulated BOC core, wherein the subsequent set of positions reduce the difference between the at least one reactor core parameter distribution of the simulated BOC core and the received at least one reactor core parameter distribution associated with a state of a core of a reference nuclear reactor below a selected tolerance level; and a nuclear reactor, the nuclear reactor including a nuclear reactor core including a plurality of fuel assemblies arrangeable according to the subsequent loading distribution determined by the controller.

In another aspect, a system includes, but is not limited to, a nuclear reactor including a nuclear reactor core, the nuclear reactor core including a plurality of fuel assemblies; and a controller configured to: determine an initial loading distribution of the nuclear reactor core utilizing a BOC simulation process to generate a simulated BOC nuclear reactor core; generate a measured reactor core parameter distribution utilizing at least one measurement of at least one reactor core parameter at one or more locations within the core of the nuclear reactor, following operation of the nuclear reactor for a selected time interval; compare the generated measured reactor core parameter distribution to at least one reactor core parameter distribution of a simulated operated nuclear reactor core generated utilizing at least the initial loading distribution; and determine an operational compliance state of the core of the nuclear reactor using the comparison between the generated measured reactor core parameter distribution and the at least one reactor core parameter distribution of the simulated operated nuclear reactor core, wherein the plurality of fuel assemblies of the nuclear reactor core are arrangeable according to a set of simulated positions of a set of regions of at least one of the simulated BOC nuclear reactor core and an additional simulated operated nuclear reactor core.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

FIG. 1O is a block diagram view of types of nuclear reactor core parameter distributions, in accordance with an embodiment of the present invention;

FIGS. 4B through 26 are high-level flowcharts depicting alternate implementations of FIG. 4A.

FIGS. 27B through 54 are high-level flowcharts depicting alternate implementations of FIG. 27A.

FIGS. 56 through 68 are high-level flowcharts depicting alternate implementations of FIG. 55.

DETAILED DESCRIPTION

Figure 1A:
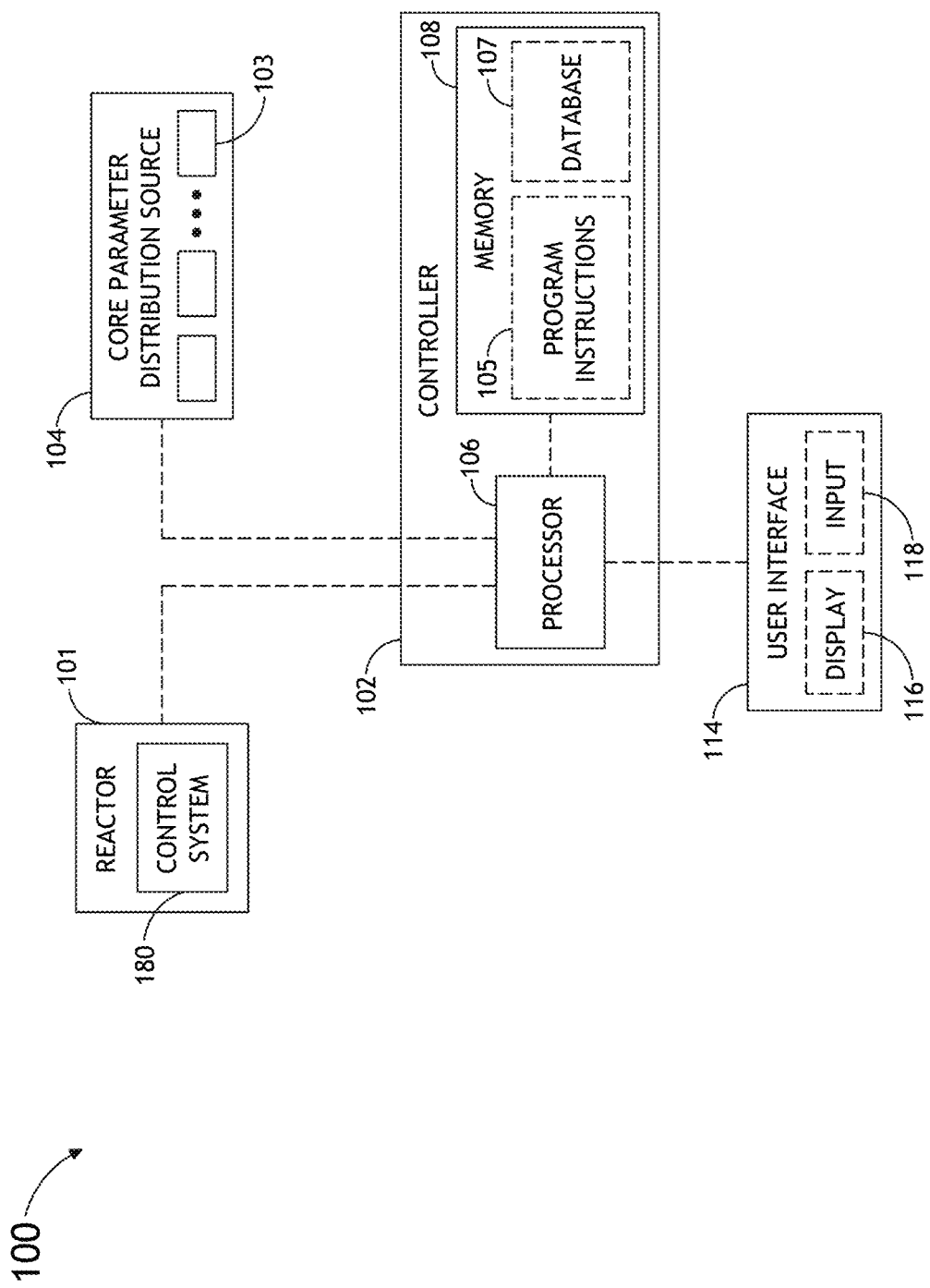
FIG. 1A is a block diagram view of a system for generating a simulated loading distribution in a BOC nuclear reactor core, in accordance with an embodiment of the present invention.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Figure 1B:
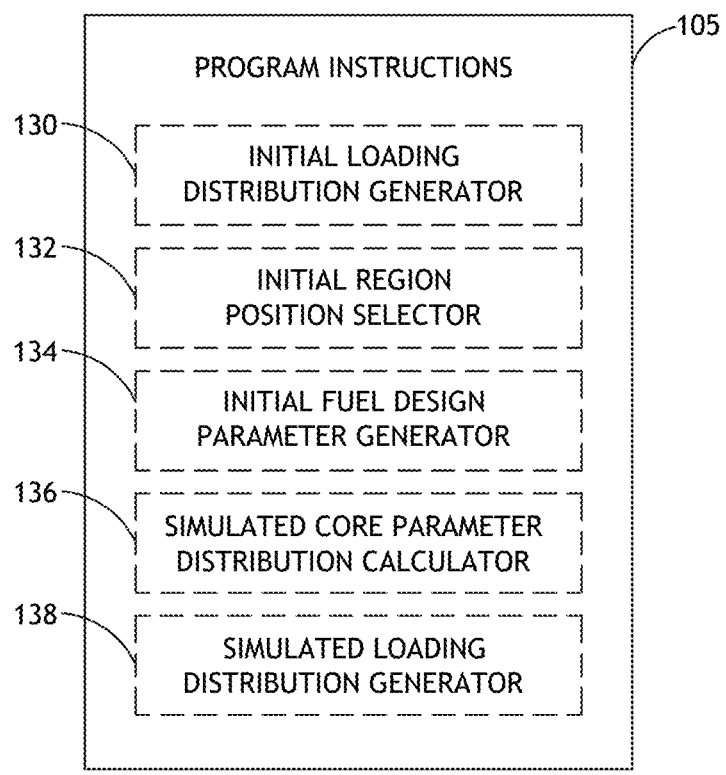
FIG. 1B is a block diagram view of the programming modules implementable by the system for generating a simulated loading distribution in a BOC nuclear reactor core, in accordance with an embodiment of the present invention.
Figure 1C:
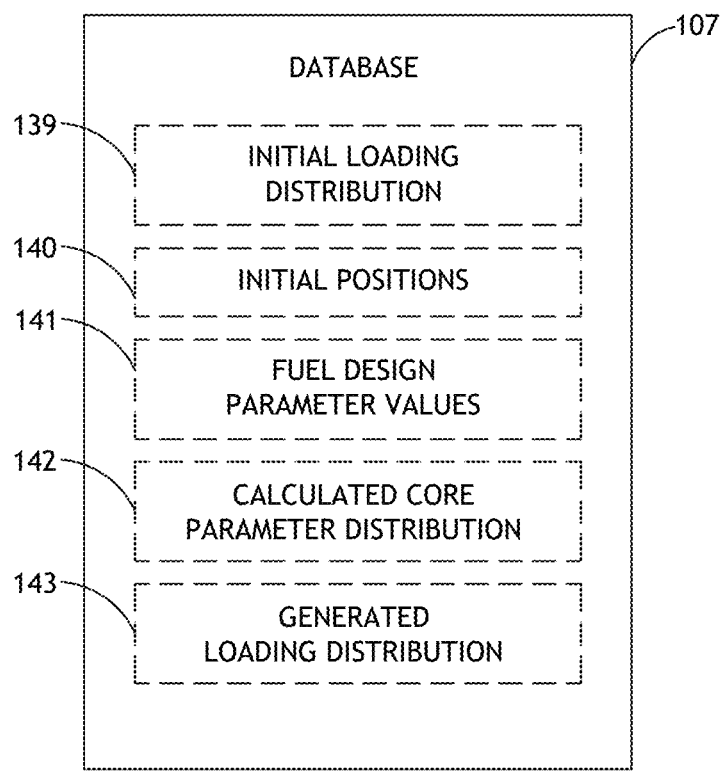
FIG. 1C is a block diagram view of the databases implementable by the system for generating a simulated loading distribution in a BOC nuclear reactor core, in accordance with an embodiment of the present invention.
Figure 1D:
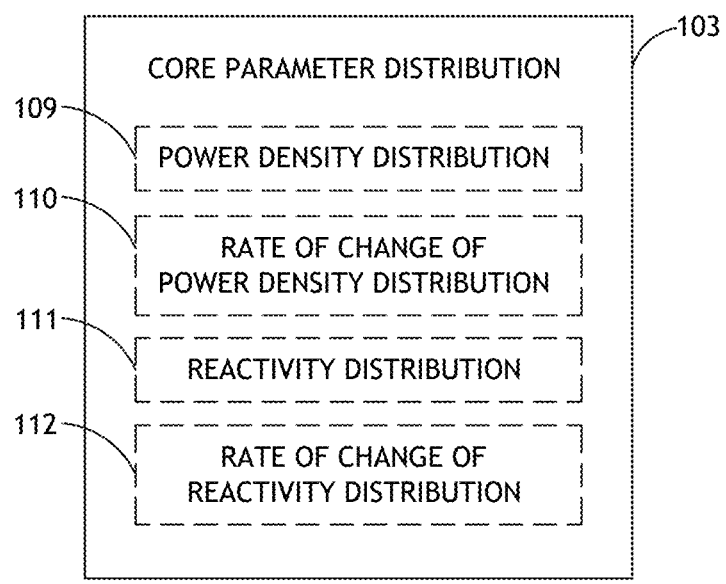
FIG. 1D is a block diagram view of types of nuclear reactor core parameter distributions, in accordance with an embodiment of the present invention.
Figure 1E:
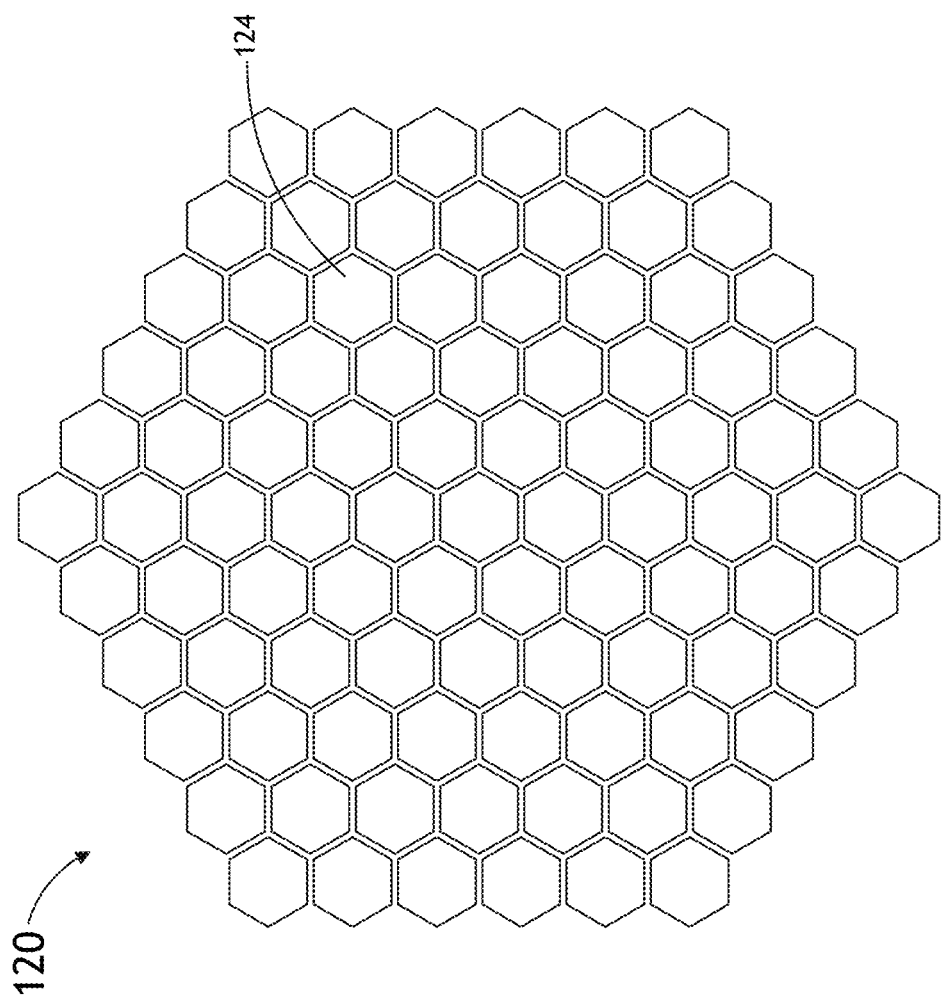
FIG. 1E is a cross-sectional view of a nuclear reactor core formed from multiple fuel assemblies, in accordance with an embodiment of the present invention.
Figure 1F:
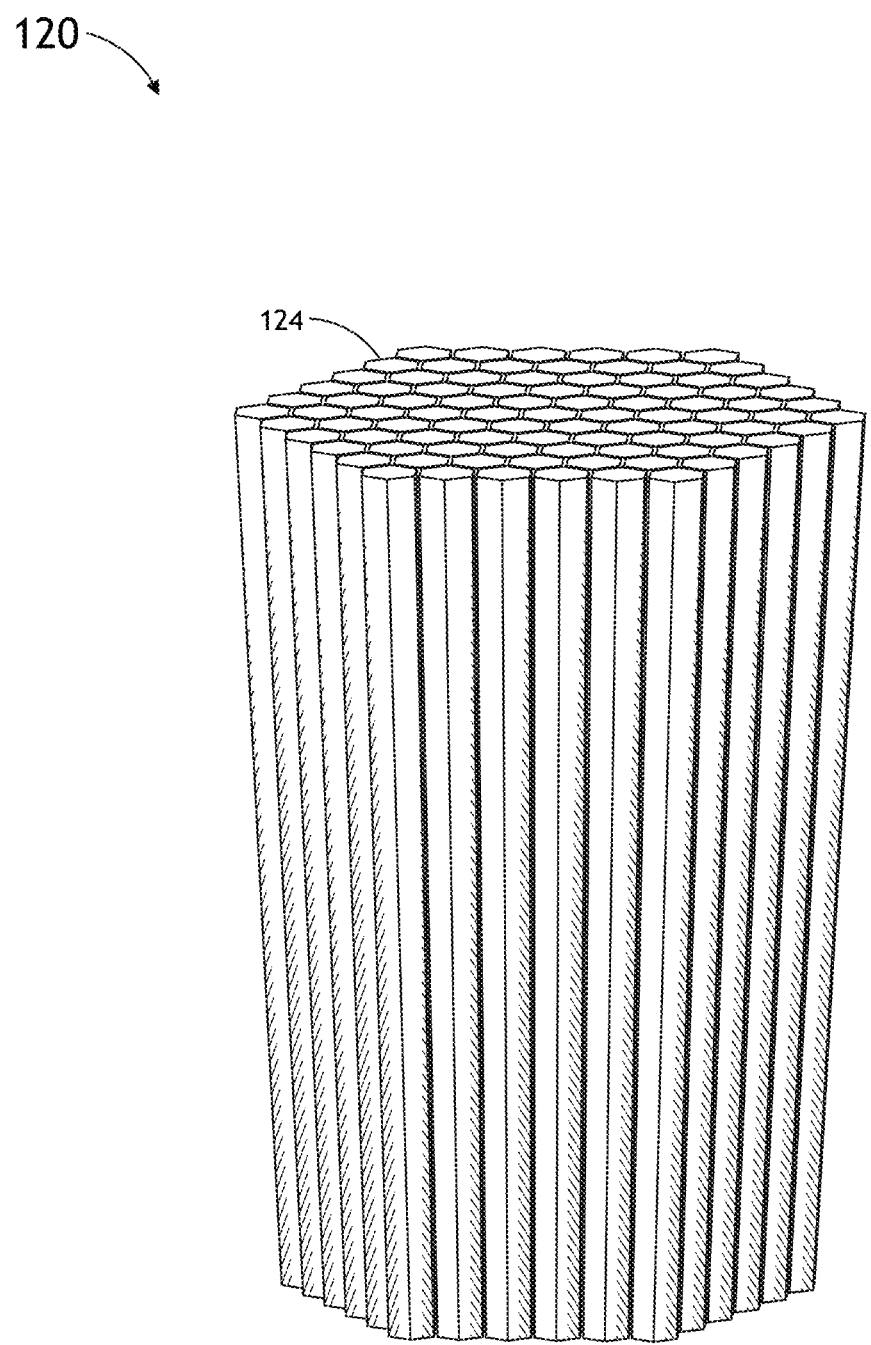
FIG. 1F is an isometric view of a nuclear reactor core formed from multiple fuel assemblies, in accordance with an embodiment of the present invention.
Figure 1G:
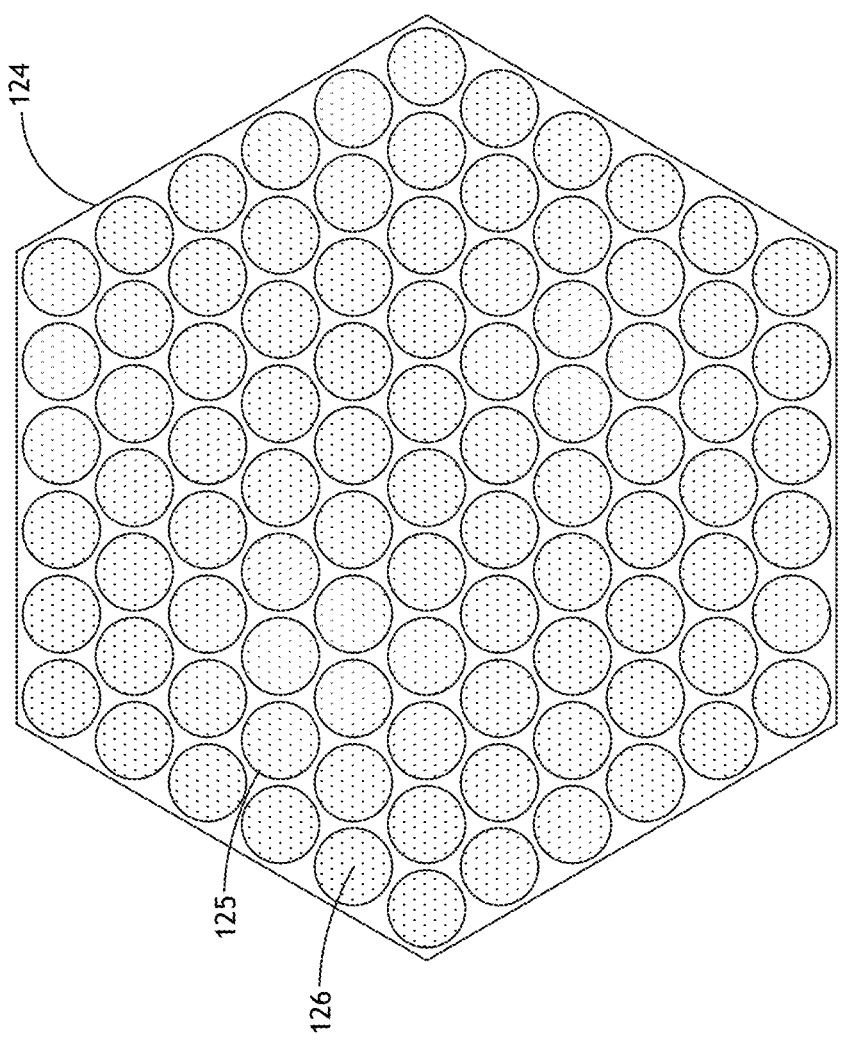
FIG. 1G is a cross-sectional view of a fuel assembly containing multiple fuel pins, in accordance with an embodiment of the present invention.
Figure 1H:
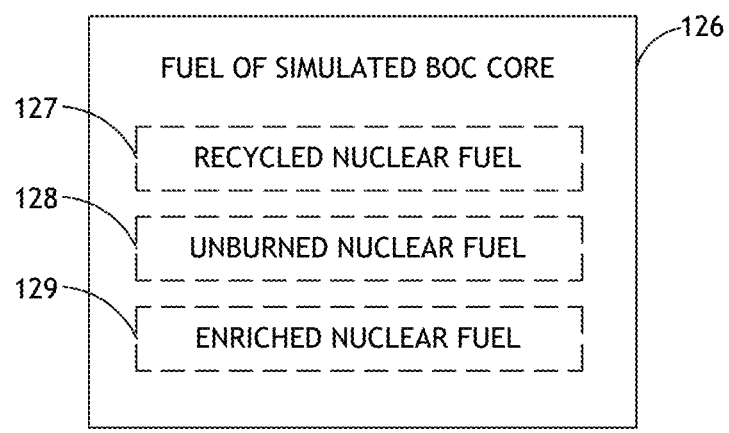
FIG. 1H is a block diagram view of types of nuclear reactor fuel of the simulated BOC nuclear reactor core, in accordance with an embodiment of the present invention.
Figure 1I:
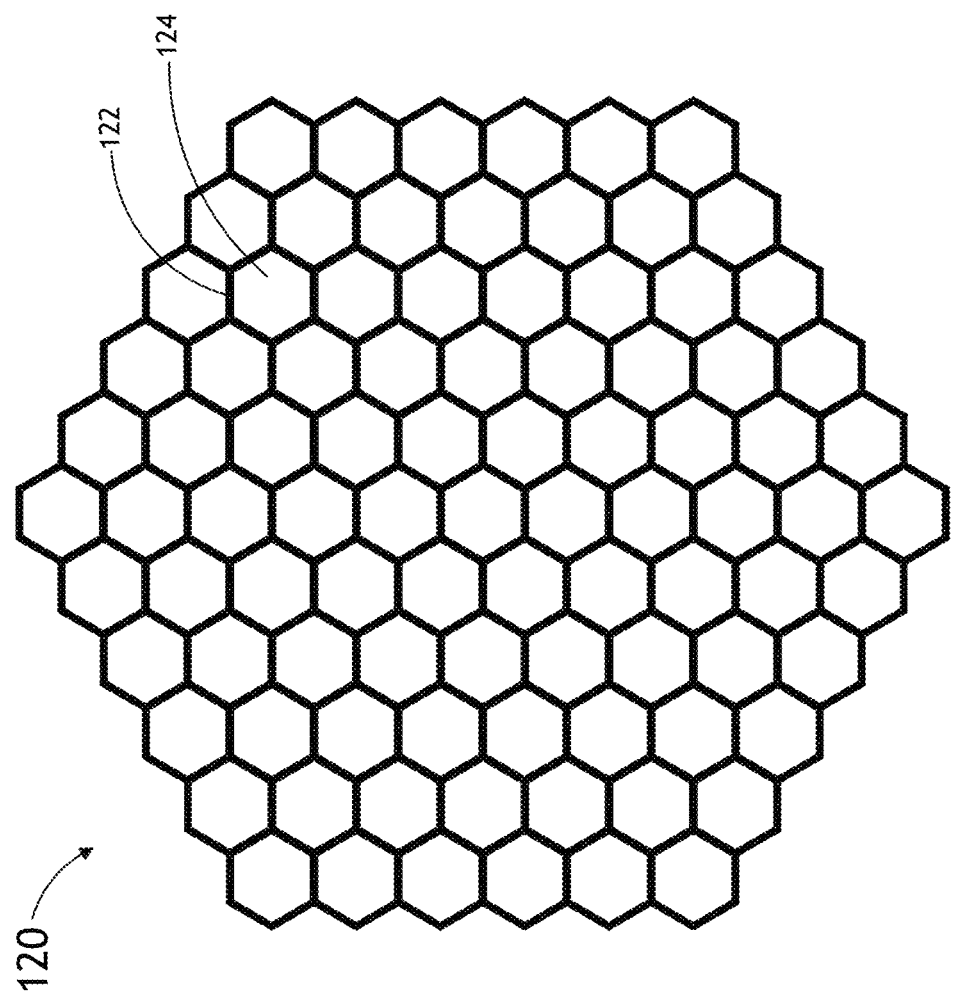
FIG. 1I is a cross-sectional view of a nuclear reactor core formed from multiple fuel assemblies with the selected regions for executing the simulation of the present invention depicted, in accordance with an embodiment of the present invention.
Figure 1J:
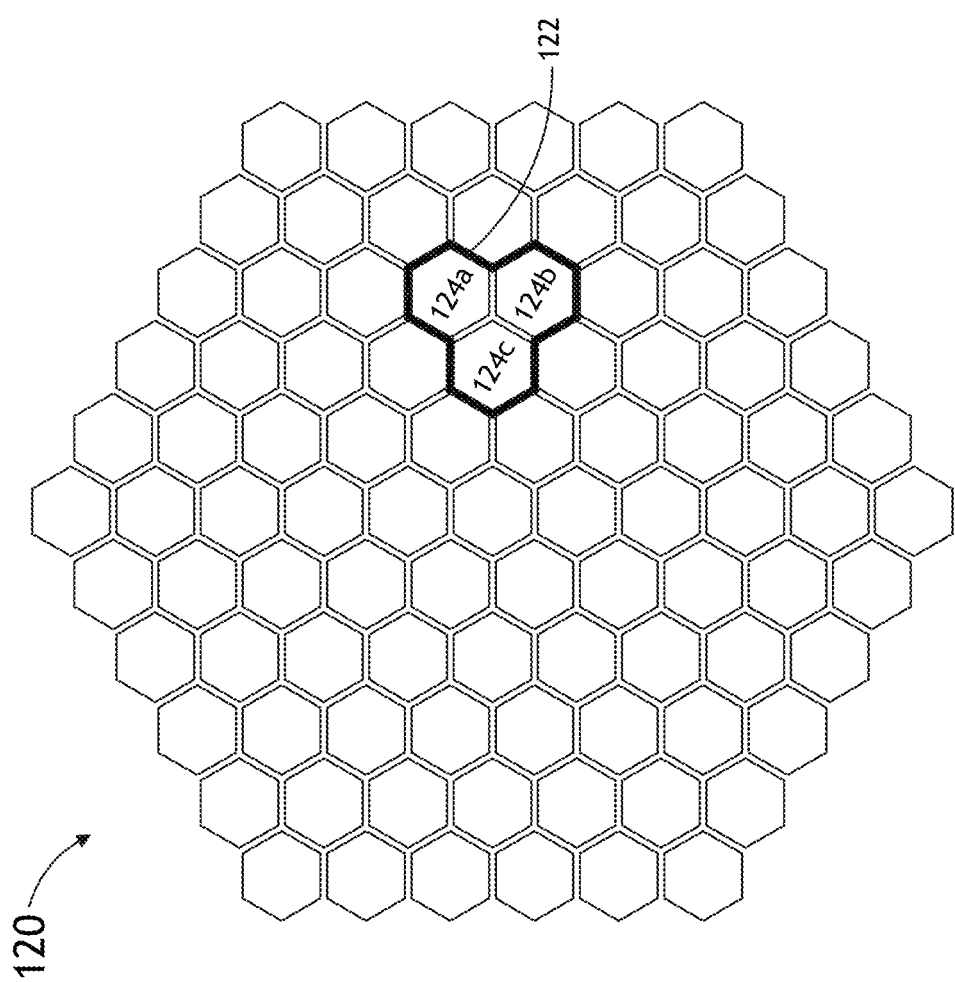
FIG. 1J is a cross-sectional view of a nuclear reactor core formed from multiple fuel assemblies with a selected region for executing the simulation of the present invention encompassing multiple fuel assemblies of the reactor core, in accordance with an embodiment of the present invention.
Figure 1K:
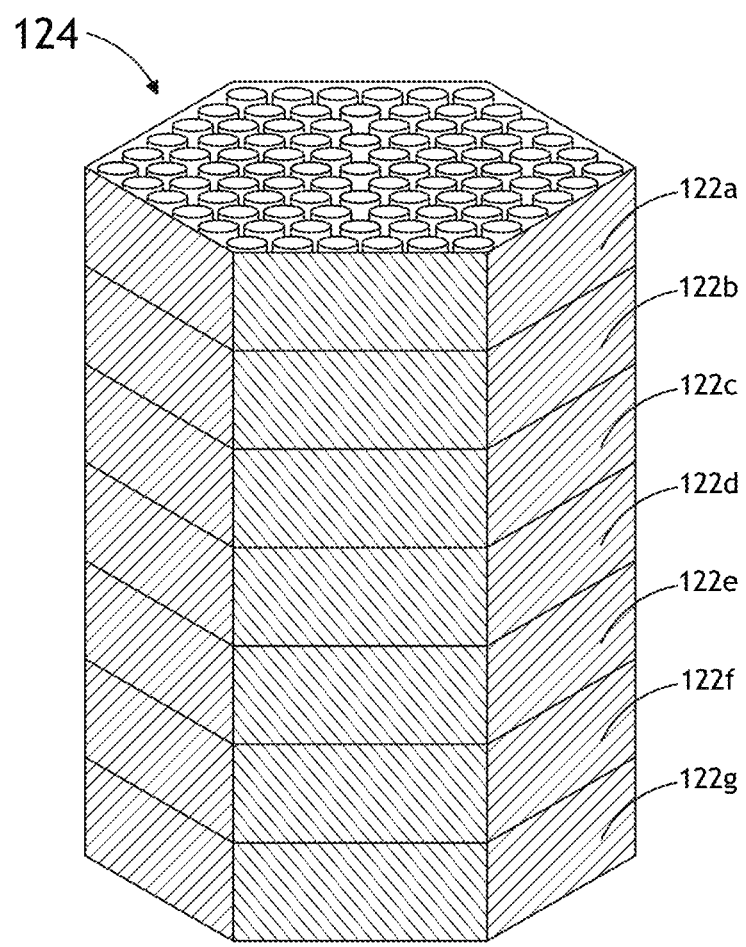
FIG. 1K is an isometric view of a fuel assembly with multiple sub-assembly simulation regions depicted, in accordance with an embodiment of the present invention.
Figure 1L:
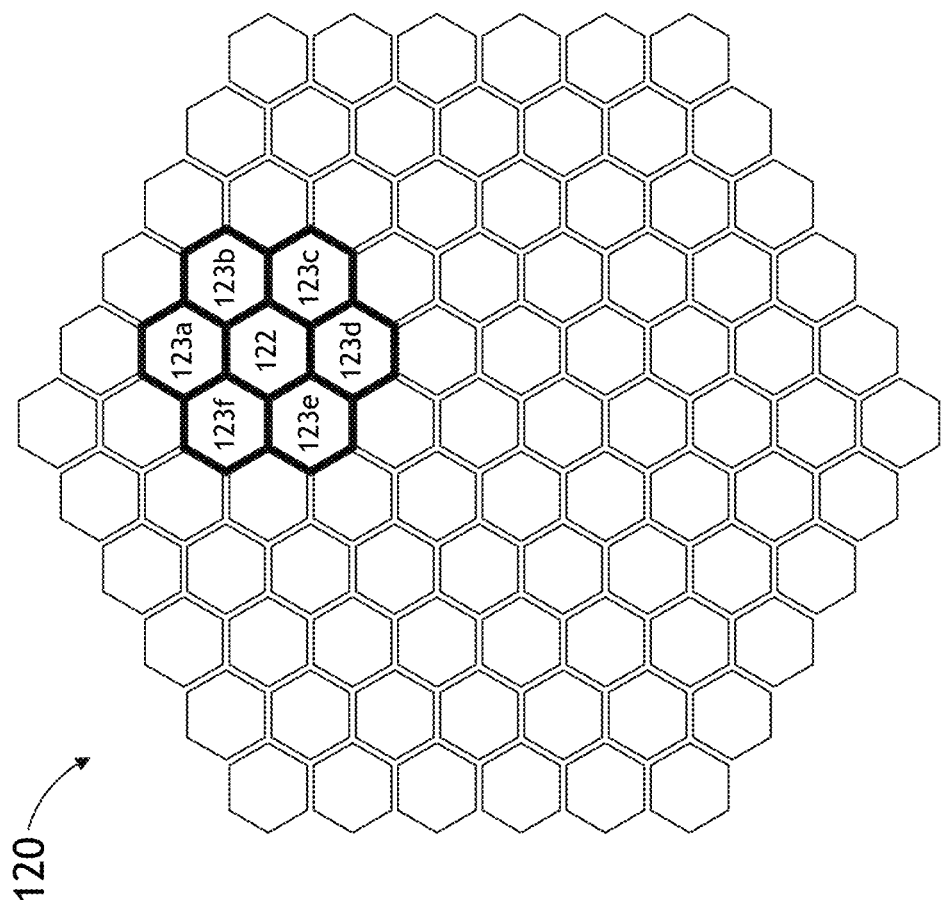
FIG. 1L is a cross-sectional view of a nuclear reactor core formed from multiple fuel assemblies depicting the use of multiple regions to calculate one or more characteristics of a single region via statistical aggregation.
Figure 1M:
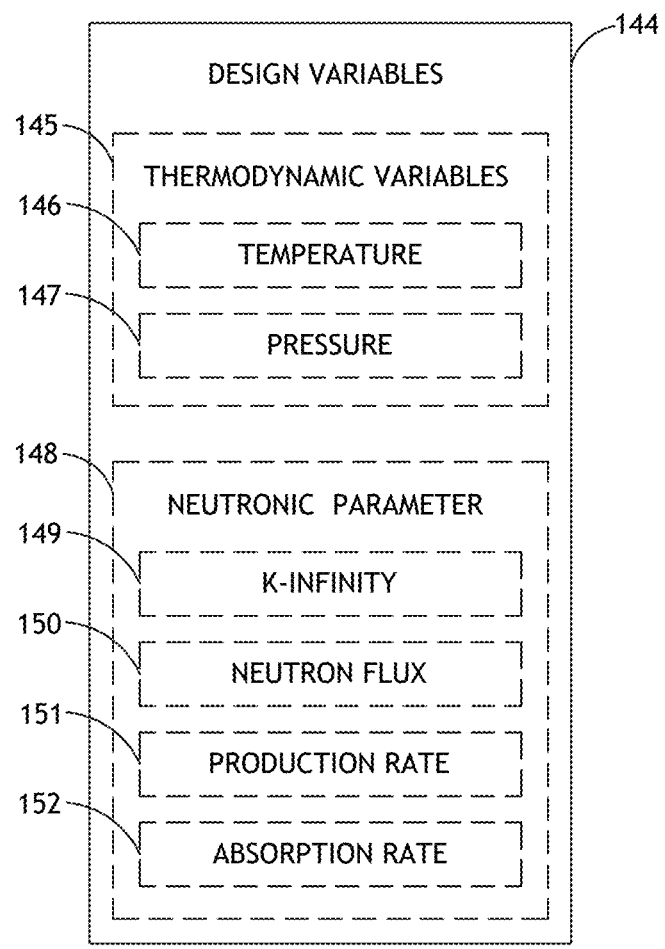
FIG. 1M is a block diagram view of types of design variables, in accordance with an embodiment of the present invention.
Figure 1N:
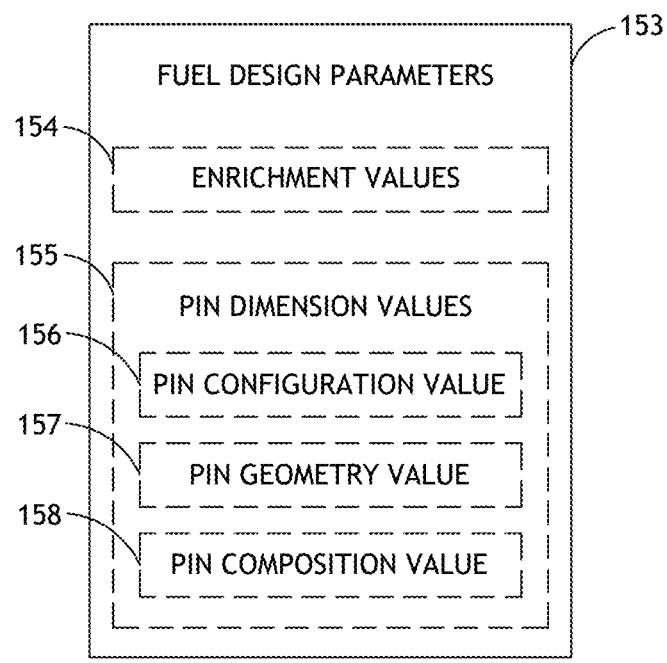
FIG. 1N is a block diagram view of types of nuclear fuel design parameters, in accordance with an embodiment of the present invention.
Figure 1P:
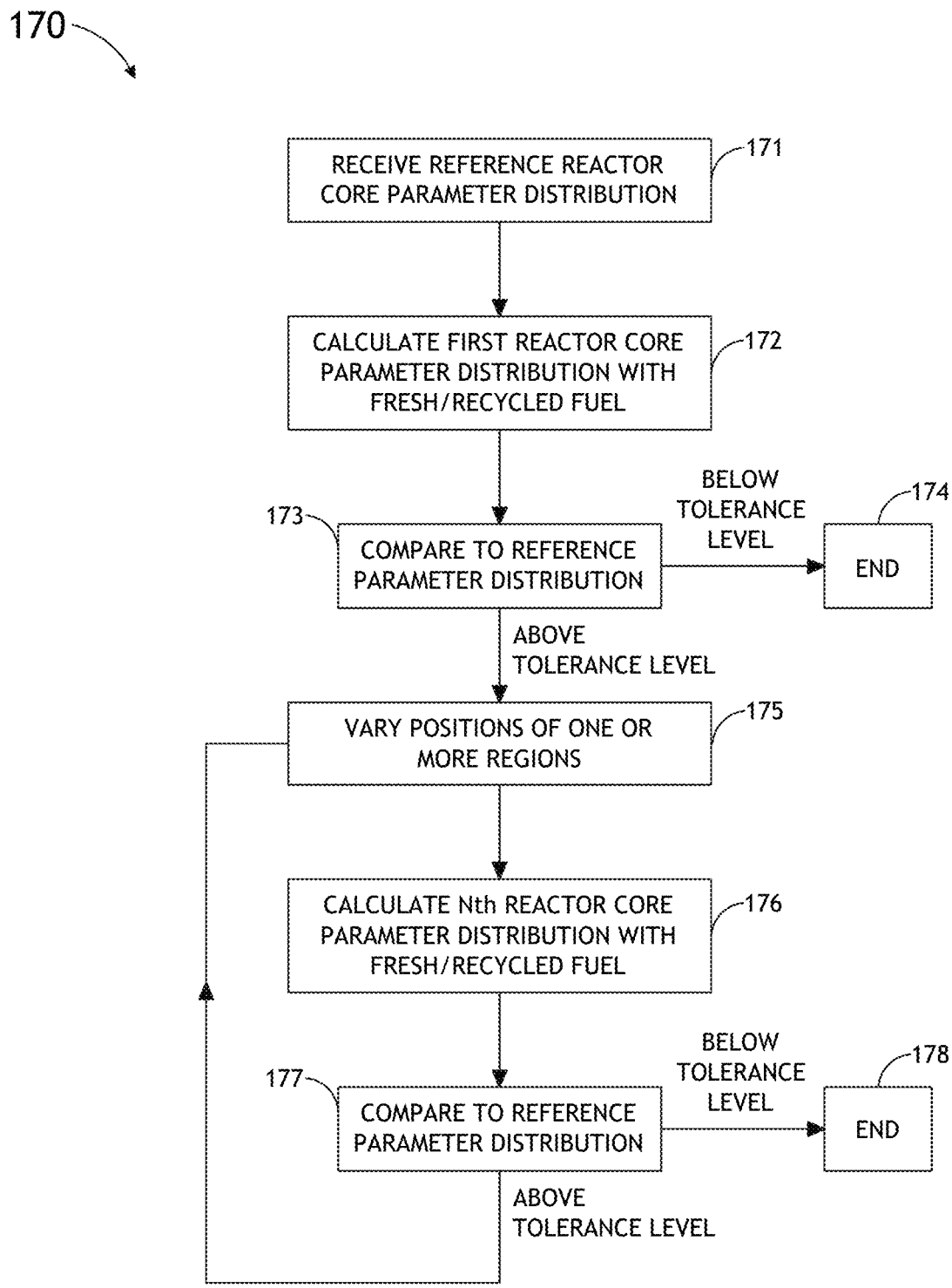
FIG. 1P is process flow diagram depicting a perturbation procedure executable by system for generating a simulated loading distribution in a BOC nuclear reactor core, in accordance with an embodiment of the present invention.

Referring generally to FIGS. 1A through 1P, a system 100 for generating a simulated nuclear fuel loading distribution of a nuclear reactor core is described in accordance with the present invention. It is recognized herein that nuclear reactors, such as a breed-and-burn type nuclear reactor, experience a transitional period, which require reloading and igniter-savoring shuffling in order to maintain reactivity as the composition of the reactor core evolves from a beginning-of-life (BOL) state to an equilibrium- or near-equilibrium state. During this transitional time, operators of the nuclear reactor are required to implement a carefully scheduled and highly sensitive fuel shuffling routine.

The present invention is directed to the determination of the distribution of newly loaded nuclear fuel producing a reactor core parameter distribution that deviates from a reference reactor core parameter distribution associated with a reference nuclear reactor by a magnitude equal to or less than a selected tolerance value). In one embodiment of the present invention, the system 100 may be implemented to determine an enrichment distribution of fresh or recycled nuclear fuel suitable for producing a reactor core parameter distribution that deviates from a parameter distribution (e.g., power density distribution or reactivity distribution) of an operated reference nuclear reactor core (i.e., made up of at least partially burned nuclear fuel) in a state of equilibrium by a magnitude equal to or less than a selected level of accuracy. As such, the present invention is capable of providing equilibrium-like benefits in a first generation reactor, thereby eliminating or at least reducing the need for time consuming transition from a beginning-of-life state to an equilibrium state.

FIG. 1A illustrates a block diagram view of a loading distribution generation system 100, in accordance with one embodiment of the present invention. In one aspect of the present invention, the loading distribution generation system 100 may include a controller 102. In another aspect of the present invention, the controller 102 is communicatively coupled to a core parameter distribution source 104 (e.g., core parameter distribution database maintained in memory). In another aspect of the present invention, the controller 102 is configured to receive one or more reactor core parameter distributions 103 (e.g., power distribution) associated with a state (e.g., equilibrium state) of a core of a nuclear reactor from the core parameter distribution source 104. In an additional aspect of the present invention, the controller 102 is configured to generate an initial fuel loading distribution for a simulated beginning-of-cycle (BOC) core of the nuclear reactor. In another aspect of the present invention, the controller 102 is configured to select an initial set of positions associated with a set of regions within the simulated BOC core of the nuclear reactor. In another aspect of the present invention, the controller 102 is configured to generate an initial set of fuel design parameter values utilizing at least one design variable of each of the set of regions. In another aspect of the present invention, the controller 102 is configured to calculate a reactor core parameter distribution of the simulated BOC core utilizing the generated initial set of fuel design parameter values associated with the set of regions located at the initial set of positions of the simulated BOC core. In another aspect of the present invention, the controller 102 is configured to generate a loading distribution by performing one or more perturbation processes on the set of regions of the simulated BOC core in order to determine a subsequent set of positions for the set of regions within the simulated BOC core. In this regard, the subsequent, or final, set of positions act to converge the reactor core parameter distribution of the simulated BOC core toward the reactor core parameter distribution received from the reference reactor within a predetermined tolerance level, even though the simulated BOC core is made up of a nuclear fuel distribution different from the nuclear fuel distribution of the core of the reference reactor.

FIG. 1B illustrates a block diagram of one or more sets of program instructions 105 maintained in memory 108 (as shown in FIG. 1A) and configured to carry out one or more steps described throughout the present disclosure. FIG. 1C illustrates a block diagram of a set of databases 107 maintained in memory 108 (or any other known memory device known in the art) and configured to store results of one or more steps of the present invention. Each of these steps will be described in further detail throughout the remainder of this disclosure.

In one embodiment of the present invention, the controller 102 may include, but is not limited to, one or more computer processors 106 configured to carry out one or more of the various steps described throughout the present disclosure. In this regard, the one or more processors 106 may retrieve program instructions 105 maintained in the non-transitory medium (e.g., memory 108 of controller 102) suitable for causing the one or more processors 106 to carry out one or more of the various steps described throughout the present disclosure. In one embodiment, the controller 102 may include any computational device known in the art. The controller 102 may include, but is not limited to, a personal computer system, mainframe computer system, workstation, image computer, parallel processor, or any other computational device known in the art. In general, the term "computational device" may be broadly defined to encompass any device having data processing capabilities. For example, a computational device may include, but is not limited to, one or more processors suitable for executing computer program instructions from a non-transitory medium. The non-transitory medium may include, but is not limited to, a read-only memory, a random access memory, a magnetic or optical disk, a solid state memory, a magnetic tape or the like.

Referring again to FIG. 1A, in one embodiment of the present invention, the one or more processors 106 of the controller 102 are communicatively coupled to the core parameter distribution source 104 and configured to receive one or more reactor core parameter distributions 103 from the core parameter distribution source 104. In one embodiment, the one or more processors 106 of the controller 102 may receive a reactor core parameter distribution for a core of a reference nuclear reactor in a given state in the form of a database. In another embodiment, the one or more processors 106 of the controller 102 may receive a reactor core parameter distribution for a core of a nuclear reactor in a given state in the form of a data set representative of a map, such as, but not limited to, a two-dimensional map or a three-dimensional map indicative of the reactor core parameter as a function of position within the core of the reference nuclear reactor.

In one embodiment, the core parameter distribution source 104 may include, but is not limited to, one or more memory devices configured to store and/or maintain one or more reactor core parameter distributions 103 associated with a state of a core of a nuclear reactor. The core parameter distribution source 104 may include any memory device known in the art. In one embodiment, the core parameter distribution source 104 includes a portable memory device suitable for storing one or more reactor core parameter distributions 103. For example, the core parameter distribution source 104 may include, but is not limited to, a portable flash drive, an optical disc, a solid state drive, and the like. In another embodiment, the core parameter distribution source 104 includes a remote memory device or system suitable for storing one or more reactor core parameter distributions 103. For example, the core parameter distribution source 104 may include, but is not limited to, a remote server communicatively coupled to the controller 102 via a data network (e.g., internet). By way of another example, the core parameter distribution source 104 may include, but is not limited to, a local server communicatively coupled to the controller 102 via a local data network (e.g., intranet). In another embodiment, the core parameter distribution source 104 may include, but is not limited to, the memory medium 108 of the controller 102.

In one embodiment, the one or more reactor core parameter distributions 103 may include a measured reactor core parameter distribution. For instance, a reactor core parameter distribution may be acquired by measuring the reactor core parameter distribution of an operating nuclear reactor while in the desired state (e.g., equilibrium or near equilibrium state, state approaching equilibrium, or state of equilibrium onset). In another embodiment, the one or more reactor core parameter distributions 103 may include a simulated reactor core parameter distribution. For instance, a reactor core parameter distribution may be acquired via computer simulation of a selected nuclear reactor (e.g., nuclear reactor loaded with "non-fresh" fuel) while in the desired state (e.g., equilibrium or near equilibrium state, state approaching equilibrium, or state of equilibrium onset).

In one embodiment, the one or more reactor core parameter distributions 103 include a reactor core parameter distribution of an equilibrium state of a nuclear reactor. For example, one or more reactor core parameter distributions 103 associated with an equilibrium state of a core of a reference nuclear reactor may be maintained in the core parameter distribution source 104. Then, the one or more stored reactor core parameter distributions associated with an equilibrium state of a core of a nuclear reactor may be transmitted from the core parameter distribution source 104 to the one or more processors 106 of the controller 102.

In another embodiment, the one or more reactor core parameter distributions 103 include a reactor core parameter distribution of an equilibrium-approaching state of a nuclear reactor. For example, one or more reactor core parameter distributions 103 associated with an equilibrium-approaching state of a core of a reference nuclear reactor may be maintained in the core parameter distribution source 104. Then, the one or more stored reactor core parameter distributions 103 associated with an equilibrium-approaching state of a core of a nuclear reactor may be transmitted from the core parameter distribution source 104 to the one or more processors 106 of the controller 102.

In another embodiment, the one or more reactor core parameter distributions 103 include a reactor core parameter distribution of an equilibrium-onset state of a nuclear reactor. For example, one or more reactor core parameter distributions 103 associated with an equilibrium-onset state of a core of a reference nuclear reactor may be maintained in the core parameter distribution source 104. Then, the one or more stored reactor core parameter distributions 103 associated with an equilibrium onset state of a core of a nuclear reactor may be transmitted from the core parameter distribution source 104 to the one or more processors 106 of the controller 102.

FIG. 1D illustrates a block diagram of types of reactor core parameter distributions 103 received from the core parameter distribution source 104, in accordance with one or more embodiments of the present invention. The one or more reactor core parameter distributions 103 received from the core parameter distribution source 104 may include any reactor core parameter distribution known in the art. In one embodiment, the one or more reactor core parameter distributions 103 received from the core parameter distribution source 104 include, but are not limited to, a power density distribution 109 or a rate of change of a power density distribution 110 of the core of a nuclear reactor. For example, the power distribution 109 (or distribution of rate of change of power density 110) associated with a state of a core of a reference nuclear reactor may be stored in the core parameter distribution source 104. Then, the stored reactor core power density distribution 109 (or distribution of rate of change of power density 110) associated with a state of the core of the reference nuclear reactor may be transmitted from the core parameter distribution source 104 to the one or more processors 106 of the controller 102.

In another embodiment, the one or more core parameter distributions received from the core parameter distribution source 104 include, but are not limited to, a reactivity distribution 111 or a rate of change of reactivity distribution 112 of the core of a nuclear reactor. For example, the reactivity distribution 111 (or distribution of rate of change of reactivity 112) associated with a state of a core of a reference nuclear reactor may be stored in the core parameter distribution source 104. Then, the stored reactor core reactivity distribution 111 (or distribution of rate of change of reactivity 112) associated with a state of the core of the reference nuclear reactor may be transmitted from the core parameter distribution source 104 to the one or more processors 106 of the controller 102.

The one or more reactor core parameter distributions 103 may be associated with a state of a core of any nuclear reactor known in the art. In some embodiments, the one or more reactor core parameter distributions 103 may be associated with a state of a core of at least one of a thermal nuclear reactor (e.g., light water reactor), a fast nuclear reactor, a breed-and-burn nuclear reactor and a traveling waver nuclear reactor. For example, one or more reactor core parameter distributions 103 associated with a state of a core of a reference thermal nuclear reactor may be stored in the core parameter distribution source 104. Then, the stored parameter distribution associated with a state of the core of the reference thermal nuclear reactor may be transmitted from the core parameter distribution source 104 to the one or more processors 106 of the controller 102. By way of another example, one or more reactor core parameter distributions associated with a state of a core of a reference fast nuclear reactor may be stored in the core parameter distribution source 104. Then, the stored parameter distribution associated with a state of the core of the reference fast nuclear reactor may be transmitted from the core parameter distribution source 104 to the one or more processors 106 of the controller 102. By way of another example, one or more reactor core parameter distributions associated with a state of a core of a reference breed-and-burn nuclear reactor may be stored in the core parameter distribution source 104. Then, the stored parameter distribution associated with a state of the core of the reference breed-and-burn nuclear reactor may be transmitted from the core parameter distribution source 104 to the one or more processors 106 of the controller 102. By way of another example, one or more reactor core parameter distributions associated with a state of a core of a reference traveling wave nuclear reactor may be stored in the core parameter distribution source 104. Then, the stored parameter distribution associated with a state of the core of the reference traveling wave nuclear reactor may be transmitted from the core parameter distribution source 104 to the one or more processors 106 of the controller 102.

In another embodiment, the one or more reactor core parameter distributions 103 may be associated with a state of a core of a nuclear reactor having one or more fuel assemblies. For example, one or more reactor core parameter distributions associated with a state of a core of a reference nuclear reactor having one or more fuel assemblies may be stored in the core parameter distribution source 104. Then, the stored parameter distribution associated with a state of the core of the reference nuclear reactor having one or more fuel assemblies may be transmitted from the core parameter distribution source 104 to the one or more processors 106 of the controller 102.

In a further embodiment, the one or more reactor core parameter distributions 103 may be associated with a state of a core of a nuclear reactor having one or more fuel assemblies with one or more fuel pins. For example, one or more reactor core parameter distributions associated with a state of a core of a reference nuclear reactor having one or more fuel assemblies with one or more fuel pins may be stored in the core parameter distribution source 104. Then, the stored parameter distribution associated with a state of the core of the reference nuclear reactor having one or more fuel assemblies with one or more fuel pins may be transmitted from the core parameter distribution source 104 to the one or more processors 106 of the controller 102. Those skilled in the art will recognize that a given fuel assembly may include a number of fuel pins assembled into a predefined array structure. It is further noted that the chosen pin/fuel arrangement within a fuel assembly may be chosen in an effort to optimize neutronic performance. The arrangement of fuel pins in a hexagonal fuel assembly of a breeder reactor is generally described in Alan E. Waltar and Albert B. Reynolds, *Fast Breeder Reactors,* 1st ed, Pergamon Press Inc., 1981, p. 119, which is incorporated herein by reference in the entirety. It is recognized herein that a core parameter distribution having any known pin arrangement within a given fuel assembly structure of a nuclear reactor core is suitable for implementation in the present invention.

It is noted herein that the one or more stored reactor core parameter distributions 103 may be associated with a state of a core of a reference nuclear reactor including any fissile or fissionable material known in the art. In one embodiment, the one or more reactor core parameter distributions 103 may be associated with a state of a core of a nuclear reactor including plutonium. For example, one or more reactor core parameter distributions associated with a state of a plutonium-containing-core of a reference nuclear reactor may be stored in the core parameter distribution source 104. Then, the stored parameter distribution associated with a state of the plutonium-containing-core of the reference nuclear reactor may be transmitted from the core parameter distribution source 104 to the one or more processors 106 of the controller 102. In another embodiment, the one or more reactor core parameter distributions 103 may be associated with a state of a core of a nuclear reactor including uranium. For example, one or more reactor core parameter distributions associated with a state of a uranium-containing-core of a reference nuclear reactor may be stored in the core parameter distribution source 104. Then, the stored parameter distribution associated with a state of the uranium-containing-core of the reference nuclear reactor may be transmitted from the core parameter distribution source 104 to the one or more processors 106 of the controller 102.

Referring again to FIGS. 1A and 1B, in one embodiment of the present invention, the one or more processors 106 of controller 102 are configured to generate an initial fuel loading distribution for a simulated BOC core of a nuclear reactor. It is noted herein that the initial fuel loading distribution (or any fuel loading distribution described herein) is representative of the spatial arrangement of the various components of nuclear fuel within a nuclear reactor core (e.g., simulated core or real core). In this regard, a given nuclear fuel loading distribution of the present invention (e.g., initial fuel loading distribution) may consist of a database or map (e.g., two-dimensional or three-dimensional map) indicative of the distribution of component materials of the nuclear fuel as a function of position within the core of the nuclear reactor.

For example, as shown in FIG. 1B, the program instructions 105 of memory 108 may include an initial nuclear fuel loading distribution generator 130 configured to cause the one or more processors 106 of controller 102 to generate an initial fuel loading distribution for a simulated BOC core of a nuclear reactor. In a further embodiment, as shown in FIG. 1C, the controller 102 may store the generated initial fuel loading distribution 139 in one or more databases 107 maintained in memory 108 or any other known memory device known in the art.

In one embodiment, based on the received one or more reactor core parameter distributions 103 from the core parameter distribution source 104, the one or more processors 106 of the controller 102 may generate an initial nuclear fuel loading distribution for a simulated BOC core of a nuclear reactor. For instance, the one or more processors 106 may compare historical data stored in the memory 108 of the controller 102 (or memory from a remote data source) to the received one or more reactor core parameter distributions 103 from the core parameter distribution source 104 to generate an initial nuclear fuel loading distribution for the simulated BOC core of a nuclear reactor. Then, the one or more processors 106 may transmit the generated initial nuclear fuel loading distribution 139 to one or more databases 107 in memory 108 for storage.

In another embodiment, an initial fuel loading distribution for a simulated BOC core of a nuclear reactor may be selected or entered into the controller 102 via user input. For example, a user input device 118 of a user interface 114 may be used by a user to input an initial fuel loading distribution for a simulated BOC core of a nuclear reactor into the controller 102 (e.g., input distribution into memory 108). By way of another example, the one or more processors 106 of the controller 102 may present a set of initial fuel loading distribution options to the user via the display 116 of the user interface 114. Then, the user may select one or more of the sets of initial fuel loading distribution options displayed on display 114. In a further embodiment, the initial fuel loading distribution options may be derived based on the one or more reactor core parameter distributions 103 received from the core parameter distribution source 104.

In another embodiment, the controller 102 is configured to randomly generate an initial fuel loading distribution for a simulated BOC core of a nuclear reactor. For example, based on the received one or more reactor core parameter distributions 103 from the core parameter distribution source 104, the one or more processors 106 of the controller 102 may randomly generate an initial nuclear fuel loading distribution for a simulated BOC core of a nuclear reactor.

FIGS. 1E-1F illustrate a graphical representation of a simulated nuclear reactor core 120, in accordance with one embodiment of the present invention. In one embodiment, an initial fuel loading distribution may be generated by the controller 102 for the simulated BOC core 120 of the nuclear reactor including, but not limited to, a plurality of simulated fuel assemblies 124, as shown in FIGS. 1E and 1F. In a further embodiment, based on the received one or more reactor core parameter distributions 103 from the core parameter distribution source 104, the one or more processors 106 of the controller 102 may generate an initial nuclear fuel loading distribution for a simulated BOC core 120 of a nuclear reactor having a plurality of fuel assemblies 124. It is noted herein that the simulated BOC core 120 of the present invention may take on any number of forms. FIGS. 1E and 1F depict a core 120 equipped with multiple hexagonoid-shape fuel assemblies 124 arranged in a hexagonal array. It is further noted that the depicted arrangements in FIGS. 1E and 1F is not limiting and is provided merely for illustration. It is noted that the simulated core 120 of the present invention may include alternative fuel assembly structures, such as, but not limited to, cylinders, parallelepipeds, triangular prisms, conical structures, helical structures and the like. Further, the array structure of the fuel assemblies of the simulated core 120 of the present invention may include alternative array structures, such as, but not limited to, a rectangular array, a square array, a cylindrical close packed array, a concentric ring array and the like.

As shown in FIG. 1G, in a further embodiment, one or more of the simulated fuel assemblies 124 of the BOC core 120 may include, but are not limited to, a plurality of fuel pins 125. In one embodiment, based on the received one or more reactor core parameter distributions 103 from the core parameter distribution source 104, the one or more processors 106 of the controller 102 may generate an initial nuclear fuel loading distribution for a simulated BOC core 120 of a nuclear reactor having a plurality of fuel assemblies 124, each equipped with multiple fuel pins 125.

It is noted herein that the structure and arrangement of the fuel pins within each fuel assembly 124 of the simulated core 120 may take on any form known in the art. For example, as shown in FIG. 1G, the fuel pins may be cylindrically shaped and arranged within a close packed hexagonal array within the fuel assembly 124. In other embodiments, although not shown, the simulated fuel pins of the core may have a hexagonoid shape, a parallelepiped shape, a triangular prism shape, a helical shape, a conical shape and the like. In another embodiment, although not shown, the simulated fuel pins of the core may be arranged in a rectangular array, a square array, a concentric ring array and the like.

In another embodiment, each of the plurality of fuel pins 125 in a simulated fuel assembly 124 of the simulated BOC core 120 may include a selected nuclear fuel. In this regard, the initial fuel loading distribution may be generated by the controller 102 for a simulated BOC core including any nuclear fuel known in the art. In one embodiment, the controller 102 may build up the simulated BOC core by selecting the nuclear fuel composition for each pin of each fuel assembly of the BOC core, resulting in a full core-wide nuclear fuel distribution. For example, as shown in FIG. 1H, a portion of the nuclear fuel 126 of the simulated BOC core may include, but not limited to, recycled nuclear fuel 127, unburned nuclear fuel 128, or enriched nuclear fuel 129.

For example, in response to the received one or more reactor core distributions 103 received from the core parameter distribution source 104, the one or more processors 106 are configured to generate an initial fuel loading distribution for a simulated BOC core of a nuclear reactor including recycled nuclear fuel 127. For instance, one or more fuel pins 125 of one or more fuel assemblies 124 of the simulated core 120 may contain a selected amount and type of recycled nuclear fuel 127.

By way of another example, in response to the received one or more reactor core parameter distributions 103 from the core parameter distribution source 104, the one or more processors 106 are configured to generate an initial fuel loading distribution for a simulated BOC core of a nuclear reactor including unburned nuclear fuel 128. For instance, one or more fuel pins 125 of one or more fuel assemblies 124 of the simulated core 120 may contain a selected amount and type of unburned nuclear fuel 128.

By way of another example, in response to the received one or more reactor core parameter distributions 103 from the core parameter distribution source 104, the one or more processors 106 are configured to generate an initial fuel loading distribution for a simulated BOC core of a nuclear reactor including enriched nuclear fuel 129. For instance, one or more fuel pins 125 of one or more fuel assemblies 124 of the simulated core 120 may contain a selected amount and type of enriched nuclear fuel 129. It is noted herein that the simulated BOC nuclear reactor core may include any enriched nuclear reactor fuel known in the art. For instance, the enriched nuclear fuel may include, but is not limited to, enriched uranium fuel.

In another embodiment, the simulated BOC core of the nuclear reactor may include, but is not limited to, a BOL core of the nuclear reactor. As such, the generated initial fuel loading distribution for the simulated BOC core of the nuclear reactor may include, but is not limited to, an initial fuel loading distribution for a simulated BOL core of the nuclear reactor. For example, the one or more processors 106 of the controller 102 may be configured to generate an initial fuel loading distribution for a simulated BOL core of a nuclear reactor. For instance, based on the received one or more reactor core parameter distributions 103 from the core parameter distribution source 104, the one or more processors 106 of the controller 102 may generate an initial nuclear fuel loading distribution for a simulated BOL core of a nuclear reactor.

Referring again to FIGS. 1A-1C, in one embodiment of the present invention, the one or more processors 106 of the controller 102 are configured to select an initial set of positions associated with each of a set of regions within the simulated BOC core 120 of the nuclear reactor. For example, as shown in FIG. 1B, the program instructions 105 maintained in memory 108 may include an initial position selector algorithm 132 configured to cause the one or more processors 106 of controller 102 to select an initial set of positions associated with each of a set of regions within the simulated BOC core 120 of the nuclear reactor. In one embodiment, the one or more processors 106 of the controller 102 may transmit the initial set of selected positions 140 (e.g., x, y, z positions; R, θ, φ positions and the like) to one or more databases 107 of memory 108 for storage and later use.

FIGS. 1I-1K illustrate a graphical representation of a simulated BOC core 120 and a set of regions 122 selected by one or more processors 106 of the controller 102, in accordance with one embodiment of the present invention. In one embodiment, as shown in FIG. 1I, each region 122 may correspond with a single fuel assembly 124 of the BOC core 120. In this regard, the one or more processors 106 of the controller 102 are configured to select an initial set of positions 140, whereby each of the set of selected initial positions 140 corresponds with the position (e.g., relative position) of the fuel assembly 124 of each single-assembly encompassing region 122.

In another embodiment, as shown in FIG. 1J, each region 122 may correspond with two or more fuel assemblies 124 of the simulated BOC core 120. For example, as shown in FIG. 1J, the surface of region 122 may encompass fuel assemblies 124a, 124b and 124c. In this regard, the one or more processors 106 of the controller 102 are configured to select an initial set of positions 140 corresponding to two or more fuel assemblies 124a-c contained within each of a set of regions 122 within the simulated BOC core of the nuclear reactor. It is noted herein that while region 122 is depicted as encompassing three fuel assemblies 124 in FIG. 1J, this should not be interpreted as a limitation. It is recognized herein that each region 122 may encompass any suitable number of fuel assemblies 124.

In another embodiment, as shown in FIG. 1K, each region 122 may correspond with a portion of a single assembly 124. For example, the surface of each region 122 may encompass a single portion of a single fuel assembly 124. For instance, as shown in FIG. 1K, in the case of a hexagonoid shaped fuel assembly 124, multiple "flat" hexagonoid shaped regions 122a-122g may each encompass different portions of the fuel assembly 124. While it is recognized herein that the positions of the sub-assembly regions 122a-122g are relatively fixed with respect to one another as the fuel assembly shape remains fixed (although expansion and warping caused by thermodynamic factors is anticipated), the sub-assembly regions 122a-122g may be utilized in the subsequent calculation and modeling of features (e.g., calculation of fuel design parameters and etc.) of the simulated core 120 of the present invention as described further herein. Further, it is recognized herein that in cases where the fuel assemblies 124 have a substantially large axial dimension, such as the hexagonoid fuel assemblies in FIG. 1K, the use of stacked sub-assembly regions 122a-122g allows for refinement in the modeling of reactor core 120 features along the axial direction. It is further noted that the particular shape and arrangement of the sub-assembly regions 122a-122g as depicted in FIG. 1K is not limiting and is provided merely for illustration.

For example, the sub-assembly regions 122a-g may include, but are not limited to, regions that are coextensive with one or more fuel pins contained with one or more fuel assemblies 124. For instance, although not shown in FIGS. 1I-1K, each region may encompass multiple fuel pins of a given fuel assembly, whereby each of the set of selected initial positions corresponds with each multi-pin encompassing region. In this regard, the one or more processors 106 of the controller 102 are configured to select an initial set of positions 140 corresponding to a set of nuclear fuel pins contained within each of a set of regions within the simulated BOC core of the nuclear reactor. In this regard, each sub-assembly region encompassing a multiple pins of a given fuel assembly may be utilized in the subsequent calculation and modeling of features (e.g., calculation of fuel design parameters and etc.). In another instance, although not shown in FIGS. 1I-1K, each region may encompass a single fuel pin, whereby each of the set of selected initial positions corresponds with a group of single-pin encompassing regions. In this regard, each sub-assembly region encompassing a single pin of a given fuel assembly may be utilized in the subsequent calculation and modeling of features.

In another embodiment of the present invention, each of the set of regions 122 includes, but is not limited to, a three-dimensional region having a selected volume. In this regard, the one or more processors 106 of the controller 102 are configured to select an initial set of positions 140 associated with a set of regions 122 defined by a three dimensional volume of selected size within the simulated BOC core 120 of the nuclear reactor. For example, the one or more processors 106 may define the size of the selected volume of each region based on a preprogrammed set of criteria. For instance, the selected volume of the constituent regions within the simulated BOC core 120 may depend on a variety of factors including, but not limited to, the volume of the reactor core, the number of fuel assemblies and fuel pins within the reactor core, the speed required of the simulation and the like. By way of another example, the one or more processors 106 may select the volume of each region based on a user selection received via the user interface device 118 of the user interface 114.

In another embodiment of the present invention, each of the set of regions includes, but is not limited to, a three-dimensional region having a selected shape. In this regard, the one or more processors 106 of the controller 102 may select an initial set of positions 140 associated with a set of regions within the simulated BOC core of the nuclear reactor, with each region being defined by a three dimensional volume having a selected shape. For example, as shown in FIG. 1I, the selected shape may include a hexagonoid. Further, as shown in FIG. 1I, the selected shape of the region 122 may outline a single hexagonoid-shaped fuel assembly or multiple hexagonoid-shaped fuel assemblies, as shown in FIGS. 1I and 1J respectively. While the shape of the selected regions and fuel assemblies have been illustrated as having a hexagonoid shape in FIGS. 1I and 1J, this should not be interpreted as a limitation of the present invention. The selected shape of the volume of one or more of the set of regions (and the shape of the fuel assemblies) may include any known three dimensional geometric shape. For example, the shape of the volume may include, but is not limited to, a cylinder, a parallelepiped (e.g., cuboid), a hexagonoid, an ellipsoid, a sphere, a disc, a ring and the like.

It is furthered note that there is no requirement that the selected regions take on the same general shape as the fuel assemblies or fuel assembly ensembles of the BOC core. In another embodiment, the one or more processors 106 may define the shape of the selected volume of each region based on a preprogrammed set of criteria. In another embodiment, the one or more processors 106 may select the shape of each volume of each region based on a user selection received via the user interface device 118 of the user interface 114.

In another embodiment of the present invention, the number of regions included in the set of regions within the simulated BOC nuclear reactor core 120 is selectable. For example, the one or more processors 106 of the controller 102 are configured to select an initial set of positions associated with a set of regions consisting of a selected number of regions within the simulated BOC core 120 of the nuclear reactor. Further, the one or more processors 106 may select the number of regions based on a preprogrammed set of criteria. Further, the one or more processors 106 may select the number or regions based on a user selection received via the user interface device 118 of the user interface 114.

Referring again to FIGS. 1A-1C, in one embodiment of the present invention, the one or more processors 106 of controller 102 are configured to generate an initial set of fuel design parameter values based one or more design variables. In this regard, the one or more processors 106 of controller 102 may generate a fuel design parameter value for the simulated nuclear fuel within a given region 122 based on one or design variables (e.g., thermodynamic variable value, neutronic parameter value, and the like) associated with the simulated nuclear fuel within the given region 122. For example, as shown in FIG. 1B, the program instructions 105 maintained in memory 108 may include an initial fuel design parameter generator algorithm 134 configured to cause the one or more processors 106 of controller 102 to generate an initial set of fuel design parameter values based on or more design variables. In a further embodiment, the one or more processors 106 of the controller 102 may transmit the generated initial set of fuel design parameters 141 to one or more databases 107 of memory 108 for storage and later use.

In one embodiment, as graphically depicted in FIG. 1I, the one or more processors 106 of controller 102 may generate an initial fuel design parameter value 141 for a first region 122 utilizing one or more design variables associated with the nuclear fuel encompassed by the first region 122. In this regard, the one or more processors 106 of controller 102 may build up a set of initial fuel design parameter values 141 by iteratively repeating this process for each region 122 in the simulated BOC core 120.

In another embodiment, the one or more processors 106 of controller 102 are configured to generate an initial fuel design parameter value 141 for each region 122 utilizing one or more design variables for each region adjacent to a given region 122. As shown in FIG. 1L, the one or more processors 106 of controller 102 may generate an initial fuel design parameter value 141 for region 122 utilizing one or more design variables for the region 122 and the regions 123a-123f surrounding region 122. For example, the one or more processors 106 of controller 102 may generate an initial fuel design parameter value 141 for region 122 utilizing a statistical characteristic of one or more design variables for the regions 123a-123f. For instance, the one or more processors 106 of controller 102 may generate an initial fuel design parameter value 141 for region 122 utilizing an average value, a median value, a maximum value, a minimum value or the like of the one or more design variables for the regions 123a-123f. In one example, the one or more processors 106 of controller 102 may generate an initial fuel design parameter value 141 for region 122 utilizing an average of the one or more design variable values for the regions 123a-123f. In another example, the one or more processors 106 of controller 102 may generate an initial fuel design parameter value 141 for region 122 utilizing a statistical median of the one or more design variable values for the regions 123a-123f. It is noted herein that any statistical aggregation or selection of the one or more design variable values of regions 122 and/or 123a-123f may be used to generate an initial fuel design parameter value 141 for region 122. Further, the one or more processors 106 of controller 102 may build up the set of initial fuel design parameter values 141 by iteratively repeating this process for each region in the simulated BOC core 120. While only one region 122 has been depicted for calculation in FIG. 1L, it is noted that the set of initial fuel design parameter values 141 may be generated by repeating this process for each defined region 122 in the simulated BOC core 120.

In another embodiment, the one or more design variables may be utilized at the pin-level (e.g., pins 125 of FIG. 1G) to generate an initial set of fuel design parameter values. In this regard, the one or more processors 106 of controller 102 may generate an initial set of nuclear fuel design parameters based on one or more design variables associated with the nuclear fuel contained within each of the set of pins within each of the set of regions 122. In a further embodiment, each of the initial set of fuel design parameter values generated by the one or more processors 106 of controller 102 is associated with one of the set of regions 122 of the simulated BOC core 120 of the nuclear reactor. In another embodiment, each of the initial set of fuel design parameter values generated by the one or more processors 106 of controller 102 is associated with one of the pins of contained within one of the set of regions 122 of the simulated BOC core 120 of the nuclear reactor.

FIG. 1M illustrates a block diagram of the types of design variables 144 suitable for use by the controller 102 to generate the initial set of fuel design parameter values, in accordance with one or more embodiments of the present invention. In one embodiment, the initial set of fuel design parameter values 141 generated by controller 102 may be based on one or more thermodynamic variables 145 associated with each of the set of regions 122. In this regard, the initial set of fuel design parameter values may be based on a value of one or more thermodynamic variables 145 for each region of the set of regions. For example, the one or more processors 106 of the controller 102 may be configured to generate an initial set of fuel design parameter values using a value of a thermodynamic variable 145 for each of the set of regions 122 within the simulated BOC core 120 of the nuclear reactor.

In another embodiment, the initial set of fuel design parameter values 141 generated by controller 102 may be based on one or more thermodynamic variables 145 associated with each region adjacent to the given region in question. In this regard, each initial fuel design parameter value of a given region of the initial set of fuel design parameter values may be based on a value of one or more thermodynamic variables for each region adjacent to the given region. For example, the one or more processors 106 of the controller 102 may be configured to generate an initial fuel design parameter value for each region 122 using a value of a thermodynamic variable 145 for region 122 and regions 123a-123f adjacent to region 122 within the simulated BOC 120 core of the nuclear reactor.

It is noted herein that the one or more thermodynamic variables used to generate the initial set of fuel design parameter values may include any thermodynamic variable known in the art. For example, the thermodynamic variable may include, but is not limited to, the temperature 146 (e.g., median temperature, average temperature, maximum temperature, minimum temperature and the like) of each of the set of regions. By way of another example, the thermodynamic variable used to generate the initial set of fuel design parameter values may include, but is not limited to, the pressure 147 (e.g., median pressure, average pressure, maximum pressure, minimum pressure and the like) of each of the set of regions.

In another embodiment of the present invention, the initial set of fuel design parameter values generated by controller 102 may be based on one or more neutronic parameters 148 associated with each of the set of regions. In this regard, the initial set of fuel design parameter values may be based on a value of one or more neutronic parameters 148 for each region of the set of regions 122. For example, the one or more processors 106 of the controller 102 may be configured to generate an initial set of fuel design parameter values using a value of a neutronic parameter 148 for each of the set of regions 122 within the simulated BOC core 120 of the nuclear reactor.

In another embodiment, the initial set of fuel design parameter values 141 generated by controller 102 may be based on one or more neutronic parameters associated with a given region and each region adjacent to the given region in question. In this regard, each initial fuel design parameter value 141 of a given region 122 of the initial set of fuel design parameter values may be based on a value of one or more neutronic parameters 148 of the given region 122 and regions 123a-123f adjacent to the given region 122. For example, the one or more processors 106 of the controller 102 may be configured to generate an initial fuel design parameter value for each region 122 using a value of a neutronic parameter for region 122 and the regions 123a-123f adjacent to region 122 within the simulated BOC 120 core of the nuclear reactor.

It is noted herein that the one or more neutronic parameter used to generate the initial set of fuel design parameter values may include any neutronic parameter known in the art. For example, the neutronic parameter may include, but is not limited to, a k-infinity value 149. By way of another example, the neutronic parameter used to generate the initial set of fuel design parameter values may include, but is not limited to, neutron flux 150 of each of the set of regions. By way of another example, the neutronic parameter used to generate the initial set of fuel design parameter values may include, but is not limited to, neutron production rate 151 of each of the set of regions. By way of another example, the neutronic parameter used to generate the initial set of fuel design parameter values may include, but is not limited to, neutron absorption rate 152 of the each of the set of regions.

FIG. 1N illustrates a block diagram of the types of fuel design parameters 153 generated by the controller 102, in accordance with one or more embodiments of the present invention. The initial fuel design parameters 141 generated by the controller 102 may include any fuel design parameter suitable for implementation in the present invention. In one embodiment, the initial set of fuel design parameter values 141 generated by controller 102 may include, but is not limited to, a set of nuclear fuel enrichment values 154. For example, the one or more processors 106 of controller 102 may generate an initial set of nuclear fuel enrichment values 154 associated with the set of regions located at the initial set of positions in the simulated BOC core 120 using the one or more design variables of each of the set of regions.

In another embodiment, the set of fuel design parameters generated by controller 102 may include, but is not limited to, a set of fuel pin dimension values 155. For example, the one or more processors 106 of controller 102 may generate an initial set of fuel pin dimension values 155 associated with the fuel pins encompassed by each of the set of regions located at the initial set of positions in the simulated BOC core using the one or more design variables of each of the set of regions.

The set of nuclear fuel pin dimension values 155 may include any nuclear fuel pin dimension value known in the art. For example, the set of nuclear fuel pin dimension values 155 may include a fuel pin configuration value 156 (e.g., pin pitch value, number of pins and the like) based on a configuration of multiple fuel pins in a single fuel assembly or multiple fuel assemblies. By way of another example, the set of nuclear fuel pin dimension values may include a fuel pin geometry value 157 (e.g., pin diameter value, pin shape and the like) based on a spatial feature of a representative fuel pin of multiple fuel pins in a single fuel assembly or multiple fuel assemblies. By way of another example, the set of nuclear fuel pin dimension values 155 may include a pin composition value 158 (e.g., ratio of fertile material to fissile material in one or more pins of one or more fuel assemblies) based on the chemical composition of the nuclear fuel contained within the multiple fuel pins in a single fuel assembly or a multiple fuel assembly.

In one embodiment, the set of nuclear fuel pin dimension values 155 may include, but is not limited to, a pin pitch value. For instance, a pin pitch value may include the pin pitch value of a group of pins within one or more fuel assemblies of the nuclear reactor core. In this regard, the pin pitch value may be defined by the pin pitch throughout one or more fuel assemblies, each containing multiples fuel pins, of a nuclear reactor core. For example, the one or more processors 106 of controller 102 may generate an initial set of pin pitch values associated with the set of regions located at the initial set of positions in the simulated BOC core using the one or more design variables of each of the set of regions. In another embodiment, the set of nuclear fuel pin dimension values may include, but is not limited to, the number of fuel pins within the BOC core 120.

In another embodiment, the set of nuclear fuel pin dimension values 155 may include, but is not limited to, a pin diameter value. For example, a pin diameter value may include the pin diameter value of a group of pins within the nuclear reactor core. In this regard, the pin diameter value may be defined by the pin diameter (e.g., average pin diameter, mean pin diameter, and the like) of the fuel pins contained within one or more fuel assemblies of a nuclear reactor core. For example, the one or more processors 106 of controller 102 may generate an initial set of pin diameter values associated with the set of regions located at the initial set of positions in the simulated BOC core using the one or more design variables of each of the set of regions. It is noted herein that the size of the coolant channels within a given fuel assembly of a nuclear reactor core is generally defined by the pin pitch and the pin diameter of the set of pins contained within the given fuel assembly.

In another embodiment, the set of nuclear fuel pin dimension 155 values may include, but is not limited to, a pin-size value. For instance, a pin-size value may include, but is not limited to, the pin length, pin radius (or pin width) or pin volume of the fuel pins within one or more fuel assemblies of the nuclear reactor core. For example, the one or more processors 106 of controller 102 may generate an initial set of pin size values associated with the set of regions 122 located at the initial set of positions 140 in the simulated BOC core 120 using the one or more design variables of each of the set of regions.

In another embodiment, the set of nuclear fuel pin dimension values 155 may include, but is not limited to, a pin shape. For example, the one or more processors 106 of controller 102 may generate an initial set of pin shapes associated with the set of regions 122 located at the initial set of positions 140 in the simulated BOC core 120 using the one or more design variables of each of the set of regions. In some embodiments, as described previously herein, the pin shape may include any geometric shape known in the art, such as, but not limited to, a hexagonoid, a cylinder, a parallelepiped, a triangular prism, a conical shape, a helical shape and the like. In other embodiments, the pin shape may include an irregular shape. For instance, the pin shape may include a warped or distorted regular geometric shape.

In another embodiment, the set of nuclear fuel pin dimension values 155 may include, but is not limited to, a pin position within the BOC core 120. For example, the one or more processors 106 of controller 102 may generate an initial set of positions 140 of multiple fuel pins encompassed by the each of the set of regions 122 located at the initial set of positions in the simulated BOC core 120 using the one or more design variables of each of the set of regions.

In another embodiment, the set of nuclear fuel pin dimension values 155 may include, but is not limited to, a fuel smear density value. For example, a fuel smear density value may include the nuclear fuel smear density value associated with the fuel contained within a group of fuel pins within the nuclear reactor core. In this regard, the fuel smear density value may be defined by the fuel smear density associated with the fuel pins contained within one or more fuel assemblies of a nuclear reactor core. For example, the one or more processors 106 of controller 102 may generate an initial set of fuel smear density values associated with the set of regions located at the initial set of positions in the simulated BOC core using the one or more design variables of each of the set of regions. Those skilled in the art will recognize that "smear density" is the density of nuclear fuel as if it were uniformly "smeared" throughout the inside surface of the fuel cladding. Nuclear fuel smear density is generally described in Alan E. Waltar and Albert B. Reynolds, *Fast Breeder Reactors,* 1st ed, Pergamon Press Inc., 1981, p. 121, which has been incorporated above by reference in the entirety.

In another embodiment, the set of nuclear fuel pin dimension values 155 may include, but is not limited to, the fission gas plenum volume associated with one or more pins of one or more fuel assemblies of the BOC core. For example, the one or more processors 106 of controller 102 may generate an initial fission gas plenum volume for each fuel pin of one or more fuel assemblies of the simulated BOC core using the one or more design variables of each of the set of regions. Those skilled in the art will recognize that for the purposes of the present disclosure "fission gas plenum" constitutes a reservoir located in a given fuel pin for collecting fission gas products released from the nuclear fuel contained within the fuel pin during core operation. A fission gas plenum is generally described in Alan E. Waltar and Albert B. Reynolds, *Fast Breeder Reactors,* 1st ed, Pergamon Press Inc., 1981, p. 254, which has been incorporated above by reference in the entirety.

In another embodiment, the set of nuclear fuel pin dimension values 155 may include, but is not limited to, the composition of nuclear fuel contained within one or more pins of one or more fuel assemblies of the simulated BOC core 120. For example, the one or more processors 106 of controller 102 may generate an initial set of fuel composition values associated with one or more fuel encompassed by the set of regions 122 located at the initial set of positions in the simulated BOC core 120 using the one or more design variables of each of the set of regions. In this regard, the one or more processors 106 of controller 102 may generate an initial fuel composition spatial distribution across the simulated BOC core 120, as represented by the set of regions 122 located at the initial set of positions in the simulated BOC core using the one or more design variables of each of the set of regions.

The fuel composition values generated by the one or more processors 106 may include any fuel composition metric known in the art. It should be recognized by those skilled in the art that "nuclear fuel" in general may include both fissionable and non-fissionable material (e.g., fertile material or non-fissionable/non-fertile material (e.g., alloying agents, moderating material, and the like)). As such, for the purposes of the present disclosure, the term "nuclear fuel" is not limited to fissionable material, but may encompass an entire volume of an object or material used as a fuel source in a nuclear reactor setting. In this regard, the volume of nuclear fuel may include regions of fissionable material, regions of fertile material and/or regions of other material (i.e., non-fertile material), such as, but not limited to, neutron moderating material and alloying agents.

In one embodiment, the one or more processors 106 of controller 102 may generate a initial set of nuclear fuel composition values including the relative amount of fissionable material within each of the set of regions located at the initial set of positions in the simulated BOC core using the one or more design variables of each of the set of regions. For example, the one or more processors 106 of controller 102 may generate an initial set of nuclear fuel composition values including the relative amount of uranium-235 within each of the set of regions 122 located at the initial set of positions in the simulated BOC core 120 using the one or more design variables of each of the set of regions. By way of another example, the one or more processors 106 of controller 102 may generate an initial set of nuclear fuel composition values including the relative amount of plutonium-239 within each of the set of regions 122 located at the initial set of positions in the simulated BOC core 120 using the one or more design variables of each of the set of regions.

In another embodiment, the one or more processors 106 of controller 102 may generate a initial set of nuclear fuel composition values including the relative amount of fertile material within each of the set of regions 122 located at the initial set of positions in the simulated BOC core 120 using the one or more design variables of each of the set of regions 122. For example, the one or more processors 106 of controller 102 may generate an initial set of nuclear fuel composition values including the relative amount of uranium-238 within each of the set of regions 122 located at the initial set of positions in the simulated BOC core 120 using the one or more design variables of each of the set of regions 122. By way of another example, the one or more processors 106 of controller 102 may generate a initial set of nuclear fuel composition values including the relative amount of thorium-232 within each of the set of regions 122 located at the initial set of positions in the simulated BOC core 120 using the one or more design variables of each of the set of regions 122.

In another embodiment, the one or more processors 106 of controller 102 may generate an initial set of nuclear fuel composition values including the relative amount of constituent elements in a nuclear fuel alloy within each of the set of regions 122 located at the initial set of positions in the simulated BOC core 120 using the one or more design variables of each of the set of regions 122. Those skilled in the art should recognize that an alloying agent, such as, but not limited to, zirconium, may be used in metallic nuclear fuels in order to stabilize the phases (e.g., stabilize the migration of constituent materials) of the metallic nuclear fuels. In one embodiment, the one or more processors 106 of controller 102 may generate an initial set of nuclear fuel composition values including the relative amount of uranium and plutonium in a uranium-zirconium alloy contained within each of the set of regions located at the initial set of positions in the simulated BOC core 120 using the one or more design variables of each of the set of regions 122. In another embodiment, the one or more processors 106 of controller 102 may generate an initial set of nuclear fuel composition values including the relative amount of uranium, plutonium and zirconium in a uranium-plutonium-zirconium alloy contained within each of the set of regions located at the initial set of positions in the simulated BOC core using the one or more design variables of each of the set of regions 122.

It should be recognized that types of fissile and non-fissile materials described above should not be interpreted as limitations. Rather, the types of fissile and non-fissile material described above are provided merely for illustrative purposes and it is anticipated that additional or alternative materials may be suitable for implementation in the present invention.

FIG. 1O illustrates a block diagram of reactor core parameter distributions 159 suitable for calculation by the one or more processors 106 of the controller 102, in accordance with one or more embodiments of the present invention. In one embodiment, the one or more processors 106 of controller 102 are configured to calculate one or more reactor core parameter distributions of the simulated BOC core 120 based on the generated initial set of fuel design parameter values associated with the set of regions 122 located at the initial set of positions of the simulated BOC core 120. For example, as shown in FIG. 1B, the program instructions 105 maintained in memory 108 may include a simulated core parameter distribution calculator algorithm 136 configured to cause the one or more processors 106 of controller 102 to calculate one or more reactor core parameter distributions of the simulated BOC core 120 based on the generated initial set of fuel design parameter values 141 associated with the set of regions 122 located at the initial set of positions of the simulated BOC core 120. In a further embodiment, the one or more processors 106 of the controller 102 may transmit the calculated one or more reactor core parameter distributions 159 to one or more databases 107 maintained in memory 108 for storage and later use.

The one or more reactor core parameter distributions 159 calculated via the one or more processors 106 may include any reactor core parameter distribution known in the art. In one embodiment, the one or more processors 106 may calculate the power density distribution 160 of the simulated BOC reactor core 120. In another embodiment, the one or more processors 106 may calculate the rate of change of the power density distribution 161 of the simulated BOC reactor core 120. The power density and rate of change of power density in a nuclear reactor core are generally described in Elmer E. Lewis, *Fundamentals of Nuclear Reactor Physics*, 1st ed, Elsevier Inc., 2008, pp. 199-213, which is incorporated herein in the entirety.

In one embodiment, the one or more processors 106 may calculate the reactivity distribution 162 of the simulated BOC reactor core 120. In another embodiment, the one or more processors 106 may calculate the rate of change of the reactivity distribution 163 of the simulated BOC reactor core 120. Reactivity and rate of change of reactivity in a nuclear reactor core are generally described in Elmer E. Lewis, *Fundamentals of Nuclear Reactor Physics*, 1st ed, Elsevier Inc., 2008, pp. 115-234, which has been incorporated above in the entirety.

Referring again to FIGS. 1A-1C, the one or more processors 106 of controller 102 are configured to generate a loading distribution by performing one or more perturbation processes on the set of regions 122 of the simulated BOC core 120, in accordance with an embodiment of the present invention. In this regard, the implemented perturbation process allows the system 100 to determine a subsequent set of positions for the set of regions 122 within the simulated BOC core.

In one embodiment, as shown in FIG. 1B, the program instructions 105 maintained in memory 108 may include a simulated loading distribution generator algorithm 138 configured to cause the one or more processors 106 of controller 102 to generate a loading distribution by performing one or more perturbation processes on the set of regions 122 of the simulated BOC core 120. In another embodiment, as shown in FIG. 1C, the one or more processors 106 of the controller 102 may transmit the generated loading distribution 143 (e.g., distribution of nuclear fuel composition throughout the simulated nuclear reactor core 120) to one or more databases 107 of memory 108 for storage and later use.

In one embodiment, the subsequent set of positions serve to reduce the deviation metric (e.g., difference, spatially averaged difference, maximum difference, minimum difference, aggregated global deviation metric and the like) between the one or more calculated reactor core distributions of the simulated BOC core and the received one or more reactor core parameter distributions associated with a state of a core of a nuclear reactor (i.e., reference nuclear reactor) below a selected tolerance level.

In another embodiment, the subsequent set of positions may define a suitable loading distribution for the simulated BOC core 120. For example, the subsequent set of region positions may define a suitable core loading distribution in situations where the subsequent set of positions (i.e., positions of regions after one or more perturbation cycles) of the set of regions within the simulated core produce one or more calculated loading distributions 143 that sufficiently converge (e.g., sufficiently converge below a selected tolerance level) toward the one or more reference reactor core parameter distributions 103 from the core parameter distribution source 104. In this setting, the subsequent set of positions may be utilized as the "final" set of positions of the one or more regions 122 in an associated nuclear reactor core (see core 202 described further herein).

FIG. 1P illustrates a flow diagram depicting steps of a perturbation process 170 suitable for determining a subsequent set of positions of the regions 122 of the simulated reactor core 120, in accordance with an embodiment of the present invention. In a first step 171, the one or more processors 106 of controller 102 may receive one or more reference reactor core parameter distributions. For example, as described throughout the present disclosure, the one or more processors 106 of controller 102 may receive one or more reference reactor core parameter distributions 103 from the core parameter distribution source 104. For instance, the one or more reference reactor core parameter distributions may include an equilibrium distribution of a reference nuclear reactor core (e.g., operated reactor core).

In a second step 172, the one or more processors 106 of controller 102 may calculate a first reactor core parameter distribution (or a first set of reactor core parameter distributions). For example, utilizing the various methods and embodiments as described throughout the present disclosure, the one or more processors 106 of controller 102 may calculate a first reactor core parameter distribution based on a distribution of regions 122 (e.g., regions containing one or more fuel assemblies 124) containing "fresh" nuclear fuel (e.g., unburned nuclear fuel or enriched nuclear fuel) or recycled nuclear fuel throughout the simulated nuclear core 120.

In a third step 173, the one or more processors 106 of the controller 102 may compare the first calculated reactor core parameter distribution calculated in step 172 to the received reference reactor core parameter distribution of step 171. For example, the one or more processors 106 of the controller 102 may compare a first calculated reactor core power density distribution (calculated in step 172) to a received reference reactor core power density distribution (received in step 171).

Further, the one or more processors 106 may calculate at least one deviation metric between at least a portion of the first calculated reactor core parameter distribution and a portion of the received reference reactor core parameter distribution. It is noted herein that the deviation metric calculated by the one or more processors 106 may include any metric known in the art suitable for quantifying a difference or deviation between all or a portion of the first calculated reactor core parameter distribution and the received reference reactor core parameter distribution. For example, the deviation metric may include, but is not limited to, a difference (e.g., difference at a common position), a relative difference, a ratio, an averaged difference (e.g., spatially averaged difference), maximum difference (e.g., maximum difference between any two or more common positions), minimum difference (e.g., minimum difference between two or more common positions), aggregated deviation (e.g., global deviation metric) or any other deviation metric known in the art.

It is recognized herein that both the first calculated reactor core parameter distribution and the received reference reactor core parameter distribution may each consist of a three-dimensional distribution of a given reactor core parameter throughout a nuclear reactor core. As such, a comparison 173 between the first calculated reactor core parameter distribution and the received reference reactor core parameter distribution may include any comparison technique known in the art suitable for comparing two or more three-dimensional varying distributions.

In one embodiment, the comparison may include comparing the reactor core parameter distributions along a selected direction in the simulated core and the reference core. For example, the comparison may include comparing the reactor core parameter distributions along at least similar radial lines running through the simulated and reference cores. It is noted herein that this approach effectively reduces the three dimensional comparison to a one-dimensional comparison. It is further noted that a number of comparisons, each along a different direction, may be made between the simulated and reference cores. Then, the multiple one-dimensional comparisons may be aggregated in order to provide a global deviation metric representative of the overall deviation between the first calculated reactor core parameter distribution and the reference reactor core parameter distribution.

In another embodiment, the comparison may include comparing the reactor core parameter distributions across a selected plane, or cross-section, in the simulated core and the reference core. For example, the comparison may include comparing the reactor core parameter distributions across at least similar cross-sections running through the simulated and reference cores. It is noted herein that this approach effectively reduces the three-dimensional comparison to a two-dimensional comparison. It is further noted that a number of comparisons, each at a different cross-section, may be made between the simulated and reference cores. Then, the multiple two-dimensional comparisons may be aggregated in order to provide a global deviation metric representative of the overall deviation between the first calculated reactor core parameter distribution and the reference reactor core parameter distribution.

In another embodiment, the comparison may include comparing distributions at each of the set of regions 122 (e.g., regions 122 in FIG. 1I-1K) in the simulated core and the reference core. For example, the comparison may include generating an aggregated deviation metric between the first calculated reactor core parameter distribution and the received reference reactor core parameter distribution by calculating a deviation metric between the two distributions at each of the sets of regions 122. Then, deviation metrics collected in the multiple comparisons from each region may be statistically aggregated to provide a global deviation metric representative of the overall deviation between the first calculated reactor core parameter distribution and the reference reactor core parameter distribution. In another embodiment, the comparison may include comparing averaged deviation values (e.g., averaged difference values) for one or more reactor core parameter distributions extracted from selected volumes (e.g., regions 122 or groups of regions 122) of the reference and simulated cores.

Upon comparing the first calculated reactor core parameter distribution and the reference reactor core parameter distribution, the one or more processors 106 of controller 102 may determine whether the deviation metric calculated between the first calculated reactor core parameter distribution and the reference reactor core parameter distribution is above, at or below a selected tolerance level. In the event that the deviation metric is at or below the selected tolerance level, the perturbation procedure ends 174. In the event that the deviation metric is above the selected tolerance level, the perturbation procedure moves to step 175.

In a fourth step 175, the one or more processors 106 of the controller 102 may vary the spatial position of one or more of the set of regions 122 (e.g., regions containing one or more simulated fuel assemblies 124) of the simulated BOC core 120. In this regard, the one or more processors 106 of the controller 102 may "perturb" the regions 122. It is recognized herein that the position of the regions 122 may be perturbed along one or more directions in any manner known in the art.

In a fifth step 176, the one or more processors 106 of the controller 102 may calculate an additional reactor core parameter distribution (or an additional set of reactor core parameter distributions) based on the perturbed positions of regions 122 achieved in step 175. For example, utilizing the various methods and embodiments as described throughout the present disclosure, the one or more processors 106 of controller 102 may calculate an additional reactor core parameter distribution based on a distribution of regions 122, containing fresh or recycled nuclear fuel, at their new positions ("new" relative to positions of step 172) achieved in step 175.

In a sixth step 177, the one or more processors 106 of the controller 102 may compare the additional calculated reactor core parameter distribution found in step 176 to the received reference reactor core parameter distribution of step 171. For example, the one or more processors 106 of the controller 102 may compare an additional calculated reactor core power density distribution (calculated in step 176) to a received reference reactor core power density distribution (received in step 171) in a manner similar to that described in step 173 above.

Upon comparing the additional calculated reactor core parameter distribution to the reference reactor core parameter distribution, the one or more processors 106 of controller 102 may determine whether the deviation metric between the additional calculated reactor core parameter distribution and the reference reactor core parameter distribution is above, at or below the selected tolerance level, as described above. In the event that the deviation metric is at or below the selected tolerance level, the perturbation procedure may end 178. In the event that the deviation metric is above the selected tolerance level, the perturbation procedure may repeat, starting again with step 175, until the Nth calculated reactor core parameter distribution converges toward the reference core parameter distribution to a level at or below the selected threshold value. In this regard, the positions of the regions 122 define the distribution of fresh or recycled nuclear fuel that produces a reactor core parameter distribution that deviates from the reference reactor core parameter distribution (e.g., equilibrium distribution) by a magnitude equal to or less than the selected tolerance value (e.g., a selected level of accuracy).

In another embodiment, the perturbation process 170 may implement linear rates of change analysis on a iteration steps after the first iteration step. For example, the perturbation process 170 may implement linear rates of change analysis on a iteration steps on the second iteration step. For instance, on a second iteration step, the perturbed results may be compared to the results of the first iteration. Based on the difference observed between the first and second steps, a linear rate of change for the regions 122 may be calculated. In turn, the linear rate of change is utilized in the next perturbation step. Further, this process may be repeated until the reactor core parameter distribution deviates from the reference reactor core parameter distribution (e.g., equilibrium distribution) by a magnitude equal to or less than the selected tolerance value (e.g., a selected level of accuracy).

It is further recognized herein that reactor core parameter distributions, such as reactivity and power density distributions, are not generally unique. As such, multiple reactor states may provide similar results. In one embodiment, the present invention may act to preferentially select solutions sufficiently near critical, whereby $k_{eff}=1$. In this regard, a second level of iteration may activate following the convergence of the first iteration (described above) in order to adjust the enrichment distribution within the simulated core 120 such that simulated core is critical or at least near-critical. Further, the present invention may execute these steps multiple times in order to properly converge on a critical distribution that mirrors the distribution of the reference nuclear reactor in the selected state (e.g., equilibrium).

Referring again to FIG. 1A, the one or more processors 106 may report the generated loading distribution including the subsequent set of positions of the set of regions of the simulated BOC core 120 found in the perturbation process to one or more associated devices or systems.

In one embodiment, the one or more processors 106 of controller 102 may report the subsequent set of positions of the set of regions 122 of the simulated BOC core to a display device 116. In another embodiment, the one or more processors 106 of controller 102 may report the set of positions of the set of regions 122 at each iterative step of the perturbation process of the simulated BOC core to a display device 116.

The display device may include any visual display device known in the art. For example, the display device 116 may include, but is not limited to, a display device 116 of a user interface device 114 communicatively coupled to the controller 102. The display device 116 may include any visual or audio display device known in the art. For example, in the case of visual display, the display device may include, but is not limited to a liquid crystal display (LCD), one or more light emitting diodes (LEDs), one or more organic LEDs (OLEDs), a cathode rate tube (CRT) or the like. Further, the interface device 114 may include any user input device 118 known in the art. For example, the one or more user input device 118 may include a keyboard, a touchpad, a touchscreen integrated with a display device, a mouse, and the like.

In another embodiment, the one or more processors 106 of controller 102 may report the loading distribution results including the subsequent set of positions of the set of regions 122 of the simulated BOC core to one or more memory devices. For example, the one or more processors 106 may transmit the loading distribution results 143 of the perturbation process to a database 107 maintained in memory 108 of controller 102. By way of another example, the one or more processors 106 may transmit the loading distribution results 143 of the perturbation process to a database maintained in memory of a remote system (e.g., remote server) communicatively coupled to controller 102.

In another embodiment, the one or more processors 106 of controller 102 may report the set of positions of the set of regions 122 at each iterative step of the perturbation process of the simulated BOC core to one or more memory devices. For example, the one or more processors 106 may transmit the set of positions of the set of regions 122 at each iterative step of the perturbation process of the simulated BOC core to a database 107 maintained in memory 108 of controller 102. By way of another example, the one or more processors 106 may transmit the set of positions of the set of regions 122 at each iterative step of the perturbation process of the simulated BOC core to a database maintained in memory of a remote system (e.g., remote server) communicatively coupled to controller 102.

In another embodiment, the one or more processors 106 of controller 102 may report the loading distribution results including the subsequent set of positions of the set of regions 122 of the simulated BOC core to an operation system of an associated nuclear reactor 101. For example, the one or more processors 106 may transmit the loading distribution results 143 of the perturbation process to control system 180 of nuclear reactor 101.

In another embodiment, the one or more processors 106 of controller 102 may report the set of positions of the set of regions 122 at each iterative step of the perturbation process of the simulated BOC core to a control system 180 of an associated nuclear reactor 101. For example, the one or more processors 106 may transmit the set of positions of the set of regions 122 at each iterative step of the perturbation process of the simulated BOC core to control system 180 of nuclear reactor 101.

Referring generally to FIGS. 2A-2D, a nuclear reactor system 200 equipped with loading distribution generation capabilities is described, in accordance with one embodiment of the present invention. In one aspect, the system 200 is suitable for generating a loading distribution (as described previously herein). In turn, the loading distribution generated by the system 200 may then be utilized to configure a nuclear reactor core 202 (e.g., arrange one or more fuel assemblies 208 of core 202 or initially load one or more fuel assemblies 208 of core 202) associated with the controller 102 of system 200. In this regard, the configuration of nuclear reactor core 202 is executed such that the core 202 of the reactor begins cycle operation (e.g., beginning of life operation) in a state consistent with (i.e., within a selected tolerance level) the received reactor core parameter distribution associated with a selected state (e.g., equilibrium state) of a core of a reference nuclear reactor.

Applicant notes herein that the various embodiments and examples provided throughout the present disclosure should be interpreted to extend to system 200. As previously described herein, the system 200 may include controller 102 communicatively coupled to a core parameter distribution source 104 (e.g., core parameter distribution database maintained in memory). Further, the controller 102 is configured to receive one or more reactor core parameter distributions 103 (e.g., power density distribution or reactivity distribution) associated with a state, such as an equilibrium state, of a core of a reference nuclear reactor (e.g., reference breed-and-burn nuclear reactor) from the core parameter distribution source 104. In addition, the controller 102 is configured to generate an initial fuel loading distribution for a simulated BOC core of a nuclear reactor. The controller 102 is further configured to select an initial set of positions associated with a set of regions 122 within the simulated BOC core 120 of the nuclear reactor. Further, the controller 102 is configured to generate an initial set of fuel design parameter values utilizing at least one design variable of each of the set of regions 122. In addition, the controller 102 is configured to calculate a reactor core parameter distribution of the simulated BOC 120 core based on the generated initial set of fuel design parameter values associated with the set of regions 122 located at the initial set of positions of the simulated BOC core 120. Further, the controller 102 is configured to generate a loading distribution by performing one or more perturbation processes (e.g., perturbation process illustrated in FIG. 1P) on the set of regions 122 of the simulated BOC core 120 in order to determine a subsequent set of positions for the set of regions 122 within the simulated BOC core 120.

In a further aspect of the present invention, the system 200 may include a nuclear reactor 101 associated with controller 102. In one embodiment, the nuclear reactor 101 includes a nuclear reactor core 202. In a further embodiment, the nuclear reactor core 202 includes a set of fuel assemblies 208. In a further embodiment, the fuel assemblies 208 of reactor core 202 are arrangeable according to the nuclear fuel loading distribution generated by the one or more processors 106 of the controller 102, as described previously herein. Further, as described previously herein, the nuclear fuel loading distribution may include a subsequent set of positions of regions 122 with the simulated BOC core 120. As described previously herein, the subsequent set of positions of regions 122 may act to cause the reactor core parameter distribution of the simulated BOC core 120 to converge toward the reactor core parameter distribution received from the core of the reference reactor within a preselected tolerance level. In this regard, the subsequent set of positions of regions 122 serve to form a reactor core parameter distribution that "matches" the reactor core parameter distribution from a given reference nuclear reactor in a selected state, such as an equilibrium state.

Figure 2A:
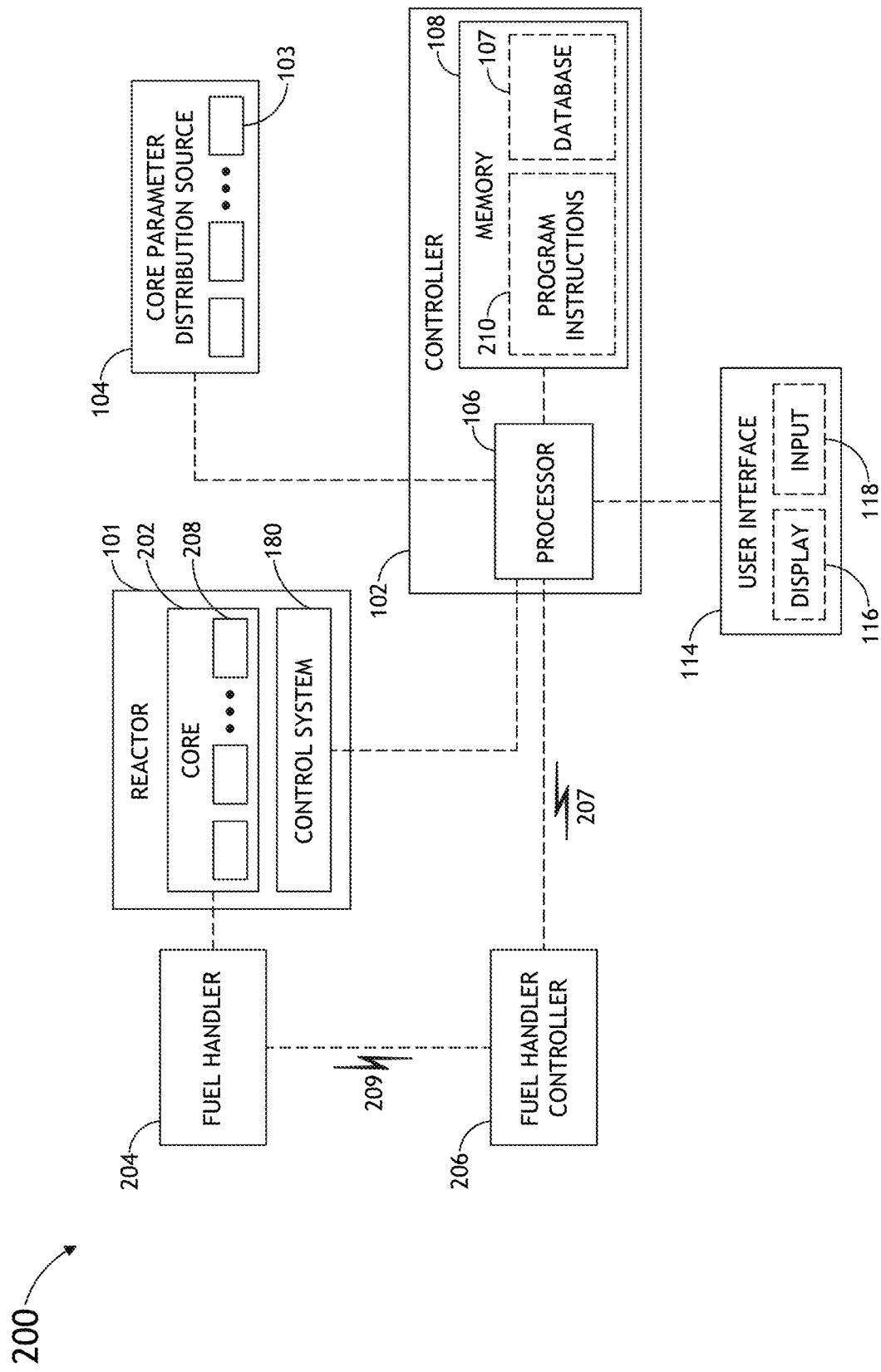
FIG. 2A is a block diagram view of a system for arranging one or more fuel assemblies in a nuclear reactor core, in accordance with an embodiment of the present invention.
Figure 2B:
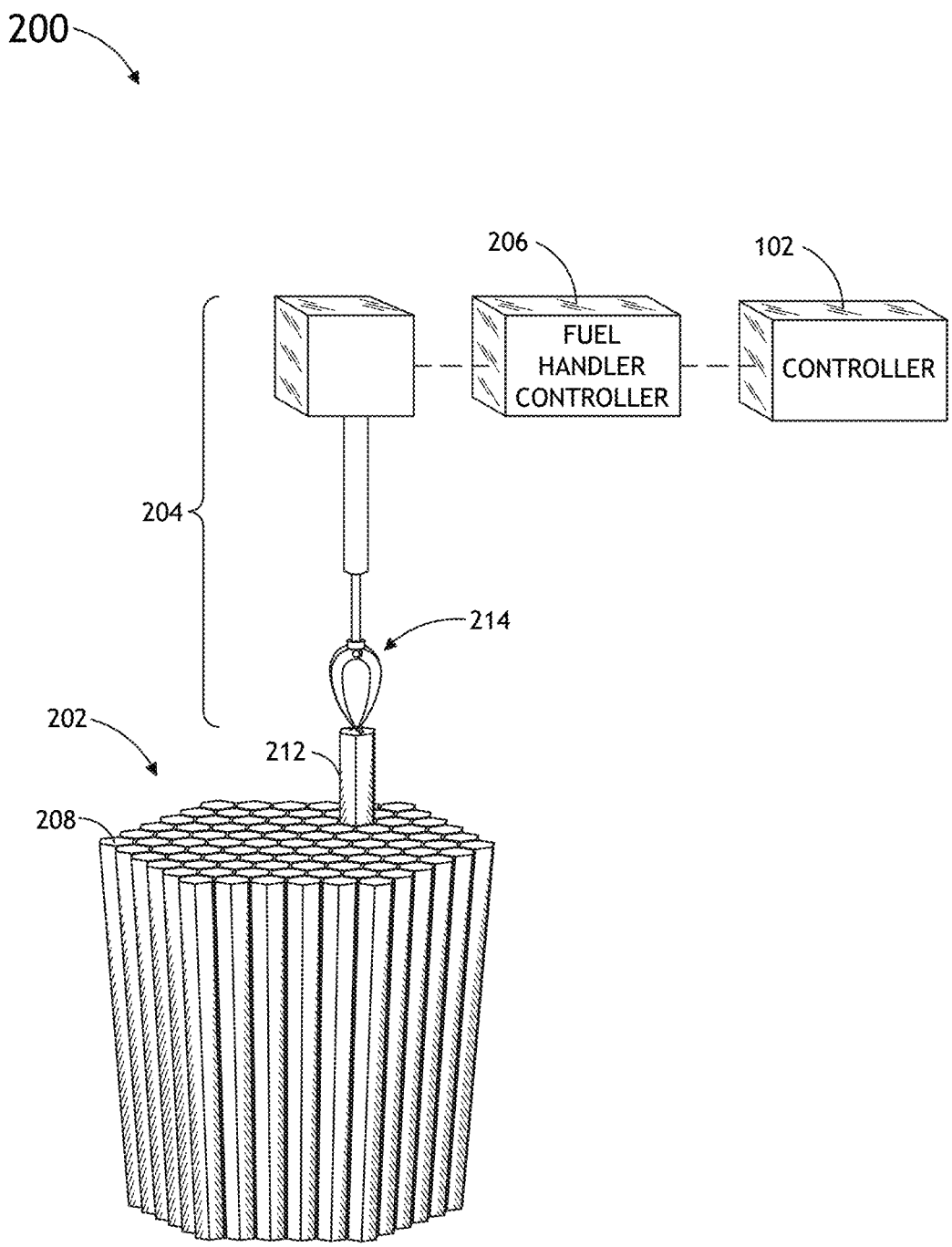
FIG. 2B is a schematic view of a system for arranging one or more fuel assemblies in a nuclear reactor core, in accordance with an embodiment of the present invention.

In one embodiment, as shown in FIGS. 2A-2B, the system 200 includes a fuel handler 204 communicatively coupled (e.g., coupled directly or indirectly) to one or more processors 106 of controller 102. In a further embodiment, the fuel handler 204 is configured to arrange at least one fuel assembly 208 of the nuclear reactor core 202 of reactor 101 according to the subsequent set of positions of the set of regions of the simulated BOC core generated by controller 102. It is noted herein that the fuel handler 204 may include any nuclear fuel assembly handler, or nuclear fuel assembly handling system, known in the art. For example, the nuclear fuel handler 204 may include any nuclear fuel assembly handler/handling system capable of "gripping" a fuel assembly and moving the fuel assembly from an initial location to a new location. In this regard, the fuel handler 204 is capable of re-arranging fuel assemblies already present in the reactor core 202 or removing fuel assemblies from the reactor core 202 and inserting fuel assemblies into the reactor core 202.

Figure 2C:
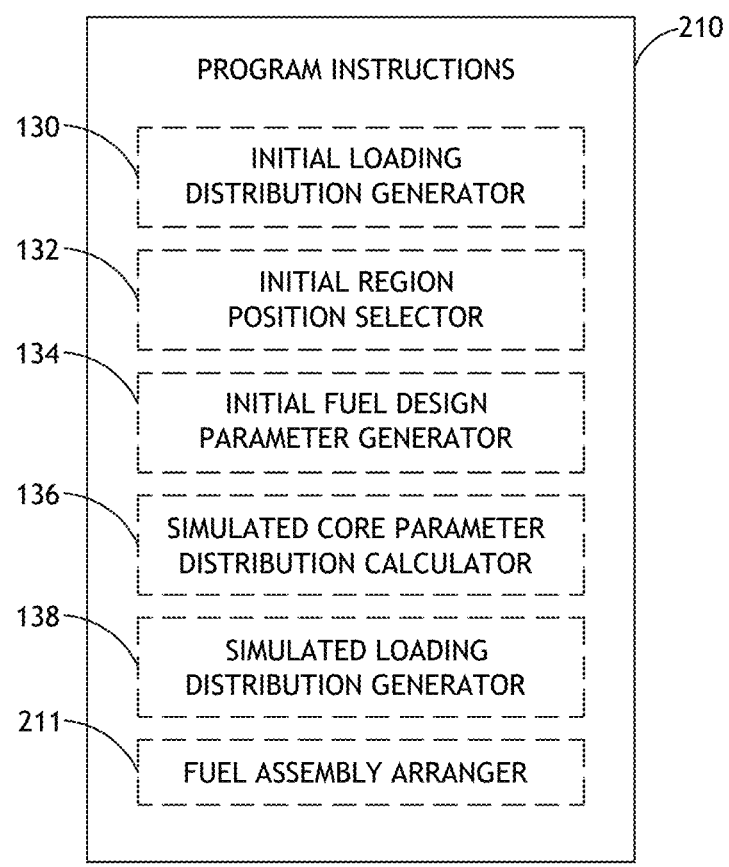
FIG. 2C is a block diagram view of the programming modules implementable by the system for arranging one or more fuel assemblies in a nuclear reactor core, in accordance with an embodiment of the present invention.

FIG. 2C illustrates a block diagram of one or more sets of program instructions 210 maintained in memory 108 and configured to carry out one or more steps described throughout the present disclosure. As described previously herein, the program instructions 210 maintained in memory 108 may include an initial loading distribution generator algorithm 130, an initial region position selector algorithm 132, an initial fuel design parameter generator algorithm 134, a simulated core parameter distribution calculator algorithm 136 and a simulated loading distribution generator algorithm 138. In a further embodiment, the program instructions 210 of system 200 may include, but are not limited to, a fuel assembly arranger algorithm 211 configured to direct the fuel assembly handler 204 to arrange one or more fuel assemblies 208 of the core 202 of reactor 101 in response to the output of the simulated loading distribution generator algorithm 138.

Referring again to FIGS. 2A-2B, the system 200 may include, but is not limited to, a fuel handler controller 206. In one embodiment, the one or more processors 106 of controller 102 are placed in indirect communication with fuel handler 204 via fuel handler controller 206. In this regard, as shown in FIGS. 2A and 2B, the one or more processors 106 of controller 102 are configured to transmit one or more signals 207 indicative of the subsequent set of positions of the set of regions of the simulated BOC core 120 generated by controller 102 to the fuel handler controller 206. In turn, the fuel handler controller 206 may receive the one or more signals 207 from controller 102 and direct the fuel handler 204 (e.g., via signal 209) to arrange the one or more fuel assemblies 208 of the reactor core 202 in accordance with the subsequent set of positions of the set of regions 122 of the simulated BOC core 120 encoded in the transmitted signal. In this regard, upon generating a suitable loading distribution, the controller 102 may direct the fuel handler 204 to arrange the constituents of the core 202 such that they match the loading distribution generated by controller 102.

In an alternative embodiment, although not shown, the one or more processors 106 of controller 102 are placed in indirect communication with fuel handler 204 via control system 180 of the nuclear reactor 101. In one embodiment, the controller 102 may indirectly transmit instructions to fuel handler 204 via the reactor control system 180. In this regard, the one or more processors 106 of controller 102 are configured to transmit one or more signals (not shown) indicative of the subsequent set of positions of the set of regions of the simulated BOC core generated by controller 102 to the control system 180 of the nuclear reactor 101. In turn, the control system 180 of the nuclear reactor 101 may receive the one or more signals from controller 102 and direct the fuel handler 204 to arrange the one or more fuel assemblies 208 of the reactor core 202 in accordance with the subsequent set of positions of the set of regions of the simulated BOC core encoded in the transmitted signal.

In another embodiment, although not shown, the one or more processors 106 of controller 102 are placed in direct communication with fuel handler 204. In one embodiment, the controller 102 may directly transmit instructions to fuel handler 204. In this regard, the one or more processors 106 of controller 102 are configured to transmit one or more signals (not shown) indicative of the subsequent set of positions of the set of regions of the simulated BOC core generated by controller 102 directly to the fuel handler 204. In this manner, the one or more processors 106 of controller 102 may direct the fuel handler 204 to arrange the one or more fuel assemblies 208 of the reactor core 202 in accordance with the subsequent set of positions of the set of regions of the simulated BOC core encoded in the transmitted signal. It is recognized herein that the functions of the fuel handler controller 206 (e.g., software/firmware necessary to control fuel handler 204) as described throughout the present disclosure may be integrated within the controller 102. In this regard, the fuel handler controller 206 may be configured as a module of the controller 102.

In another embodiment, the controller 102 may be integrated within one or more operating systems of the nuclear reactor 101. For example, the various functions of controller 102 may be integrated within the control system 180 of the nuclear reactor 101. In this regard, the controller 102 may be configured as a module of the control system 180.

Referring again to FIGS. 2A-2B, the one or more processors 106 of controller 102 may direct the fuel handler 204 to arrange one or more fuel assemblies 208 by translation of one or more fuel assemblies 208. In one embodiment, the one or more processors 106 of controller 102 are configured to direct the fuel handler 204 to translate one or more fuel assemblies 208 of the core 202 of the nuclear reactor 101 from an initial location to a subsequent location according to the subsequent set of positions of the set of regions of the simulated BOC core. For example, as shown in FIG. 2B, the one or more processors 106 of controller 102 may direct the fuel handler 204 to mechanically couple to fuel assembly 212 via gripper unit 214. In turn, the fuel handler 204 may withdraw the fuel assembly 212 from the core 202 and translate the fuel assembly 212 to a different location. Upon reaching the new location, the fuel handler 204 may then re-insert the fuel assembly 212 into to new location. It is recognized herein that in order for the new location to be available for re-insertion of assembly 212 the assembly (not shown) previously occupying the location must first be removed (e.g., removed by a second gripper of fuel handler 204 or an additional fuel handler (not shown)). In this regard, the fuel handler 204 (or multiple fuel handlers) may arrange (or re-arrange) all or a portion of the fuel assemblies 208 of the core 202 of the nuclear reactor 101 according to the subsequent set of positions of the set of regions of the simulated BOC core 120 generated by the controller 102.

In another embodiment, the one or more processors 106 of controller 102 may direct the fuel handler 204 to arrange one or more fuel assemblies 208 by replacing one or more fuel assemblies 208. In one embodiment, the one or more processors 106 of controller 102 are configured to direct the fuel handler 204 to replace one or more fuel assemblies 208 of the core 202 of the nuclear reactor 101 according to the subsequent set of positions of the set of regions of the simulated BOC core 120. For example, as shown in FIG. 2B, the one or more processors 106 of controller 102 may direct the gripper unit 214 of the fuel handler 204 to mechanically couple to fuel assembly 212. In turn, the fuel handler 204 may withdraw the fuel assembly 212 from the core 202 and move the fuel assembly 212 to a fuel assembly storage unit (not shown). Then, the gripper unit 214 of fuel handler 204 (or an additional fuel handler) may mechanically couple to a "new" fuel assembly (not shown) and move the new fuel assembly into the location of the removed fuel assembly 212 or another location. In this regard, the fuel handler 204 (or multiple fuel handlers) may replace all or a portion of the fuel assemblies 208 of the core 202 of the nuclear reactor 101 according to the subsequent set of positions of the set of regions of the simulated BOC core 120 generated by the controller 102.

In another embodiment, the one or more processors 106 of controller 102 may direct the fuel handler 204 to arrange one or more fuel assemblies 208 by loading one or more fuel assemblies 208 into the core 202. In one embodiment, the one or more processors 106 of controller 102 are configured to direct the fuel handler 204 to freshly load (i.e., load for the first time) one or more fuel assemblies 208 of the core 202 of the nuclear reactor 101 according to the subsequent set of positions of the set of regions of the simulated BOC core 120. For example, the one or more processors 106 of controller 102 may direct the gripper unit 214 of the fuel handler 204 to mechanically couple to a fuel assembly (not shown) stored outside of the reactor core 202. In turn, the fuel handler 204 may move the fuel assembly to a location consistent with the subsequent set of positions of the set of regions of the simulated BOC core 120 generated by the controller 102. In this regard, the fuel handler 204 (or multiple fuel handlers) may load all or a portion of the fuel assemblies 208 of the core 202 of the nuclear reactor 101 according to the subsequent set of positions of the set of regions of the simulated BOC core 120 generated by the controller 102.

In another embodiment, the fuel handler 204 may be controlled via user input. For example, a user may review a nuclear fuel loading distribution generated by controller 102 on a display 116. In response to the nuclear fuel loading distribution, the user may choose to accept, reject or modify the displayed nuclear fuel loading distribution. For instance, upon being presented with a suitable nuclear fuel loading distribution, the user may approve the suitable nuclear fuel loading distribution via the user input device 118. In turn, the one or more processors 106 of controller 102 may direct the fuel handler 204 to implement the approved nuclear fuel loading distribution, as described throughout the present disclosure. In another instance, upon being presented with an undesired nuclear fuel loading distribution, the user may reject the undesired nuclear fuel loading distribution via the user input device 118. In turn, the one or more processors 106 of controller 102 may terminate or repeat the core simulation/handling procedure of the present invention. In another instance, upon being presented with an undesired nuclear fuel loading distribution, the user may modify the undesired nuclear fuel loading distribution via the user input device 118. For example, the user may accept a portion of the provided loading distribution, while altering one or more other portions of the loading distribution. For instance, the user may alter, or re-arrange (e.g., via user input device 118 and/or display 116), the arrangement of the fuel assemblies or fuel assembly ensembles of the nuclear fuel loading distribution provided by controller 102. In turn, the one or more processors 106 of controller 102 may direct the fuel handler 204 to implement the user-altered nuclear fuel loading distribution.

Figure 2D:
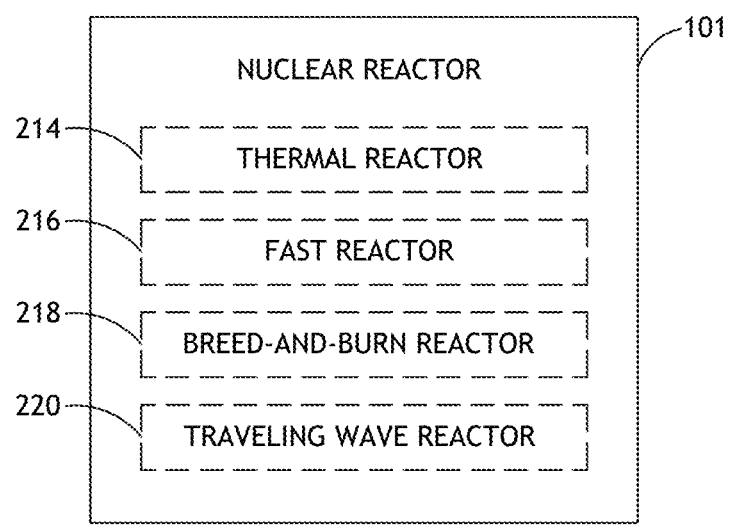
FIG. 2D is a block diagram view of types of nuclear reactors for use in the present invention, in accordance with an embodiment of the present invention.

FIG. 2D illustrates the types of nuclear reactors suitable for core arrangement of the present invention, in accordance with one or more embodiments of the present invention. The nuclear reactor 101 of system 200 may include any nuclear reactor known in the art. In one embodiment, the nuclear reactor 101 may include, but is not limited to, a thermal nuclear reactor 214. In another embodiment, the nuclear reactor 101 may include, but is not limited to, a fast nuclear reactor 216. In another embodiment, the nuclear reactor 101 may include, but is not limited to, a breed-and-burn nuclear reactor 218. In another embodiment, the nuclear reactor 101 may include, but is not limited to, a traveling wave nuclear reactor 220.

It is recognized herein that the fuel assembly configuration of the reactor core 202 of the nuclear reactor 101 of system 200 may take on any configuration known in the art. As such, the number, shape, size and arrangement of the fuel assemblies 208 within the reactor core 202 of reactor 101 may take on any configuration known in the art. For example, the fuel assemblies 208 may include hexagonoid-shaped fuel assemblies arranged in a hexagonal array configuration, as depicted in FIGS. 2A-2B. In another embodiment, each fuel assembly 208 of the reactor core 202 of the nuclear reactor 101 of system 200 may include one or more fuel pins (not shown). It is recognized that the number, shape, size and arrangement of the fuel pins within each fuel assembly 208 may take on any configuration known in the art. For example, the fuel pins of each fuel assembly 208 may include cylindrically shaped fuel pins arranged in a close-packed configuration within each fuel assembly, similar to the simulated arrangement depicted in FIG. 1G.

In another embodiment, the one or more processors 106 of controller 102 are configured to generate a core 120 simulating environment having at least some simulated physical characteristics substantially similar to some of the physical characteristics of reactor core 202 of reactor 101. For example, in settings where the reactor core 202 consists of hexagonoid-shaped fuel assemblies arranged in a hexagonal array structure, the program instructions 210 may be suitable for causing the one or more one or more processors 106 of controller 102 to generate a reactor core 120 simulating environment having hexagonoid-shaped fuel assemblies arranged in a hexagonal array structure. In a general sense, the program instructions 210 are configured to cause the one or more processors 106 of controller 102 to pattern the simulated reactor core 120 after the associated reactor core 202 within a selected accuracy level for various selected characteristics (e.g., type of fuel assemblies (e.g., size, shape, and etc.), number of fuel assemblies, arrangement of fuel assemblies and the like). Then, once the one or more processors 106 of controller 102 have established a reactor core simulating environment at least similar to the reactor core 202, the one or more processors 106 may proceed to execute the core simulation process steps as described throughout the present invention.

Referring generally to FIGS. 3A-3D, a nuclear reactor system 300 equipped with operational compliance feedback capabilities is described, in accordance with one embodiment of the present invention. In one embodiment, the system 300 of the present invention is directed, at least in part, to measuring the operation compliance of a reactor core of the nuclear reactor of system 300. Further, the system 300 may act to provide an additional, or "new," nuclear fuel loading distribution suitable for adjusting the nuclear fuel loading distribution of the reactor core 202 in order to bring the reactor core 202 into a state of compliance.

In one aspect, system 300 may include controller 102 communicatively coupled to a core parameter distribution source 104 and configured to determine an initial nuclear fuel loading distribution of the nuclear reactor core 202 utilizing a BOC simulation process to generate a simulated BOC nuclear reactor core 120. Applicant notes that system 300 may determine an initial loading distribution utilizing the various systems and methods described throughout the present disclosure. As such, the various embodiments and examples provided throughout the present disclosure should be interpreted to extend to system 300.

In another aspect, the system 300 may include a reactor core measurement system 302 (e.g., thermal measurement system, pressure measurement system and the like) communicatively coupled to controller 102 and suitable for measuring one or more state variables of one or more portions of reactor core 202. In another aspect, the controller 102 is further configured to compare (e.g., calculate a deviation metric) a generated measured reactor core parameter distribution acquired from the reactor core 202 to one or more reactor core parameter distributions of a simulated operated nuclear reactor core. In another aspect, the controller 102 is further configured to determine an operational compliance state (e.g., in-compliance or out-of-compliance) of the core 202 of the nuclear reactor 101 using the comparison between the generated measured reactor core parameter distribution acquired from reactor core 202 and the one or more reactor core parameter distributions of the simulated operated nuclear reactor core 120. In a further aspect, the nuclear reactor core 202 of nuclear reactor 101 may include a set of fuel assemblies 208 arrangeable according to a set of simulated positions of a set of regions of at least one of the simulated BOC nuclear reactor core and an additional simulated nuclear reactor core. In one embodiment, prior to operation, the fuel assemblies 208 of reactor core 202 are arrangeable according to an initial fuel loading distribution of the simulated BOC nuclear reactor core 120 generated by the one or more processors 106 of the controller 102. In another embodiment, follow a period of operation, the fuel assemblies 208 of reactor core 202 are arrangeable according to an additional fuel loading distribution (e.g., additional fuel loading distribution generated in response to an out-of-compliance reactor operation state) of an additional simulated nuclear reactor core generated by the one or more processors 106 of controller 102. In one embodiment, the fuel handler 204 of system 300 is further configured to arrange one or more fuel assemblies of the reactor core 202 according to an initial fuel loading distribution of the simulated BOC nuclear reactor core 120 or an additional loading distribution of an additional simulated core.

Figure 3A:
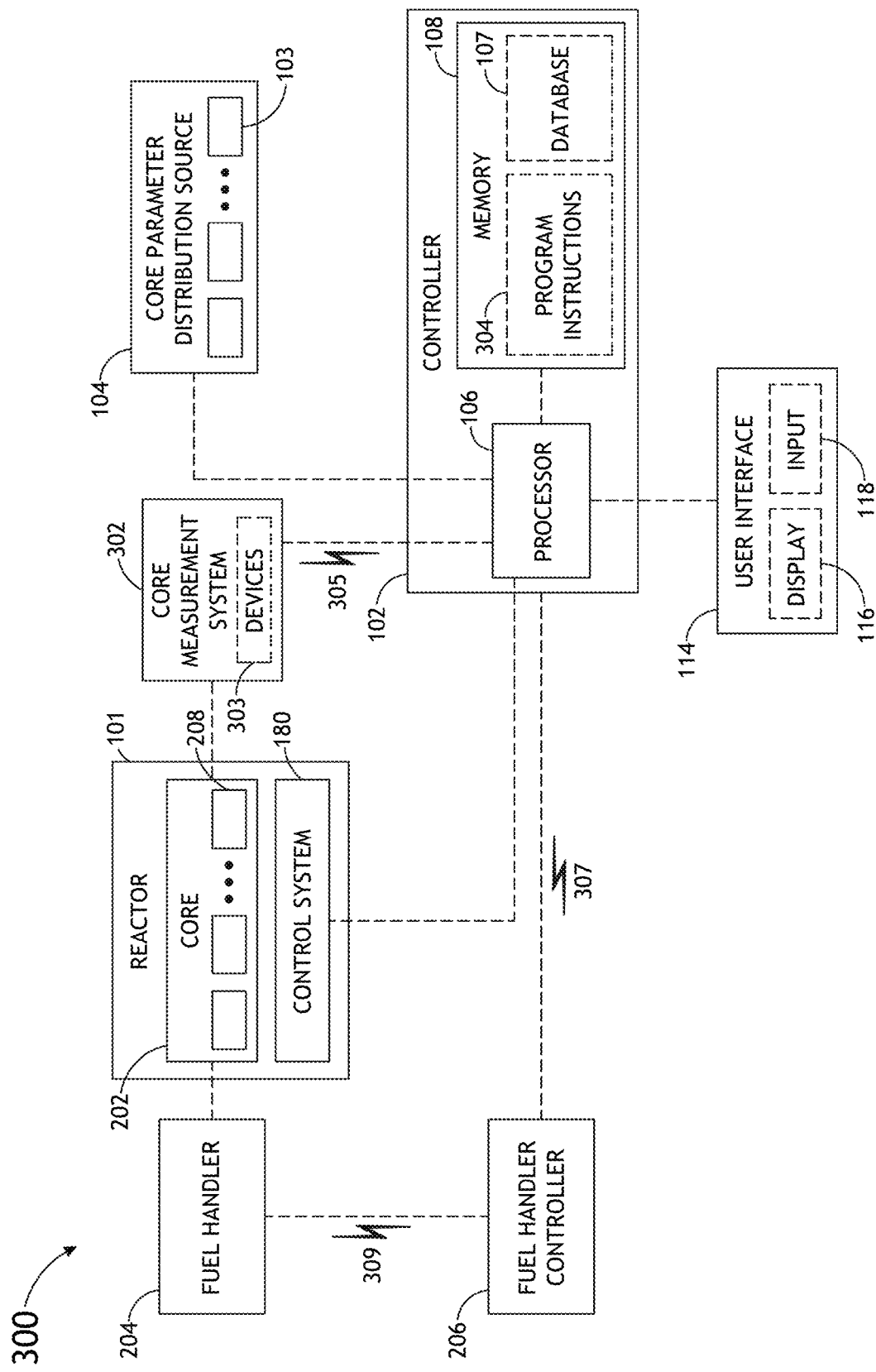
FIG. 3A is a block diagram view of a system for determining a state of operation compliance of a nuclear reactor core, in accordance with an embodiment of the present invention.
Figure 3B:
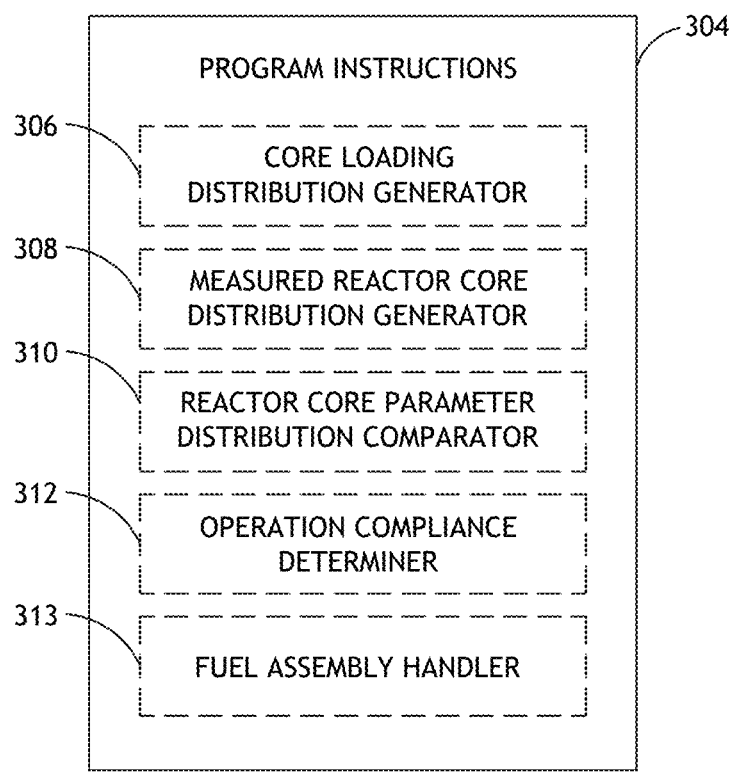
FIG. 3B is a block diagram view of the programming modules implementable by the system for determining a state of operation compliance of a nuclear reactor core, in accordance with an embodiment of the present invention.
Figure 3C:
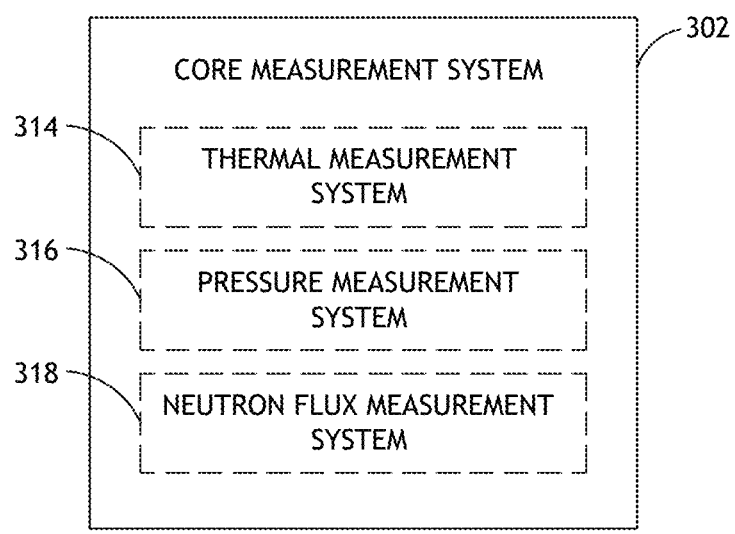
FIG. 3C is a block diagram view of types of nuclear reactor core measurement systems suitable for use in the present invention, in accordance with an embodiment of the present invention.

FIG. 3B illustrates a block diagram of one or more sets of program instructions 304 maintained in memory 108 and configured to carry out one or more steps described throughout the present disclosure. In one embodiment, the program instructions 304 maintained in memory 108 may include a core loading distribution generator algorithm 306 configured to generate an initial loading distribution for the nuclear reactor core 202 of reactor 101 using a BOC simulation process to generate a simulated BOC nuclear reactor core (as discussed previously herein). In another embodiment, the program instructions 304 may include a measured reactor core distribution generator algorithm 308 configured to generate a measured reactor core parameter distribution based on one or more measurements of one or more reactor core parameters at one or more locations within the core 202 of the nuclear reactor 101 after the nuclear reactor core 202 is operated for a given time interval. In another embodiment, the program instructions 304 may include a reactor core parameter distribution comparator algorithm 310 configured to compare the generated measured reactor core parameter distribution outputted from generator 308 to one or more reactor core parameter distributions of the simulated operated nuclear reactor core. In another embodiment, the program instructions 304 may include an operation compliance determiner algorithm 312 configured to determine an operational compliance state of the core 202 of the nuclear reactor 101 based on the comparison between the generated measured reactor core parameter distribution and the one or more reactor core parameter distributions of the simulated operated nuclear reactor core. In a further embodiment, the program instructions 304 may include a fuel assembly handler algorithm 313 configured to arrange one or more fuel assemblies 208 of the reactor core 202 of reactor 101 in accordance with the simulated BOC core 120 and/or an additional simulated core, described in greater detail further herein Referring again to FIG. 3A, in one embodiment, the reactor core measurement system 302 is configured to measure one or more state variable values of the reactor core 202 at one or more locations within the reactor core 202. The reactor core measurement system 302 may include any measurement system known in the art capable of measuring one or more state variables of one or more portions of the reactor core 202. In one embodiment, as shown in FIG. 3C, the reactor core measurement system 302 may include a thermal measurement system 314 configured to measure one or more thermal characteristics (e.g., temperature, rate-of-change of temperature) of a portion of nuclear fuel material within the reactor core 202 at one or more locations within the reactor core 202. For example, the thermal measurement system 314 may include one or more thermal measurement devices configured to measure the temperature or rate-of-change of temperature at one or more selected locations within the reactor core 202. For instance, the thermal measurement system 314 may include, but is not limited to, one or more thermocouple devices or one or more resistance based thermal detection devices (i.e., RTDs) configured to measure the temperature or rate-of-change of temperature at one or more selected locations within the reactor core 202.

In another embodiment, as shown in FIG. 3C, the reactor core measurement system 302 may include a pressure measurement system 316 configured to measure one or more pressure characteristics (e.g., pressure or rate-of-change of pressure) of a portion of nuclear fuel material within reactor core 202 at one or more locations within the reactor core 202. For example, the pressure measurement system 316 may include one or more pressure measurement devices configured to measure the pressure or rate-of-change of pressure at one or more selected locations within the reactor core 202. For example, the pressure measurement system 316 may include, but is not limited to, one or more transducer pressure sensors configured to measure the pressure or rate-of-change of pressure at one or more selected locations within the reactor core 202.

In another embodiment, as shown in FIG. 3C, the reactor core measurement system 302 may include a neutron flux measurement system 318 configured to measure one or more neutron characteristics (e.g., neutron flux or rate-of-change of neutron flux) of a portion of nuclear fuel material within reactor core 202 at one or more locations within the reactor core 202. For example, the neutron flux measurement system 318 may include one or more neutron flux measurement devices configured to measure the neutron flux or rate-of-change of neutron flux at one or more selected locations within the reactor core 202. For example, the neutron flux measurement system 318 may include, but is not limited to, one or fission detectors (e.g., in-core micropocket fission detectors) configured to measure the neutron flux or rate-of-change of neutron flux at one or more selected locations within the reactor core 202.

In another embodiment, the reactor core measurement system 302 may include a set of measurement devices (e.g., thermal measurement devices, pressure measurement devices, neutron flux measurement devices and the like) each positioned at different locations within the reactor core 202. In this regard, the set of measurement devices of the measurement system 302 may form an array within the nuclear reactor core 202 suitable for measuring one or more values of one or more selected state variables of the reactor core 202 across the spatial extent (e.g., along x-direction, y-direction, and/or z-direction) of the nuclear reactor core 202. Utilizing the spatially resolved measurements of the one or more state variables, the measurement system 302 (or the one or more processors 106 of controller 102) may build up the spatial dependence of one or more state variables of the reactor core 202.

For example, the reactor core measurement system 302 may include a set of thermal measurement devices of a thermal measurement system 314 each positioned at different locations within the reactor core 202. In this regard, the set of thermal measurement devices may form an array within the nuclear reactor core 202 suitable for measuring one or more thermal characteristics across the spatial extent of the nuclear reactor core 202. Utilizing the spatially resolved measurements of the one or more thermal characteristics, the thermal measurement system 314 (or the one or more processors 106 of controller 102) may build up the spatial dependence of one or more thermal characteristics of the reactor core 202.

By way of another example, the reactor core measurement system 302 may include a set of pressure measurement devices of a pressure measurement system 316 each positioned at different locations within the reactor core 202. In this regard, the set of pressure sensors may form an array within the nuclear reactor core 202 suitable for measuring one or more pressure characteristics across the spatial extent of the nuclear reactor core 202. Utilizing the spatially resolved measurements of the one or more pressure characteristics, the pressure measurement system 316 (or the one or more processors 106 of controller 102) may build up the spatial dependence of one or more pressure characteristics of the reactor core 202.

By way of another example, the reactor core measurement system 302 may include a set of neutron flux measurement devices of a neutron flux measurement system 318 each positioned at different locations within the reactor core 202. In this regard, the set of neutron flux detectors (e.g., multiple in-core micropocket fission detectors (MPFD)) may form an array within the nuclear reactor core 202 suitable for measuring one or more neutron flux characteristics across the spatial extent of the nuclear reactor core 202. Utilizing the spatially resolved measurements of the one or more neutron flux characteristics, the neutron flux measurement system 318 (or the one or more processors 106 of controller 102) may build up the spatial dependence of one or more neutron flux characteristics of the reactor core 202.

In one embodiment, one or more the measurement devices 303 of the reactor core measurement system 302 may be positioned in a region of the reactor core 202 between two or more fuel assemblies 208. In another embodiment, each of the measurement devices 303 of the reactor core measurement system 302 may be affixed to the outside portion of a fuel assembly 208 of the reactor core 202. In another embodiment, each of the measurement devices 303 of the reactor core measurement system 302 may be positioned within a fuel assembly 208 of the reactor core 202. For instance, each measurement devices 303 may be affixed to an internal surface of a fuel assembly 208 or between two or more fuel pins of a given fuel assembly 208.

In another embodiment, the one or more processors 106 of controller 102 are configured to direct the reactor core measurement system 302 to measure one or more state variable values of the reactor core 202 at one or more locations within the reactor core 202. For example, the one or more processors 106 may transmit a command signal (not shown) to the core measurement system 302 indicative of a core measurement initiation acquisition command. In turn, the core measurement system 302 may measure one or more state variable values of the reactor core 202 at one or more locations within the reactor core 202. In another embodiment, following measurement of one or more state variable values at one or more locations within the reactor core 202, the core measurement system 302 may transmit a signal 305 indicative of one or more measured state variable values (e.g., temperature, rate-of-change of temperature, pressure, rate-of-change of pressure and the like) to the one or more processors 106 of controller 102.

In another embodiment, upon operation of the nuclear reactor core 202 of the reactor 101 over a time interval, the one or more processors 106 of controller 102 may generate a measured reactor core parameter distribution based on the one or more received measurement values from core measurement system 302 acquired at one or more locations within the core 202 of the nuclear reactor 101. For example, the one or more processors 106 of controller 102 may generate a measured power density distribution based on the one or more received measurement values from core measurement system 302 acquired at one or more locations within the core 202 of the nuclear reactor 101. By way of another example, the one or more processors 106 of controller 102 may generate a measured rate of change of power density distribution based on the one or more received measurement values from core measurement system 302 acquired at one or more locations within the core 202 of the nuclear reactor 101. By way of another example, the one or more processors 106 of controller 102 may generate a measured reactivity distribution based on the one or more received measurement values from core measurement system 302 acquired at one or more locations within the core 202 of the nuclear reactor 101. By way of another example, the one or more processors 106 of controller 102 may generate a measured rate of change of reactivity distribution based on the one or more received measurement values from core measurement system 302 acquired at one or more locations within the core 202 of the nuclear reactor 101. It is recognized herein that the various reactor core parameter distributions may be calculated utilizing a variety of known parameter calculation techniques. For example, the calculation of power density profiles utilizing at least neutron flux measurements within a reactor core is described generally in J. Kenneth Shultis, "Determining axial fuel-rod power-density profiles from in-core neutron flux measurements," *Nuclear Instruments and Methods in Physics Research A*, Vol. 547 pp. 663-678 (2005), which is incorporated herein by reference in the entirety.

In another embodiment, the one or more processors 106 of controller 102 may generate a simulated operated core. In another embodiment, the one or more processors 106 of controller 102 may generate a simulated operated core based at least on the initial loading distribution utilized when initiating operation of the reactor core 202. In this regard, the initial loading distribution of the reactor core may serve as an input to a modeling routine suitable for generating a state of the simulated core 120 after a given time of operation, with the simulated operated core remaining a selected state, such as an equilibrium state. In a further embodiment, the one or more processors 106 of controller 102 may generate one or more reactor core parameter distributions of the simulated operated nuclear reactor core. For instance, the one or more processors 106 of controller 102 may generate a power density distribution for the simulated operated nuclear core utilizing at least the initial, or starting, loading distribution of the core 202 of the nuclear reactor 101. In another instance, the one or more processors 106 of controller 102 may generate a power density rate-of-change distribution for the simulated operated nuclear core utilizing at least the initial loading distribution of the core 202 of the nuclear reactor 101. In another instance, the one or more processors 106 of controller 102 may generate a reactivity distribution for the simulated operated nuclear core utilizing at least the initial loading distribution of the core 202 of the nuclear reactor 101. In another instance, the one or more processors 106 of controller 102 may generate a reactivity rate-of-change distribution for the simulated operated nuclear core utilizing at least the initial loading distribution of the core 202 of the nuclear reactor 101. It is noted herein that any nuclear reactor core modeling routine known in the art may be implemented in order to simulate the evolution of the initially loaded reactor core 202 as a function of operation time.

In another embodiment, following the generation of a measured reactor core parameter distribution by the one or more processors 106 of controller 102, the one or more processors 106 may compare the generated measured reactor core parameter distribution acquired from the reactor core 202 to one or more reactor core parameter distributions of the simulated operated nuclear reactor core.

In another embodiment, the comparison of the generated measured reactor core parameter distribution and the one or more reactor core parameter distributions of the simulated operated nuclear reactor core may include, but is not limited to, calculating a deviation metric between the generated measured reactor core parameter distribution and the one or more reactor core parameter distributions of the simulated operated nuclear reactor core. In one embodiment, the one or more processors 106 may calculate at least one deviation metric between at least a portion of the generated measured reactor core parameter distribution and a portion of the one or more reactor core parameter distributions of the simulated operated nuclear reactor core. It is noted herein that the deviation metric calculated by the one or more processors 106 may include any metric known in the art suitable for quantifying a difference or deviation between all or a portion of the generated measured reactor core parameter and the one or more reactor core parameter distributions of the simulated operated nuclear reactor core. For example, the deviation metric may include, but is not limited to, a difference (e.g., difference at a common position), a relative difference, a ratio, an averaged difference (e.g., spatially averaged difference), maximum difference (e.g., maximum difference between any two or more common positions), minimum difference (e.g., minimum difference between two or more common positions), aggregated deviation (e.g., global deviation metric) or any other deviation metric known in the art.

It is recognized herein that both the generated measured reactor core parameter distribution and the one or more reactor core parameter distributions of the simulated operated nuclear reactor core may each consist of a three-dimensional distribution of a given reactor core parameter throughout the given nuclear reactor core. As such, a comparison between the generated measured reactor core parameter distribution and a portion of the one or more reactor core parameter distributions of the simulated operated nuclear reactor core may include any comparison technique known in the art suitable for comparing two or more three-dimensional varying distributions.

In one embodiment, the comparison may include comparing the generated measured reactor core parameter distribution and the one or more reactor core parameter distributions of the simulated operated nuclear reactor core along a selected direction in the reactor core 202 and the simulated operated core. For example, the comparison may include comparing the reactor core parameter distributions along at least similar radial lines running through the simulated operated core and reactor core 202. It is noted that a number of comparisons, each along a different direction, may be made between the simulated operated core and reactor core 202. Then, the multiple one-dimensional comparisons may be aggregated in order to provide a global deviation metric representative of the overall deviation between the generated measured reactor core parameter distribution and the one or more reactor core parameter distributions of the simulated operated nuclear reactor core.

In another embodiment, the comparison may include comparing the reactor core parameter distributions across a selected plane, or cross-section, in the simulated operated core and the reactor core 202. For example, the comparison may include comparing the reactor core parameter distributions across at least similar cross-sections running through the simulated operated core and the reactor core 202. It is further noted that a number of comparisons, each at a different cross-section, may be made between the simulated operated core and reactor core 202. Then, the multiple two-dimensional comparisons may be aggregated in order to provide a global deviation metric representative of the overall deviation between the generated measured reactor core parameter distribution and the one or more reactor core parameter distributions of the simulated operated nuclear reactor core.

In another embodiment, the comparison may include comparing distributions at each of a set of regions in the simulated operated core and the reactor core 202. For example, the comparison may include generating an aggregated deviation metric between the generated measured reactor core parameter distribution and the one or more reactor core parameter distributions of the simulated operated nuclear reactor core by calculating a deviation metric between the two distributions at each of a sets of regions (e.g., a set of selected regions similar to regions 122 of system 100). For example, the set of regions may correspond to the fuel assemblies contained within the simulated operated core and the reactor core 202. By way of another example, the set of regions may correspond to portions (e.g., sub-assembly volumes (see FIG. 1K) or individual fuel pins) of the fuel assemblies contained within the simulated operated core and the reactor core 202. Then, deviation metrics collected in the multiple comparisons from each region may be statistically aggregated to provide a global deviation metric representative of the overall deviation between the generated measured reactor core parameter distribution and the one or more reactor core parameter distributions of the simulated operated nuclear reactor core. In another embodiment, the comparison may include comparing averaged deviation values (e.g., averaged difference values) for one or more reactor core parameter distributions extracted from selected volumes (e.g., regions or groups of regions) of the simulated operated core and the reactor core 202.

In another embodiment, the comparison of the generated measured reactor core parameter distribution from the reactor core 202 and the one or more reactor core parameter distributions of the simulated operated nuclear reactor core may include, but is not limited to, comparing a generated measured reactor core power density distribution of the reactor core 202 to a reactor core power density distribution of a simulated operated nuclear reactor core. For example, following operation of the core 202 for a given time interval, the one or more processors 106 of controller may generate a measured power density distribution using measurement results from core measurement system 302. The one or more processors 106 may further generate a power density distribution for the simulated operated nuclear reactor core utilizing the initial loading distribution of the nuclear reactor core 202. In turn, the one or more processors may compare (e.g., calculate a deviation metric) a portion of the power density distribution of the reactor core 202 to a portion of the power density distribution for the simulated operated nuclear reactor core.

In another embodiment, the comparison of the generated measured reactor core parameter distribution from the reactor core 202 and the one or more reactor core parameter distributions of the simulated operated nuclear reactor core may include, but is not limited to, comparing a generated measured reactor core rate-of-change of power density distribution of the reactor core 202 to a reactor core rate-of-change power density distribution of a simulated operated nuclear reactor core. For example, following operation of the core 202 for a given time interval, the one or more processors 106 of controller may generate a measured rate-of-change power density distribution using measurement results from core measurement system 302. The one or more processors 106 may further generate a rate-of-change power density distribution for the simulated operated nuclear reactor core utilizing the initial loading distribution of the nuclear reactor core 202. In turn, the one or more processors may compare a portion of the rate-of-change power density distribution of the reactor core 202 to a portion of the rate-of-change power density distribution for the simulated operated nuclear reactor core.

In another embodiment, the comparison of the generated measured reactor core parameter distribution from the reactor core 202 and the one or more reactor core parameter distributions of the simulated operated nuclear reactor core may include, but is not limited to, comparing a generated measured reactor core reactivity distribution of the reactor core 202 to a reactor core reactivity distribution of a simulated operated nuclear reactor core. For example, following operation of the core 202 for a given time interval, the one or more processors 106 of controller may generate a measured reactivity distribution using measurement results from core measurement system 302. The one or more processors 106 may further generate a reactivity distribution for the simulated operated nuclear reactor core utilizing the initial loading distribution of the nuclear reactor core 202. In turn, the one or more processors may compare (e.g., calculate a deviation metric) a portion of the reactivity distribution of the reactor core 202 to a portion of the reactivity distribution for the simulated operated nuclear reactor core.

In another embodiment, the comparison of the generated measured reactor core parameter distribution from the reactor core 202 and the one or more reactor core parameter distributions of the simulated operated nuclear reactor core may include, but is not limited to, comparing a generated measured reactor core rate-of-change of reactivity distribution of the reactor core 202 to a reactor core rate-of-change reactivity distribution of a simulated operated nuclear reactor core. For example, following operation of the core 202 for a given time interval, the one or more processors 106 of controller may generate a measured rate-of-change reactivity distribution using measurement results from core measurement system 302. The one or more processors 106 may further generate a rate-of-change reactivity distribution for the simulated operated nuclear reactor core utilizing the initial loading distribution of the nuclear reactor core 202. In turn, the one or more processors may compare a portion of the rate-of-change reactivity distribution of the reactor core 202 to a portion of the rate-of-change reactivity distribution for the simulated operated nuclear reactor core.

In another embodiment, the one or more processors 106 of controller 102 may determine the state of operation compliance of the reactor core 202 based on the deviation metric. For example, upon comparing the generated measured reactor core parameter distribution and the one or more reactor core parameter distributions of the simulated operated nuclear reactor core, the one or more processors 106 of controller 102 may determine whether the deviation metric calculated between the generated measured reactor core parameter distribution and the one or more reactor core parameter distributions of the simulated operated nuclear reactor core is above, at or below a selected tolerance level. In one embodiment, a determination that the deviation metric is at or below the selected tolerance level may correspond with an "in-compliance" state for the nuclear reactor core 202. In another embodiment, a determination that the deviation metric is above the selected tolerance level may correspond with an "out-of-compliance" state for the nuclear reactor core 202.

In another embodiment, in response to a determination of an out-of-compliance state, the one or more processors 106 of controller 102 may determine an additional loading distribution of the core 202 of the nuclear reactor 101 via an additional core simulation process. It is further noted herein that the additional simulated loading distribution represents a loading distribution that may act to correct an out-of-compliance nuclear reactor core 202 such that re-arrangement of the reactor core 202 in a manner consistent with the additional simulated core serves to bring the core 202 into an in-compliance state.

In another embodiment, the additional simulation process executed by the one or more processors 106 of controller 102 is configured to determine a set of simulated positions of a set of regions within an additional simulated core suitable for reducing the deviation metric between at least one reactor core parameter distribution of the additional simulated core and the received at least one reactor core parameter distribution associated with a state (e.g., equilibrium state) of a core of a reference nuclear reactor below a selected tolerance level. The additional simulated core and the additional nuclear fuel loading distribution making up the additional core may be determined utilizing a methodology similar to that described with respect to systems 100 and 200 of the present disclosure. In one embodiment, the nuclear reactor core 202 of system 300 is previously loaded with fuel assemblies 208. As such, the procedure utilized to determine the additional nuclear fuel loading distribution of the additional simulated core may include utilizing the loading distribution of the nuclear reactor core 202 in its operated state (i.e., immediately prior to measurement via measurement system 302) as an initial, or starting, loading distribution of the additional simulated core in the additional simulation process (e.g., see process 170 of FIG. 1P) carried out by the one or more processors 106.

The fuel handler 204 may include any nuclear fuel assembly handler, or nuclear fuel assembly handling system, known in the art, as described previously herein. For example, the nuclear fuel handler 204 may include any nuclear fuel assembly handler/handling system capable of gripping a fuel assembly and moving the fuel assembly from an initial location to a new location.

In one embodiment, responsive to the initial loading distribution determination, the fuel handler 204 may arrange at least one fuel assembly 208 of the core 202 of the nuclear reactor 101 according to the set of simulated positions of the set of regions of the simulated BOC nuclear reactor core 120. The description of the fuel handler 204, fuel handler controller 206 and arrangement of the fuel assemblies 208 of core 202 according to an initial loading distribution has been described previously herein and should be interpreted to extend to system 300.

In another embodiment, the fuel handler 204 is further configured to arrange one or more fuel assemblies of the reactor core 202 according to the set of simulated positions of a set of regions within the additional simulated core, responsive to the additional loading distribution determination. In one embodiment, as shown in FIG. 3A, the one or more processors 106 of controller 102 are configured to transmit one or more signals 307 indicative of the set of positions of a set of regions of an additional simulated core generated by controller 102 to the fuel handler controller 206. In turn, the fuel handler controller 206 may receive the one or more signals 307 from controller 102 and direct the fuel handler 204 (e.g., via signal 309) to arrange the one or more fuel assemblies 208 of the reactor core 202 in accordance with the set of positions of the set of regions of the additional simulated core encoded in the transmitted signal. In this regard, upon generating an additional loading distribution, the controller 102 may direct the fuel handler 204 to arrange the constituents of the core 202 such that they match the additional loading distribution generated by controller 102.

In another embodiment, the one or more processors 106 of controller 102 are configured to transmit one or more signals (not shown) indicative of a set of positions of the set of regions of the additional simulated core generated by controller 102 to the control system 180 of the nuclear reactor 101. In turn, the control system 180 of the nuclear reactor 101 may receive the one or more signals from controller 102 and direct the fuel handler 204 to arrange the one or more fuel assemblies 208 of the reactor core 202 in accordance with the set of positions of the set of regions of the additional simulated core encoded in the transmitted signal.

In another embodiment, the one or more processors 106 of controller 102 are configured to transmit one or more signals (not shown) indicative of the set of positions of the set of regions of the additional simulated core generated by controller 102 directly to the fuel handler 204. In this manner, the one or more processors 106 of controller 102 may direct the fuel handler 204 to arrange the one or more fuel assemblies 208 of the reactor core 202 in accordance with the set of positions of the set of regions of the additional simulated core encoded in the transmitted signal.

In another embodiment, the one or more processors 106 of controller 102 are configured to direct the fuel handler 204 to translate one or more fuel assemblies 208 of the core 202 of the nuclear reactor 101 from an initial location to a subsequent location according to the set of positions of the set of regions of the additional simulated core. In this regard, the fuel handler 204 (or multiple fuel handlers) may arrange (or re-arrange) all or a portion of the fuel assemblies 208 of the core 202 of the nuclear reactor 101 according to the set of positions of the set of regions of the additional simulated core generated by the controller 102.

In another embodiment, the one or more processors 106 of controller 102 are configured to direct the fuel handler 204 to replace one or more fuel assemblies 208 of the core 202 of the nuclear reactor 101 according to the set of positions of the set of regions of the additional simulated core. In this regard, the fuel handler 204 (or multiple fuel handlers) may replace all or a portion of the fuel assemblies 208 of the core 202 of the nuclear reactor 101 according to the set of positions of the set of regions of the additional simulated core generated by the controller 102.

In another embodiment, as described previously herein, the fuel handler 204 may be controlled via user input. For example, in response to the generated additional loading distribution of the additional simulated core, the user may choose to accept, reject or modify the displayed additional loading distribution. For instance, upon being presented with an additional loading distribution, the user may approve the additional loading distribution via the user input device 118. In turn, the one or more processors 106 of controller 102 may direct the fuel handler 204 to implement the approved additional loading distribution, as described throughout the present disclosure. In another instance, upon being presented with an undesired additional loading distribution, the user may reject the undesired additional loading distribution via the user input device 118. In turn, the one or more processors 106 of controller 102 may terminate or repeat the additional simulated core simulation/handling procedure of the present invention. In another instance, upon being presented with an undesired additional loading distribution, the user may modify the undesired additional loading distribution via the user input device 118. For example, the user may accept a portion of the provided additional loading distribution, while altering one or more other portions of the additional loading distribution. For instance, the user may alter, or re-arrange (e.g., via user input device 118 and/or display 116), the arrangement of the fuel assemblies or fuel assembly ensembles of the additional nuclear fuel loading distribution provided by controller 102. In turn, the one or more processors 106 of controller 102 may direct the fuel handler 204 to implement the user-altered additional nuclear fuel loading distribution.

In another embodiment, the one or more processors 106 of controller 102 may report the operation compliance state (e.g., an in-compliance state or an out-of-compliance) to one or more associated devices or systems. In one embodiment, the one or more processors 106 of controller 102 may report the operational compliance state to a display device 116. In another embodiment, the one or more processors 106 of controller 102 may report the operational compliance state to one or more memory devices. For example, the one or more processors 106 may transmit the operational compliance state to a database 107 maintained in memory 108 of controller 102. By way of another example, the one or more processors 106 may transmit the operational compliance state to a database maintained in memory of a remote system (e.g., remote server) communicatively coupled to controller 102. In another embodiment, the one or more processors 106 of controller 102 may report the operation compliance state of the reactor core 202 to an operation system of nuclear reactor 101. For example, the one or more processors 106 of controller 102 may transmit the operational compliance state of the nuclear reactor core 202 to a control system 180 of the nuclear reactor 101. By way of another example, the one or more processors 106 of controller 102 may transmit the operational compliance state of the nuclear reactor core 202 to a safety system (not shown) of the nuclear reactor 101.

Figure 3D:
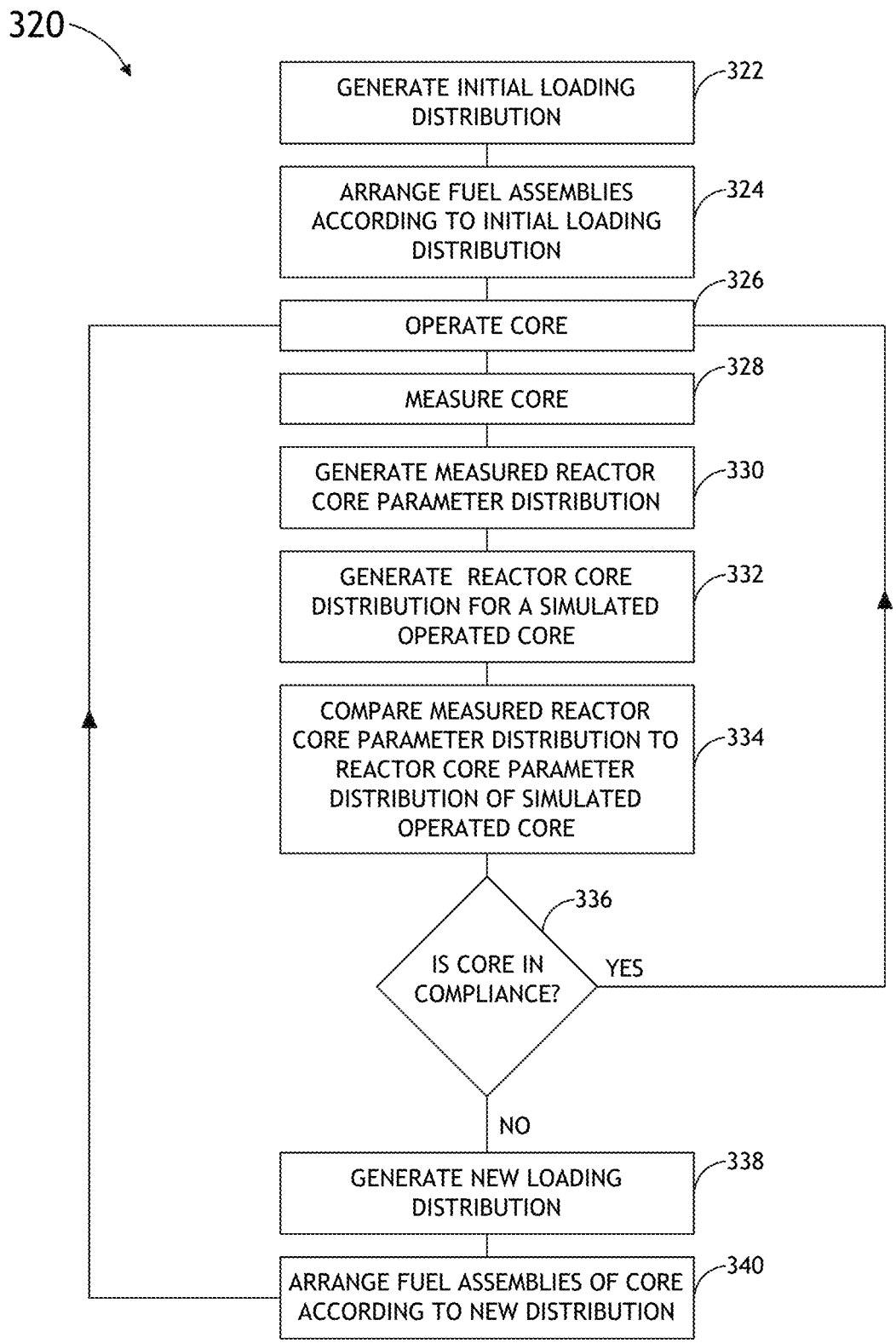
FIG. 3D is process flow diagram depicting an operation cycle of the system for determining a state of operation compliance of a nuclear reactor core, in accordance with an embodiment of the present invention.

FIG. 3D illustrates a process flow diagram 320 of an example operation of system 300, in accordance with one or more embodiments of the present invention. In step 322, one or more processors 106 of controller 102 may generate an initial, or starting, nuclear fuel loading distribution using a BOC simulation process suitable for generating a simulated BOC core (e.g., simulated BOC core 120). For example, as described throughout the present disclosure, the one or more processors 106 of controller 102 may generate a starting nuclear fuel loading distribution for reactor core 202 based on a received reactor core parameter distribution associated with a selected state (e.g., equilibrium state) of core of a reference nuclear reactor core. For instance, the one or more processors 106 of controller 102 may generate a starting nuclear fuel loading distribution formed from "fresh" nuclear fuel based on a received reactor core parameter distribution associated with an equilibrium state of a core of a reference nuclear reactor core at least partially formed from burned nuclear fuel.

In step 324, one or more processors 106 of controller 102 may arrange one or more fuel assemblies of the reactor core 202 of nuclear reactor 101 according to the initial loading distribution generated for the simulated BOC core in step 322. For example, one or more processors 106 of controller 102 may arrange one or more fuel assemblies of the reactor core 202 of nuclear reactor 101 according to a set of simulated positions of a set of regions of the simulated BOC nuclear reactor core.

In step 326, the nuclear core 202 of the nuclear reactor 101 is operated for a selected time interval. In step 328, the reactor core measurement system 302 may measure one or more values of a selected reactor core parameter at one or more locations within the nuclear reactor core 202 of reactor 101. For example, the reactor core measurement system 302 may measure a value of one or more selected state variables of the nuclear reactor core 202 at one or more locations within the nuclear reactor core 202 of reactor 101. For instance, the reactor core measurement system 302 may measure the temperature or rate-of-change of temperature of the nuclear reactor core 202 at one or more locations within the nuclear reactor core 202 of reactor 101. In another instance, the reactor core measurement system 302 may measure the pressure or rate-of-change of pressure of the nuclear reactor core 202 at one or more locations within the nuclear reactor core 202 of reactor 101. In another instance, the reactor core measurement system 302 may measure the neutron flux or rate-of-change of neutron flux of the nuclear reactor core 202 at one or more locations within the nuclear reactor core 202 of reactor 101.

In step 330, the one or more processors 106 of controller 102 may generate a measured reactor core parameter distribution utilizing the measurements from the reactor core measurement system 302. For example, the one or more processors 106 of controller 102 may generate a measured reactor core parameter distribution utilizing a set of state variable values acquired at multiple locations within the nuclear reactor core 202 by the reactor core measurement system 302. For instance, the one or more processors 106 of controller 102 may generate a measured power density distribution utilizing a set of temperature, pressure and/or neutron flux values acquired at multiple locations within the nuclear reactor core 202 by the reactor core measurement system 302.

In step 332, the one or more processors 106 of controller 102 may generate a reactor core parameter distribution for a simulated operated nuclear core. For example, the one or more processors 106 of controller 102 may generate a reactor core parameter distribution for a simulated operated nuclear core utilizing at least the initial, or starting, loading distribution of the core 202 of the nuclear reactor 101. For instance, the one or more processors 106 of controller 102 may generate a power density distribution for a simulated operated nuclear core utilizing at least the initial, or starting, loading distribution of the core 202 of the nuclear reactor 101.

In step 334, the one or more processors 106 compare the generated measured reactor core parameter distribution of step 330 to one or more reactor core parameter distributions of a simulated operated nuclear reactor core of step 332. For example, the one or more processors 106 may generate a deviation metric between the generated measured reactor core parameter distribution of step 330 and the one or more reactor core parameter distributions of a simulated operated nuclear reactor core of step 332.

In step 336, the one or more processors 106 may determine the operation compliance state of the nuclear reactor core 202 of reactor 101 using the comparison of the generated measured reactor core parameter distribution to one or more reactor core parameter distributions of a simulated operated nuclear reactor core. In one embodiment, a deviation metric between the generated measured reactor core parameter distribution and the one or more reactor core parameter distributions of the simulated operated nuclear reactor core below (or at) a selected tolerance level corresponds to an in-compliance state. In another embodiment, a deviation metric between the generated measured reactor core parameter distribution and the one or more reactor core parameter distributions of the simulated operated nuclear reactor core above a selected tolerance level corresponds to an out-of-compliance state. In the event the reactor core is in an in-compliance state, the process 320 ends or moves back to step 326 to repeat the core measurement and analysis steps 326-336. In the event the reactor core 202 is in an out-of-compliance state, the process 320 moves to step 338.

In step 338, after identifying a state of out-of-compliance for reactor core 202, the one or more processors 106 of controller 102 may generate an additional loading distribution of the core 202. In one embodiment, the additional simulation process executed by the one or more processors 106 of controller 102 is configured to determine a set of simulated positions of a set of regions within an additional simulated core suitable for reducing a deviation metric between at least one reactor core parameter distribution of the additional simulated core and the received at least one reactor core parameter distribution (received in step 322) associated with a state (e.g., equilibrium state) of a core of a reference nuclear reactor below a selected tolerance level.

In step 340, after generating the additional loading distribution in step 338, the fuel handler 204 may arrange one or more fuel assemblies 208 of the reactor core 202 according to the set of simulated positions of a set of regions within the additional simulated core. After arrangement of the fuel assemblies 208 of the reactor core 202, the process 320 ends or moves back to step 326 to repeat the core measurement and analysis steps 326-336. It is recognized that this process may be repeated indefinitely in order to maintain the reactor core 202 in a state of compliance.

The one or more processors 106 of the controller 102 may be communicatively coupled to the various sub-systems (e.g., core distribution source 103, controller of reactor 180, fuel handler 204, fuel handler controller 206, reactor core measurement system 302 and the like)) of systems 100, 200 and 300 in any manner known in the art. For example, the one or more processors 106 may be communicatively coupled to the core measurement system 302 via a wireline (e.g., copper wire, fiber optic cable, and the like) or wireless connection (e.g., RF coupling). By way of another example, the one or more processors 106 may be communicatively coupled to the control system 180 of the reactor 101 via a wireline or wireless connection. In another example, the one or more processors 106 may be communicatively coupled to a remote system (not shown), such as a remote computer system or a control system of a remote nuclear reactor, via a wireline or wireless connection. In another example, the one or more processors 106 may be communicatively coupled to any sub-system via a network. In this regard, the controller 102 may include a network interface device (not shown) suitable for interfacing with a network, while a sub-system includes a network interface device also suitable for interfacing with the network. The network interface devices may include any network interface device known in the art. For instance, the network interface devices may include a wireline-based interface device (e.g., DSL-based interconnection, Cable-based interconnection, T9-based interconnection, and the like). In another instance, the network interface devices may include a wireless-based interface device employing GSM, GPRS, CDMA, EV-DO, EDGE, WiMAX, LTE, Wi-Fi protocols, and the like.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 4A:
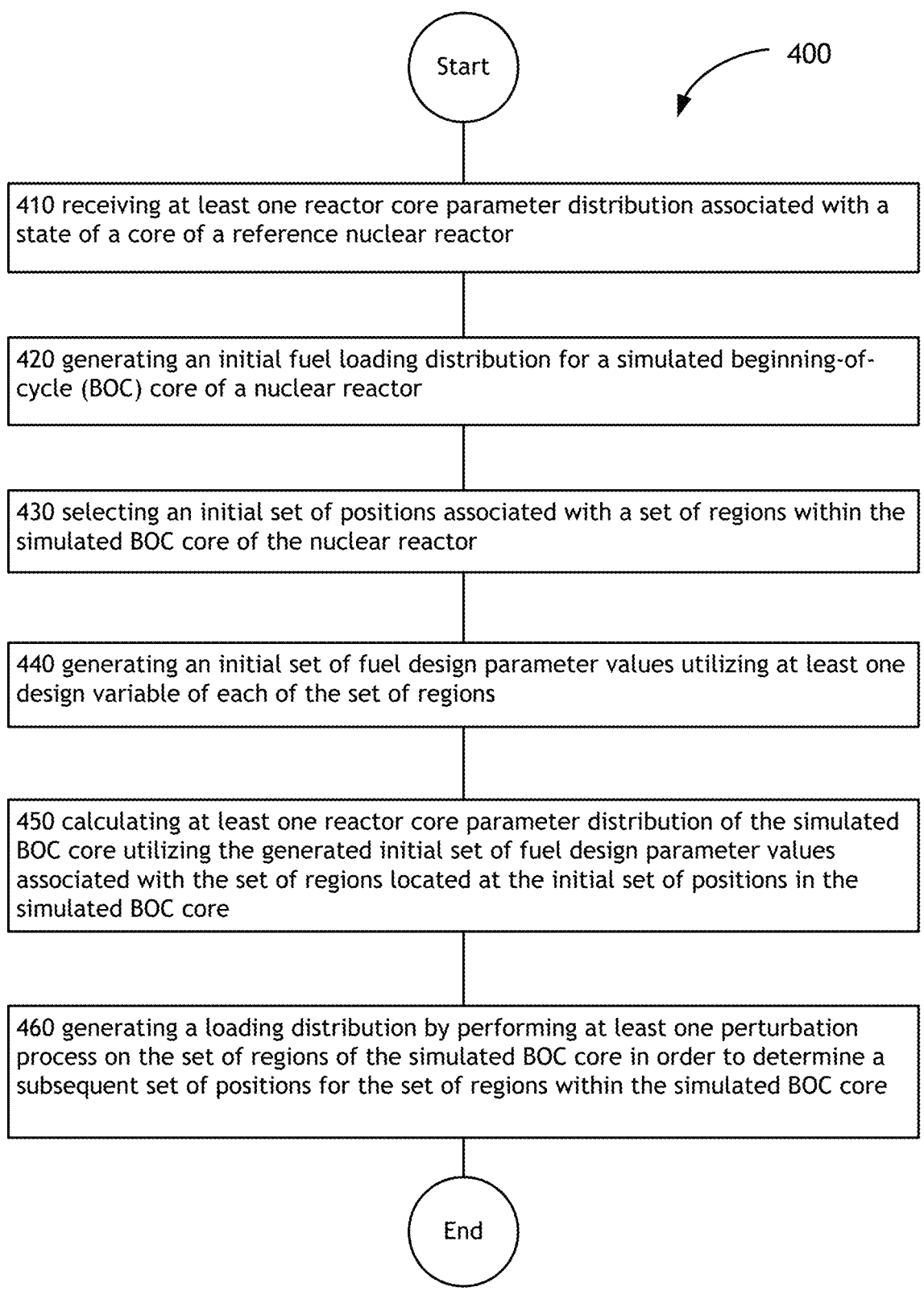
FIG. 4A is a high-level flowchart of a method for generating a simulated loading distribution in a BOC nuclear reactor core.

FIG. 4A illustrates an operational flow 400 representing example operations related to generating a nuclear reactor core loading distribution. In FIG. 4A and in following figures that include various examples of operational flows, discussion and explanation may be provided with respect to the above-described examples of FIGS. 1A through 1P, and/or with respect to other examples and contexts. However, it should be understood that the operational flows may be executed in a number of other environments and contexts, and/or in modified versions of FIGS. 1A through 1P. Also, although the various operational flows are presented in the sequence(s) illustrated, it should be understood that the various operations may be performed in other orders than those which are illustrated, or may be performed concurrently.

After a start operation, the operational flow 400 moves to a receiving operation 410. The receiving operation 410 depicts receiving at least one reactor core parameter distribution 103 associated with a state of a core of a nuclear reactor. For example, as shown in FIGS. 1A through 1P, one or more processors 106 of the controller 102 are communicatively coupled to a core parameter distribution source 104 and configured to receive one or more reactor core parameter distributions 103 of a core of a nuclear reactor (e.g., reference nuclear reactor) in a given state (e.g., equilibrium state, a state approaching equilibrium, or a state of equilibrium onset) from the core parameter distribution source 104 (e.g., memory). For instance, the core parameter distribution source 104 may include, but is not limited to, one or more memory devices configured to store and/or maintain one or more reactor core parameter distributions 103 (e.g., measured reactor core parameter distribution or simulated reactor core parameter distribution). Further, the one or more processors 106 of the controller 102 may receive a reactor core parameter distribution for a core of the nuclear reactor in a given state in the form of a database or map (e.g., two-dimensional or three-dimensional map) indicative of the reactor core parameter as a function of position within the core of the nuclear reactor.

Then, generating operation 420 depicts generating an initial fuel loading distribution for a simulated BOC core of the nuclear reactor. For example, as shown in FIGS. 1A through 1P, one or more processors 106 of the controller 102 may generate an initial fuel loading distribution for a simulated BOC core of the nuclear reactor.

Then, selecting operation 430 depicts selecting an initial set of positions associated with a set of regions within the simulated BOC core of the nuclear reactor. For example, as shown in FIGS. 1A through 1P, the one or more processors 106 of the controller 102 may select an initial set of positions associated with a set of regions 122 within the simulated BOC core 120 of the nuclear reactor.

Then, generating operation 440 depicts generating an initial set of fuel design parameter values utilizing at least one design variable of each of the set of regions. For example, as shown in FIGS. 1A through 1P, the one or more processors 106 of the controller 102 may generate an initial set of fuel design parameter values utilizing at least one design variable of each of the set of regions.

Then, calculating operation 450 depicts calculating at least one reactor core parameter distribution of the simulated BOC core utilizing the generated initial set of fuel design parameter values associated with the set of regions located at the initial set of positions of the simulated BOC core. For example, as shown in FIGS. 1A through 1P, the one or more processors 106 of the controller 102 may calculate one or more reactor core parameter distributions of the simulated BOC core utilizing the generated initial set of fuel design parameter values associated with the set of regions located at the initial set of positions of the simulated BOC core.

Then, loading distribution generating step 460 depicts generating a loading distribution by performing at least one perturbation process on the set of regions of the simulated BOC core in order to determine a subsequent set of positions for the set of regions within the simulated BOC core. For example, as shown in FIGS. 1A through 1P, the one or more processors 106 of the controller 102 may generate a loading distribution by performing one or more perturbation processes on the set of regions 122 of the simulated BOC 120 core in order to determine a subsequent set of positions for the set of regions within the simulated BOC core. For instance, as shown in FIG. 1P, the perturbation procedure 170 may iteratively vary the positions of the regions 122 within the simulated core 120 until a suitable loading distribution of the simulated BOC core 120 is achieved.

Figure 4B:
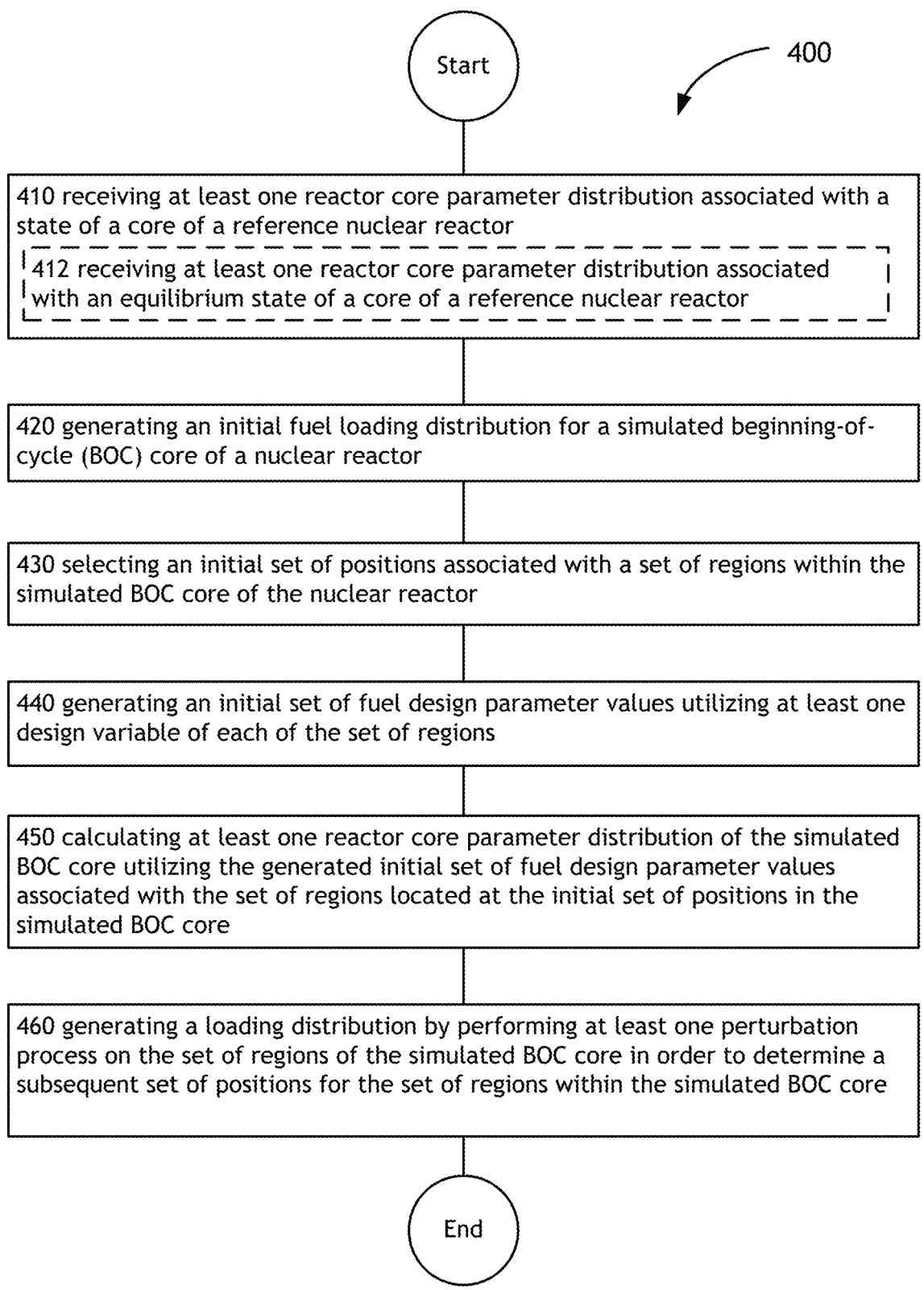

FIG. 4B illustrates alternative embodiments of the example operational flow 400 of FIG. 4A. FIG. 4B illustrates example embodiments where the receiving operation 410 may include at least one additional operation. Additional operations may include operation 412.

The operation 412 illustrates receiving at least one reactor core parameter distribution associated with an equilibrium state of a core of a nuclear reactor. For example, as shown in FIGS. 1A through 1P, one or more processors 106 of controller 102 may receive one or more reactor core parameter distributions 103 for a core of a nuclear reactor in an equilibrium state from a core parameter distribution source 104. In this regard, the core parameter distribution source 104 may store a reactor core parameter distribution for a core of a nuclear reactor in an equilibrium state. Then, the one or more processors 106 of controller 102 may retrieve the reactor core parameter distribution 103 for a core of a nuclear reactor in an equilibrium state stored in the core parameter distribution source 104.

By way of another example, as shown in FIGS. 1A through 1P, one or more processors 106 of controller 102 may receive one or more reactor core parameter distributions 103 for a core of a nuclear reactor in a state approaching equilibrium from a core parameter distribution source 104. In this regard, the core parameter distribution source 104 may store a reactor core parameter distribution for a core of a nuclear reactor in a state approaching equilibrium. Then, the one or more processors 106 of controller 102 may retrieve the reactor core parameter distribution 103 for a core of a nuclear reactor in a state approaching equilibrium stored in the core parameter distribution source 104.

By way of another example, as shown in FIGS. 1A through 1P, one or more processors 106 of controller 102 may receive one or more reactor core parameter distributions 103 for a core of a nuclear reactor at an onset of an equilibrium state from a core parameter distribution source 104. In this regard, the core parameter distribution source 104 may store a reactor core parameter distribution for a core of a nuclear reactor at an onset of an equilibrium state. Then, the one or more processors 106 of controller 102 may retrieve the reactor core parameter distribution 103 for a core of a nuclear reactor at an onset of an equilibrium state stored in the core parameter distribution source 104.

Figure 5:
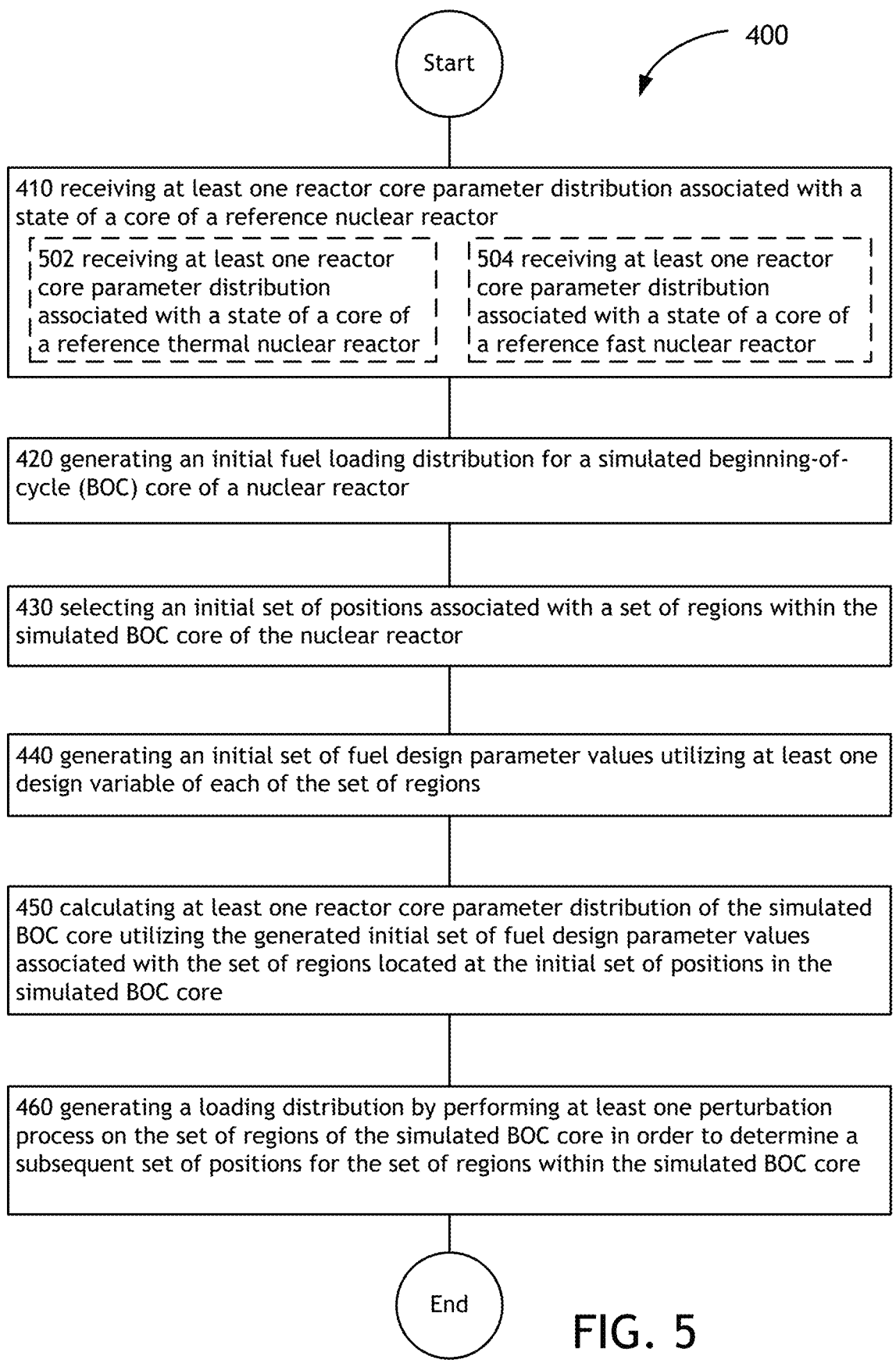

FIG. 5 illustrates alternative embodiments of the example operational flow 400 of FIG. 4A. FIG. 5 illustrates example embodiments where the receiving operation 410 may include at least one additional operation. Additional operations may include operations 502 and/or 504.

The operation 502 illustrates receiving at least one reactor core parameter distribution associated with a state of a core of a thermal nuclear reactor. For example, as shown in FIGS. 1A through 1P, one or more processors 106 of controller 102 may receive one or more reactor core parameter distributions 103 for a core of a thermal nuclear reactor from a core parameter distribution source 104. In this regard, the core parameter distribution source 104 may store a reactor core parameter distribution for a core of a reference thermal nuclear reactor. Then, the one or more processors 106 of controller 102 may retrieve the reactor core parameter distribution 103 for a core of the reference thermal nuclear reactor stored in the core parameter distribution source 104.

In another embodiment, the operation 504 illustrates receiving at least one reactor core parameter distribution associated with a state of a core of a fast nuclear reactor. For example, as shown in FIGS. 1A through 1P, one or more processors 106 of controller 102 may receive one or more reactor core parameter distributions 103 for a core of a fast nuclear reactor from a core parameter distribution source 104. In this regard, the core parameter distribution source 104 may store a reactor core parameter distribution for a core of a reference fast nuclear reactor. Then, the one or more processors 106 of controller 102 may retrieve the reactor core parameter distribution 103 for a core of the reference fast nuclear reactor stored in the core parameter distribution source 104.

Figure 6:
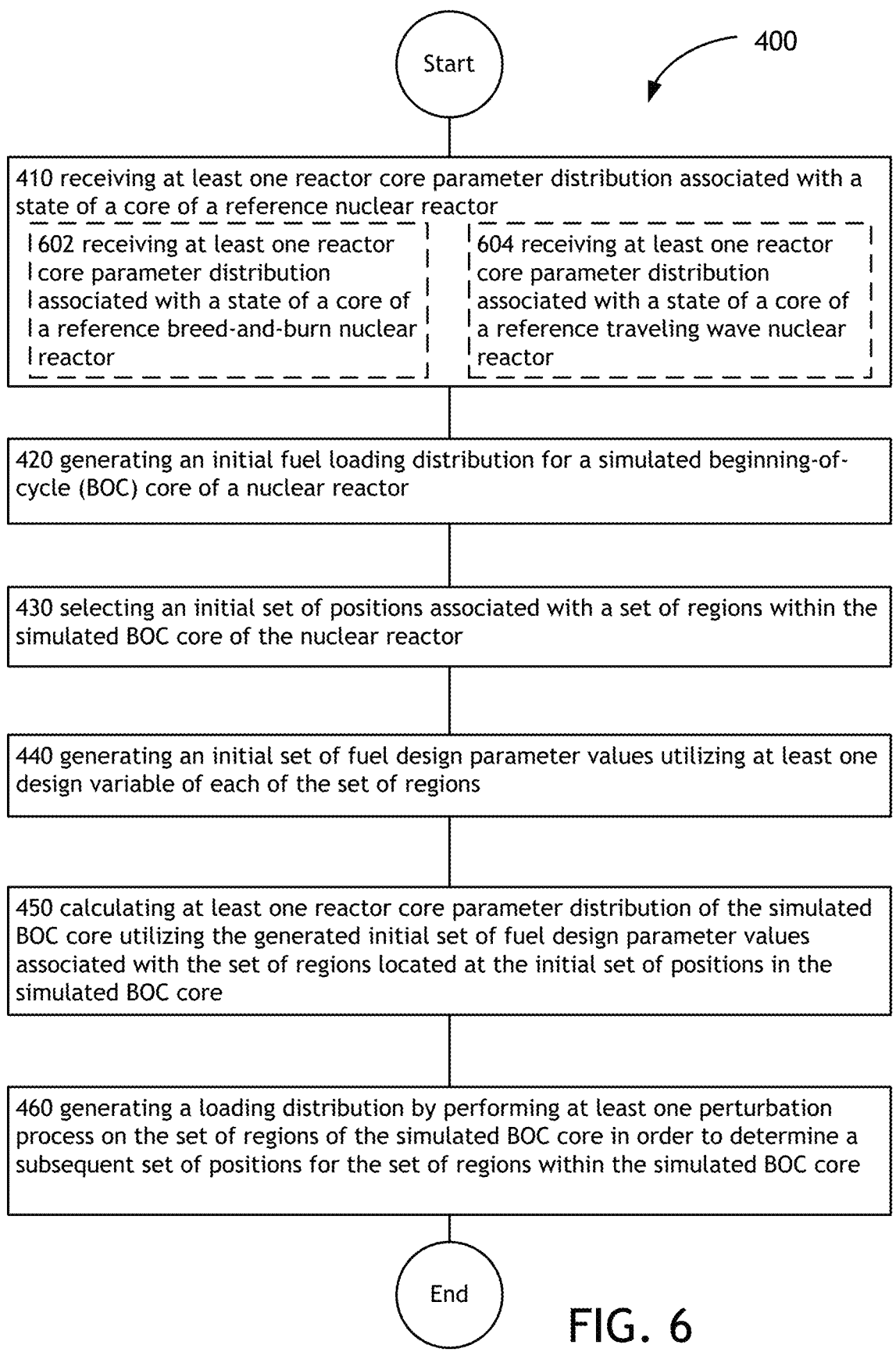

FIG. 6 illustrates alternative embodiments of the example operational flow 400 of FIG. 4A. FIG. 6 illustrates example embodiments where the receiving operation 410 may include at least one additional operation. Additional operations may include an operation 602, and/or operation 604.

In one embodiment, operation 602 illustrates receiving at least one reactor core parameter distribution associated with a state of a core of a breed-and-burn nuclear reactor. For example, as shown in FIGS. 1A through 1P, one or more processors 106 of controller 102 may receive one or more reactor core parameter distributions 103 for a core of a breed-and-burn nuclear reactor from a core parameter distribution source 104. In this regard, the core parameter distribution source 104 may store a reactor core parameter distribution for a core of a reference breed-and-burn nuclear reactor. Then, the one or more processors 106 of controller 102 may retrieve the reactor core parameter distribution 103 for a core of the reference breed-and-burn nuclear reactor stored in the core parameter distribution source 104.

In another embodiment, operation 604 illustrates receiving at least one reactor core parameter distribution associated with a state of a core of a traveling wave reactor. For example, as shown in FIGS. 1A through 1P, one or more processors 106 of controller 102 may receive one or more reactor core parameter distributions 103 for a core of a traveling wave nuclear reactor from a core parameter distribution source 104. In this regard, the core parameter distribution source 104 may store a reactor core parameter distribution for a core of a reference traveling nuclear reactor. Then, the one or more processors 106 of controller 102 may retrieve the reactor core parameter distribution 103 for a core of the reference traveling wave nuclear reactor stored in the core parameter distribution source 104.

Figure 7:
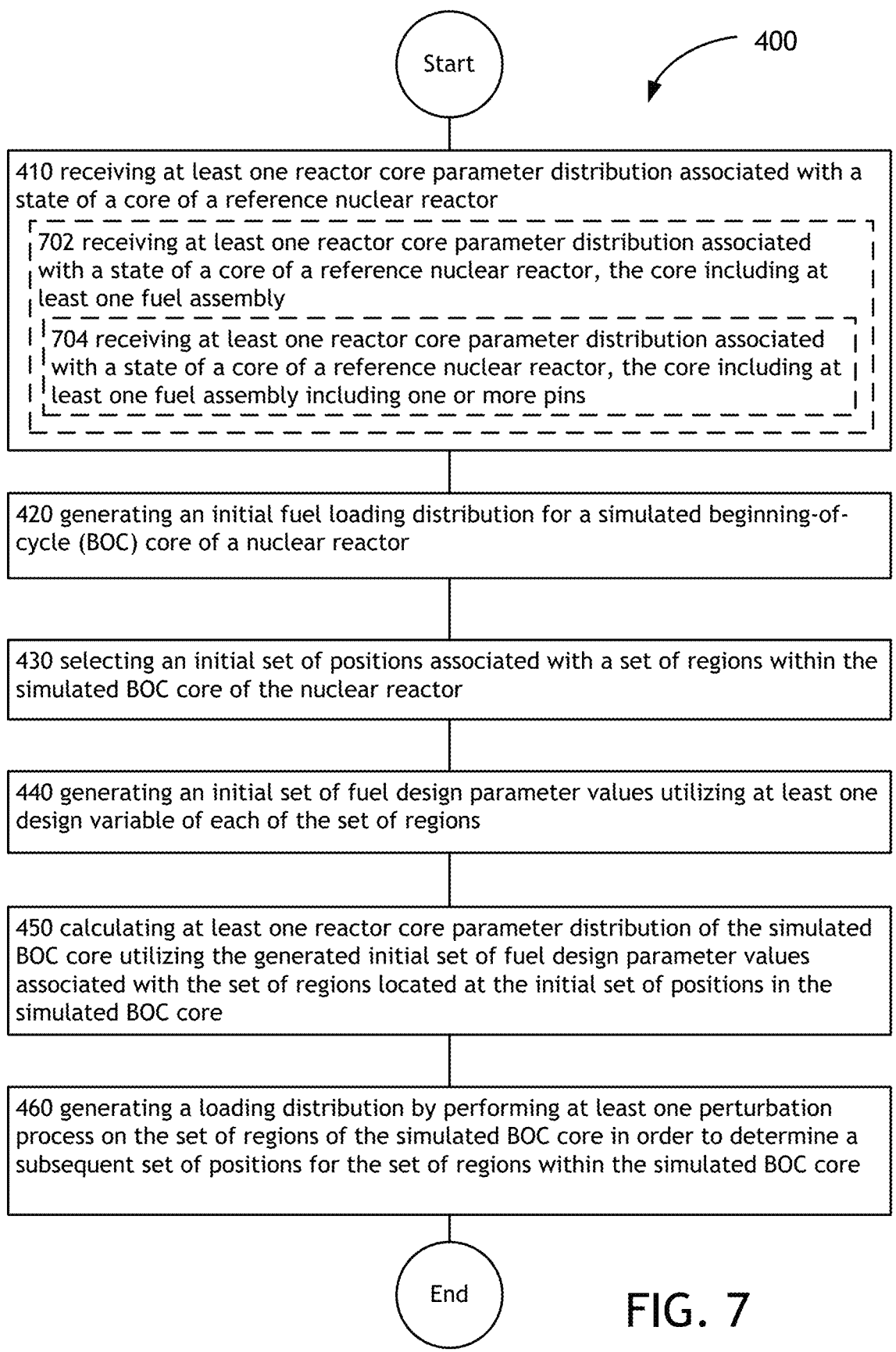

FIG. 7 illustrates alternative embodiments of the example operational flow 400 of FIG. 4A. FIG. 7 illustrates example embodiments where the receiving operation 410 may include at least one additional operation. Additional operations may include an operation 702 and/or operation 704.

In one embodiment, the operation 702 illustrates receiving at least one reactor core parameter distribution associated with a state of a core of a nuclear reactor, the core including at least one fuel assembly. For example, as shown in FIGS. 1A through 1P, one or more processors 106 of controller 102 may receive one or more reactor core parameter distributions 103 for a core of a nuclear reactor including one or more fuel assemblies from a core parameter distribution source 104. In this regard, the core parameter distribution source 104 may store a reactor core parameter distribution for a core of a nuclear reactor with one or more fuel assemblies. Then, the one or more processors 106 of controller 102 may retrieve the reactor core parameter distribution 103 for a core of a nuclear reactor with one or more fuel assemblies stored in the core parameter distribution source 104.

Further, operation 704 illustrates receiving at least one reactor core parameter distribution associated with a state of a core of a nuclear reactor, the core including at least one fuel assembly including at least one pin. For example, as shown in FIGS. 1A through 1P, one or more processors 106 of controller 102 may receive one or more reactor core parameter distributions 103 for a core of a nuclear reactor including one or more fuel assemblies with one or more fuel pins from a core parameter distribution source 104. In this regard, the core parameter distribution source 104 may store a reactor core parameter distribution for a core of a nuclear reactor with one or more fuel assemblies having one or more fuel pins. Then, the one or more processors 106 of controller 102 may retrieve the reactor core parameter distribution 103 for a core of a nuclear reactor with one or more fuel assemblies having one or more fuel pins stored in the core parameter distribution source 104.

Figure 8:
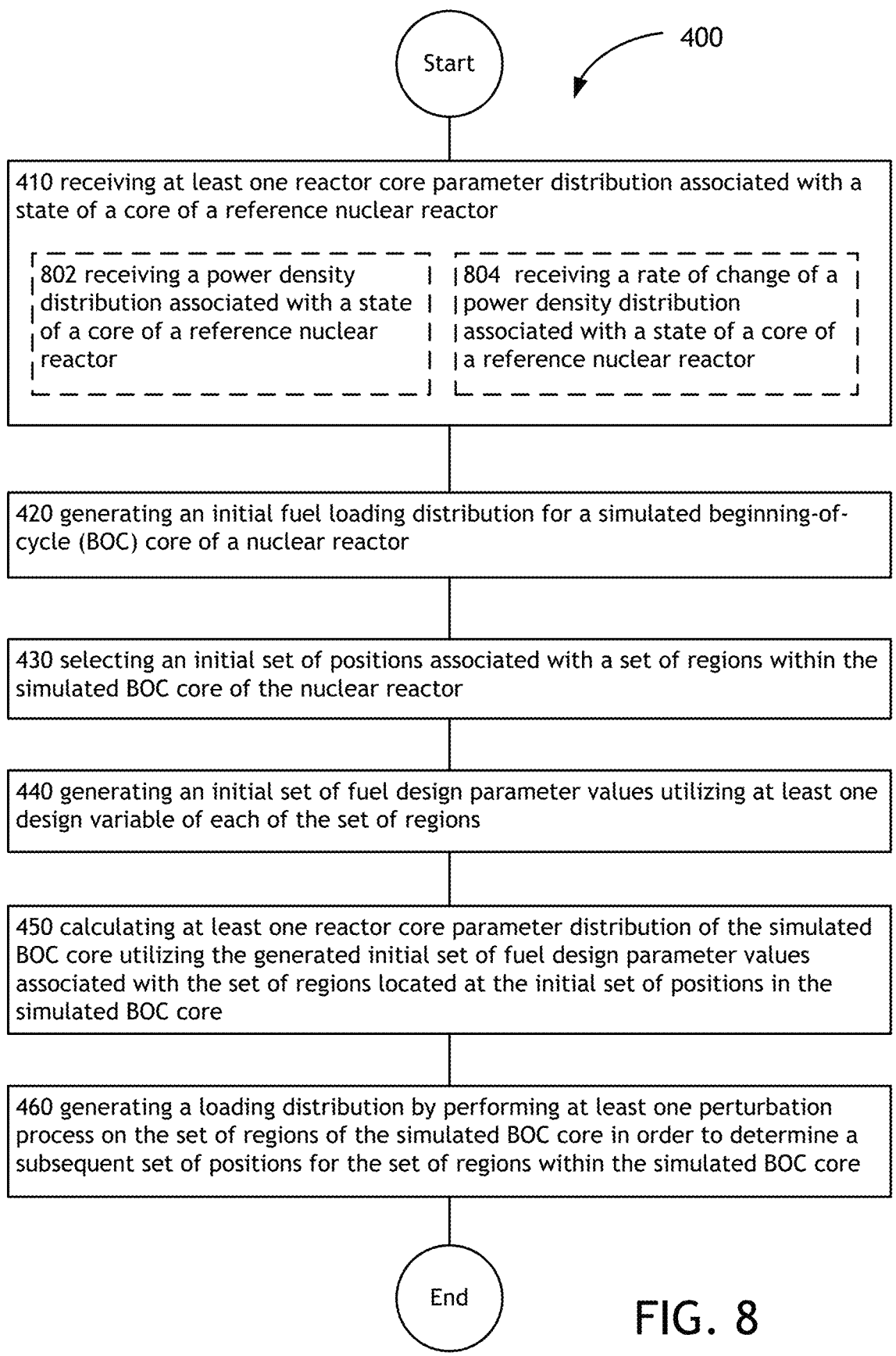

FIG. 8 illustrates alternative embodiments of the example operational flow 400 of FIG. 4A. FIG. 8 illustrates example embodiments where the receiving operation 410 may include at least one additional operation. Additional operations may include an operation 802 and/or operation 804.

The operation 802 illustrates receiving a power density distribution associated with a state of a core of a nuclear reactor. For example, as shown in FIGS. 1A through 1P, one or more processors 106 of controller 102 may receive one or more power density distributions for a given state of a core of a nuclear reactor from a core parameter distribution source 104. In this regard, the core parameter distribution source 104 may store a power density distribution for a given state of a core of a nuclear reactor. Then, the one or more processors 106 of controller 102 may retrieve the power density distribution for a given state of a core of a nuclear reactor stored in the core parameter distribution source 104. Further, the one or more processors 106 of the controller 102 may receive a power density distribution for a core of the nuclear reactor in the form of a database or map (e.g., two-dimensional or three-dimensional map) indicative of the power generation density as a function of position within the core of the nuclear reactor.

In another embodiment, operation 804 illustrates receiving a rate of change of a power density distribution associated with a state of a core of a nuclear reactor. For example, as shown in FIGS. 1A through 1P, one or more processors 106 of controller 102 may receive one or more power density rate-of-change distributions for a given state of a core of a nuclear reactor from a core parameter distribution source 104. In this regard, the core parameter distribution source 104 may store a power density rate-of-change distribution for a given state of core of a nuclear reactor. Then, the one or more processors 106 of controller 102 may retrieve the power density rate-of-change distribution for a given state of a core of a nuclear reactor stored in the core parameter distribution source 104. Further, the one or more processors 106 of the controller 102 may receive a power density rate-of-change distribution for a core of the nuclear reactor in the form of a database or map (e.g., two-dimensional or three-dimensional map) indicative of the rate of change of power generation density as a function of position within the core of the nuclear reactor.

Figure 9:
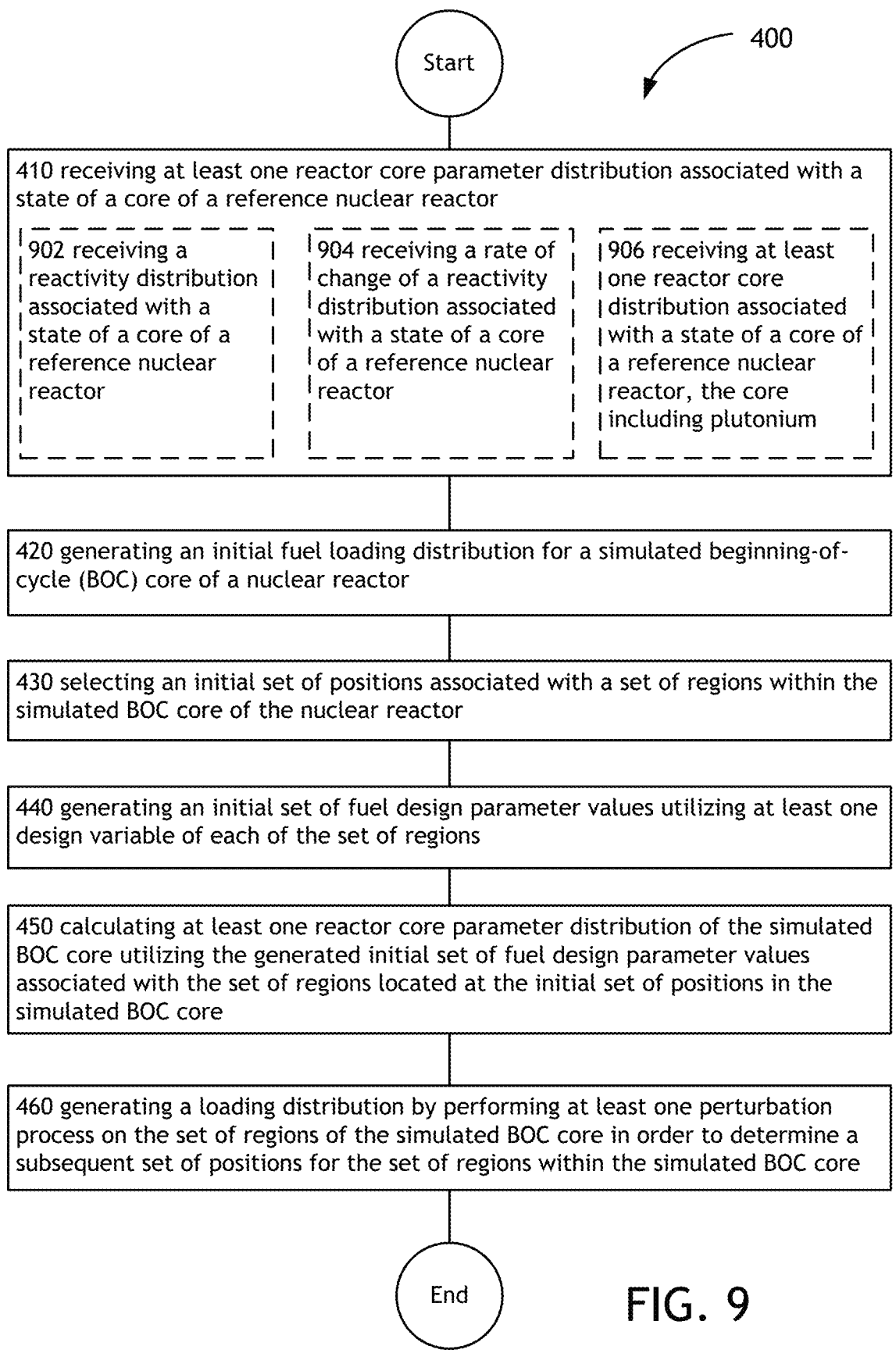
Figure 10:
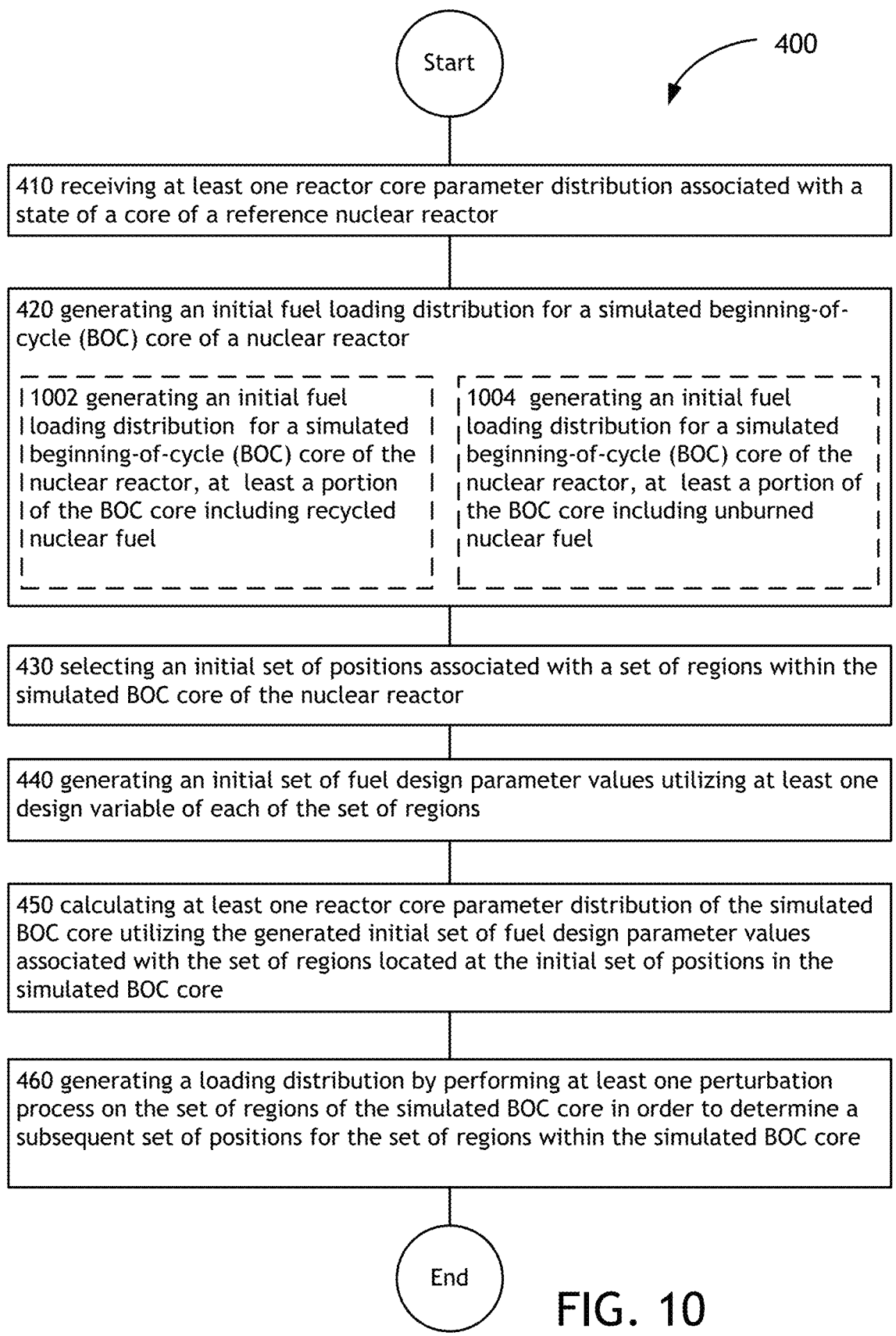

FIG. 9 illustrates alternative embodiments of the example operational flow 400 of FIG. 4A. FIG. 9 illustrates example embodiments where the receiving operation 410 may include at least one additional operation. Additional operations may include an operation 902, 904 and/or operation 906.

The operation 902 illustrates receiving a reactivity distribution associated with a state of a core of a nuclear reactor. For example, as shown in FIGS. 1A through 1P, one or more processors 106 of controller 102 may receive one or more reactivity distributions for a given state of a core of a nuclear reactor from a core parameter distribution source 104. In this regard, the core parameter distribution source 104 may store a reactivity distribution for a given state of a core of a nuclear reactor. Then, the one or more processors 106 of controller 102 may retrieve the reactivity distribution for a given state of a core of a nuclear reactor stored in the core parameter distribution source 104. Further, the one or more processors 106 of the controller 102 may receive a reactivity distribution for a core of the nuclear reactor in the form of a database or map (e.g., two-dimensional or three-dimensional map) indicative of reactivity as a function of position within the core of the nuclear reactor.

In another embodiment, the operation 904 illustrates receiving a rate of change of a reactivity distribution associated with a state of a core of a nuclear reactor. For example, as shown in FIGS. 1A through 1P, one or more processors 106 of controller 102 may receive one or more reactivity rate-of-change distributions for a given state of a core of a nuclear reactor from a core parameter distribution source 104. In this regard, the core parameter distribution source 104 may store a reactivity rate-of-change distribution for a given state of a core of a nuclear reactor. Then, the one or more processors 106 of controller 102 may retrieve the reactivity rate-of-change distribution for a given state of a core of a nuclear reactor stored in the core parameter distribution source 104. Further, the one or more processors 106 of the controller 102 may receive a reactivity rate-of-change distribution for a core of the nuclear reactor in the form of a database or map (e.g., two-dimensional or three-dimensional map) indicative of the rate of change of reactivity as a function of position within the core of the nuclear reactor.

In another embodiment, the operation 906 illustrates receiving at least one reactor core parameter distribution associated with a state of a core of a nuclear reactor, the core including plutonium. For example, as shown in FIGS. 1A through 1P, one or more processors 106 of controller 102 may receive one or more reactor core parameter distributions for a given state of a nuclear reactor core including plutonium from a core parameter distribution source 104. In this regard, the core parameter distribution source 104 may store a reactor core parameter distribution for a given state of a nuclear reactor core including plutonium. Then, the one or more processors 106 of controller 102 may retrieve the reactor core parameter distribution for a given state of a nuclear reactor core including plutonium stored in the core parameter distribution source 104.

Figure 10:
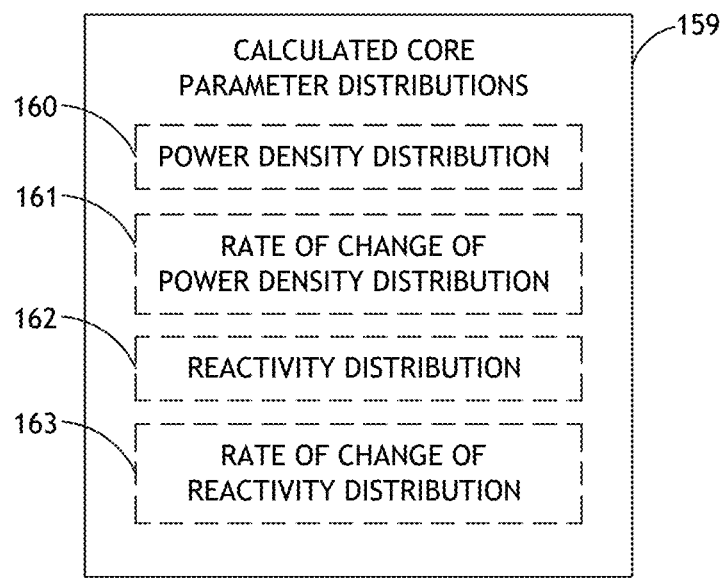

FIG. 10 illustrates alternative embodiments of the example operational flow 400 of FIG. 4A. FIG. 10 illustrates example embodiments where the reference generating operation 420 may include at least one additional operation. Additional operations may include an operation 1002 and/or operation 1004.

The operation 1002 illustrates generating an initial fuel loading distribution for a simulated BOC core of the nuclear reactor, at least a portion of the BOC core including recycled nuclear fuel. For example, as shown in FIGS. 1A through 1P, the one or more processors 106 of the controller 102 may generate an initial fuel loading distribution for a simulated BOC core of the nuclear reactor including recycled nuclear fuel. For instance, the one or more processors 106 of the controller 102 may provide the spatial distribution of nuclear fuel (including fissile and non-fissile material) throughout a simulated BOC core (e.g., throughout the fuel assemblies of a simulated BOC core) including at least some recycled nuclear fuel (e.g., recycled uranium).

In another embodiment, operation 1004 illustrates generating an initial fuel loading distribution for a simulated BOC core of the nuclear reactor, at least a portion of the BOC core including unburned nuclear fuel. For example, as shown in FIGS. 1A through 1P, the one or more processors 106 of the controller 102 may generate an initial fuel loading distribution for a simulated BOC core of the nuclear reactor including unburned nuclear fuel. For instance, the one or more processors 106 of the controller 102 may provide the spatial distribution of nuclear fuel (including fissile and non-fissile material) throughout a simulated BOC core including at least some unburned nuclear fuel (e.g., unburned uranium).

Figure 11:
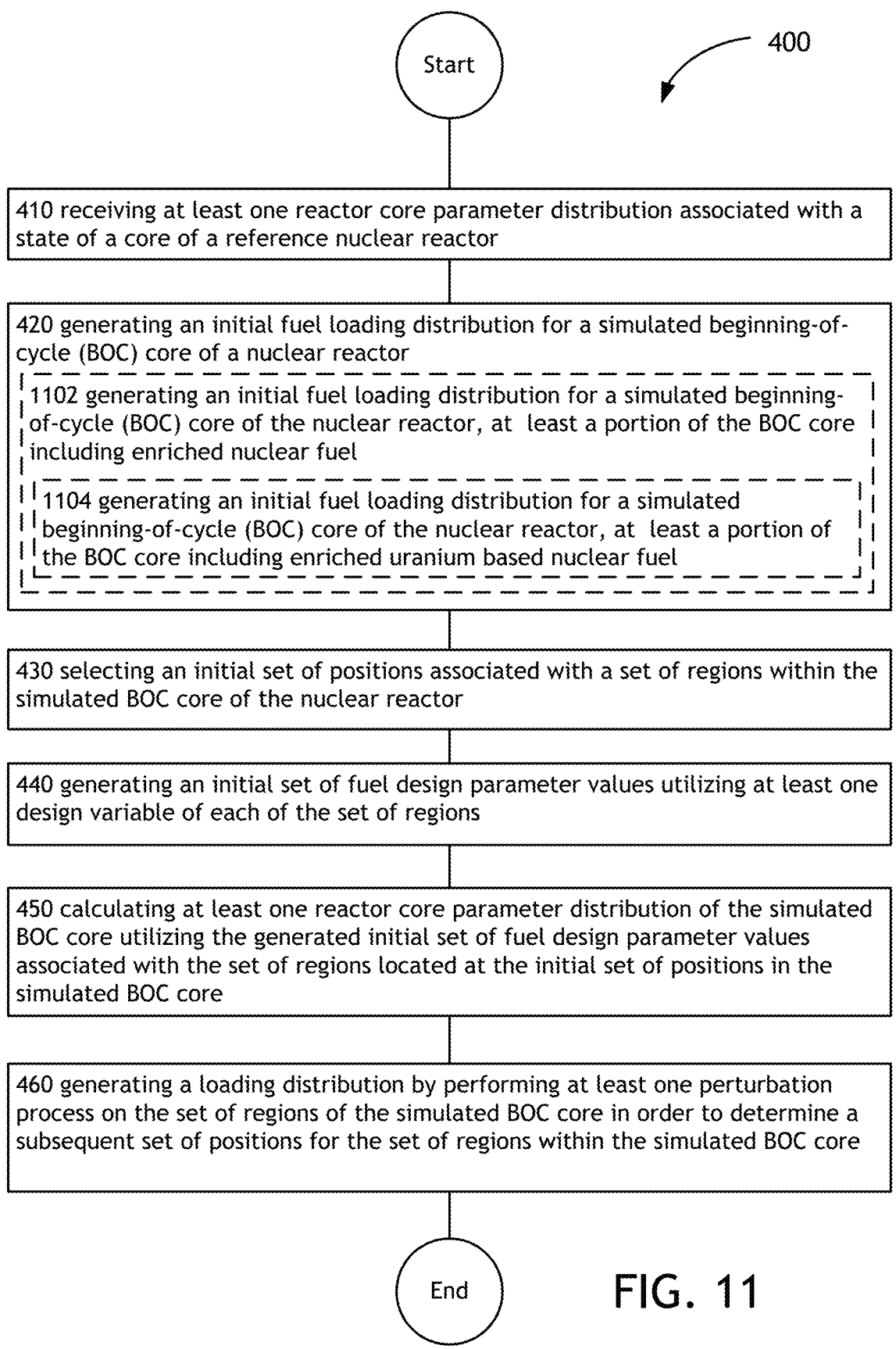

FIG. 11 illustrates alternative embodiments of the example operational flow 400 of FIG. 4A. FIG. 11 illustrates example embodiments where the generating operation 420 may include at least one additional operation. Additional operations may include an operation 1102 and/or operation 1104.

The operation 1102 illustrates generating an initial fuel loading distribution for a simulated BOC core of the nuclear reactor, at least a portion of the BOC core including enriched nuclear fuel. For example, as shown in FIGS. 1A through 1P, the one or more processors 106 of the controller 102 may generate an initial fuel loading distribution for a simulated BOC core of the nuclear reactor including enriched nuclear fuel. For instance, the one or more processors 106 of the controller 102 may provide the spatial distribution of nuclear fuel (including fissile and non-fissile material) throughout a simulated BOC core including at least some enriched nuclear fuel.

In another embodiment, operation 1104 illustrates generating an initial fuel loading distribution for a simulated BOC core of the nuclear reactor, at least a portion of the BOC core including enriched uranium based nuclear fuel. For example, as shown in FIGS. 1A through 1P, the one or more processors 106 of the controller 102 may generate an initial fuel loading distribution for a simulated BOC core of the nuclear reactor including enriched uranium. For instance, the one or more processors 106 of the controller 102 may provide the spatial distribution of nuclear fuel (including fissile and non-fissile material) throughout a simulated BOC core including at least some enriched uranium.

Figure 12:
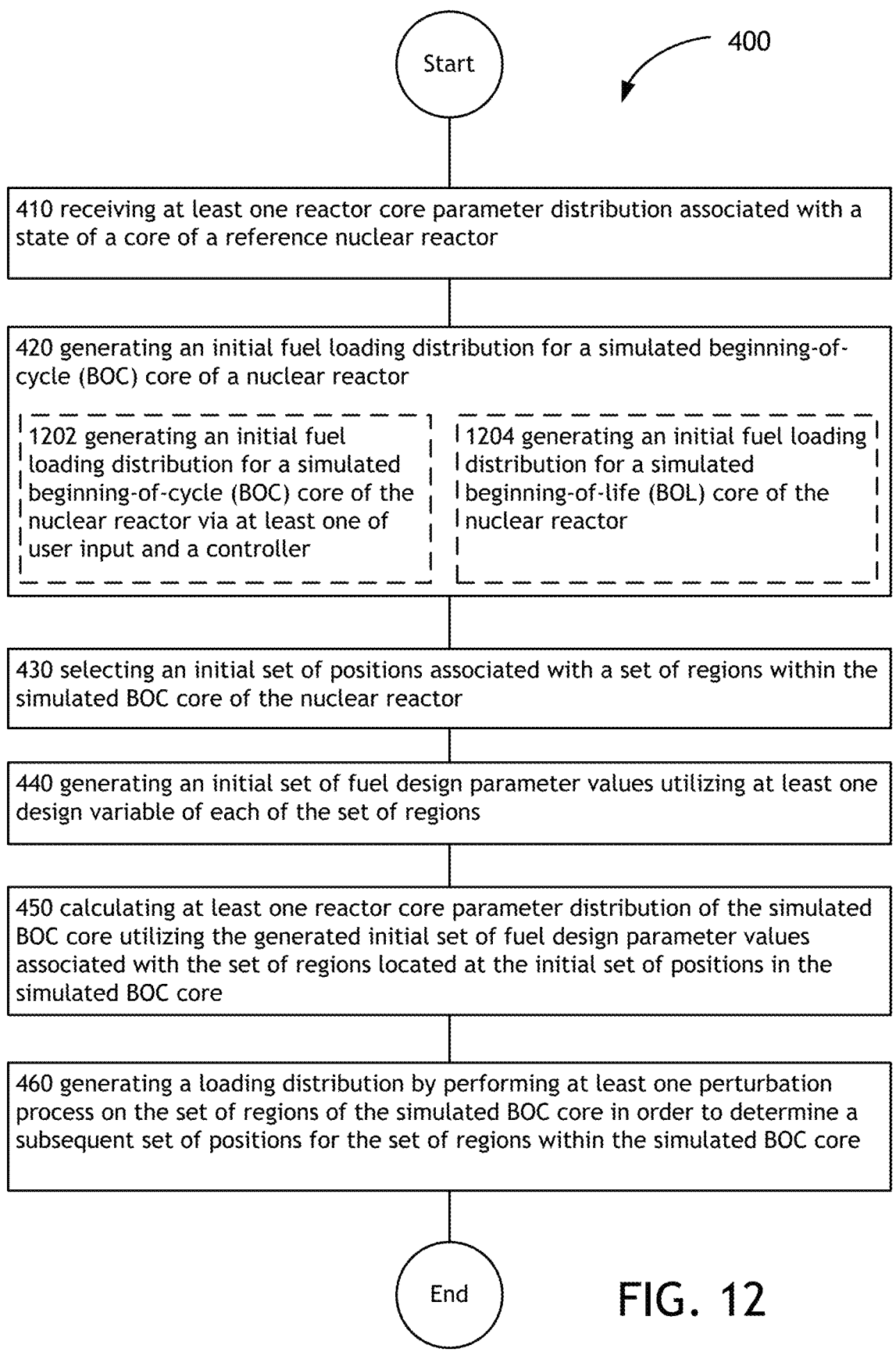

FIG. 12 illustrates alternative embodiments of the example operational flow 400 of FIG. 4A. FIG. 12 illustrates example embodiments where the reference generating operation 420 may include at least one additional operation. Additional operations may include an operation 1202 and/or operation 1204.

The operation 1202 illustrates generating an initial fuel loading distribution for a simulated BOC core of the nuclear reactor via at least one of user input and a controller. For example, as shown in FIGS. 1A through 1P, the one or more processors 106 of the controller 102 may generate an initial fuel loading distribution for a simulated BOC core of the nuclear reactor using at least one of user input and the controller 102. For instance, the one or more processors 106 of the controller 102 may provide the spatial distribution of nuclear fuel (including fissile and non-fissile material) throughout a simulated BOC core utilizing a preprogrammed predictive algorithm executed by the one or more processors 106 of the controller 102. In this regard, the predictive algorithm may select the preferred initial fuel loading distribution based on a variety parameters, such as, but not limited to, historical data correlating initial fuel loading distribution starting points and quality of final fuel loading distribution, user selected initial fuel loading distribution preferences and the like.

In another instance, the one or more processors 106 of the controller 102 may provide the spatial distribution of nuclear fuel (including fissile and non-fissile material) throughout a simulated BOC core utilizing user inputted data in conjunction with the controller 102. In this regard, the user may select an initial fuel loading distribution based on a number of options presented to the user of the user display 116. For example, the controller 102 may present the user (e.g., present on display 116) with a plurality of initial fuel loading distributions based on an output of a preprogrammed predictive algorithm. Based on this presentation of loading distributions on display 116, the user may select the preferred initial loading distribution using a user input device 118.

In yet another instance, the one or more processors 106 of the controller 102 may provide the spatial distribution of nuclear fuel (including fissile and non-fissile material) throughout a simulated BOC core based primarily on user inputted data. In this regard, the user may select or input an initial fuel loading distribution into the controller 102. For example, a user may select the initial fuel loading distribution by choosing the specific material or materials (fissile or non-fissile) for each fuel assembly or each pin of each fuel assembly across the simulated BOC core. Further, the user may make this initial fuel selection utilizing a graphical user interface 114 (e.g., display/mouse, touchscreen, display/keyboard and the like), allowing the user to select from a list of possible nuclear fuel materials (e.g., fissile or non-fissile materials) at each of the simulated fuel assemblies or pins of each of the simulated fuel assemblies throughout the simulated BOC core. In this manner, the user, in a discretized manner, may build up the initial nuclear fuel loading distribution across the simulated BOC core (e.g., built up with fuel assembly-level resolution or built up with pin-level resolution). The selected initial loading distribution may then be read into the memory 108 of the controller 102 and used by the one or more processors 106 in subsequent steps of the present invention.

In another embodiment, operation 1204 illustrates generating an initial fuel loading distribution for a simulated beginning-of-life (BOL) core of the nuclear reactor. For example, as shown in FIGS. 1A through 1P, the one or more processors 106 of the controller 102 may generate an initial fuel loading distribution for a simulated beginning-of-life (BOL) core of the nuclear reactor. For instance, the one or more processors 106 of the controller 102 may provide the spatial distribution of nuclear fuel (including fissile and non-fissile material) throughout a simulated BOL core (e.g., throughout the fuel assemblies of a simulated BOL core) of the nuclear reactor.

Figure 13:
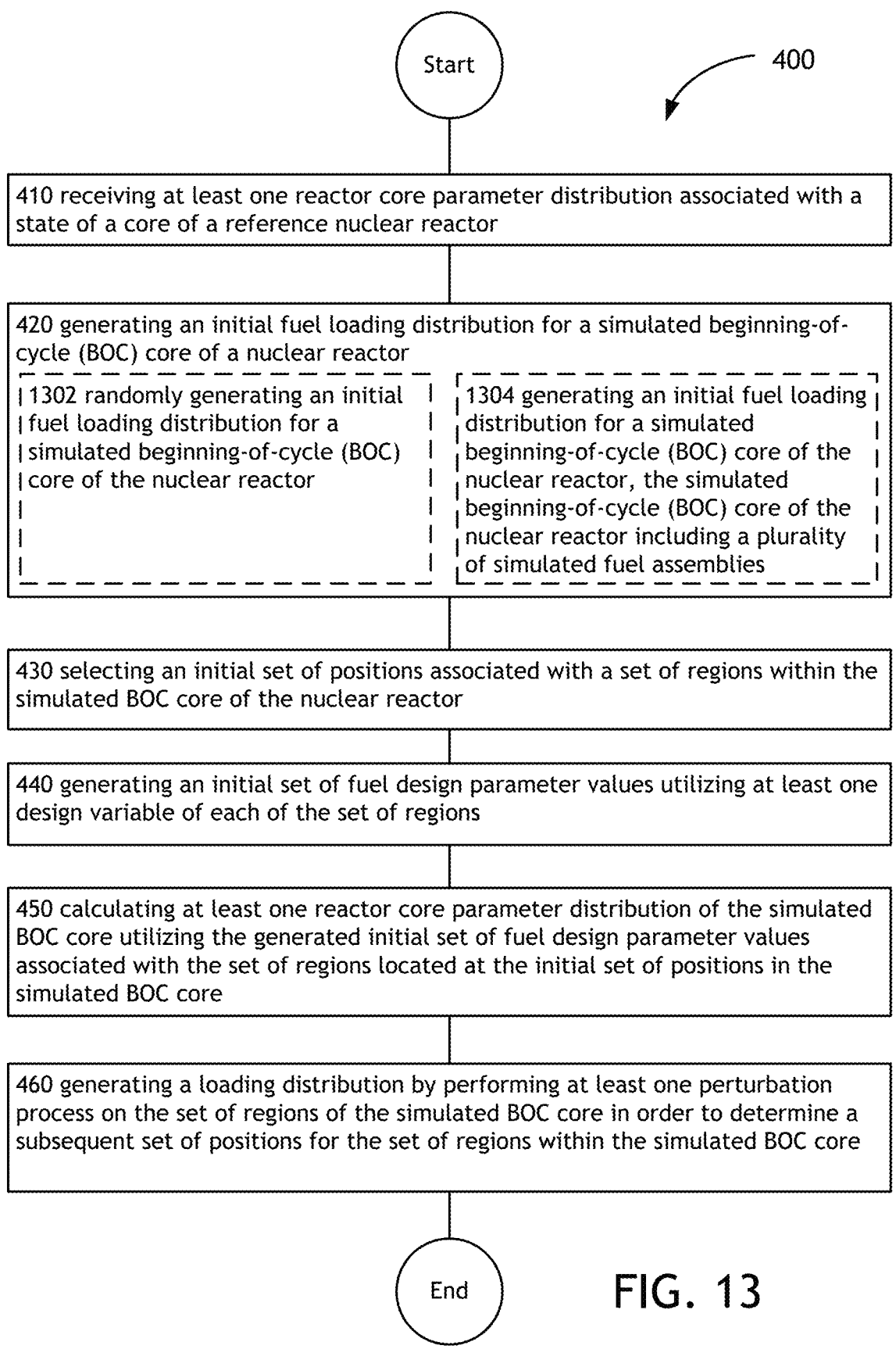

FIG. 13 illustrates alternative embodiments of the example operational flow 400 of FIG. 4A. FIG. 13 illustrates example embodiments where the generating operation 420 may include at least one additional operation. Additional operations may include an operation 1302 and/or operation 1304.

The operation 1302 illustrates randomly generating an initial fuel loading distribution for a simulated BOC core of the nuclear reactor. For example, as shown in FIGS. 1A through 1P, the one or more processors 106 of the controller 102 may randomly generate an initial fuel loading distribution for a simulated BOC core of the nuclear reactor. For instance, the one or more processors 106 of the controller 102 may apply a preprogrammed algorithm configured to randomly select the spatial distribution of nuclear fuel (including fissile and non-fissile material) across the simulated BOC core.

In another embodiment, operation 1304 illustrates generating an initial fuel loading distribution for a simulated BOC core of the nuclear reactor, the simulated BOC core of the nuclear reactor including a plurality of simulated fuel assemblies. For example, as shown in FIGS. 1A through 1P, the one or more processors 106 of the controller 102 may generate an initial fuel loading distribution through a plurality of simulated fuel assemblies for a simulated BOC core of the nuclear reactor. For instance, the one or more processors 106 of the controller 102 may provide the spatial distribution of nuclear fuel (including fissile and non-fissile material) throughout simulated BOC core by providing the type and quantity of material within each of the fuel assemblies throughout the simulated BOC core. Further, the initial fuel loading distribution may be resolved at the pin-level of each fuel assembly of the simulated BOC core. In this regard, the one or more processors 106 of the controller 102 may provide the spatial distribution of nuclear fuel (including fissile and non-fissile material) throughout the BOC core by providing the type and quantify of material within each fuel pin of each fuel assembly throughout the simulated BOC core.

Figure 14:
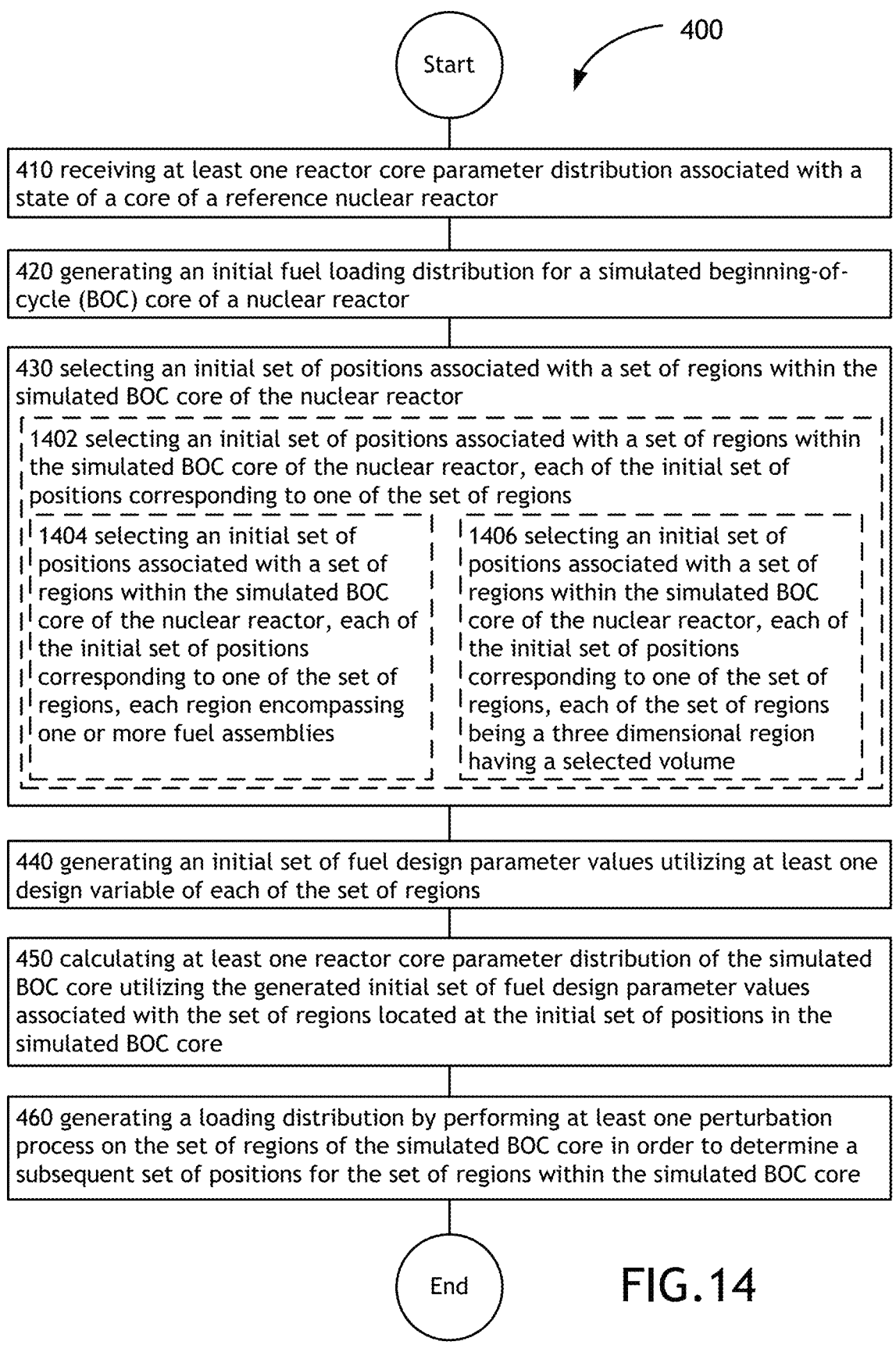

FIG. 14 illustrates alternative embodiments of the example operational flow 400 of FIG. 4A. FIG. 14 illustrates example embodiments where the selecting operation 430 may include at least one additional operation. Additional operations may include an operation 1402, 1404 and/or operation 1406.

The operation 1402 illustrates selecting an initial set of positions associated with a set of regions within the simulated BOC core of the nuclear reactor, each of the initial set of positions corresponding to one of the set of regions. For example, as shown in FIGS. 1A through 1P, one or more processors 106 of controller 102 may select an initial set of positions (e.g., x, y, z positions) associated with a set of regions within the simulated BOC core of the nuclear reactor. Further, the one or more processors 106 of the controller 102 may assign a relative position to each of a set of regions 122 within the simulated BOC core 120 of the nuclear reactor. In this regard, each region as delineated by the controller 102 may encompass a selected volume (e.g., selected by controller 102 or selected via user input) of the nuclear fuel within the simulated BOC core 120.

In another embodiment, the operation 1404 illustrates selecting an initial set of positions associated with a set of regions within the simulated BOC core of the nuclear reactor, each of the initial set of positions corresponding to one of the set regions, each region encompassing at least one fuel assembly. For example, as shown in FIGS. 1A through 1P, one or more processors 106 of controller 102 may select an initial set of positions (e.g., x, y, z positions) associated with a set of regions 122 within the simulated BOC core 120 of the nuclear reactor, whereby each region encompasses one or more fuel assemblies 124 of the simulated BOC core 120. Further, the one or more processors 106 of the controller 102 may assign a relative position to each region encompassing one or more fuel assemblies 124 within the simulated BOC core 120 of the nuclear reactor. For instance, as shown in FIG. 1I, the one or more processors 106 of the controller 102 are configured to select an initial set of positions 140 of the set of regions 122, whereby each region 122 encompasses a single fuel assembly 124 of the BOC core 120. In another instance, as shown in FIG. 1J, the one or more processors 106 of the controller 102 are configured to select an initial set of positions 140 of the set of regions 122, whereby each region 122 encompasses multiple fuel assemblies 124 of the BOC core 120.

In another embodiment, the operation 1406 illustrates selecting an initial set of positions associated with a set of regions within the simulated BOC core of the nuclear reactor, each of the initial set of positions corresponding to one of the set of regions, each of the set of regions being a three dimensional region having a selected volume. For example, as shown in FIGS. 1A through 1P, one or more processors 106 of controller 102 may select an initial set of positions 140 associated with a set of regions 122 within the simulated BOC core 120 of the nuclear reactor, whereby each region is a three dimensional region having a selected volume. Further, the one or more processors 106 of the controller 102 may assign a relative position to each three dimensional region of selected volume within the simulated BOC core 120 of the nuclear reactor.

Figure 15:
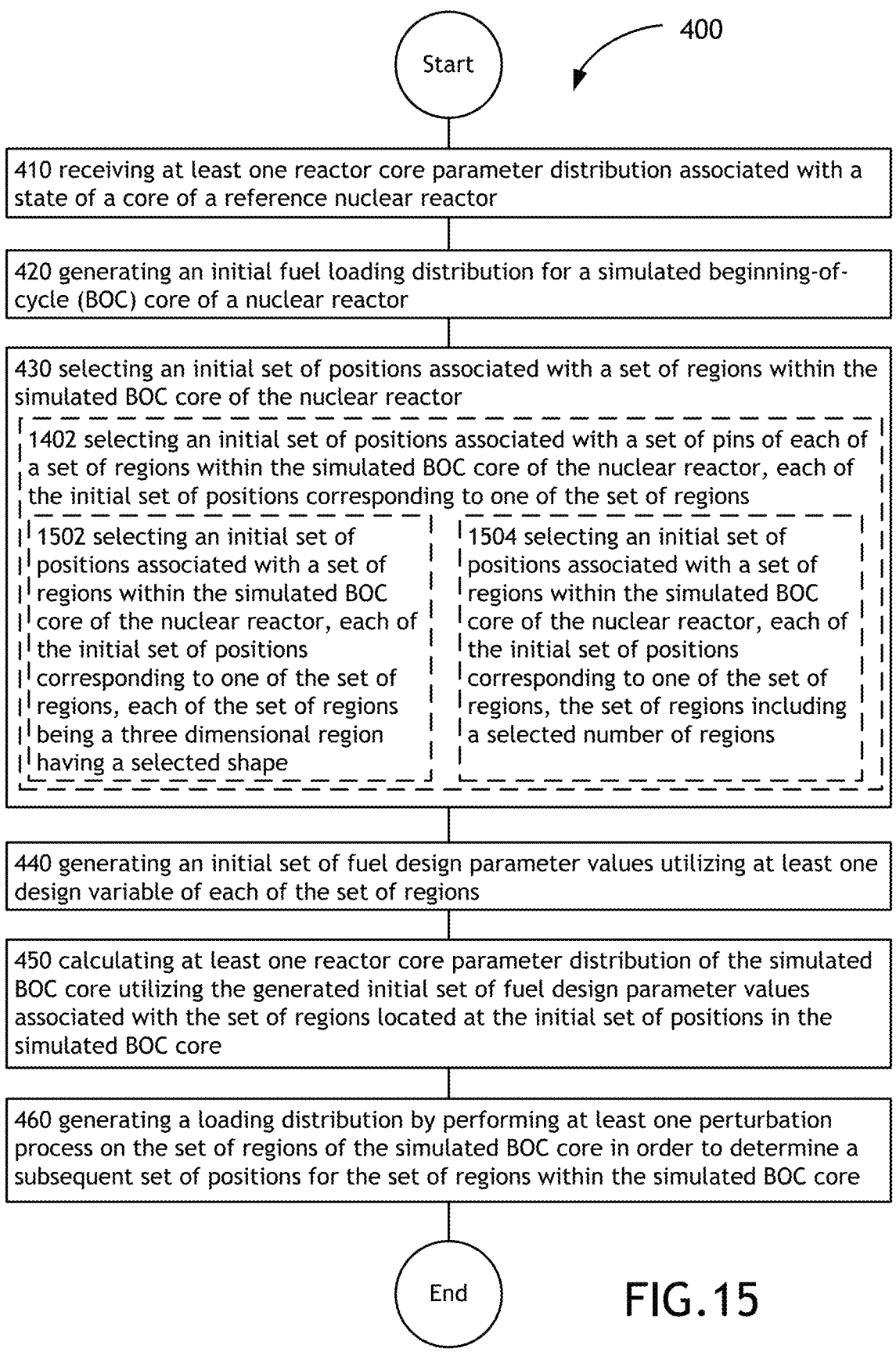

FIG. 15 illustrates alternative embodiments of the example operational flow 400 of FIG. 4A. FIG. 15 illustrates example embodiments where the selecting operation 430 may include at least one additional operation. Additional operations may include an operation 1502 and/or operation 1504.

In another embodiment, the operation 1502 illustrates selecting an initial set of positions associated with a set of regions within the simulated BOC core of the nuclear reactor, each of the initial set of positions corresponding to one of the set of regions, each of the set of regions being a three dimensional region having a selected shape. For example, as shown in FIGS. 1A through 1P, one or more processors 106 of controller 102 may select an initial set of positions 140 associated with a set of regions 122 within the simulated BOC core 120 of the nuclear reactor, whereby each region is a three dimensional region having a selected shape (e.g., hexagonoid, cuboid, cylinder, ellipsoid, sphere, disc, ring and the like). Further, the one or more processors 106 of the controller 102 may assign a relative position to each three dimensional region of selected shape within the simulated BOC core 120 of the nuclear reactor.

In another embodiment, the operation 1504 illustrates selecting an initial set of positions associated with a set of regions within the simulated BOC core of the nuclear reactor, each of the initial set of positions corresponding to one of the set of regions, the set of regions including a selected number of regions. For example, as shown in FIGS. 1A through 1P, one or more processors 106 of controller 102 may select an initial set of positions 140 associated with a set of regions 122 including a selected number of regions. Further, the one or more processors 106 of the controller 102 may assign a relative position to each region of the selected number of regions within the simulated BOC core 120 of the nuclear reactor.

Figure 16:
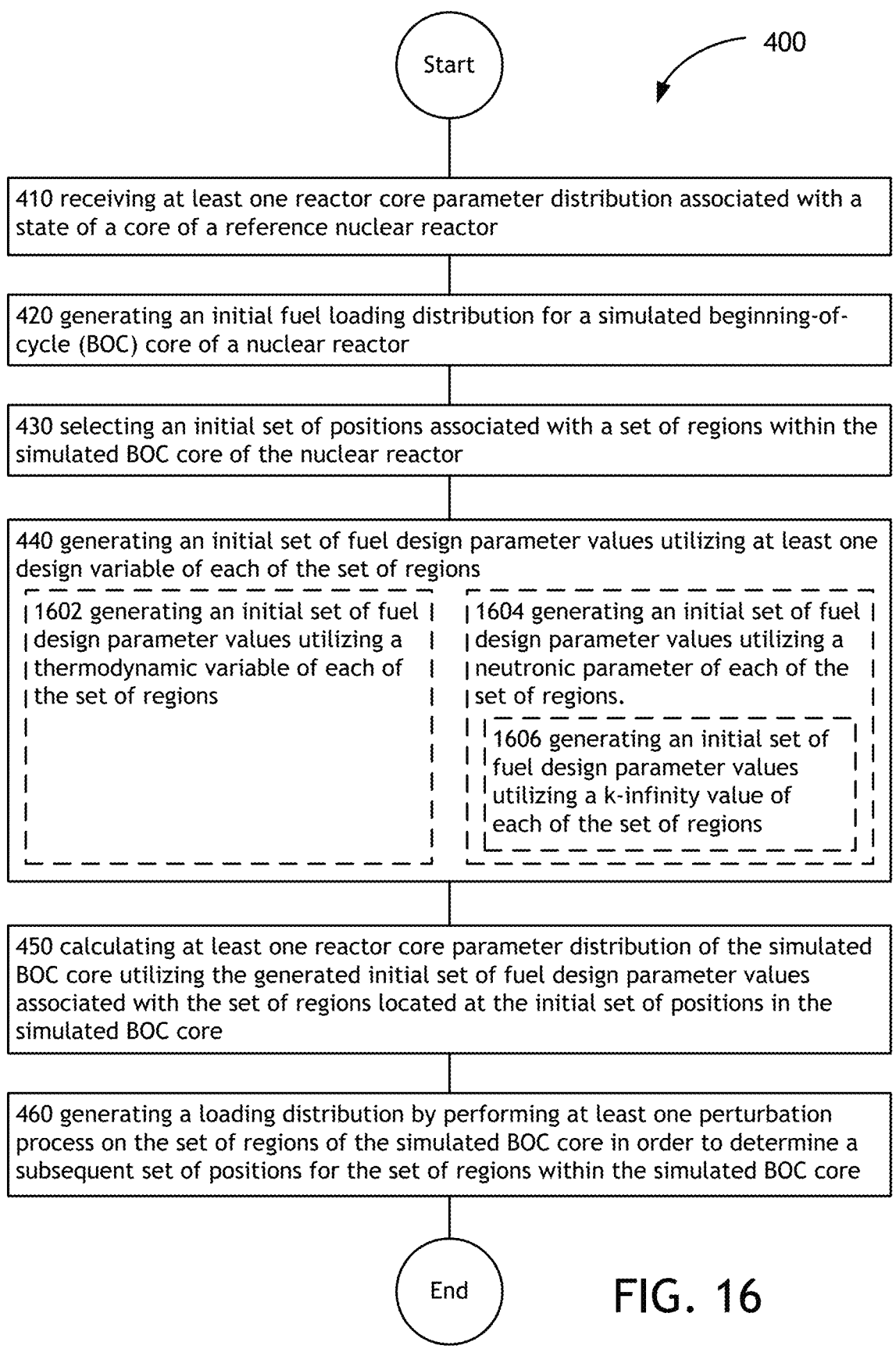

FIG. 16 illustrates alternative embodiments of the example operational flow 400 of FIG. 16. FIG. 16 illustrates example embodiments where the generating operation 440 may include at least one additional operation. Additional operations may include an operation 1602, 1604 and/or operation 1606.

The operation 1602 illustrates generating an initial set of fuel design parameter values utilizing a thermodynamic variable of each of the set of regions. For example, as shown in FIGS. 1A through 1P, one or more processors 106 of controller 102 may generate an initial fuel design parameter value 141 utilizing a thermodynamic variable (e.g., temperature, pressure and the like) for each region 122. For instance, as shown in FIG. 1I, one or more processors 106 of controller 102 may generate an initial fuel design parameter value for a given region 122 utilizing a thermodynamic variable for the given region 122. In another instance, as shown in FIG. 1L, one or more processors 106 of controller 102 may generate an initial fuel design parameter value for a given region 122 utilizing a thermodynamic variable for the region 122 and regions 123a-123f adjacent to the given region 122.

In another embodiment, the operation 1604 illustrates generating an initial set of fuel design parameter values utilizing a neutronic parameter of each of the set of regions. For example, as shown in FIGS. 1A through 1P, one or more processors 106 of controller 102 may generate an initial set of fuel design parameter values utilizing a neutronic parameter associated with the simulated nuclear fuel within of each of the set of regions. For instance, as shown in FIG. 1I, one or more processors 106 of controller 102 may generate an initial fuel design parameter value for a given region 122 utilizing a neutronic parameter for the given region 122. In another instance, as shown in FIG. 1L, one or more processors 106 of controller 102 may generate an initial fuel design parameter value for a given region 122 utilizing a neutronic parameter for region 122 and regions 123a-123f adjacent to the given region 122.

In another embodiment, the operation 1606 illustrates generating an initial set of fuel design parameter values utilizing a k-infinity value of each of the set of regions. For example, as shown in FIGS. 1A through 1P, one or more processors 106 of controller 102 may generate an initial set of fuel design parameter values utilizing a k-infinity value associated with the nuclear fuel within each of the set of regions. For instance, as shown in FIG. 1I, one or more processors 106 of controller 102 may generate an initial fuel design parameter value for a given region 122 utilizing a k-infinity value for the given region 122. In another instance, as shown in FIG. 1L, one or more processors 106 of controller 102 may generate an initial fuel design parameter value for a given region 122 utilizing a k-infinity value for region 122 and regions 123a-123f adjacent to the given region 122.

Figure 17:
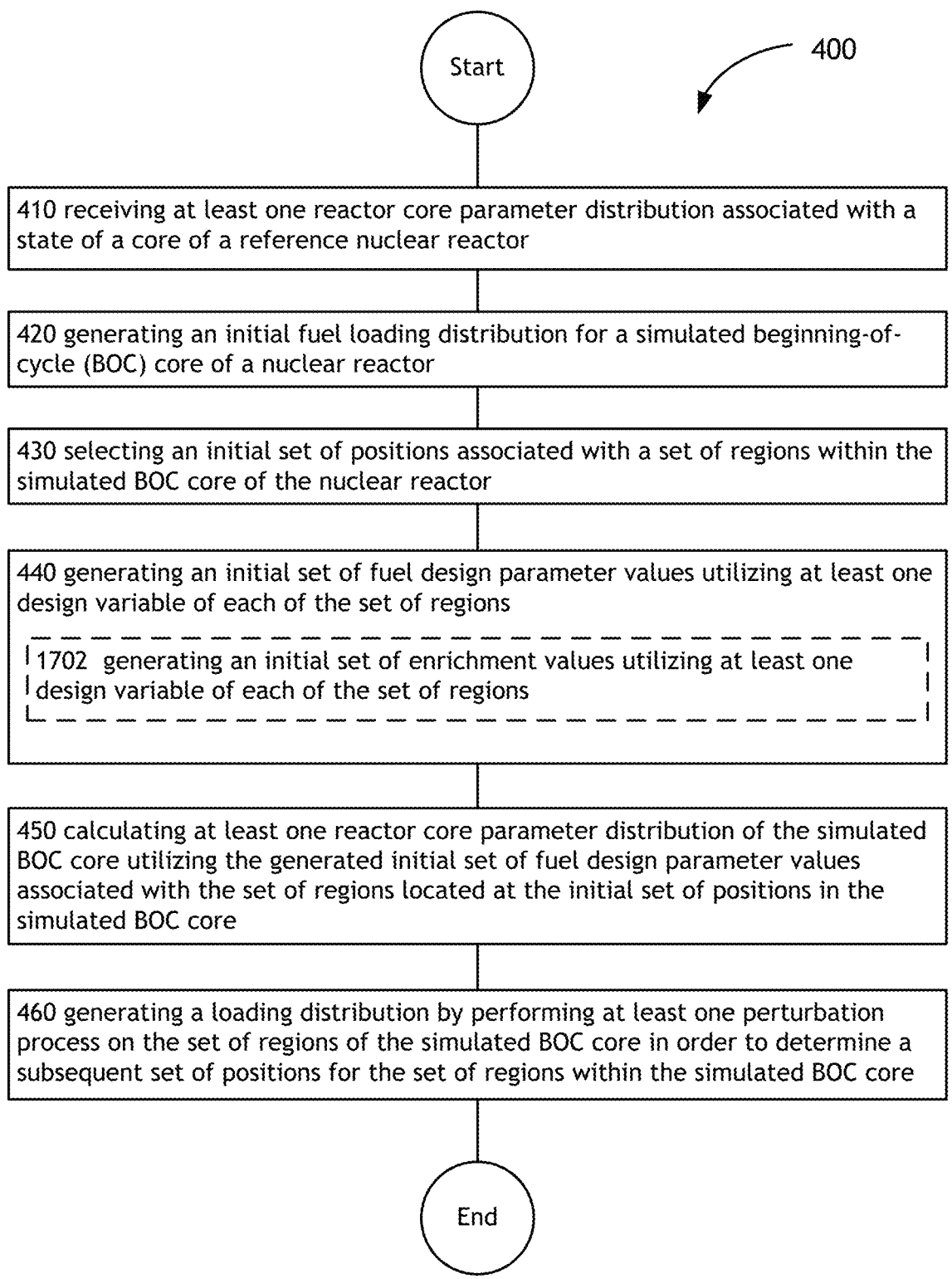

FIG. 17 illustrates alternative embodiments of the example operational flow 400 of FIG. 4A. FIG. 17 illustrates example embodiments where the generating operation 440 may include at least one additional operation. Additional operations may include an operation 1702.

The operation 1702 illustrates generating an initial set of enrichment values utilizing at least one design variable of each of the set of regions. For example, as shown in FIGS. 1A through 1P, one or more processors 106 of controller 102 may generate an initial set of simulated nuclear fuel enrichment value utilizing one or more design variables (e.g., thermodynamic variable, neutronic parameter and the like) for each region 122. For instance, as shown in FIG. 1I, one or more processors 106 of controller 102 may generate an initial set of enrichment values for a given region 122 utilizing a design variable for the given region 122. In another instance, as shown in FIG. 1L, one or more processors 106 of controller 102 may generate an initial set of enrichment values for a given region 122 utilizing a design variable for region 122 and regions 123a-123f adjacent to the given region 122.

Figure 18:
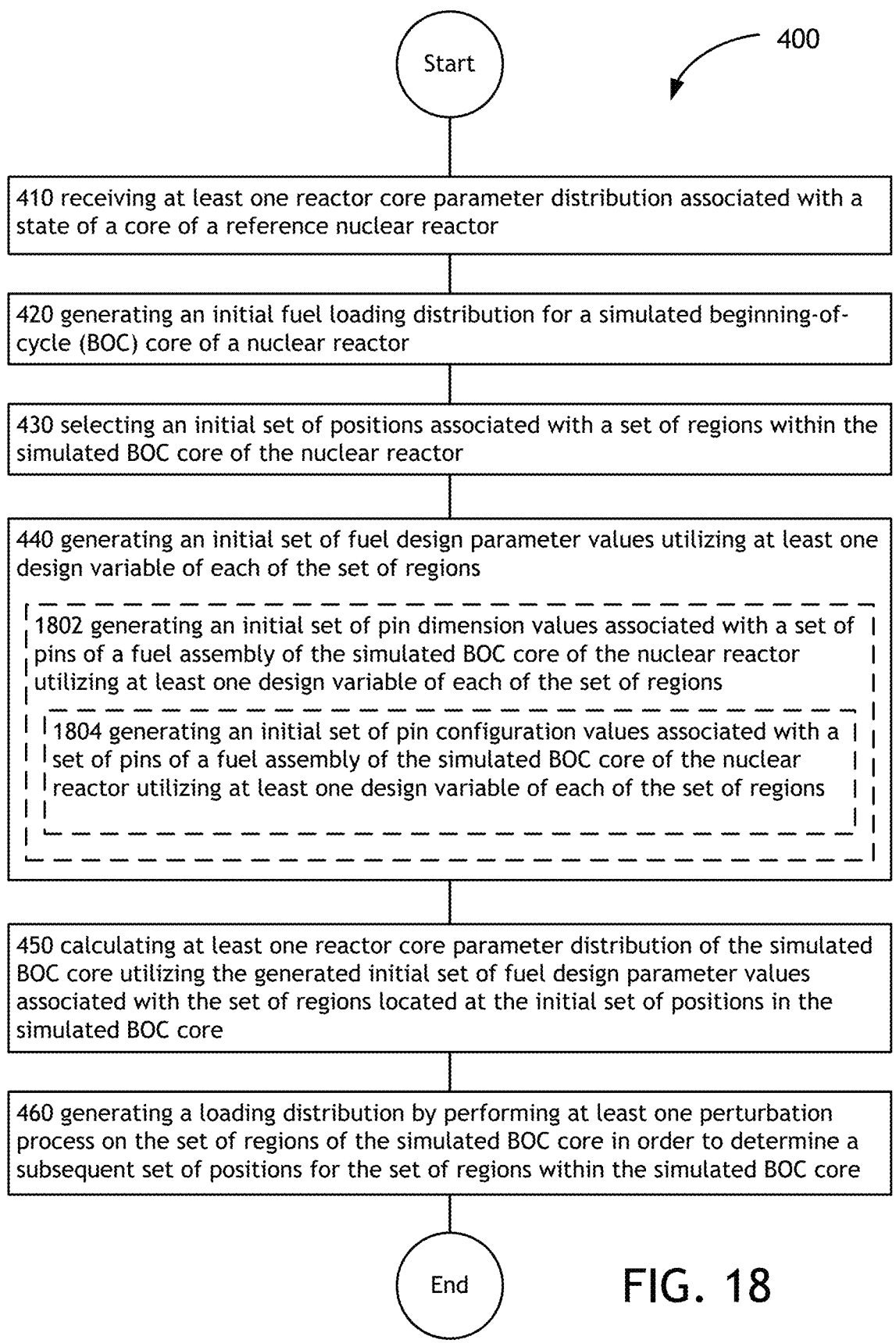

FIG. 18 illustrates alternative embodiments of the example operational flow 400 of FIG. 4A. FIG. 18 illustrates example embodiments where the generating operation 440 may include at least one additional operation. Additional operations may include an operation 1802 and/or 1804.

The operation 1802 illustrates generating an initial set of pin dimension values associated with a set of pins of a fuel assembly of the simulated BOC core of the nuclear reactor utilizing at least one design variable of each of the set of regions. For example, as shown in FIGS. 1A through 1P, one or more processors 106 of controller 102 may generate an initial set of pin dimension values associated with a set of pins of a fuel assembly 124 of the simulated BOC core 120 of the nuclear reactor utilizing one or more design variables of each of the set of regions 122. For instance, as shown in FIG. 1I, one or more processors 106 of controller 102 may generate an initial set of pin dimension values associated with a set of pins of a fuel assembly 124 of the simulated BOC core 120 of the nuclear reactor utilizing a design variable for the given region 122. In another instance, as shown in FIG. 1L, one or more processors 106 of controller 102 may generate an initial set of pin dimension values associated with a set of pins of a fuel assembly 124 of the simulated BOC core 120 of the nuclear reactor utilizing a design variable for region 122 and each of the regions 123a-122f adjacent to the given region 122.

In another embodiment, the operation 1804 illustrates generating an initial set of pin configuration values associated with a set of pins of a fuel assembly of the simulated BOC core of the nuclear reactor utilizing at least one design variable of each of the set of regions. For example, as shown in FIGS. 1A through 1P, one or more processors 106 of controller 102 may generate an initial set of pin configuration values associated with a set of pins of a fuel assembly 124 of the simulated BOC core 120 of the nuclear reactor utilizing one or more design variables of each of the set of regions 122. For instance, one or more processors 106 of controller 102 may generate an initial set of pin pitch values associated with a set of pins of a fuel assembly 124 of the simulated BOC core 120 of the nuclear reactor utilizing one or more design variables of each of the set of regions 122. In another instance, one or more processors 106 of controller 102 may generate an initial number of pins within a set of pins of a fuel assembly 124 of the simulated BOC core 120 of the nuclear reactor utilizing one or more design variables of each of the set of regions 122.

Figure 19:
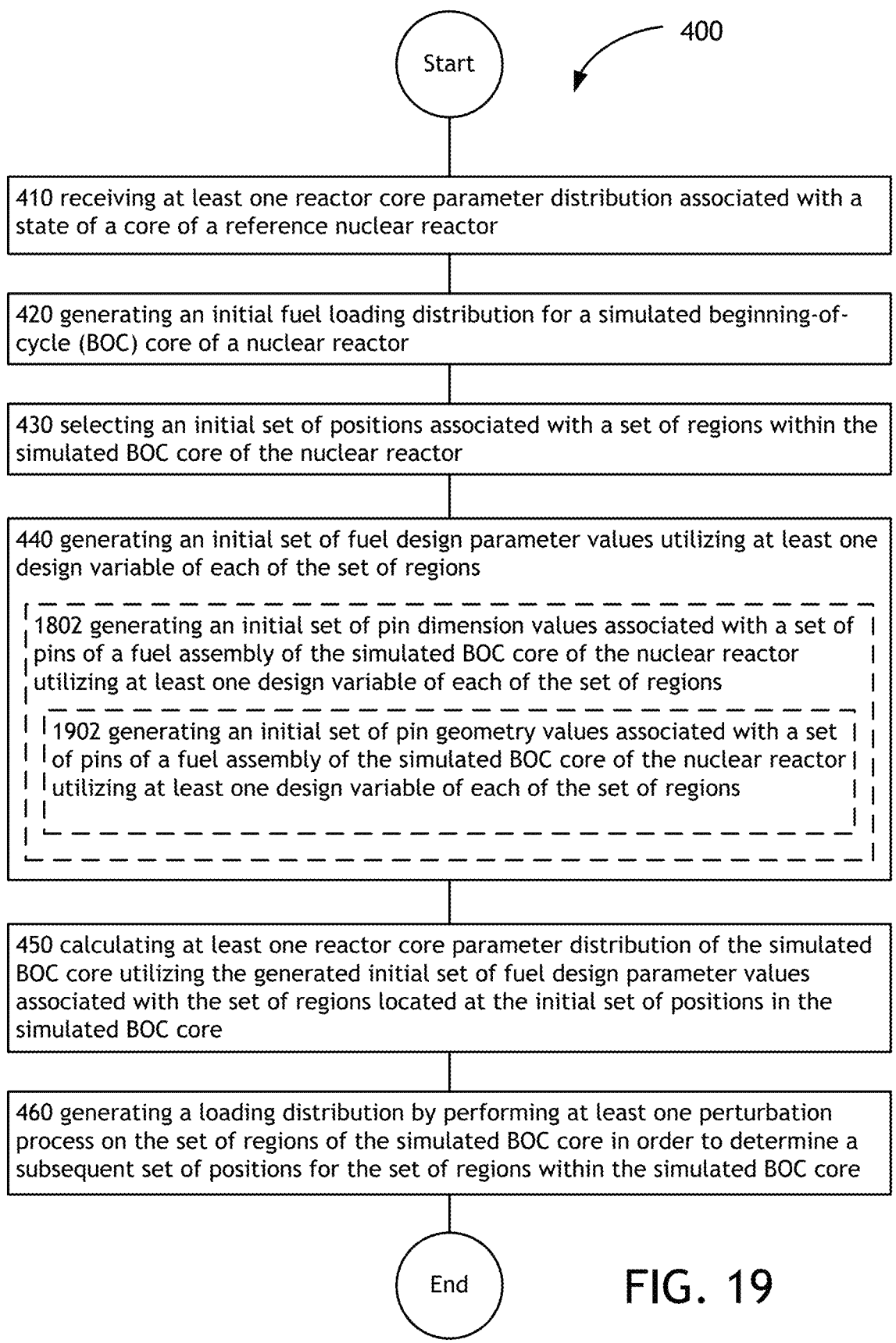

FIG. 19 illustrates alternative embodiments of the example operational flow 400 of FIG. 4A. FIG. 19 illustrates example embodiments where the generating operation 440 may include at least one additional operation. Additional operations may include an operation 1902.

In another embodiment, the operation 1902 illustrates generating an initial set of pin geometry values associated with a set of pins of a fuel assembly of the simulated BOC core of the nuclear reactor utilizing at least one design variable of each of the set of regions. For example, as shown in FIGS. 1A through 1P, one or more processors 106 of controller 102 may generate an initial set of pin geometry values associated with a set of pins of a fuel assembly 124 of the simulated BOC core 120 of the nuclear reactor utilizing one or more design variables of each of the set of regions 122. For instance, one or more processors 106 of controller 102 may generate an initial set of pin size values (e.g., pin length values, pin thickness/radius values and the like) associated with a set of pins of a fuel assembly 124 of the simulated BOC core 120 of the nuclear reactor utilizing one or more design variables of each of the set of regions 122. In another instance, one or more processors 106 of controller 102 may generate an initial set of pin shapes (e.g., hexagonoid, cylinder, prism and the like) associated with a set of pins of a fuel assembly 124 of the simulated BOC core 120 of the nuclear reactor utilizing one or more design variables of each of the set of regions 122.

Figure 20:
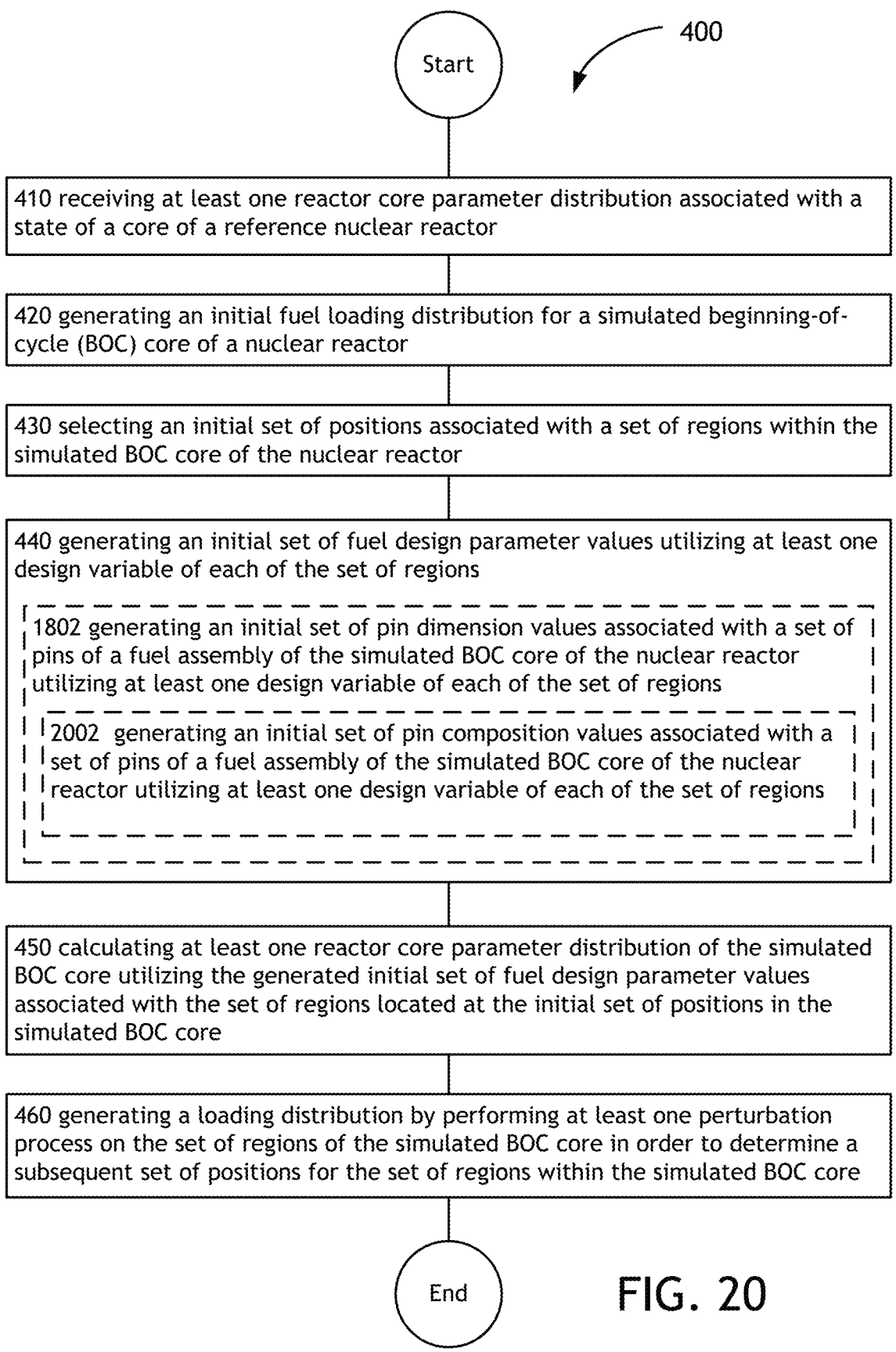

FIG. 20 illustrates alternative embodiments of the example operational flow 400 of FIG. 4A. FIG. 20 illustrates example embodiments where the generating operation 440 may include at least one additional operation. Additional operations may include an operation 2002.

In another embodiment, the operation 2002 illustrates generating an initial set of pin composition values associated with a set of pins of a fuel assembly of the simulated BOC core of the nuclear reactor utilizing at least one design variable of each of the set of regions. For example, as shown in FIGS. 1A through 1P, one or more processors 106 of controller 102 may generate an initial set of pin composition values associated with a set of pins of a fuel assembly 124 of the simulated BOC core 120 of the nuclear reactor utilizing one or more design variables of each of the set of regions 122. For instance, one or more processors 106 of controller 102 may generate a set of fuel smear densities associated with a set of pins of a fuel assembly 124 of the simulated BOC core 120 of the nuclear reactor utilizing one or more design variables of each of the set of regions 122. In another instance, one or more processors 106 of controller 102 may generate a set of fissile content values (i.e., relative amount of fissile material in each pin) associated with a set of pins of a fuel assembly 124 of the simulated BOC core 120 of the nuclear reactor utilizing one or more design variables of each of the set of regions 122. In another instance, one or more processors 106 of controller 102 may generate a set of fertile content values (i.e., relative amount of fertile material in each pin) associated with a set of pins of a fuel assembly 124 of the simulated BOC core 120 of the nuclear reactor utilizing one or more design variables of each of the set of regions 122. In another instance, one or more processors 106 of controller 102 may generate a set of non-fissile/non-fertile content values (i.e., relative amount of non-fissile/non-fertile material in each pin (e.g., amount of zirconium in each pin)) associated with a set of pins of a fuel assembly 124 of the simulated BOC core 120 of the nuclear reactor utilizing one or more design variables of each of the set of regions 122. By way of another example, as shown in FIGS. 1A through 1P, one or more processors 106 of controller 102 may generate an initial set of pin composition values as a function of position and/or fuel assembly location across the simulated BOC core of the nuclear reactor utilizing one or more design variables of each of the set of regions 122. In this regard, the one or more processors 106 of controller 102 may control both the fuel composition of each pin of the fuel assemblies of the simulated BOC core and the manner in which the fuel composition varies across the various fuel assemblies of the simulated BOC core.

Figure 21:
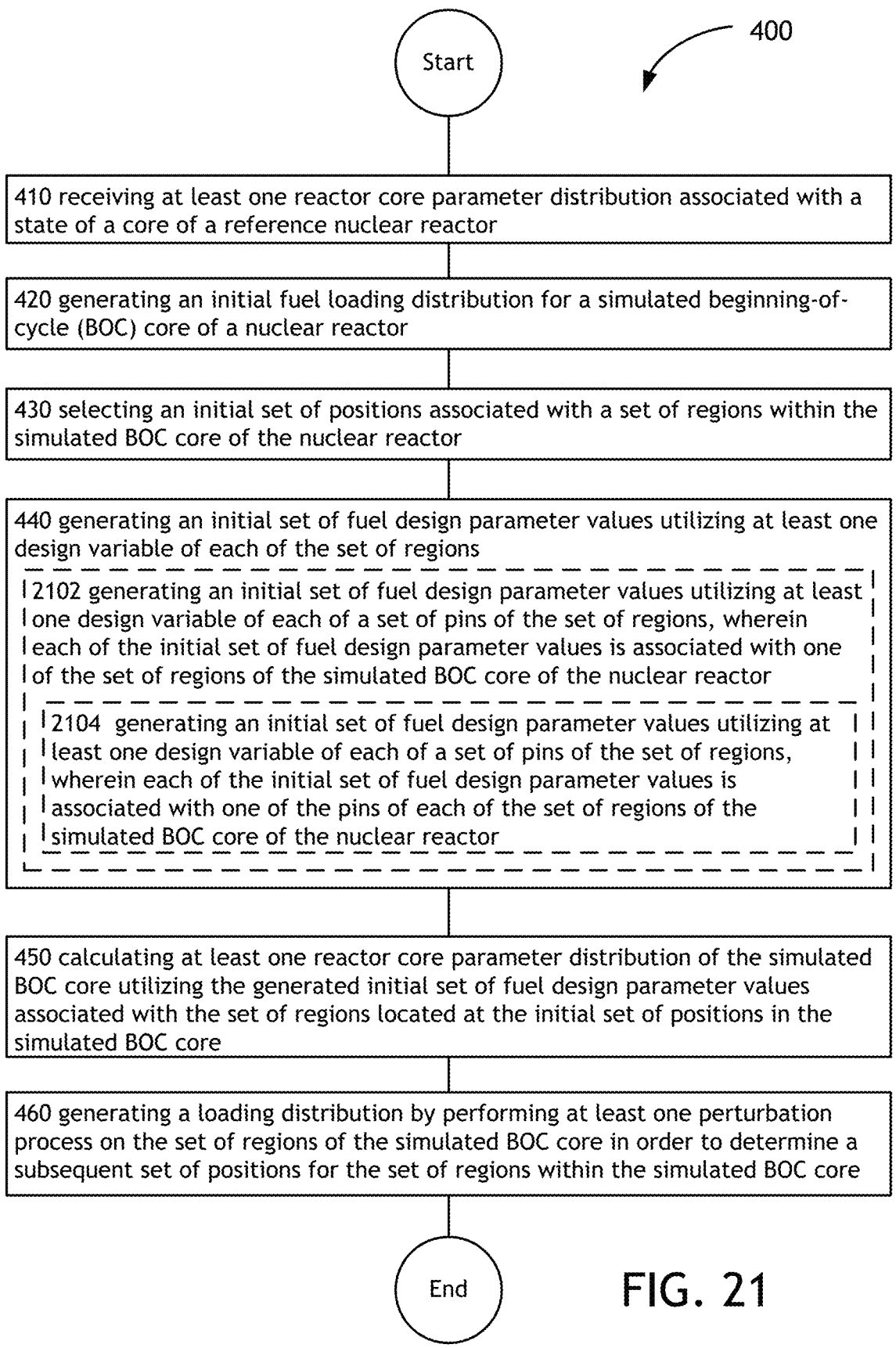

FIG. 21 illustrates alternative embodiments of the example operational flow 400 of FIG. 4A. FIG. 21 illustrates example embodiments where the generating operation 440 may include at least one additional operation. Additional operations may include an operation 2102 and/or 2104.

The operation 2102 illustrates generating an initial set of fuel design parameter values utilizing at least one design variable of each of a set of pins of the set of regions, wherein each of the initial set of fuel design parameter values is associated with one of the set of regions of the simulated BOC core of the nuclear reactor. For example, as shown in FIGS. 1A through 1P, one or more processors 106 of controller 102 may generate an initial set of fuel design parameter values associated with one of the set of regions of the simulated BOC core 120 utilizing at least one design variable for each of the set of pins. Further, each of the initial set of fuel design parameter values may be associated with one of the set of regions of the simulated BOC core of the nuclear reactor. In this regard, the initial set of fuel design parameter values may be generated at the "multi-pin" level (i.e., region including multiple pins) using pin-level inputs for the one or more design variables.

The operation 2104 illustrates generating an initial set of fuel design parameter values utilizing at least one design variable of each of a set of pins of the set of regions, wherein each of the initial set of fuel design parameter values is associated with one of the pins of each of the set of regions of the simulated BOC core of the nuclear reactor. For example, as shown in FIGS. 1A through 1P, one or more processors 106 of controller 102 may generate an initial set of fuel design parameter values associated with a set of pins of a fuel assembly 124 of the simulated BOC core 120 utilizing at least one design variable of each of the set of pins. Further, each of the initial set of fuel design parameter values may be associated with one of the pins of each of the set of regions of the simulated BOC core of the nuclear reactor. In this regard, the initial set of fuel design parameter values may be generated at the "pin-level" of the simulated reactor core using pin-level inputs for the one or more design variables.

Figure 22:

FIG. 22 illustrates alternative embodiments of the example operational flow 400 of FIG. 4A. FIG. 22 illustrates example embodiments where the calculating operation 450 may include at least one additional operation. Additional operations may include an operation 2202 and/or 2204.

The operation 2202 illustrates calculating a power density distribution of the simulated BOC core utilizing the generated initial set of fuel design parameter values associated with the set of regions located at the initial set of positions of the simulated BOC core. For example, as shown in FIGS. 1A through 1P, using the generated initial set of fuel design parameter values corresponding to the regions 122 located at the initial positions of the simulated BOC core 120, the one or more processors 106 of controller 102 may calculate a power density distribution for the simulated BOC core 120.

In another embodiment, 2204 illustrates calculating a rate of change of a power density distribution of the simulated BOC core utilizing the generated initial set of fuel design parameter values associated with the set of regions located at the initial set of positions of the simulated BOC core. For example, as shown in FIGS. 1A through 1P, using the generated initial set of fuel design parameter values corresponding to the regions 122 located at the initial positions of the simulated BOC core 120, the one or more processors 106 of controller 102 may calculate a rate-of-change of power density distribution for the simulated BOC core 120.

Figure 23:
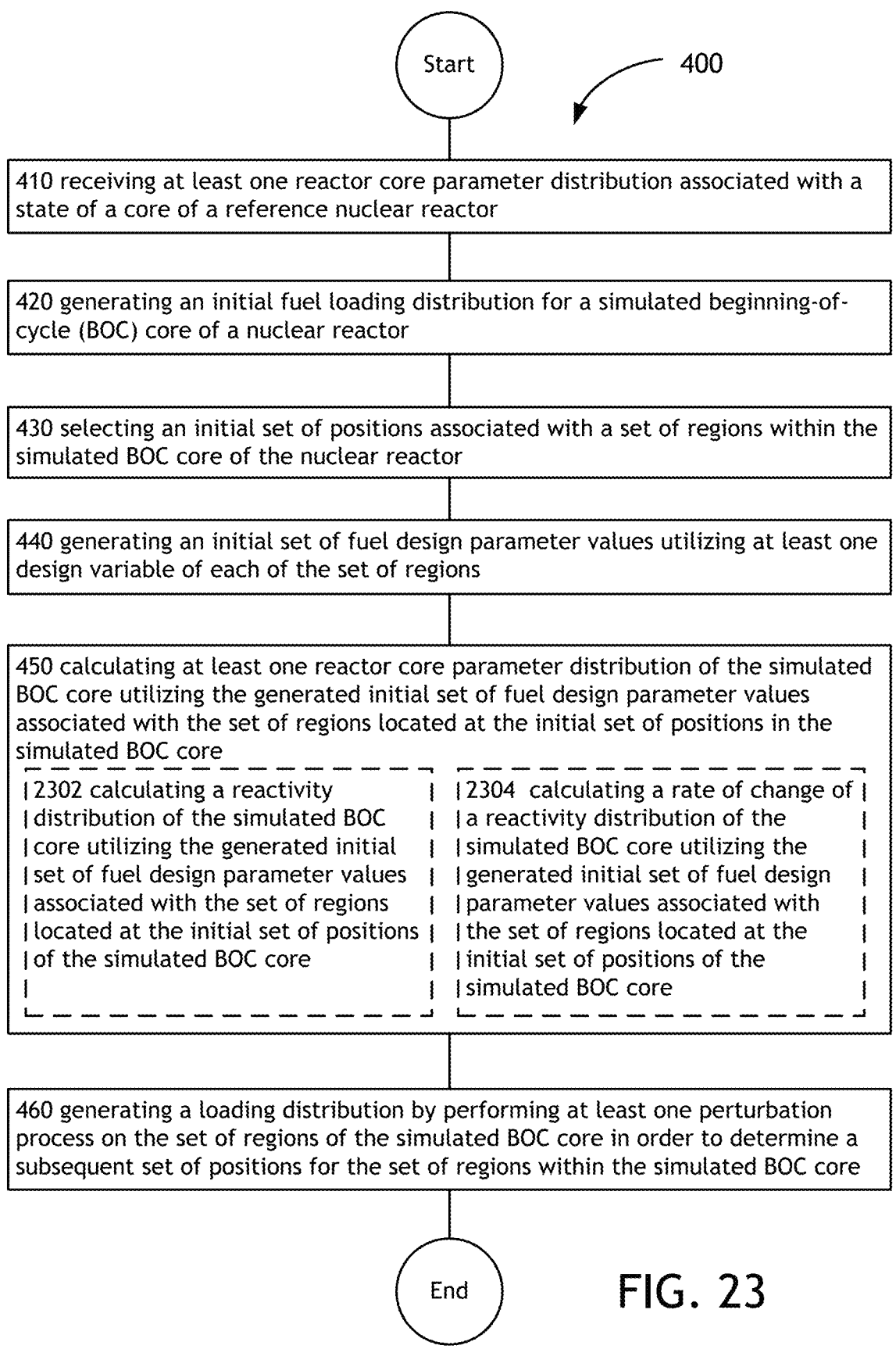

FIG. 23 illustrates alternative embodiments of the example operational flow 400 of FIG. 4A. FIG. 23 illustrates example embodiments where the calculating operation 450 may include at least one additional operation. Additional operations may include an operation 2302 and/or 2304.

The operation 2302 illustrates calculating a reactivity distribution of the simulated BOC core utilizing the generated initial set of fuel design parameter values associated with the set of regions located at the initial set of positions of the simulated BOC core. For example, as shown in FIGS. 1A through 1P, using the generated initial set of fuel design parameter values corresponding to the regions 122 located at the initial positions of the simulated BOC core 120, the one or more processors 106 of controller 102 may calculate a reactivity distribution for the simulated BOC core 120.

In another embodiment, operation 2304 illustrates calculating a rate of change of a reactivity distribution of the simulated BOC core utilizing the generated initial set of fuel design parameter values associated with the set of regions located at the initial set of positions of the simulated BOC core. For example, as shown in FIGS. 1A through 1P, using the generated initial set of fuel design parameter values corresponding to the regions 122 located at the initial positions of the simulated BOC core 120, the one or more processors 106 of controller 102 may calculate a rate-of-change of reactivity distribution for the simulated BOC core 120.

Figure 24:
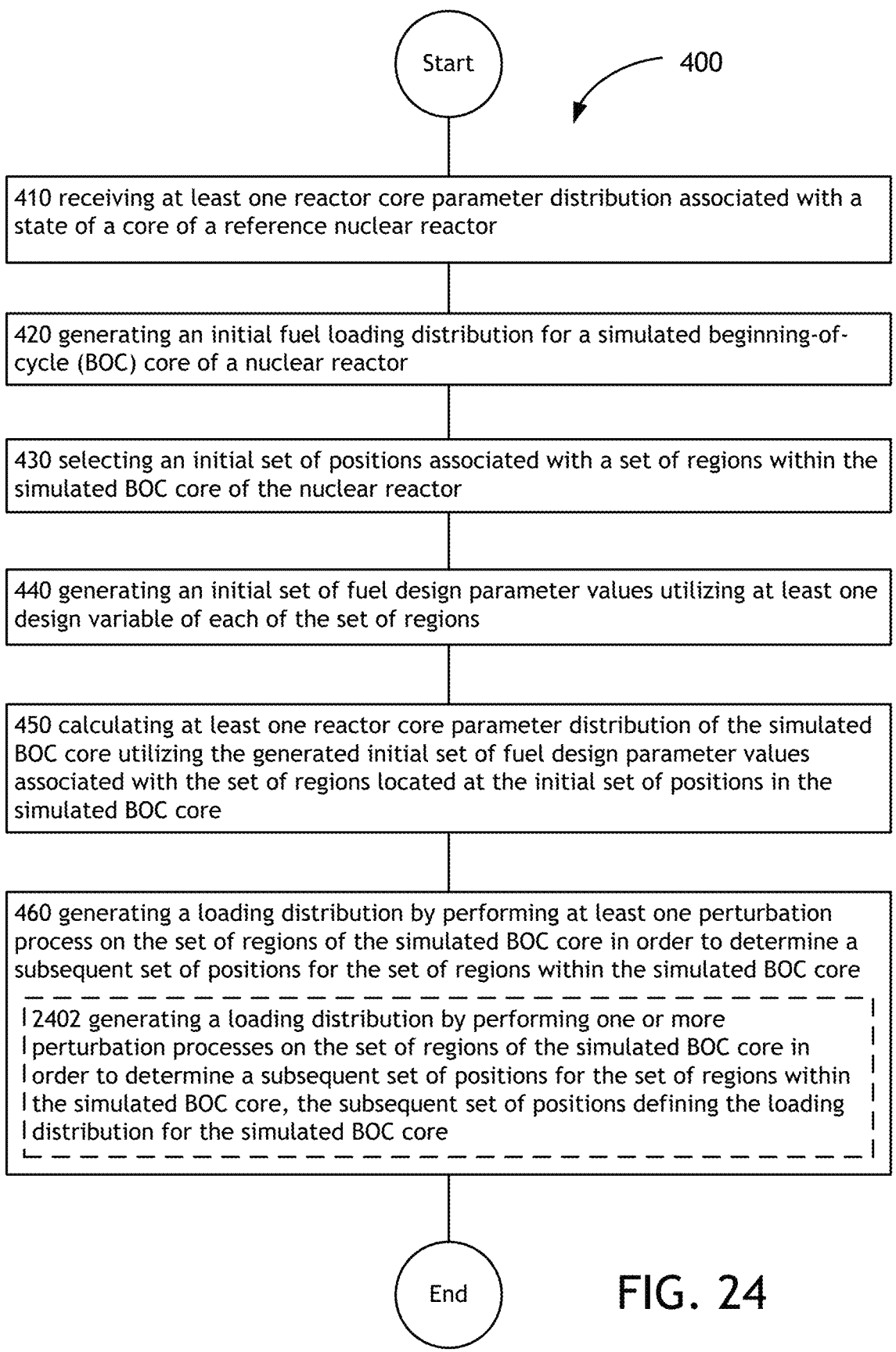

FIG. 24 illustrates alternative embodiments of the example operational flow 400 of FIG. 4A. FIG. 24 illustrates example embodiments where the generating operation 460 may include at least one additional operation. Additional operations may include an operation 2402.

The operation 2402 illustrates generating a loading distribution by performing at least one perturbation process on the set of regions of the simulated BOC core in order to determine a subsequent set of positions for the set of regions within the simulated BOC core, the subsequent set of positions defining the loading distribution for the simulated BOC core. For example, as shown in FIGS. 1A through 1P, the one or more processors 106 of the controller 102 may generate a loading distribution by performing at least one perturbation process on the set of regions 122 of the simulated BOC core 120 in order to determine a subsequent set of positions for the set of regions within the simulated BOC core, the subsequent set of positions defining the loading distribution for the simulated BOC core 120. For instance, the subsequent positions of regions 122 outputted from the perturbation process 170 may serve to define a loading distribution (i.e., spatial distribution of fertile and non-fertile components of nuclear fuel in reactor core) for the simulated BOC core 120.

Figure 25:
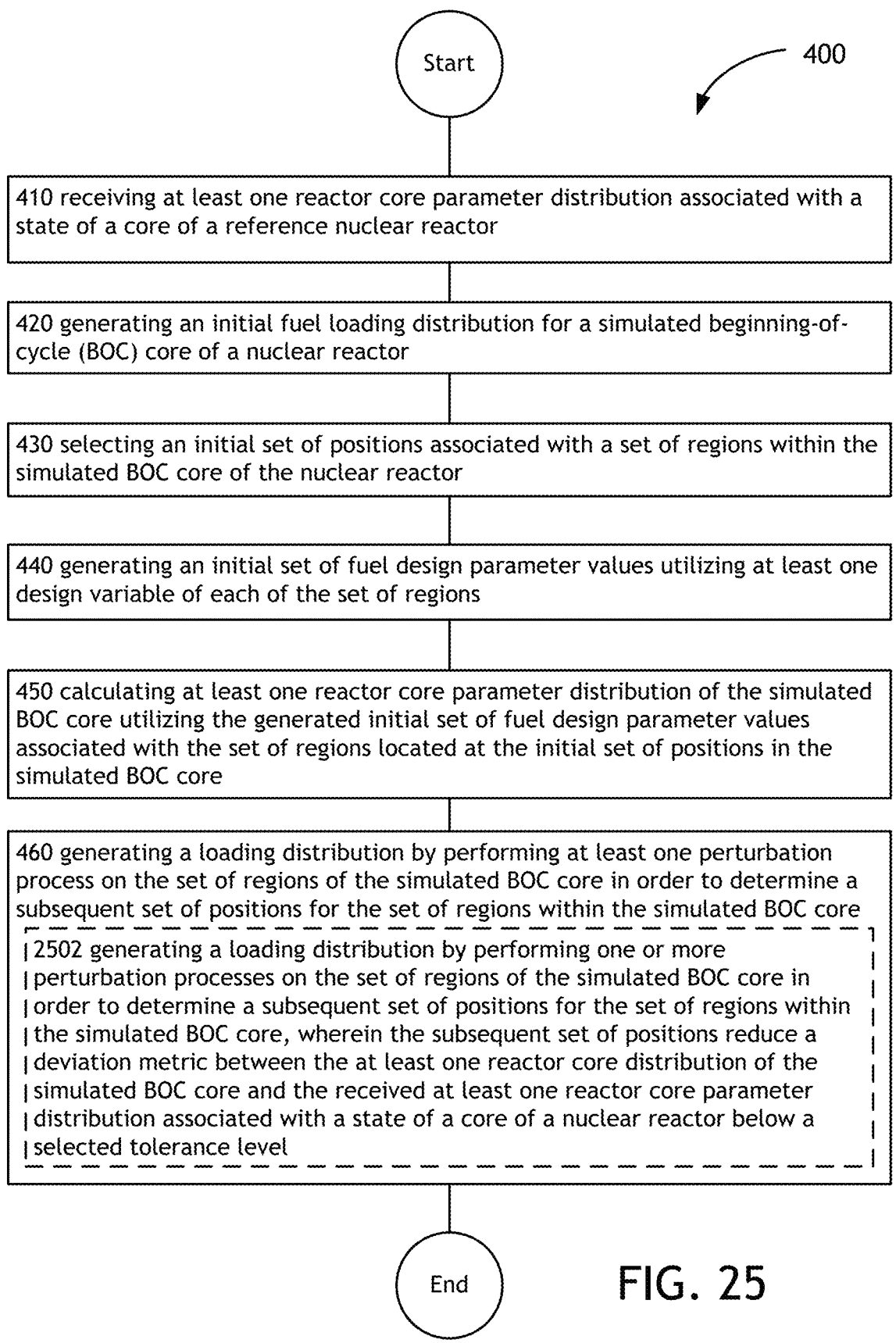

FIG. 25 illustrates alternative embodiments of the example operational flow 400 of FIG. 4A. FIG. 25 illustrates example embodiments where the generating operation 460 may include at least one additional operation. Additional operations may include an operation 2502.

The operation 2502 illustrates generating a loading distribution by performing at least one perturbation process on the set of regions of the simulated BOC core in order to determine a subsequent set of positions for the set of regions within the simulated BOC core, wherein the subsequent set of positions reduce a deviation metric between the at least one reactor core distribution of the simulated BOC core and the received at least one reactor core parameter distribution associated with a state of a core of a nuclear reactor below a selected tolerance level. For example, as shown in FIGS. 1A through 1P, the one or more processors 106 of the controller 102 may generate a loading distribution by performing at least one perturbation process on the set of regions 122 of the simulated BOC core 120 in order to determine a subsequent set of positions for the set of regions 122 within the simulated BOC core 120. Further, the subsequent set of positions may serve to reduce a deviation metric between the at least one reactor core distribution of the simulated BOC core and the received at least one reactor core parameter distribution associated with a state of a core of a nuclear reactor below a selected tolerance level. For instance, as shown in FIG. 10, the perturbation procedure 170 may iteratively vary the positions of the regions 122 within the simulated core 120 until a deviation metric (e.g., difference, spatially averaged difference, maximum difference, minimum difference, aggregated global deviation metric and the like) between the one or more calculated reactor core distributions of the simulated BOC core and the received one or more reactor core parameter distributions associated with a state of a core of a reference nuclear reactor is reduced below a selected tolerance level.

Figure 26:
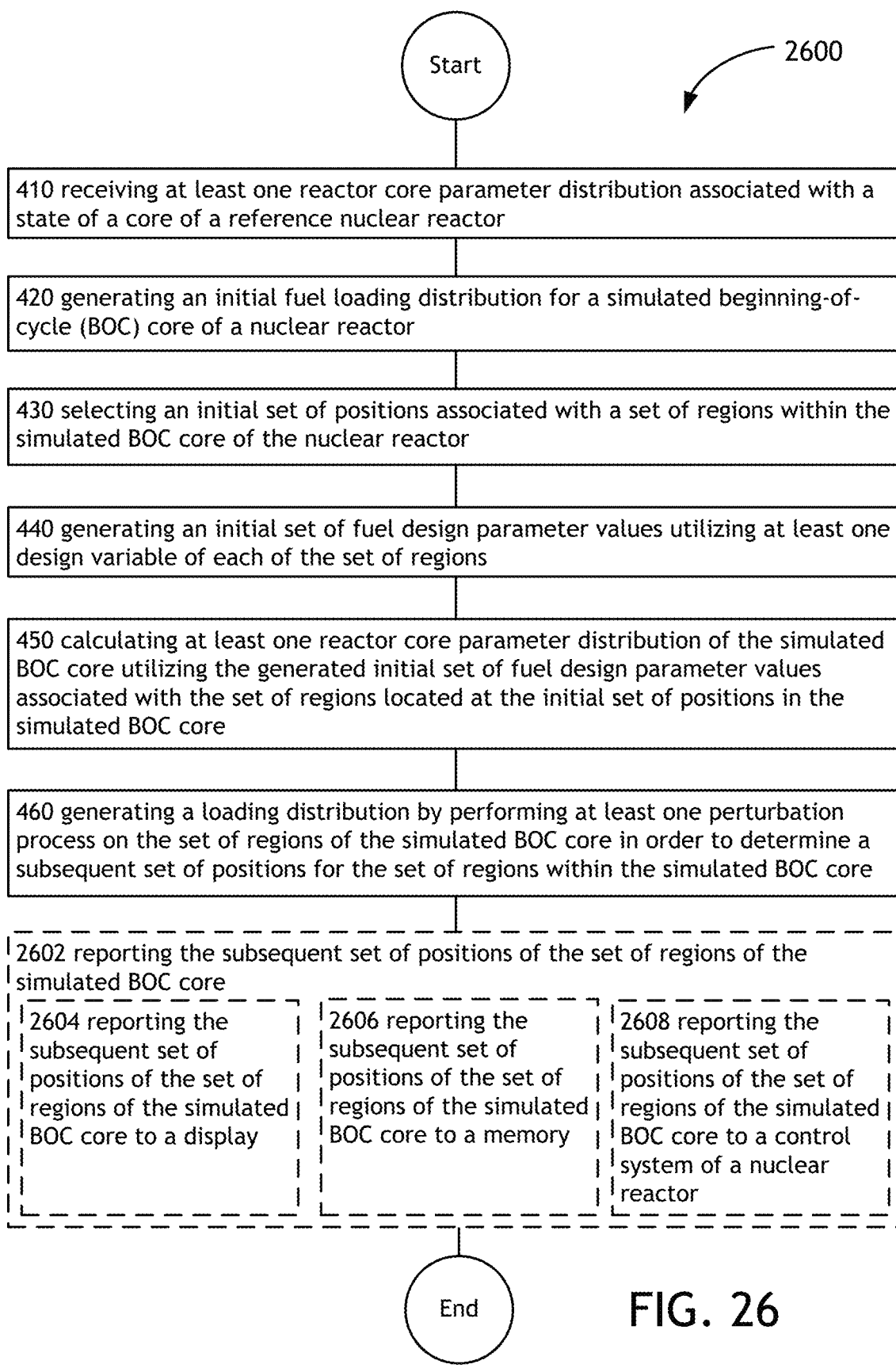

FIG. 26 illustrates an operational flow 2600 representing example operations related to generating a nuclear reactor core loading distribution. FIG. 26 illustrates an example embodiment where the example operational flow 400 of FIG. 4A may include at least one additional operation. Additional operations may include an operation 2602, 2604, 2606 and/or 2608.

The operation 2602 illustrates reporting the subsequent set of positions of the set of regions of the simulated BOC core. For example, as shown in FIGS. 1A through 1P, the one or more processors 106 of controller 102 may report the subsequent set of positions of the set of regions of the simulated BOC core to a destination. For instance, the one or more processors 106 of controller 102 may transmit one or more signals indicative of the subsequent set of positions of the set of regions 122 of the simulated BOC core 120 to a destination.

In another embodiment, operation 2604 illustrates reporting the subsequent set of positions of the set of regions of the simulated BOC core to a display. For example, as shown in FIGS. 1A through 1P, the one or more processors 106 of controller 102 may report the subsequent set of positions of the set of regions of the simulated BOC core to a display (e.g., display associated with controller 102, display of remote system, display of nuclear reactor control system and the like). For instance, the one or more processors 106 of controller 102 may transmit one or more signals indicative of the subsequent set of positions of the set of regions 122 of the simulated BOC core 120 to a display.

In another embodiment, operation 2606 illustrates reporting the subsequent set of positions of the set of regions of the simulated BOC core to a memory. For example, as shown in FIGS. 1A through 1P, the one or more processors 106 of controller 102 may report the subsequent set of positions of the set of regions of the simulated BOC core to a memory (e.g., memory of controller 102, memory of remote system, memory of nuclear reactor control system and the like). For instance, the one or more processors 106 of controller 102 may transmit one or more signals indicative of the subsequent set of positions of the set of regions 122 of the simulated BOC core 120 to a display.

In another embodiment, operation 2608 illustrates reporting the subsequent set of positions of the set of regions of the simulated BOC core to a control system of a nuclear reactor. For example, as shown in FIGS. 1A through 1P, the one or more processors 106 of controller 102 may report the subsequent set of positions of the set of regions of the simulated BOC core to a control system of a nuclear reactor (e.g., reactor 101 of FIG. 2A). For instance, the one or more processors 106 of controller 102 may transmit one or more signals indicative of the subsequent set of positions of the set of regions 122 of the simulated BOC core 120 to a control system of a nuclear reactor (e.g., reactor 101 of FIG. 2A).

Figure 27A:
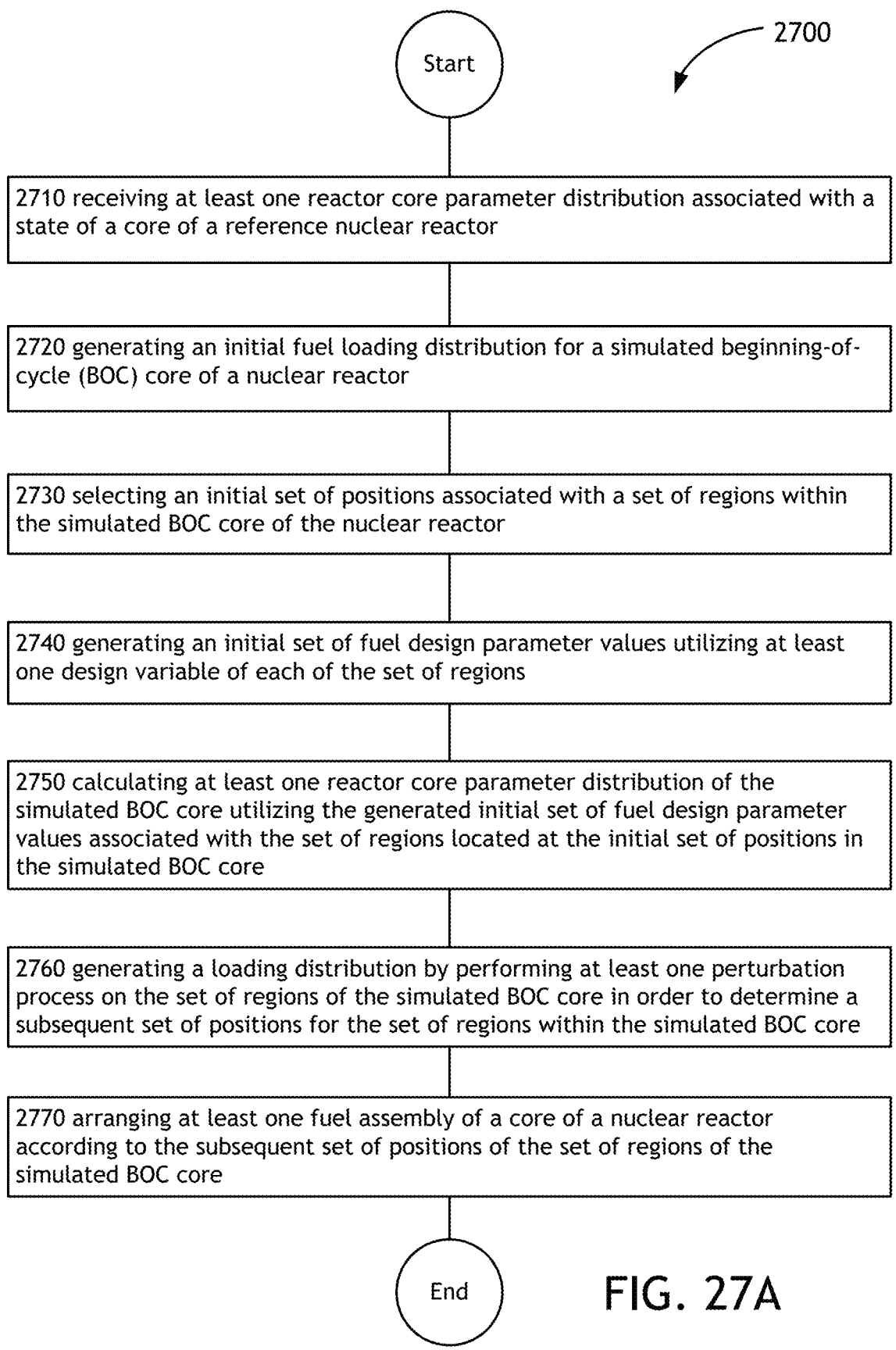
FIG. 27A is a high-level flowchart of a method for arranging one or more fuel assemblies in a nuclear reactor core.

FIG. 27A illustrates an operational flow 2700 representing example operations related to arranging one or more fuel assemblies of a nuclear reactor core according to a generated nuclear reactor core loading distribution. In FIG. 27A and in following figures that include various examples of operational flows, discussion and explanation may be provided with respect to the above-described examples of FIGS. 1A through 2D, and/or with respect to other examples and contexts. However, it should be understood that the operational flows may be executed in a number of other environments and contexts, and/or in modified versions of FIGS. 1A through 2D. Also, although the various operational flows are presented in the sequence(s) illustrated, it should be understood that the various operations may be performed in other orders than those which are illustrated, or may be performed concurrently.

After a start operation, the operational flow 2700 moves to a receiving operation 2710. The receiving operation 2710 depicts receiving at least one reactor core parameter distribution 103 associated with a state (e.g., equilibrium state) of a core of a nuclear reactor (e.g., reference nuclear reactor). For example, as shown in FIGS. 1A through 2D, one or more processors 106 of the controller 102 are communicatively coupled to a core parameter distribution source 104 and configured to receive one or more reactor core parameter distributions 103 of a core of a nuclear reactor in a given state (e.g., equilibrium state, a state approaching equilibrium, or a state of equilibrium onset) from the core parameter distribution source 104 (e.g., memory). Further, the one or more processors 106 of the controller 102 may receive a reactor core parameter distribution for a core of the nuclear reactor in a given state in the form of a database or map (e.g., two-dimensional or three-dimensional map) indicative of the reactor core parameter as a function of position within the core of the nuclear reactor.

Then, generating operation 2720 depicts generating an initial fuel loading distribution for a simulated BOC core of the nuclear reactor. For example, FIGS. 1A through 2D, one or more processors 106 of the controller 102 may generate an initial fuel loading distribution for a simulated BOC core of the nuclear reactor.

Then, selecting operation 2730 depicts selecting an initial set of positions associated with a set of regions within the simulated BOC core of the nuclear reactor. For example, FIGS. 1A through 2D, the one or more processors 106 of the controller 102 may select an initial set of positions associated with a set of regions within the simulated BOC core of the nuclear reactor.

Then, generating operation 2740 depicts generating an initial set of fuel design parameter values utilizing at least one design variable of each of the set of regions. For example, as shown in FIGS. 1A through 2D, the one or more processors 106 of the controller 102 may generate an initial set of fuel design parameter values utilizing at least one design variable of each of the set of regions.

Then, calculating operation 2750 depicts calculating at least one reactor core parameter distribution of the simulated BOC core utilizing the generated initial set of fuel design parameter values associated with the set of regions located at the initial set of positions of the simulated BOC core. For example, FIGS. 1A through 2D, the one or more processors 106 of the controller 102 may calculate one or more reactor core parameter distributions of the simulated BOC core utilizing the generated initial set of fuel design parameter values associated with the set of regions located at the initial set of positions of the simulated BOC core.

Then, loading distribution generating step 2760 depicts generating a loading distribution by performing at least one perturbation process on the set of regions of the simulated BOC core in order to determine a subsequent set of positions for the set of regions within the simulated BOC core. For example, the one or more processors 106 of the controller 102 may generate a loading distribution by performing one or more perturbation processes on the set of regions of the simulated BOC core in order to determine a subsequent set of positions for the set of regions within the simulated BOC core.

Then, arranging operation 2770 depicts arranging at least one fuel assembly of a core of a nuclear reactor according to the subsequent set of positions of the set of regions of the simulated BOC core. For example, as shown in FIGS. 1A through 2D, the one or more processors 106 of the controller 102 may direct the fuel handler 204 to arrange one or more fuel assemblies of the core 202 of the nuclear reactor 101 according to the subsequent set of positions of the set of regions of the simulated BOC core in the loading distribution generated by the one or more processors 106. For instance, the one or more processors 106 may transmit a signal representative of the subsequent set of positions of the set of regions 122 of the generated loading distribution to a fuel handler controller 206. In turn, the controller 206 may direct the fuel handler 204 to arrange (e.g., replace, reposition, and the like) one or more fuel assemblies of the core 202 of the nuclear reactor 101 according to the subsequent set of positions of the set of regions 122 of the simulated BOC core 120 in the loading distribution generated by the one or more processors 106.

Figure 27B:
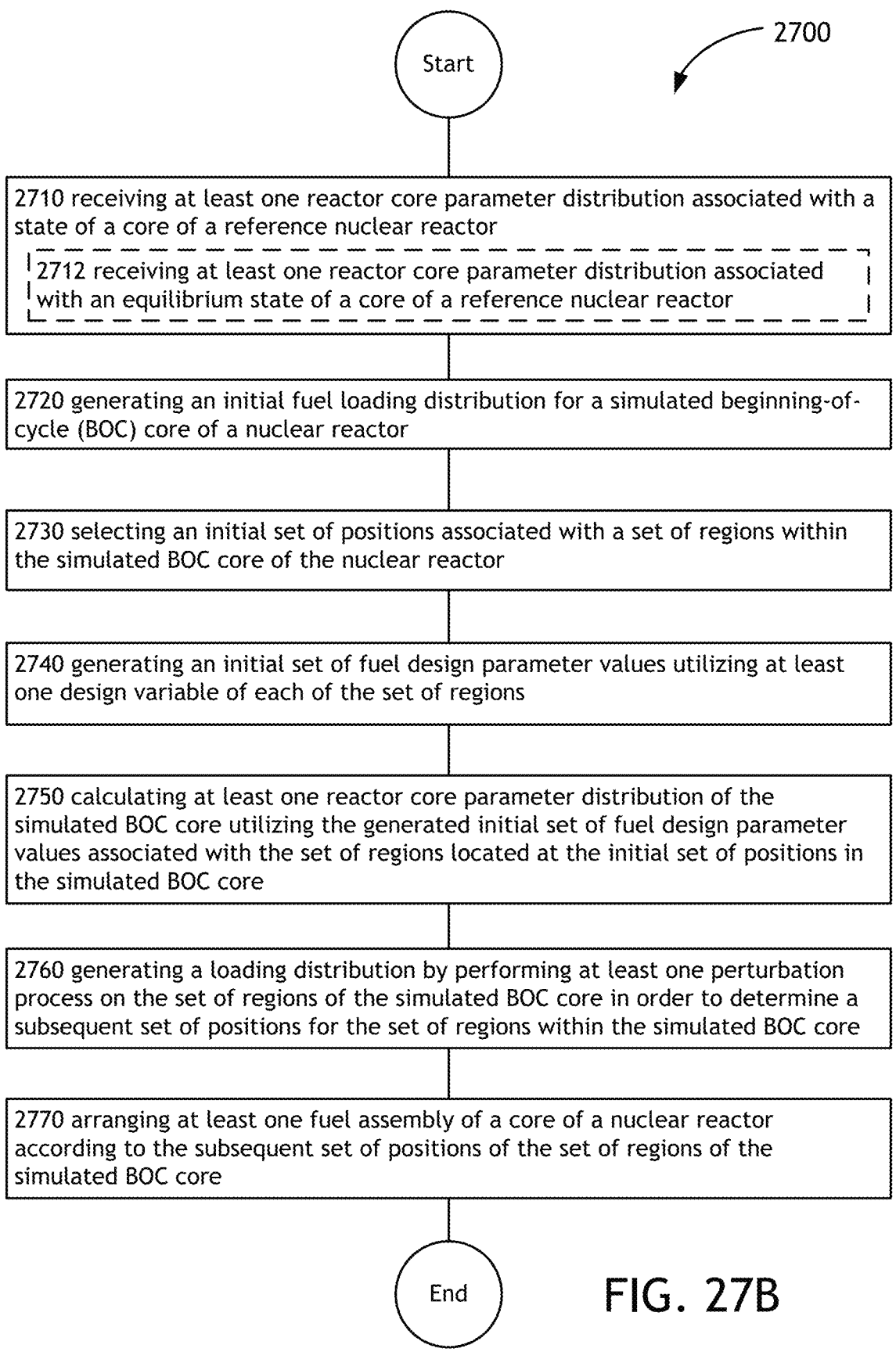

FIG. 27B illustrates alternative embodiments of the example operational flow 2700 of FIG. 27A. FIG. 27B illustrates example embodiments where the receiving operation 2710 may include at least one additional operation. Additional operations may include operation 2712.

The operation 2712 illustrates receiving at least one reactor core parameter distribution associated with an equilibrium state of a core of a nuclear reactor. For example, as shown in FIGS. 1A through 2D, one or more processors 106 of controller 102 may receive one or more reactor core parameter distributions 103 for a core of a nuclear reactor in an equilibrium state from a core parameter distribution source 104. By way of another example, as shown in FIGS. 1A through 2D, one or more processors 106 of controller 102 may receive one or more reactor core parameter distributions 103 for a core of a nuclear reactor in a state approaching equilibrium from a core parameter distribution source 104. By way of another example, as shown in FIGS. 1A through 2D, one or more processors 106 of controller 102 may receive one or more reactor core parameter distributions 103 for a core of a nuclear reactor at an onset of an equilibrium state from a core parameter distribution source 104.

Figure 28:
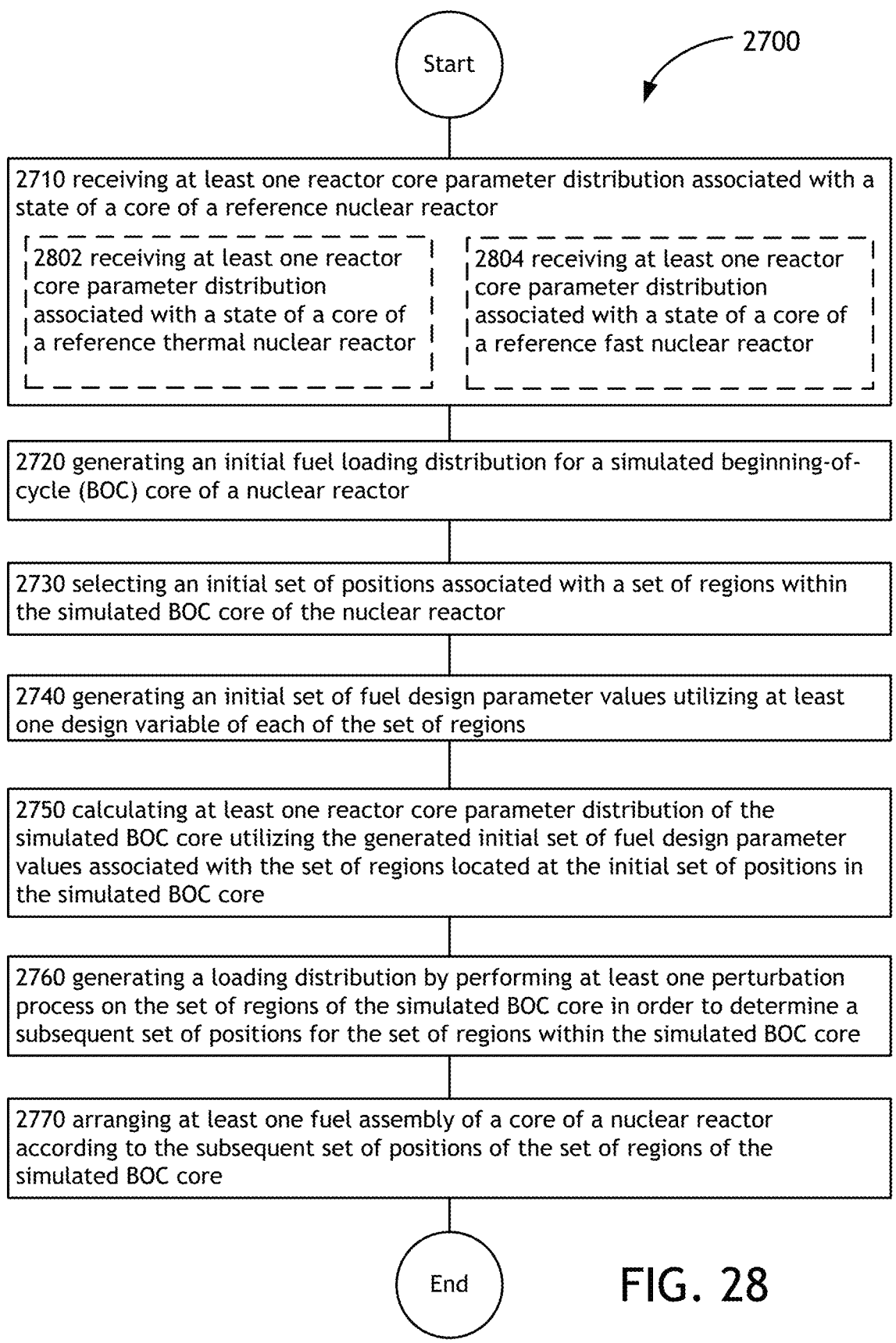

FIG. 28 illustrates alternative embodiments of the example operational flow 2700 of FIG. 27A. FIG. 28 illustrates example embodiments where the receiving operation 2710 may include at least one additional operation. Additional operations may include operations 2802 and/or 2804.

The operation 2802 illustrates receiving at least one reactor core parameter distribution associated with a state of a core of a thermal nuclear reactor. For example, as shown in FIGS. 1A through 2D, one or more processors 106 of controller 102 may receive one or more reactor core parameter distributions 103 for a core of a thermal nuclear reactor from a core parameter distribution source 104. In this regard, the core parameter distribution source 104 may store a reactor core parameter distribution for a core of a reference thermal nuclear reactor. Then, the one or more processors 106 of controller 102 may retrieve the reactor core parameter distribution 103 for a core of the reference thermal nuclear reactor stored in the core parameter distribution source 104.

In another embodiment, the operation 2804 illustrates receiving at least one reactor core parameter distribution associated with a state of a core of a fast nuclear reactor. For example, as shown in FIGS. 1A through 2D, one or more processors 106 of controller 102 may receive one or more reactor core parameter distributions 103 for a core of a fast nuclear reactor from a core parameter distribution source 104. In this regard, the core parameter distribution source 104 may store a reactor core parameter distribution for a core of a reference fast nuclear reactor. Then, the one or more processors 106 of controller 102 may retrieve the reactor core parameter distribution 103 for a core of the reference fast nuclear reactor stored in the core parameter distribution source 104.

Figure 29:
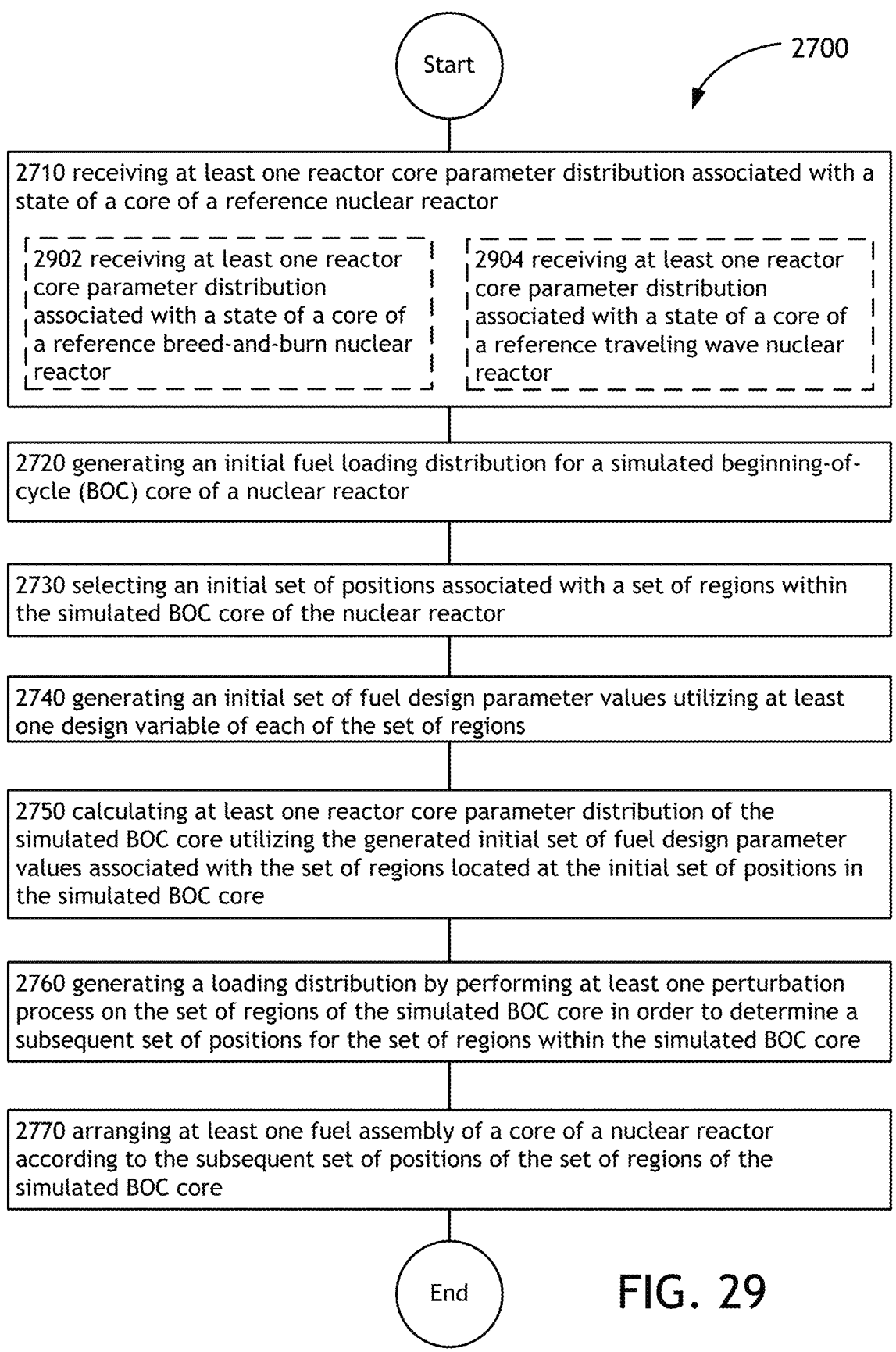

FIG. 29 illustrates alternative embodiments of the example operational flow 2700 of FIG. 27A. FIG. 29 illustrates example embodiments where the receiving operation 2710 may include at least one additional operation. Additional operations may include an operation 2902, and/or operation 2904.

In one embodiment, operation 2902 illustrates receiving at least one reactor core parameter distribution associated with a state of a core of a breed-and-burn nuclear reactor. For example, as shown in FIGS. 1A through 2D, one or more processors 106 of controller 102 may receive one or more reactor core parameter distributions 103 for a core of a breed-and-burn nuclear reactor from a core parameter distribution source 104. In this regard, the core parameter distribution source 104 may store a reactor core parameter distribution for a core of a reference breed-and-burn nuclear reactor. Then, the one or more processors 106 of controller 102 may retrieve the reactor core parameter distribution 103 for a core of the reference breed-and-burn nuclear reactor stored in the core parameter distribution source 104.

In another embodiment, operation 2904 illustrates receiving at least one reactor core parameter distribution associated with a state of a core of a traveling wave reactor. For example, as shown in FIGS. 1A through 2D, one or more processors 106 of controller 102 may receive one or more reactor core parameter distributions 103 for a core of a traveling wave nuclear reactor from a core parameter distribution source 104. In this regard, the core parameter distribution source 104 may store a reactor core parameter distribution for a core of a reference traveling nuclear reactor. Then, the one or more processors 106 of controller 102 may retrieve the reactor core parameter distribution 103 for a core of the reference traveling wave nuclear reactor stored in the core parameter distribution source 104.

Figure 30:
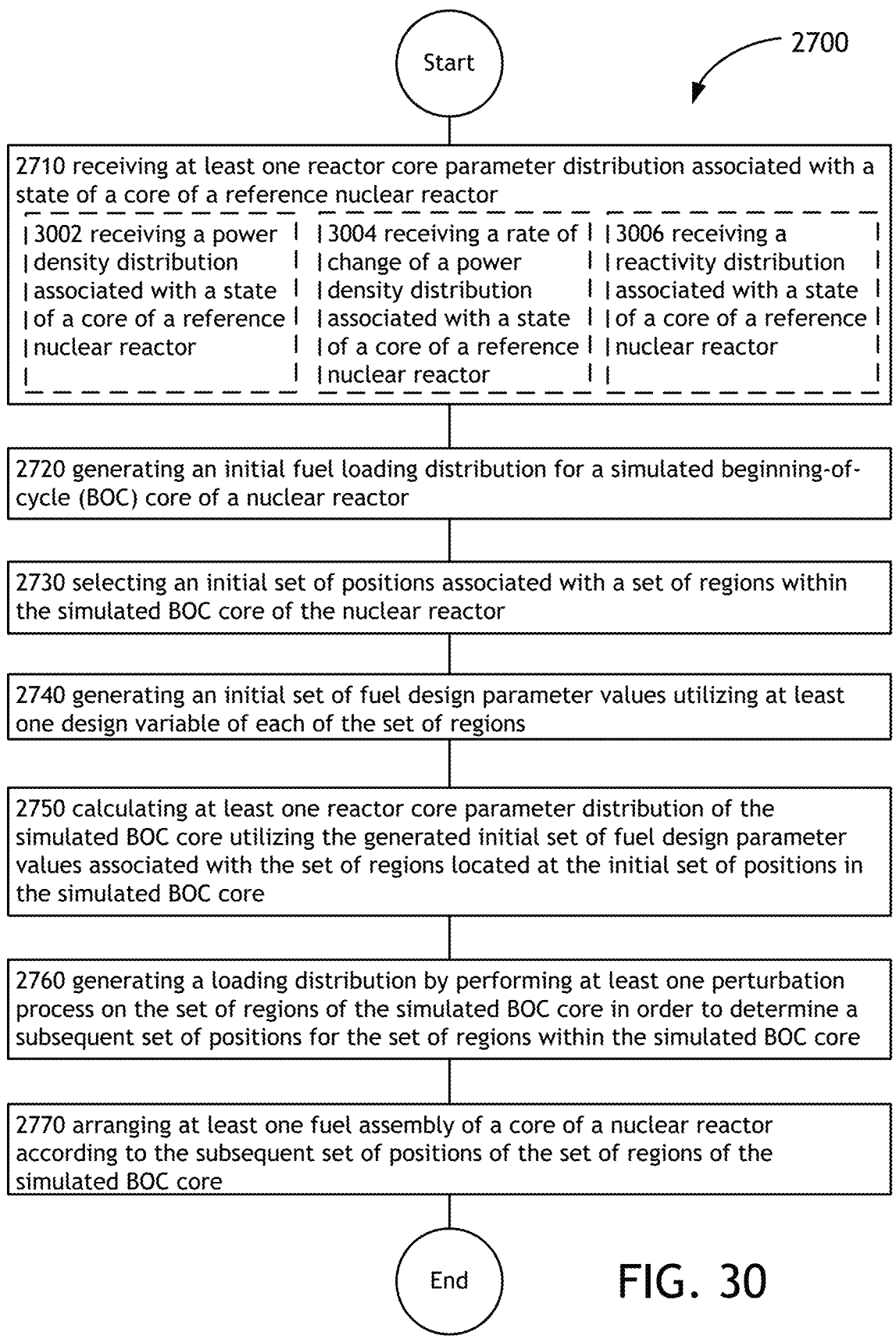

FIG. 30 illustrates alternative embodiments of the example operational flow 2700 of FIG. 27A. FIG. 30 illustrates example embodiments where the receiving operation 2710 may include at least one additional operation. Additional operations may include an operation 3002, 3004 and/or operation 3006.

The operation 3002 illustrates receiving a power density distribution associated with a state of a core of a nuclear reactor. For example, as shown in FIGS. 1A through 2D, one or more processors 106 of controller 102 may receive one or more power density distributions for a given state of a core of a nuclear reactor from a core parameter distribution source 104. In this regard, the core parameter distribution source 104 may store a power density distribution for a given state of a core of a nuclear reactor. Then, the one or more processors 106 of controller 102 may retrieve the power density distribution for a given state of a core of a nuclear reactor stored in the core parameter distribution source 104. Further, the one or more processors 106 of the controller 102 may receive a power density distribution for a core of the nuclear reactor in the form of a database or map (e.g., two-dimensional or three-dimensional map) indicative of the power generation density as a function of position within the core of the nuclear reactor.

In another embodiment, operation 3004 illustrates receiving a rate of change of a power density distribution associated with a state of a core of a nuclear reactor. For example, as shown in FIGS. 1A through 2D, one or more processors 106 of controller 102 may receive one or more power density rate-of-change distributions for a given state of a core of a nuclear reactor from a core parameter distribution source 104. In this regard, the core parameter distribution source 104 may store a power density rate-of-change distribution for a given state of core of a nuclear reactor. Then, the one or more processors 106 of controller 102 may retrieve the power density rate-of-change distribution for a given state of a core of a nuclear reactor stored in the core parameter distribution source 104. Further, the one or more processors 106 of the controller 102 may receive a power density rate-of-change distribution for a core of the nuclear reactor in the form of a database or map (e.g., two-dimensional or three-dimensional map) indicative of the rate of change of power generation density as a function of position within the core of the nuclear reactor.

In another embodiment, operation 3006 illustrates receiving a reactivity distribution associated with a state of a core of a nuclear reactor. For example, as shown in FIGS. 1A through 2D, one or more processors 106 of controller 102 may receive one or more reactivity distributions for a given state of a core of a nuclear reactor from a core parameter distribution source 104. In this regard, the core parameter distribution source 104 may store a reactivity distribution for a given state of a core of a nuclear reactor. Then, the one or more processors 106 of controller 102 may retrieve the reactivity distribution for a given state of a core of a nuclear reactor stored in the core parameter distribution source 104. Further, the one or more processors 106 of the controller 102 may receive a reactivity distribution for a core of the nuclear reactor in the form of a database or map (e.g., two-dimensional or three-dimensional map) indicative of reactivity as a function of position within the core of the nuclear reactor.

Figure 31:
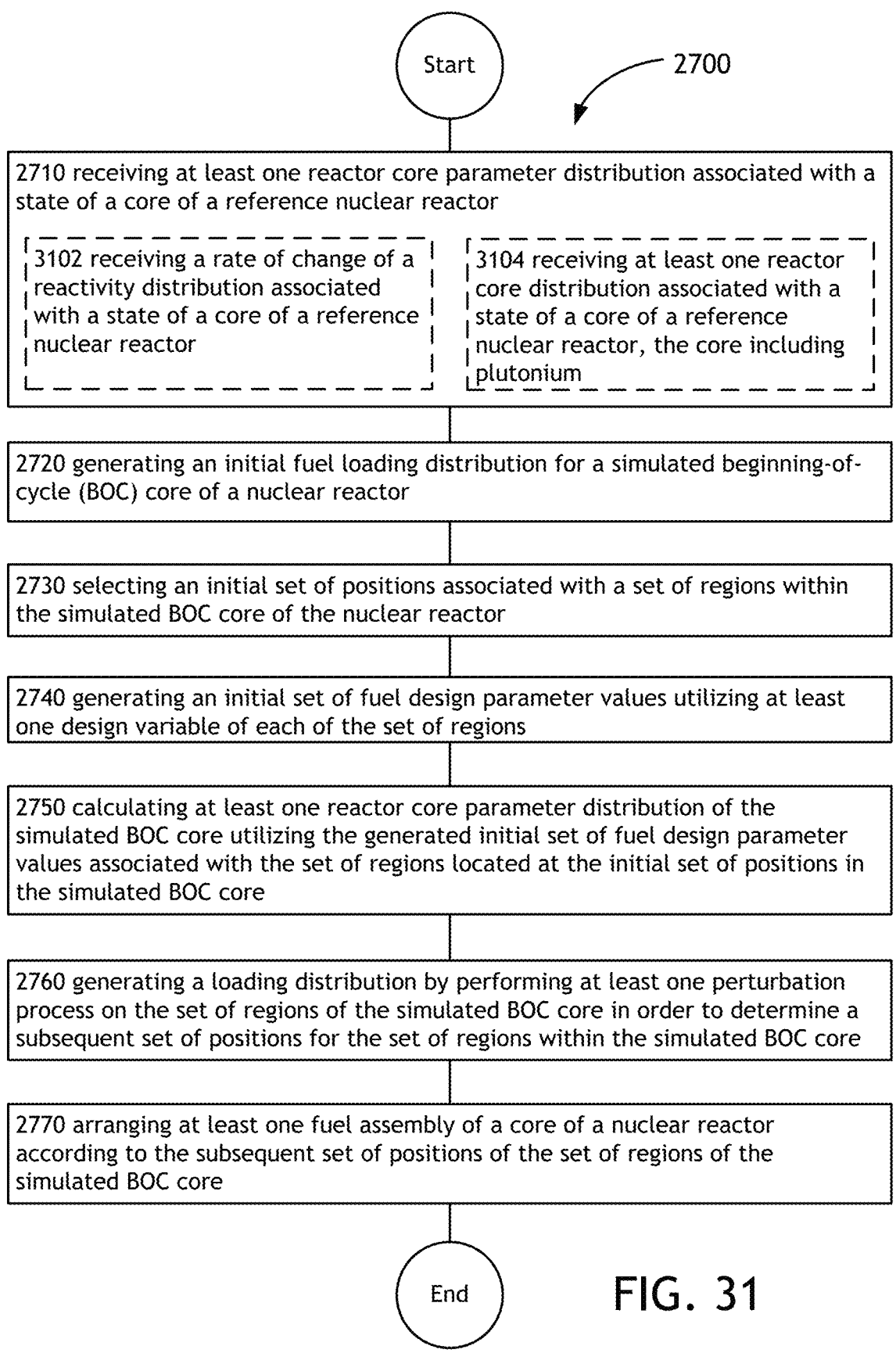

FIG. 31 illustrates alternative embodiments of the example operational flow 2700 of FIG. 27A. FIG. 31 illustrates example embodiments where the receiving operation 2710 may include at least one additional operation. Additional operations may include an operation 3102, and/or operation 3104.

The operation 3102 illustrates receiving a rate of change of a reactivity distribution associated with a state of a core of a nuclear reactor. For example, as shown in FIGS. 1A through 2D, one or more processors 106 of controller 102 may receive one or more reactivity rate-of-change distributions for a given state of a core of a nuclear reactor from a core parameter distribution source 104. In this regard, the core parameter distribution source 104 may store a reactivity rate-of-change distribution for a given state of a core of a nuclear reactor. Then, the one or more processors 106 of controller 102 may retrieve the reactivity rate-of-change distribution for a given state of a core of a nuclear reactor stored in the core parameter distribution source 104. Further, the one or more processors 106 of the controller 102 may receive a reactivity rate-of-change distribution for a core of the nuclear reactor in the form of a database or map (e.g., two-dimensional or three-dimensional map) indicative of the rate of change of reactivity as a function of position within the core of the nuclear reactor.

In another embodiment, the operation 3104 illustrates receiving at least one reactor core parameter distribution associated with a state of a core of a nuclear reactor, the core including plutonium. For example, as shown in FIGS. 1A through 2D, one or more processors 106 of controller 102 may receive one or more reactor core parameter distributions for a given state of a nuclear reactor core including plutonium from a core parameter distribution source 104. In this regard, the core parameter distribution source 104 may store a reactor core parameter distribution for a given state of a nuclear reactor core including plutonium. Then, the one or more processors 106 of controller 102 may retrieve the reactor core parameter distribution for a given state of a nuclear reactor core including plutonium stored in the core parameter distribution source 104.

Figure 32:
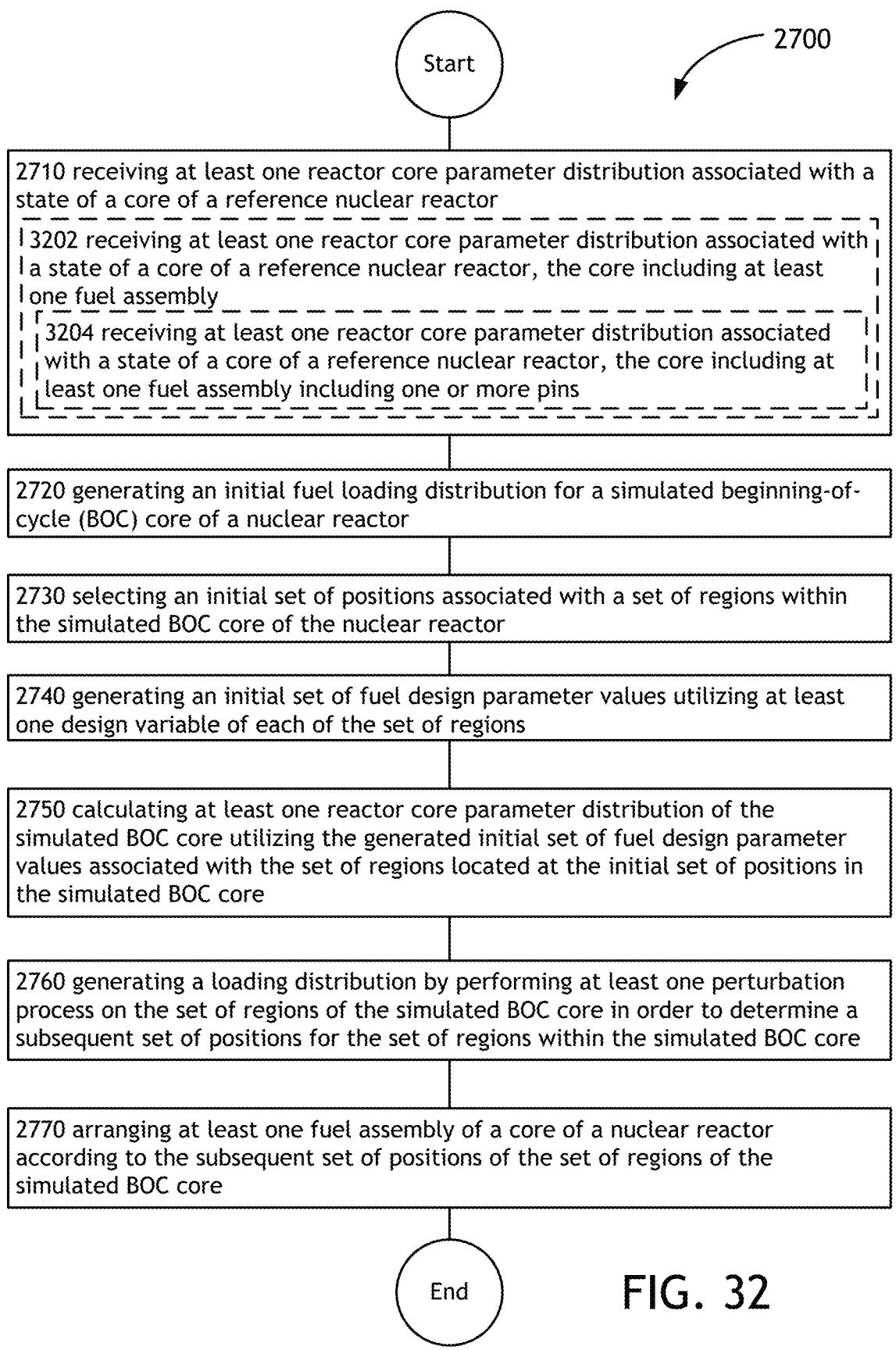

FIG. 32 illustrates alternative embodiments of the example operational flow 2700 of FIG. 27A. FIG. 32 illustrates example embodiments where the receiving operation 2710 may include at least one additional operation. Additional operations may include an operation 3202 and/or operation 3204.

The operation 3202 illustrates receiving at least one reactor core parameter distribution associated with a state of a core of a nuclear reactor, the core including at least one fuel assembly. For example, as shown in FIGS. 1A through 2D, one or more processors 106 of controller 102 may receive one or more reactor core parameter distributions 103 for a core of a nuclear reactor including one or more fuel assemblies from a core parameter distribution source 104. In this regard, the core parameter distribution source 104 may store a reactor core parameter distribution for a core of a nuclear reactor with one or more fuel assemblies. Then, the one or more processors 106 of controller 102 may retrieve the reactor core parameter distribution 103 for a core of a nuclear reactor with one or more fuel assemblies stored in the core parameter distribution source 104.

Further, operation 3204 illustrates receiving at least one reactor core parameter distribution associated with a state of a core of a nuclear reactor, the core including at least one fuel assembly including at least one pin. For example, as shown in FIGS. 1A through 2D, one or more processors 106 of controller 102 may receive one or more reactor core parameter distributions 103 for a core of a nuclear reactor including one or more fuel assemblies with one or more fuel pins from a core parameter distribution source 104. In this regard, the core parameter distribution source 104 may store a reactor core parameter distribution for a core of a nuclear reactor with one or more fuel assemblies having one or more fuel pins. Then, the one or more processors 106 of controller 102 may retrieve the reactor core parameter distribution 103 for a core of a nuclear reactor with one or more fuel assemblies having one or more fuel pins stored in the core parameter distribution source 104.

Figure 33:
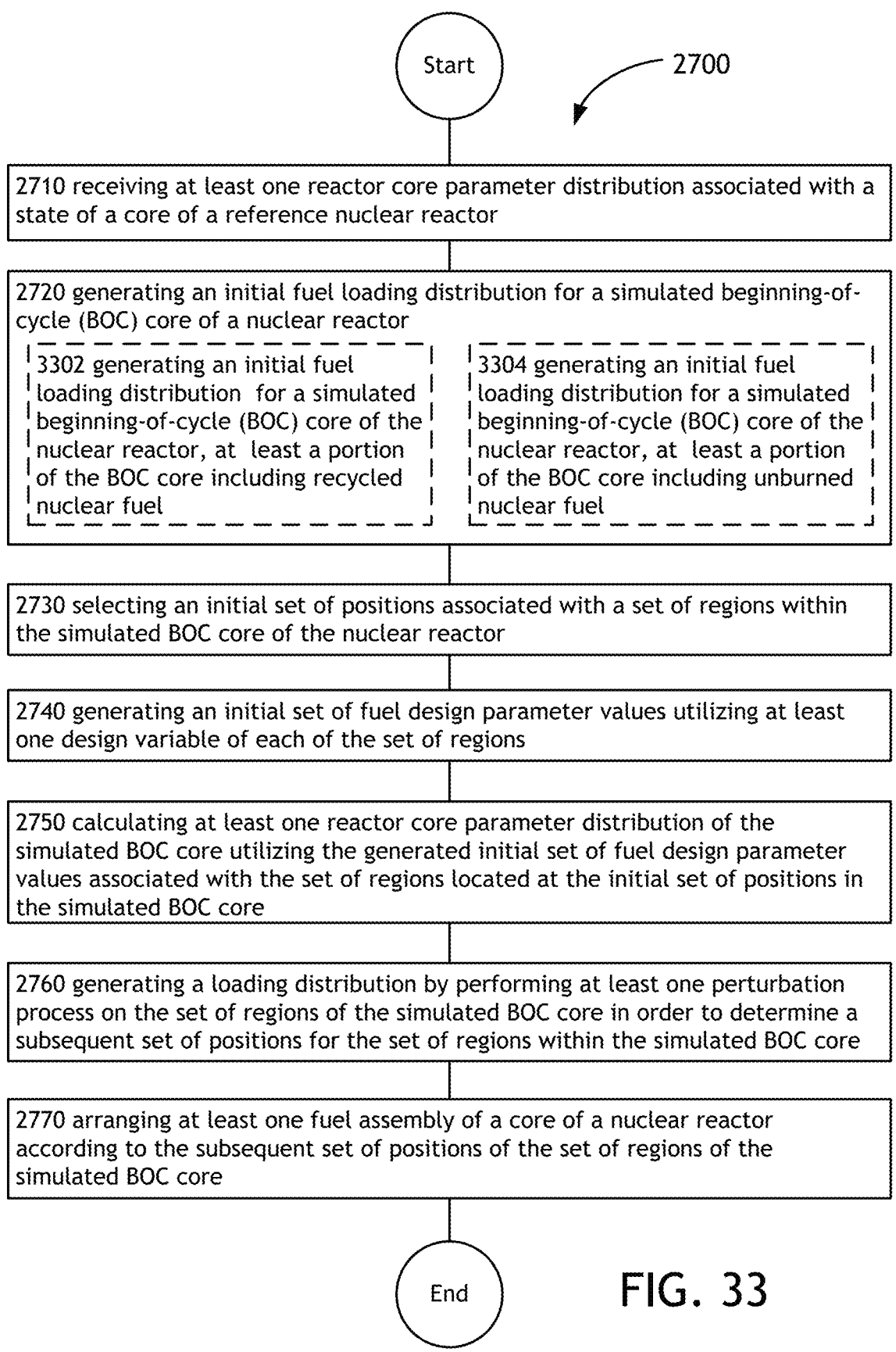

FIG. 33 illustrates alternative embodiments of the example operational flow 2700 of FIG. 27A. FIG. 33 illustrates example embodiments where the reference generating operation 2720 may include at least one additional operation. Additional operations may include an operation 3302 and/or operation 3304.

The operation 3302 illustrates generating an initial fuel loading distribution for a simulated BOC core of the nuclear reactor, at least a portion of the BOC core including recycled nuclear fuel. For example, as shown in FIGS. 1A through 2D, the one or more processors 106 of the controller 102 may generate an initial fuel loading distribution for a simulated BOC core of the nuclear reactor including recycled nuclear fuel. For instance, the one or more processors 106 of the controller 102 may provide the spatial distribution of nuclear fuel (including fissile and non-fissile material) throughout a simulated BOC core (e.g., throughout the fuel assemblies of a simulated BOC core) including at least some recycled nuclear fuel (e.g., recycled uranium).

In another embodiment, operation 3304 illustrates generating an initial fuel loading distribution for a simulated BOC core of the nuclear reactor, at least a portion of the BOC core including unburned nuclear fuel. For example, as shown in FIGS. 1A through 2D, the one or more processors 106 of the controller 102 may generate an initial fuel loading distribution for a simulated BOC core of the nuclear reactor including unburned nuclear fuel. For instance, the one or more processors 106 of the controller 102 may provide the spatial distribution of nuclear fuel throughout a simulated BOC core including at least some unburned nuclear fuel (e.g., unburned uranium).

Figure 34:
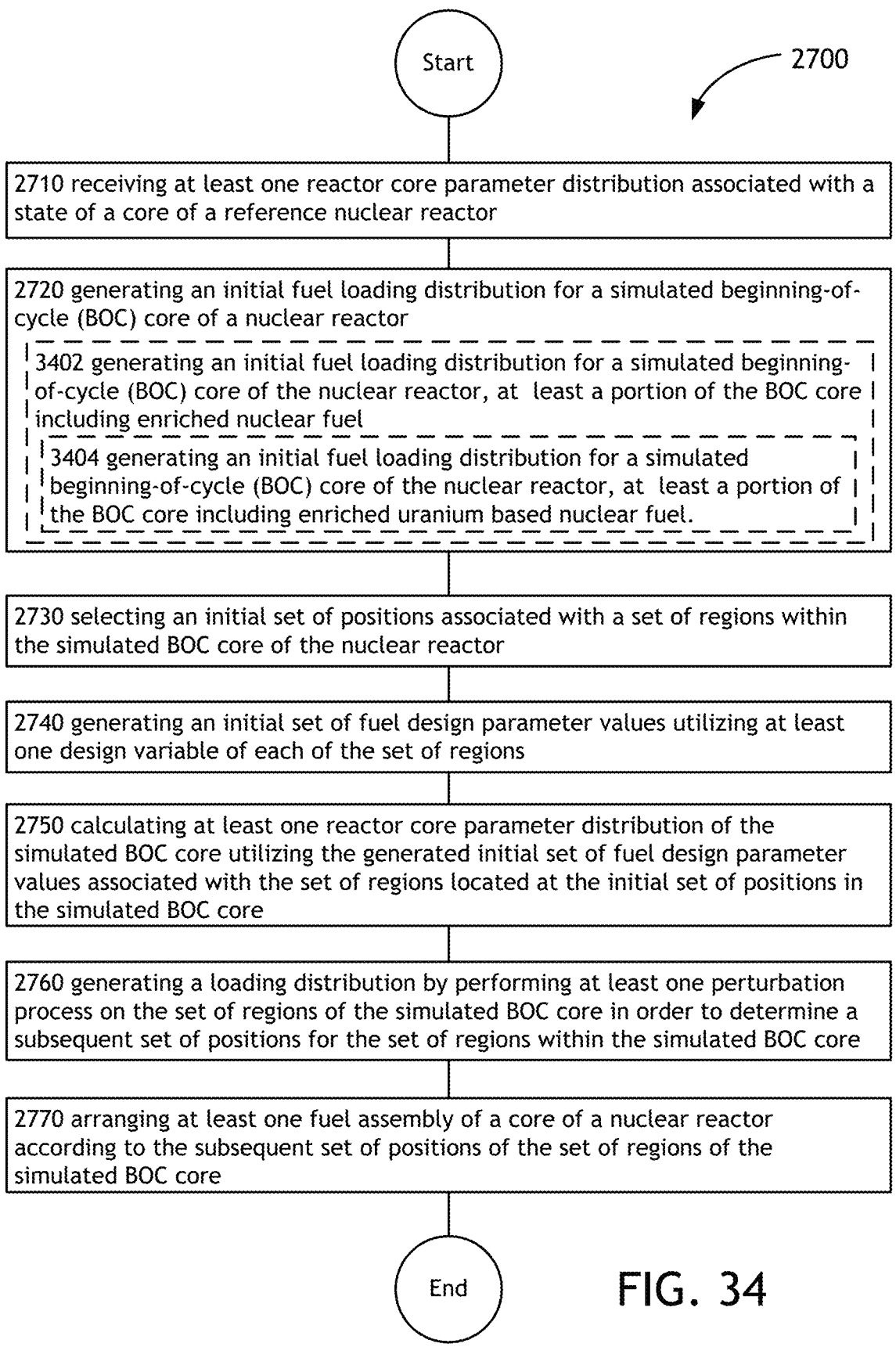

FIG. 34 illustrates alternative embodiments of the example operational flow 2700 of FIG. 27A. FIG. 34 illustrates example embodiments where the generating operation 2720 may include at least one additional operation. Additional operations may include an operation 3402 and/or operation 3404.

The operation 3402 illustrates generating an initial fuel loading distribution for a simulated BOC core of the nuclear reactor, at least a portion of the BOC core including enriched nuclear fuel. For example, as shown in FIGS. 1A through 2D, the one or more processors 106 of the controller 102 may generate an initial fuel loading distribution for a simulated BOC core of the nuclear reactor including enriched nuclear fuel. For instance, the one or more processors 106 of the controller 102 may provide the spatial distribution of nuclear fuel throughout a simulated BOC core including at least some enriched nuclear fuel.

In another embodiment, operation 3404 illustrates generating an initial fuel loading distribution for a simulated BOC core of the nuclear reactor, at least a portion of the BOC core including enriched uranium based nuclear fuel. For example, as shown in FIGS. 1A through 2D, the one or more processors 106 of the controller 102 may generate an initial fuel loading distribution for a simulated BOC core of the nuclear reactor including enriched uranium. For instance, the one or more processors 106 of the controller 102 may provide the spatial distribution of nuclear fuel throughout a simulated BOC core including at least some enriched uranium.

Figure 35:
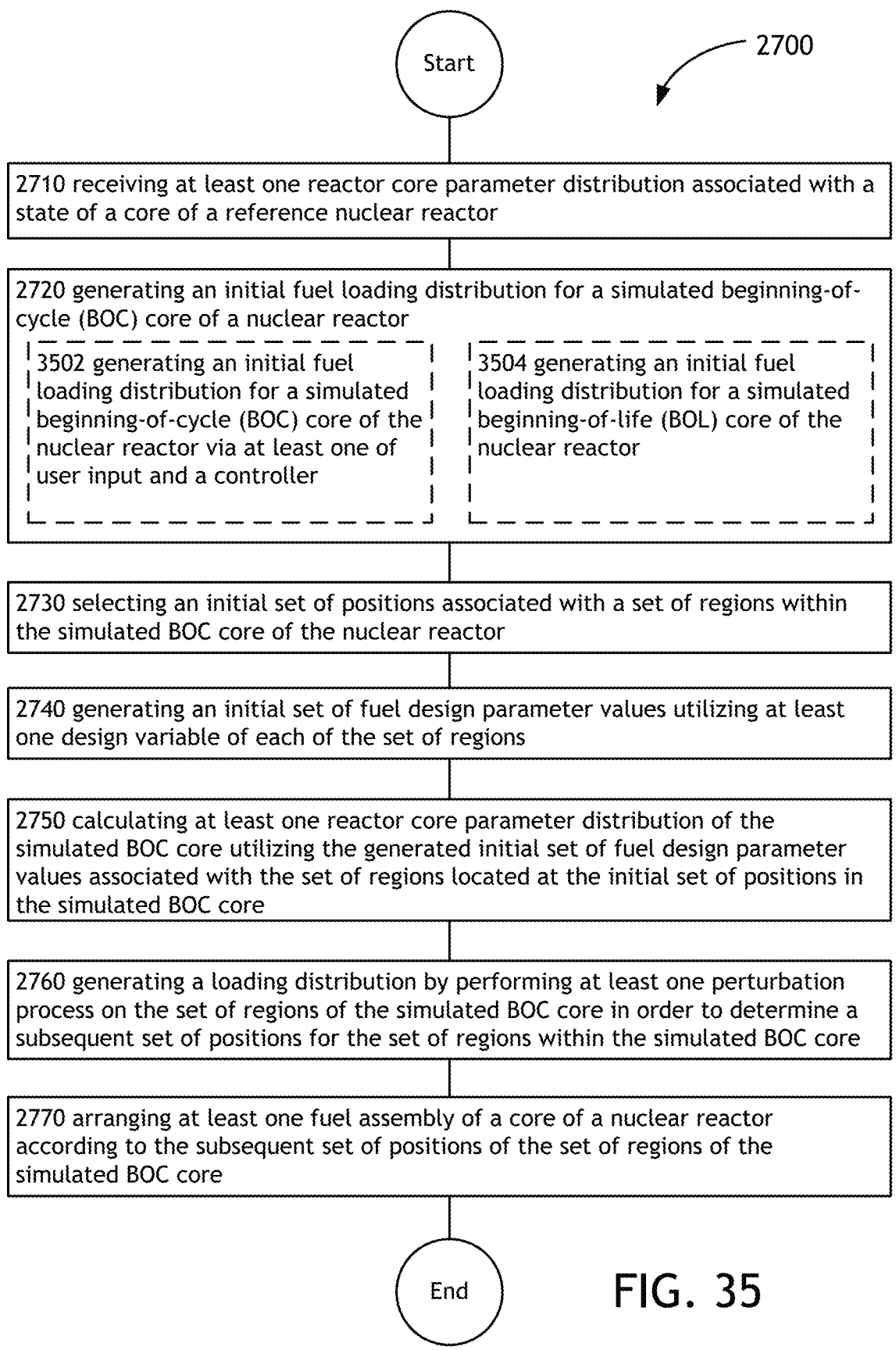

FIG. 35 illustrates alternative embodiments of the example operational flow 2700 of FIG. 27A. FIG. 35 illustrates example embodiments where the reference generating operation 2720 may include at least one additional operation. Additional operations may include an operation 3502 and/or operation 3504.

The operation 3502 illustrates generating an initial fuel loading distribution for a simulated BOC core of the nuclear reactor via at least one of user input and a controller. For example, as shown in FIGS. 1A through 2D, the one or more processors 106 of the controller 102 may generate an initial fuel loading distribution for a simulated BOC core of the nuclear reactor using user input and/or the controller 102. For instance, the one or more processors 106 of the controller 102 may provide the spatial distribution of nuclear fuel (including fissile and non-fissile material) throughout a simulated BOC core utilizing a preprogrammed predictive algorithm executed by the one or more processors 106 of the controller 102. In this regard, the predictive algorithm may select the preferred initial fuel loading distribution based on a variety parameters, such as, but not limited to, historical data correlating initial fuel loading distribution starting points and quality of final fuel loading distribution, user selected initial fuel loading distribution preferences and the like.

In another instance, the one or more processors 106 of the controller 102 may provide the spatial distribution of nuclear fuel throughout a simulated BOC core utilizing user inputted data in conjunction with the controller 102. In this regard, the user may select an initial fuel loading distribution based on a number of options presented to the user via user display 116. For example, the controller 102 may present the user (e.g., present on display 116) with a plurality of initial fuel loading distributions based on an output of a preprogrammed predictive algorithm. Based on this presentation of loading distributions on display 116, the user may select the preferred initial loading distribution using a user input device 118.

In yet another instance, the one or more processors 106 of the controller 102 may provide the spatial distribution of nuclear fuel throughout a simulated BOC core based primarily on user inputted data. In this regard, the user may select or input an initial fuel loading distribution into the controller 102. For example, a user may select the initial fuel loading distribution by choosing the specific material or materials (fissile or non-fissile) for each fuel assembly or each pin of each fuel assembly across the simulated BOC core. Further, the user may make this initial fuel selection utilizing a graphical user interface 114 (e.g., display/mouse, touchscreen, display/keyboard and the like), allowing the user to select from a list of possible nuclear fuel materials (e.g., fissile or non-fissile materials) at each of the simulated fuel assemblies or pins of each of the simulated fuel assemblies throughout the simulated BOC core. In this manner, the user, in a discretized manner, may build up the initial nuclear fuel loading distribution across the simulated BOC core (e.g., built up with fuel assembly-level resolution or built up with fuel pin-level resolution). The selected initial loading distribution may then be read into the memory 108 of the controller 102 and used by the one or more processors 106 in subsequent steps of the present invention.

In another embodiment, operation 3504 illustrates generating an initial fuel loading distribution for a simulated beginning-of-life (BOL) core of the nuclear reactor. For example, as shown in FIGS. 1A through 2D, the one or more processors 106 of the controller 102 may generate an initial fuel loading distribution for a simulated beginning-of-life (BOL) core of the nuclear reactor. For instance, the one or more processors 106 of the controller 102 may provide the spatial distribution of nuclear fuel throughout a simulated BOL core (e.g., throughout the fuel assemblies of a simulated BOL core) of the nuclear reactor.

Figure 36:
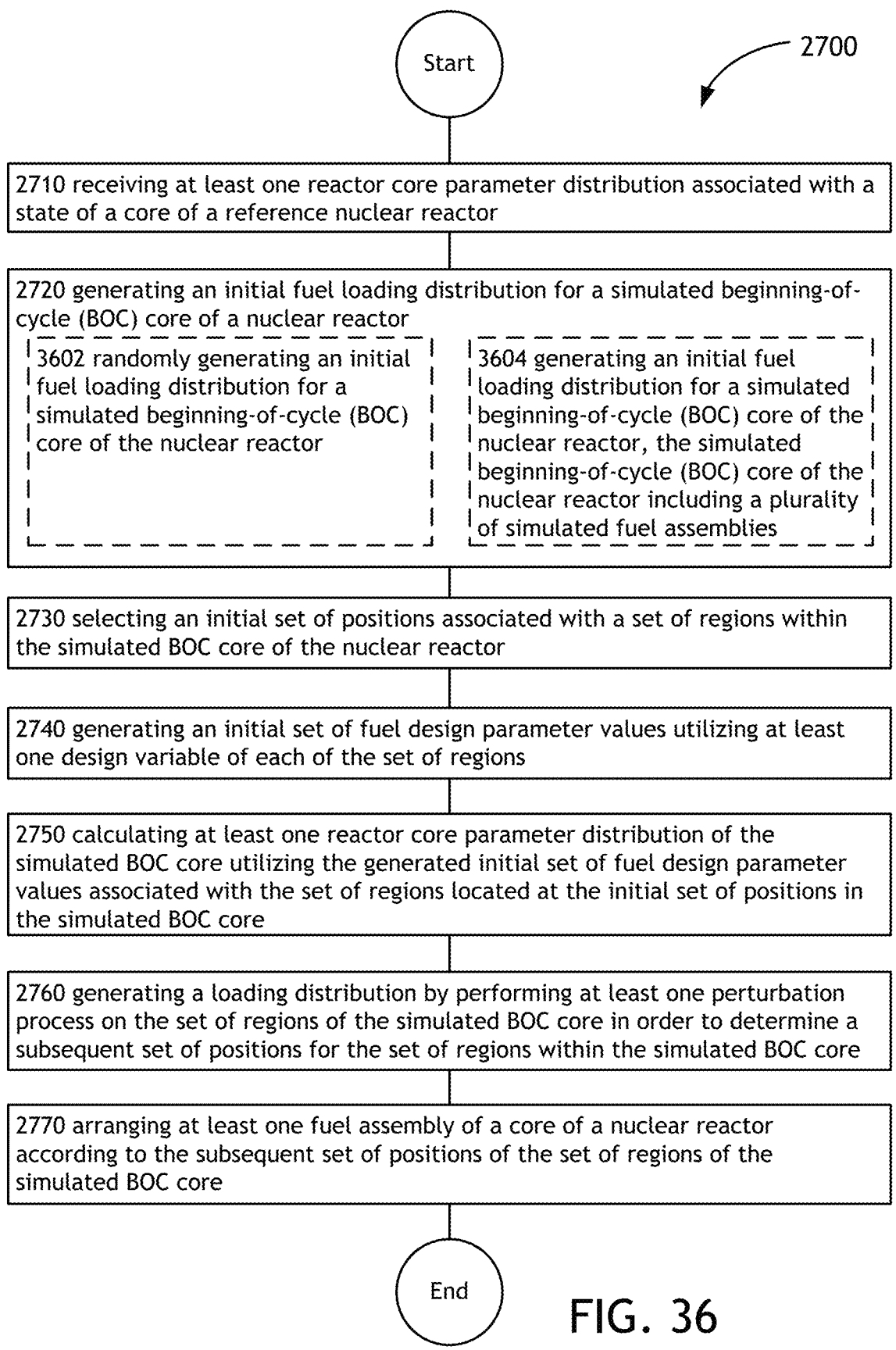

FIG. 36 illustrates alternative embodiments of the example operational flow 2700 of FIG. 27A. FIG. 36 illustrates example embodiments where the generating operation 2720 may include at least one additional operation. Additional operations may include an operation 3602 and/or operation 3604.

The operation 3602 illustrates randomly generating an initial fuel loading distribution for a simulated BOC core of the nuclear reactor. For example, as shown in FIGS. 1A through 2D, the one or more processors 106 of the controller 102 may randomly generate an initial fuel loading distribution for a simulated BOC core of the nuclear reactor. For instance, the one or more processors 106 of the controller 102 may apply a preprogrammed algorithm configured to randomly select the spatial distribution of nuclear fuel (e.g., spatial distribution of fissile and non-fissile material) across the simulated BOC core.

In another embodiment, operation 3604 illustrates generating an initial fuel loading distribution for a simulated BOC core of the nuclear reactor, the simulated BOC core of the nuclear reactor including a plurality of simulated fuel assemblies. For example, as shown in FIGS. 1A through 2D, the one or more processors 106 of the controller 102 may generate an initial fuel loading distribution through a plurality of simulated fuel assemblies for a simulated BOC core of the nuclear reactor. For instance, the one or more processors 106 of the controller 102 may provide the spatial distribution of nuclear fuel (e.g., spatial distribution of fissile and non-fissile material) throughout simulated BOC core by providing the type and quantity of material within each of the fuel assemblies throughout the simulated BOC core 120. Further, the initial fuel loading distribution may be resolved at the pin-level of each fuel assembly of the simulated BOC core. In this regard, the one or more processors 106 of the controller 102 may provide the spatial distribution of nuclear fuel throughout the simulated BOC core by providing the type and quantity of material within each fuel pin of each fuel assembly throughout the simulated BOC core 120.

Figure 37:
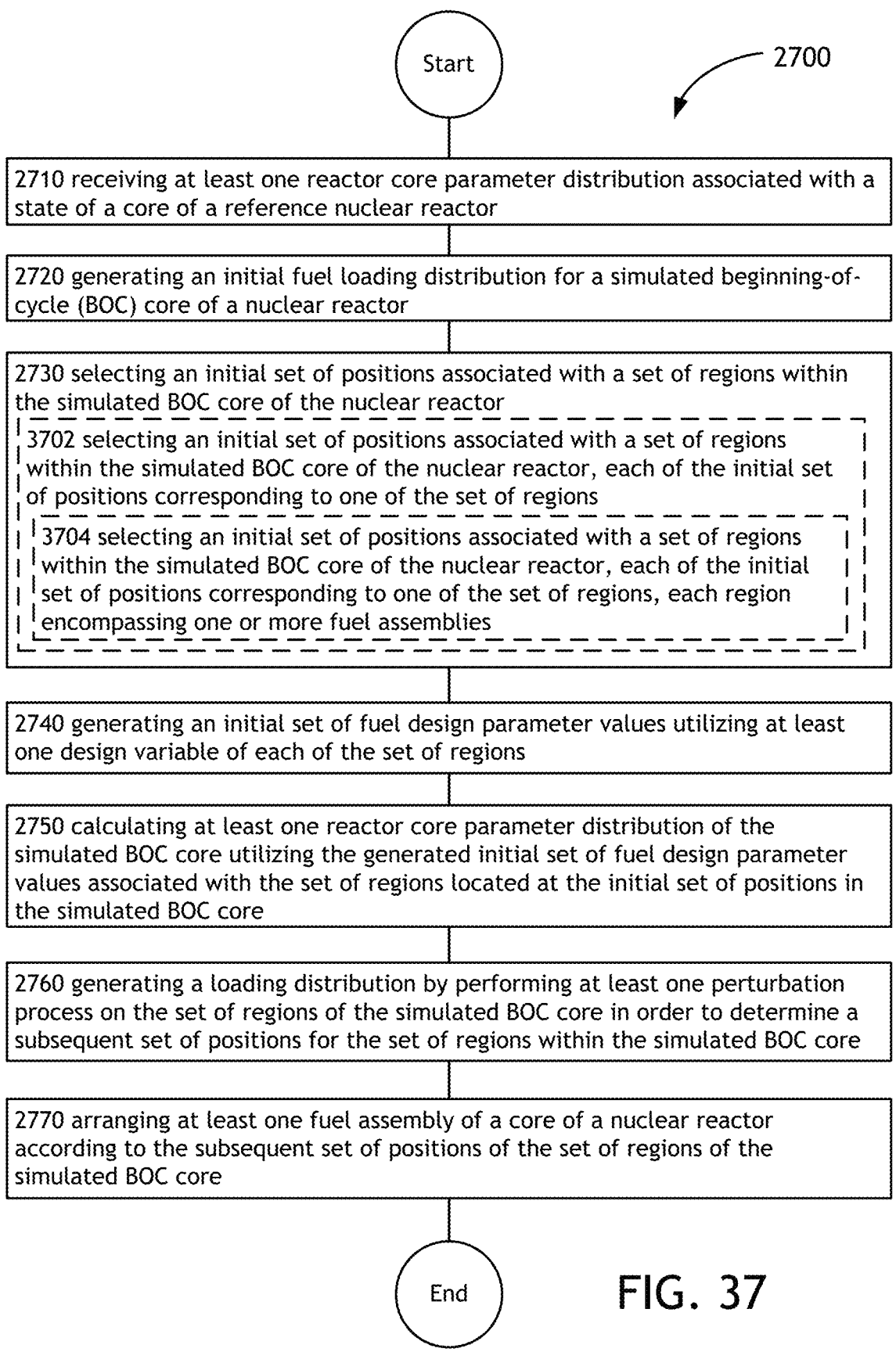

FIG. 37 illustrates alternative embodiments of the example operational flow 2700 of FIG. 27A. FIG. 37 illustrates example embodiments where the selecting operation 2730 may include at least one additional operation. Additional operations may include an operation 3702 and/or operation 3704.

The operation 3702 illustrates selecting an initial set of positions associated with a set of regions within the simulated BOC core of the nuclear reactor, each of the initial set of positions corresponding to one of the set of regions. For example, as shown in FIGS. 1A through 2D, one or more processors 106 of controller 102 may select an initial set of positions (e.g., x, y, z positions) associated with a set of regions 122 within the simulated BOC core of the nuclear reactor. Further, the one or more processors 106 of the controller 102 may assign a relative position to each of a set of regions within the simulated BOC core 120 of the nuclear reactor. In this regard, each region as delineated by the controller 102 may encompass a selected volume (e.g., selected by controller or selected via user input) of the nuclear fuel within the simulated BOC core 120.

In another embodiment, the operation 3704 illustrates selecting an initial set of positions associated with a set of regions within the simulated BOC core of the nuclear reactor, each of the initial set of positions corresponding to one of the set regions, each region encompassing at least one fuel assembly. For example, as shown in FIGS. 1A through 2D, one or more processors 106 of controller 102 may select an initial set of positions (e.g., x, y, z positions) associated with a set of regions 122 within the simulated BOC core 120 of the nuclear reactor, whereby each region encompasses one or more fuel assemblies 124 of the simulated BOC core 120. Further, the one or more processors 106 of the controller 102 may assign a relative position to each region encompassing one or more fuel assemblies 124 within the simulated BOC core 120 of the nuclear reactor. For instance, as shown in FIG. 1I, the one or more processors 106 of the controller 102 are configured to select an initial set of positions 140 of the set of regions 122, whereby each region 122 encompasses a single fuel assembly 124 of the BOC core 120. In another instance, as shown in FIG. 1J, the one or more processors 106 of the controller 102 are configured to select an initial set of positions 140 of the set of regions 122, whereby each region 122 encompasses multiple fuel assemblies 124 of the BOC core 120.

Figure 38:
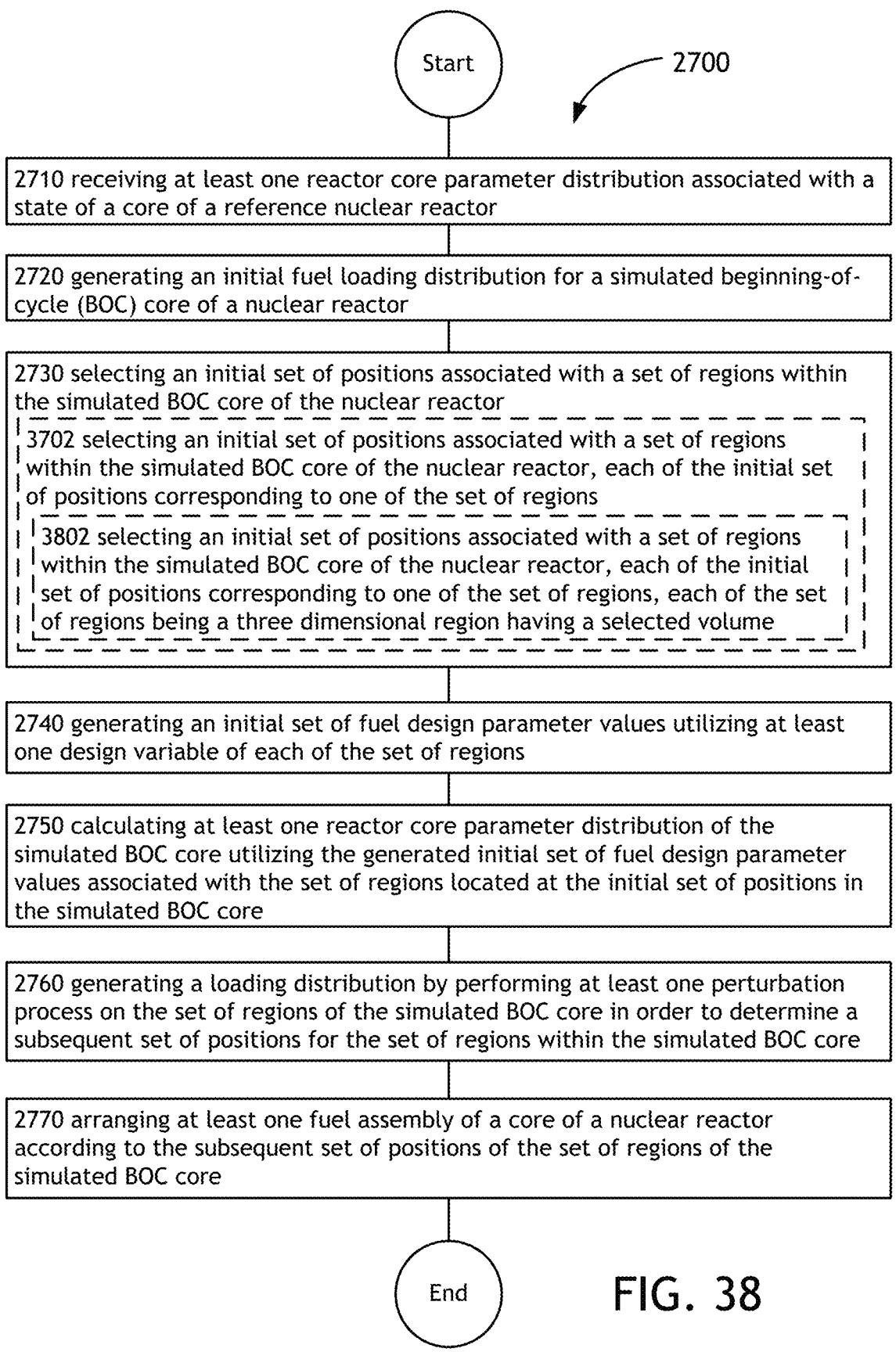

FIG. 38 illustrates alternative embodiments of the example operational flow 2700 of FIG. 27A. FIG. 38 illustrates example embodiments where the selecting operation 2730 may include at least one additional operation. Additional operations may include an operation 3802.

In one embodiment, the operation 3802 illustrates selecting an initial set of positions associated with a set of regions within the simulated BOC core of the nuclear reactor, each of the initial set of positions corresponding to one of the set of regions, each of the set of regions being a three dimensional region having a selected volume. For example, as shown in FIGS. 1A through 2D, one or more processors 106 of controller 102 may select an initial set of positions 140 associated with a set of regions 122 within the simulated BOC core 120 of the nuclear reactor, whereby each region is a three dimensional region having a selected volume. Further, the one or more processors 106 of the controller 102 may assign a relative position to each three dimensional region of selected volume within the simulated BOC core 120 of the nuclear reactor.

Figure 39:
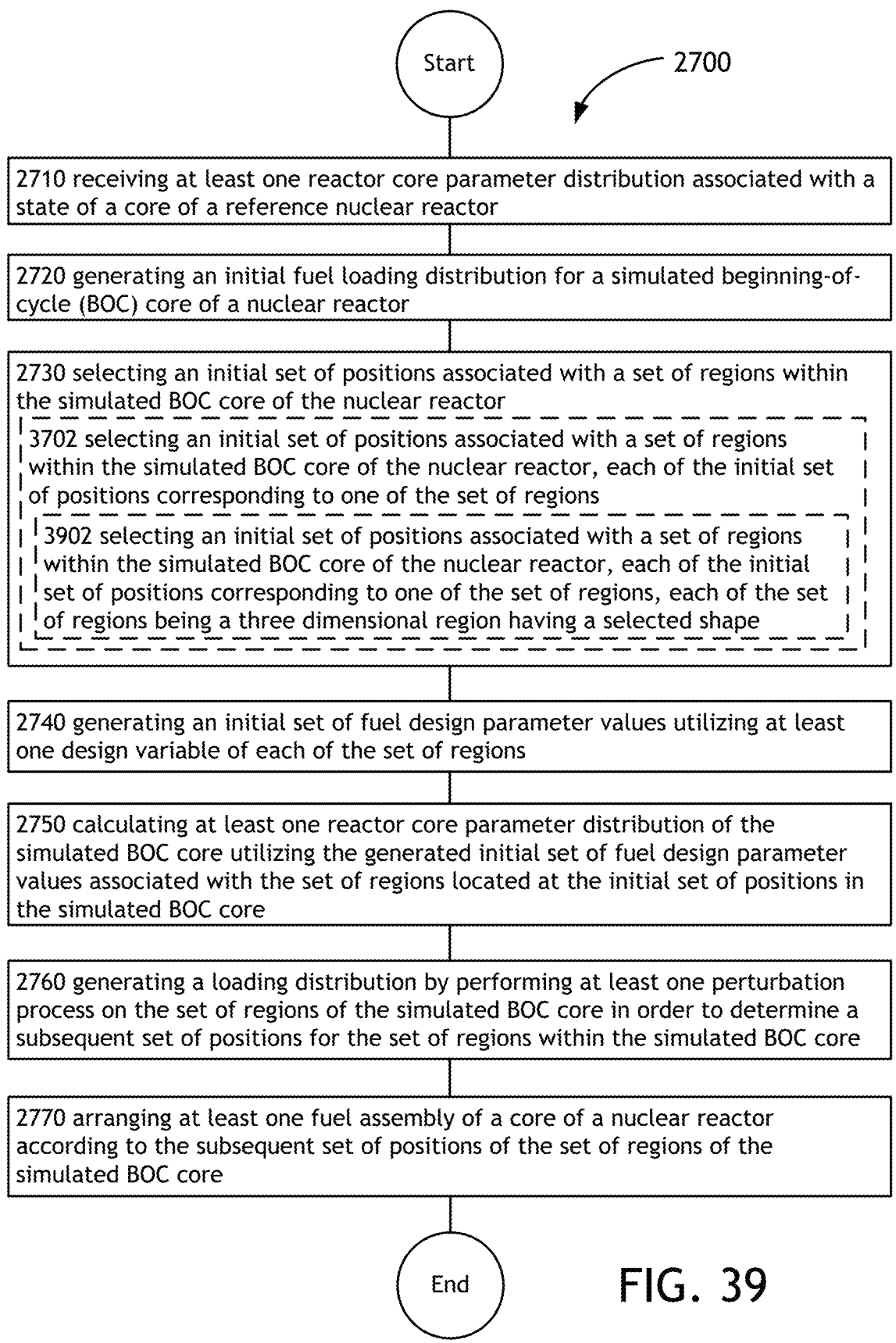

FIG. 39 illustrates alternative embodiments of the example operational flow 2700 of FIG. 27A. FIG. 39 illustrates example embodiments where the selecting operation 2730 may include at least one additional operation. Additional operations may include an operation 3902.

In one embodiment, the operation 3902 illustrates selecting an initial set of positions associated with a set of regions within the simulated BOC core of the nuclear reactor, each of the initial set of positions corresponding to one of the set of regions, each of the set of regions being a three dimensional region having a selected shape. For example, as shown in FIGS. 1A through 2D, one or more processors 106 of controller 102 may select an initial set of positions 140 associated with a set of regions 122 within the simulated BOC core 120 of the nuclear reactor, whereby each region is a three dimensional region having a selected shape (e.g., hexagonoid, cuboid, cylinder, ellipsoid, sphere, disc, ring and the like). Further, the one or more processors 106 of the controller 102 may assign a relative position to each three dimensional region of selected shape within the simulated BOC core 120 of the nuclear reactor.

Figure 40:
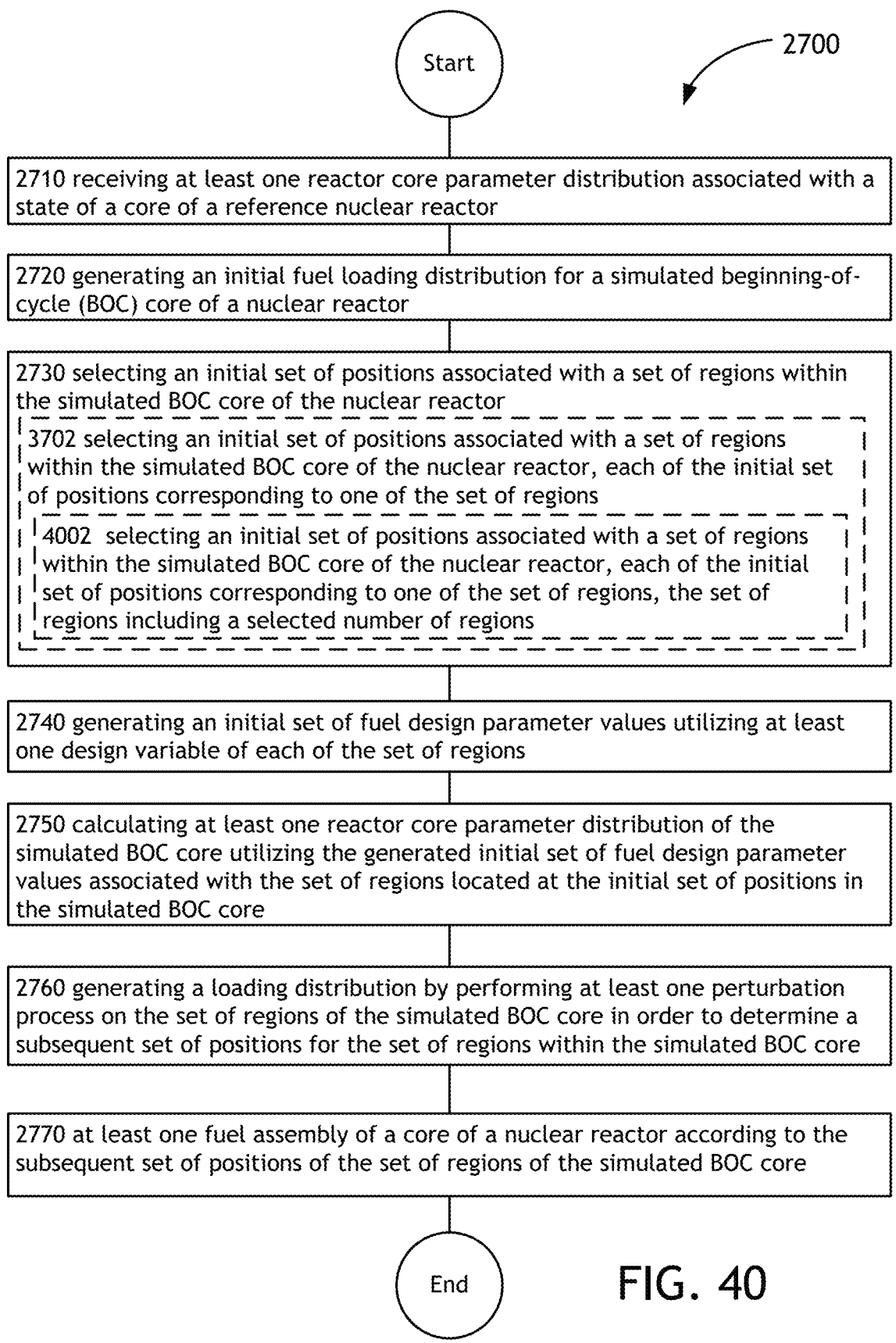

FIG. 40 illustrates alternative embodiments of the example operational flow 2700 of FIG. 27A. FIG. 40 illustrates example embodiments where the selecting operation 2730 may include at least one additional operation. Additional operations may include an operation 4002.

In another embodiment, the operation 4002 illustrates selecting an initial set of positions associated with a set of regions within the simulated BOC core of the nuclear reactor, each of the initial set of positions corresponding to one of the set of regions, the set of regions including a selected number of regions. For example, as shown in FIGS. 1A through 2D, one or more processors 106 of controller 102 may select an initial set of positions 140 associated with a set of regions 122 including a selected number of regions. Further, the one or more processors 106 of the controller 102 may assign a relative position to each region of the selected number of regions within the simulated BOC core 120 of the nuclear reactor.

Figure 41:
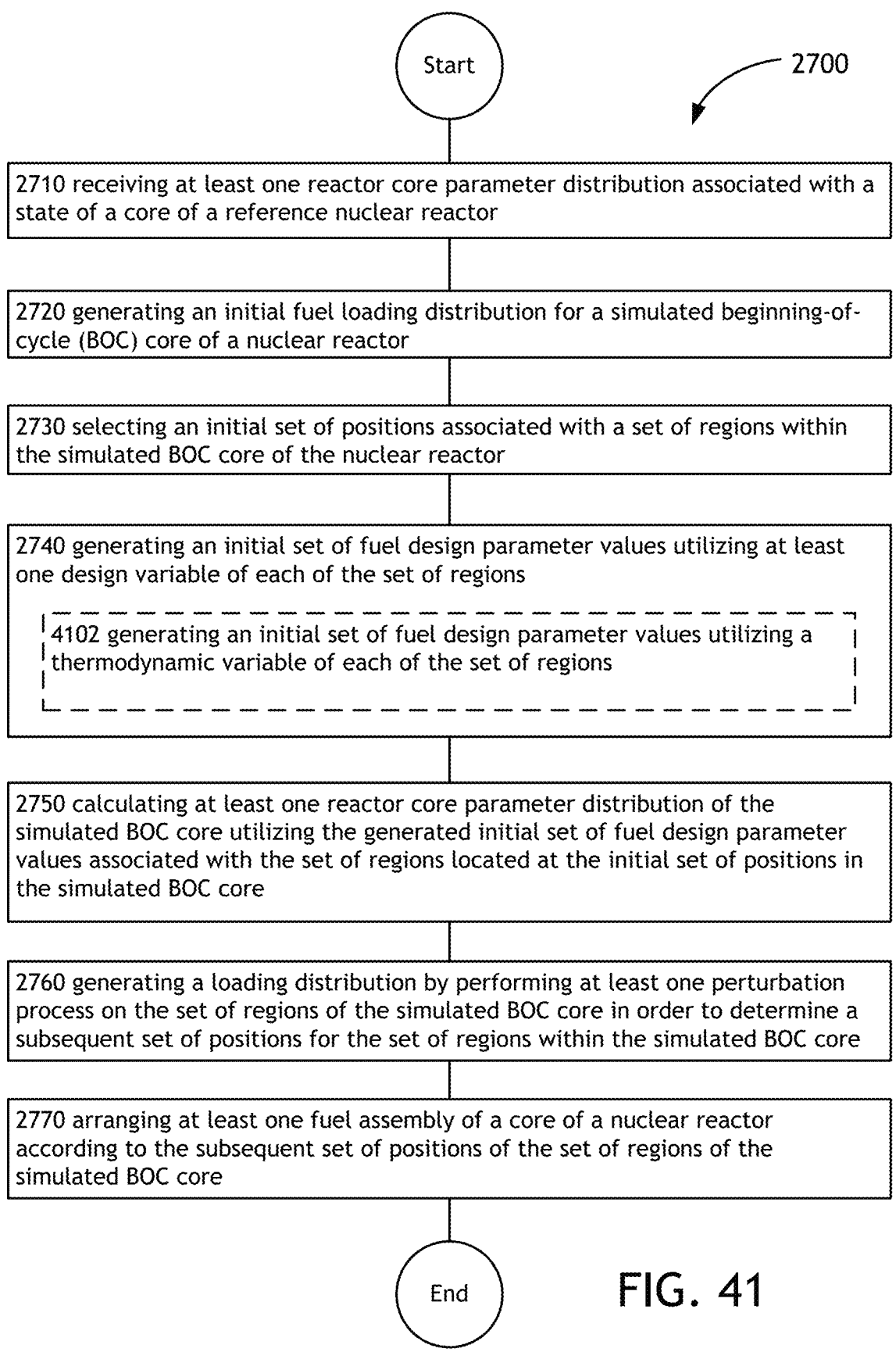

FIG. 41 illustrates alternative embodiments of the example operational flow 2700 of FIG. 27A. FIG. 41 illustrates example embodiments where the generating operation 2740 may include at least one additional operation. Additional operations may include an operation 4102.

The operation 4102 illustrates generating an initial set of fuel design parameter values utilizing a thermodynamic variable of each of the set of regions. For example, as shown in FIGS. 1A through 2D, one or more processors 106 of controller 102 may generate an initial fuel design parameter value 141 utilizing a thermodynamic variable (e.g., temperature, pressure and the like) for each region 122. For instance, as shown in FIG. 1I, one or more processors 106 of controller 102 may generate an initial fuel design parameter value for a given region 122 utilizing a thermodynamic variable 145 for the given region 122. In another instance, as shown in FIG. 1L, one or more processors 106 of controller 102 may generate an initial fuel design parameter value for a given region 122 utilizing a thermodynamic variable for the region 122 and regions 123a-123f adjacent to the given region 122.

Figure 42:
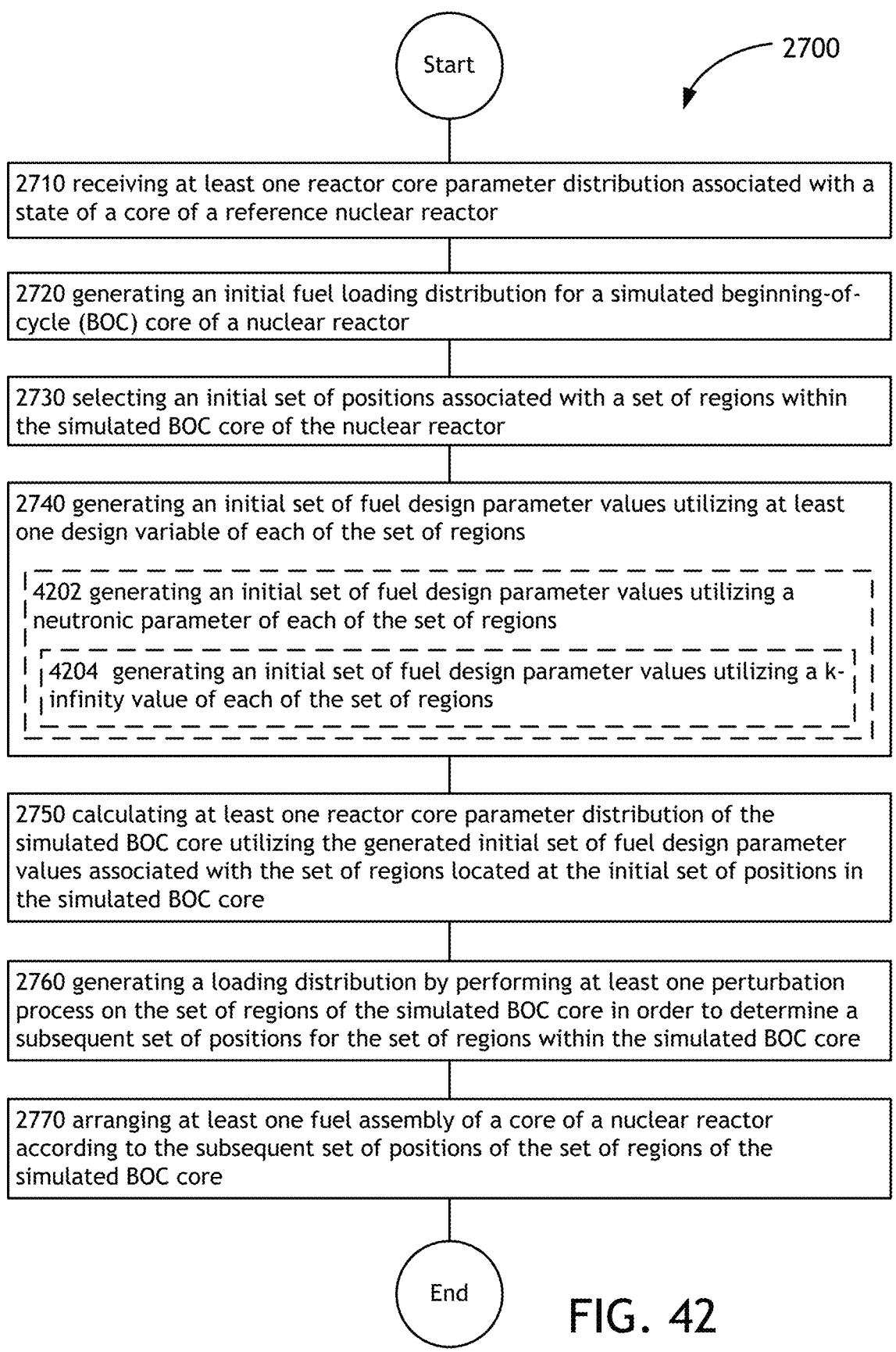

FIG. 42 illustrates alternative embodiments of the example operational flow 2700 of FIG. 27A. FIG. 42 illustrates example embodiments where the generating operation 2740 may include at least one additional operation. Additional operations may include an operation 4202 and/or 4204.

The operation 4202 illustrates generating an initial set of fuel design parameter values utilizing a neutronic parameter of each of the set of regions. For example, as shown in FIGS. 1A through 2D, one or more processors 106 of controller 102 may generate an initial set of fuel design parameter values utilizing a neutronic parameter associated with the simulated nuclear fuel within of each of the set of regions. For instance, as shown in FIG. 1I, one or more processors 106 of controller 102 may generate an initial fuel design parameter value for a given region 122 utilizing a neutronic parameter for the given region 122. In another instance, as shown in FIG. 1L, one or more processors 106 of controller 102 may generate an initial fuel design parameter value for a given region 122 utilizing a neutronic parameter for region 122 and regions 123a-123f adjacent to the given region 122.

In another embodiment, the operation 4204 illustrates generating an initial set of fuel design parameter values utilizing a k-infinity value of each of the set of regions. For example, as shown in FIGS. 1A through 2D, one or more processors 106 of controller 102 may generate an initial set of fuel design parameter values utilizing a k-infinity value associated with the nuclear fuel within each of the set of regions. For instance, as shown in FIG. 1I, one or more processors 106 of controller 102 may generate an initial fuel design parameter value for a given region 122 utilizing a k-infinity value for the given region 122. In another instance, as shown in FIG. 1L, one or more processors 106 of controller 102 may generate an initial fuel design parameter value for a given region 122 utilizing a k-infinity value for region 122 and regions 123a-123f adjacent to the given region 122.

Figure 43:
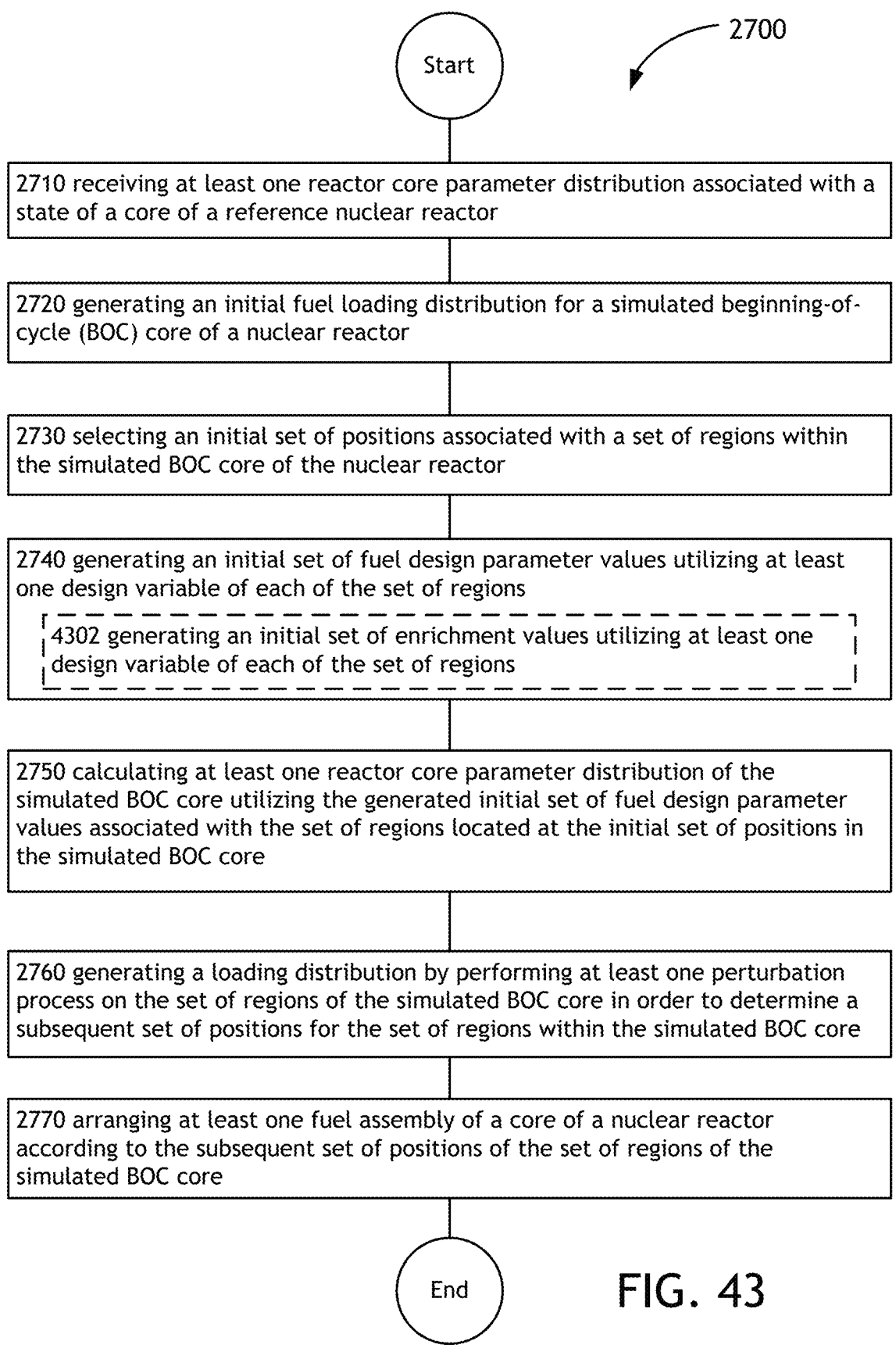

FIG. 43 illustrates alternative embodiments of the example operational flow 2700 of FIG. 27A. FIG. 43 illustrates example embodiments where the generating operation 2740 may include at least one additional operation. Additional operations may include an operation 4302.

The operation 4302 illustrates generating an initial set of enrichment values utilizing at least one design variable of each of the set of regions. For example, as shown in FIGS. 1A through 2D, one or more processors 106 of controller 102 may generate an initial set of simulated nuclear fuel enrichment value utilizing one or more design variables (e.g., thermodynamic variable, neutronic parameter and the like) for each region 122. For instance, as shown in FIG. 1I, one or more processors 106 of controller 102 may generate an initial set of enrichment values for a given region 122 utilizing a design variable for the given region 122. In another instance, as shown in FIG. 1L, one or more processors 106 of controller 102 may generate an initial set of enrichment values for a given region 122 utilizing a design variable for region 122 and regions 123*a*-123*f* adjacent to the given region 122.

Figure 44:
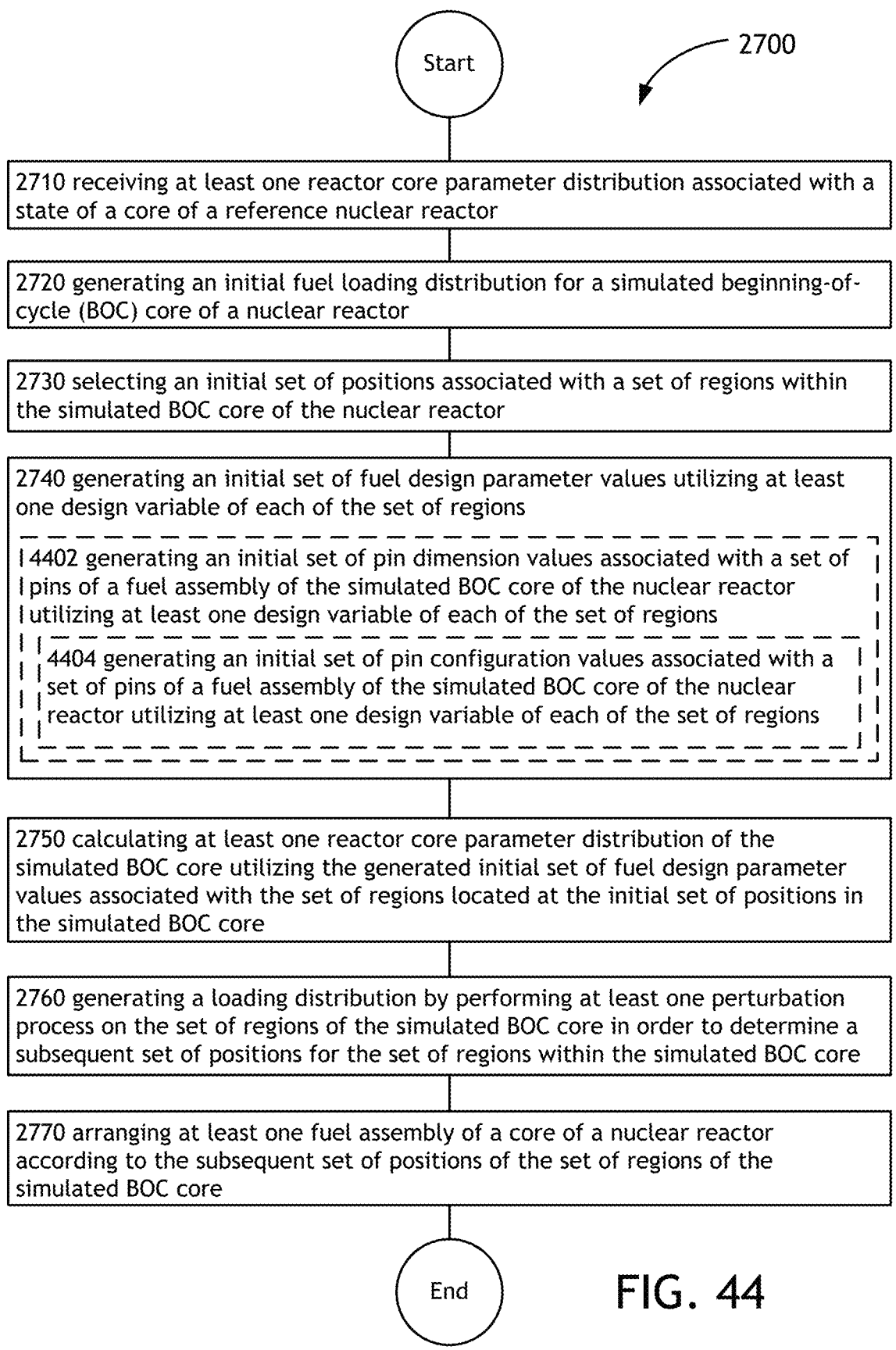

FIG. 44 illustrates alternative embodiments of the example operational flow 2700 of FIG. 27A. FIG. 44 illustrates example embodiments where the generating operation 2740 may include at least one additional operation. Additional operations may include an operation 4402 and/or operation 4404.

The operation 4402 illustrates generating an initial set of pin dimension values associated with a set of pins of a fuel assembly of the simulated BOC core of the nuclear reactor utilizing at least one design variable of each of the set of regions. For example, as shown in FIGS. 1A through 2D, one or more processors 106 of controller 102 may generate an initial set of pin dimension values associated with a set of pins of a fuel assembly 124 of the simulated BOC core 120 of the nuclear reactor utilizing one or more design variables of each of the set of regions 122. For instance, as shown in FIG. 1I, one or more processors 106 of controller 102 may generate an initial set of pin dimension values associated with a set of pins of a fuel assembly 124 of the simulated BOC core 120 of the nuclear reactor utilizing a design variable for the given region 122. In another instance, as shown in FIG. 1L, one or more processors 106 of controller 102 may generate an initial set of pin dimension values associated with a set of pins of a fuel assembly 124 of the simulated BOC core 120 of the nuclear reactor utilizing a design variable for region 122 and regions 123*a*-123*f* adjacent to the given region 122.

In another embodiment, the operation 4404 illustrates generating an initial set of pin configuration values associated with a set of pins of a fuel assembly of the simulated BOC core of the nuclear reactor utilizing at least one design variable of each of the set of regions. For example, as shown in FIGS. 1A through 2D, one or more processors 106 of controller 102 may generate an initial set of pin configuration values associated with a set of pins of a fuel assembly 124 of the simulated BOC core 120 of the nuclear reactor utilizing one or more design variables of each of the set of regions 122. For instance, one or more processors 106 of controller 102 may generate an initial set of pin pitch values associated with a set of pins of a fuel assembly 124 of the simulated BOC core 120 of the nuclear reactor utilizing one or more design variables of each of the set of regions 122. In another instance, one or more processors 106 of controller 102 may generate an initial number of pins within a set of pins of a fuel assembly 124 of the simulated BOC core 120 of the nuclear reactor utilizing one or more design variables of each of the set of regions 122.

Figure 45:
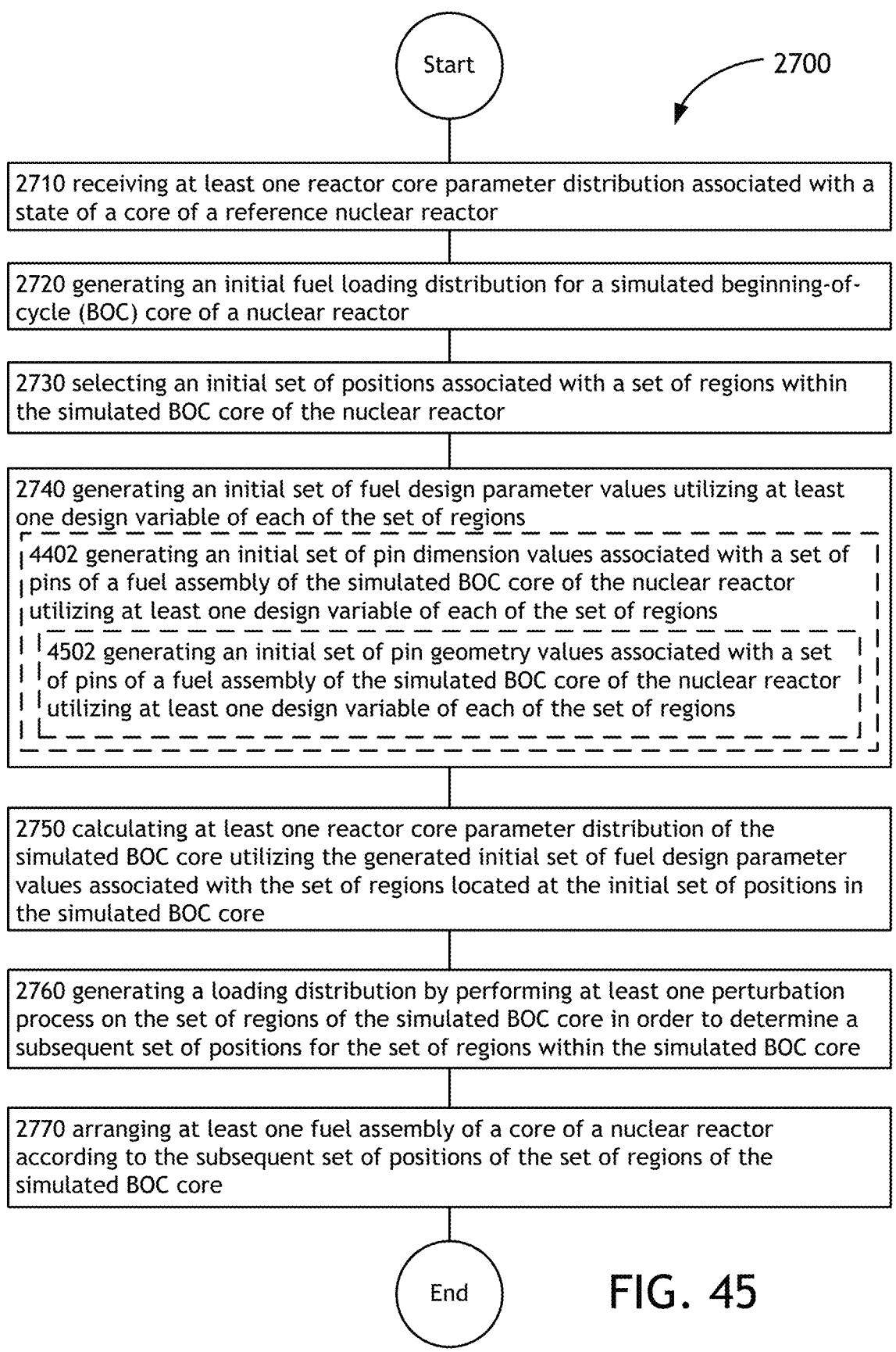

FIG. 45 illustrates alternative embodiments of the example operational flow 2700 of FIG. 27A. FIG. 45 illustrates example embodiments where the generating operation 2740 may include at least one additional operation. Additional operations may include an operation 4502.

In another embodiment, the operation 4502 illustrates generating an initial set of pin geometry values associated with a set of pins of a fuel assembly of the simulated BOC core of the nuclear reactor utilizing at least one design variable of each of the set of regions. For example, as shown in FIGS. 1A through 2D, one or more processors 106 of controller 102 may generate an initial set of pin geometry values associated with a set of pins of a fuel assembly 124 of the simulated BOC core 120 of the nuclear reactor utilizing one or more design variables of each of the set of regions 122. For instance, one or more processors 106 of controller 102 may generate an initial set of pin size values (e.g., pin length values, pin thickness/radius values and the like) associated with a set of pins of a fuel assembly 124 of the simulated BOC core 120 of the nuclear reactor utilizing one or more design variables of each of the set of regions 122. In another instance, one or more processors 106 of controller 102 may generate an initial set of pin shapes (e.g., hexagonoid, cylinder, prism and the like) associated with a set of pins of a fuel assembly 124 of the simulated BOC core 120 of the nuclear reactor utilizing one or more design variables of each of the set of regions 122.

Figure 46:
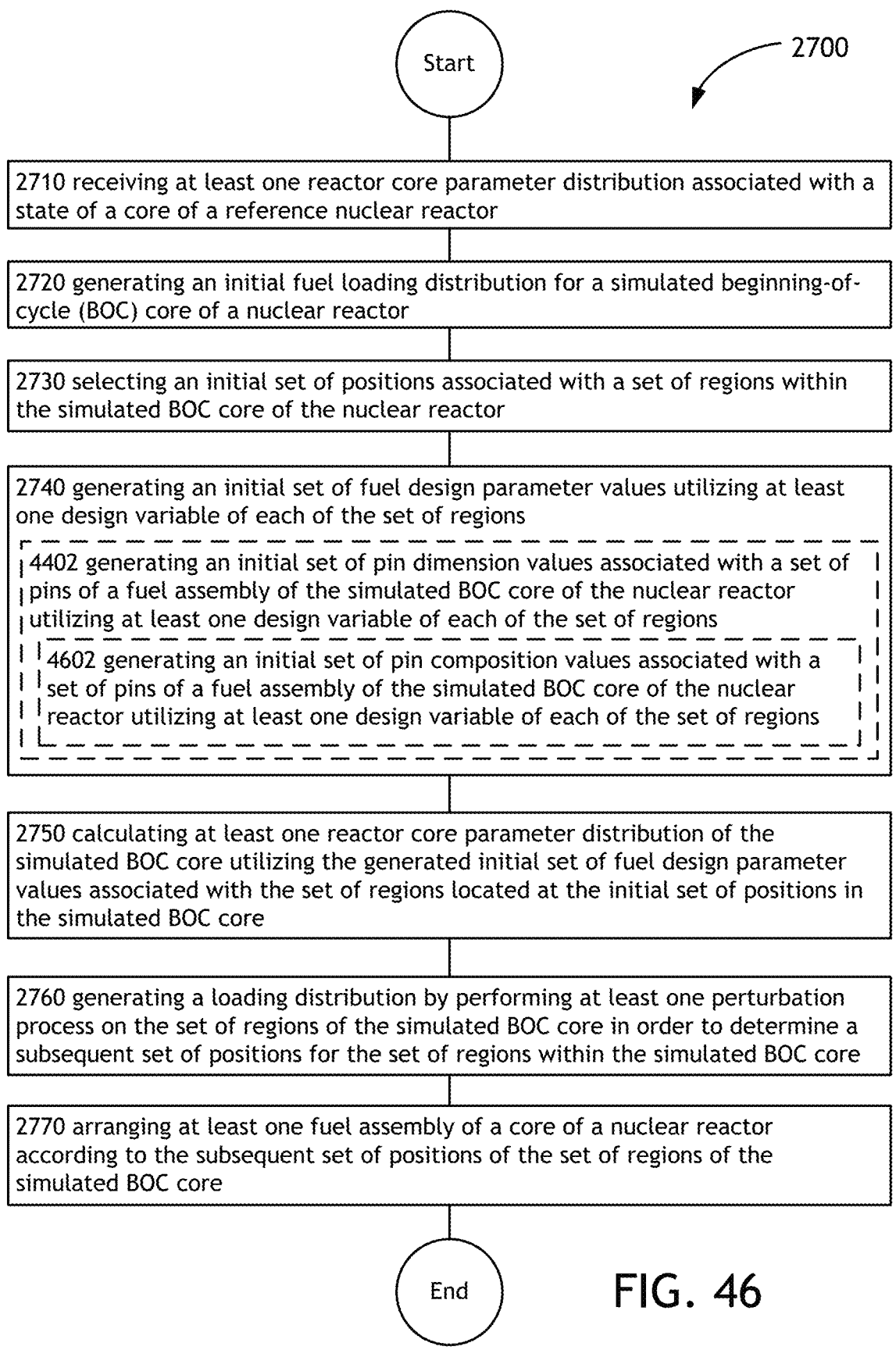

FIG. 46 illustrates alternative embodiments of the example operational flow 2700 of FIG. 27A. FIG. 46 illustrates example embodiments where the generating operation 2740 may include at least one additional operation. Additional operations may include an operation 4602.

In another embodiment, the operation 4602 illustrates generating an initial set of pin composition values associated with a set of pins of a fuel assembly of the simulated BOC core of the nuclear reactor utilizing at least one design variable of each of the set of regions. For example, as shown in FIGS. 1A through 2D, one or more processors 106 of controller 102 may generate an initial set of pin composition values associated with a set of pins of a fuel assembly 124 of the simulated BOC core 120 of the nuclear reactor utilizing one or more design variables of each of the set of regions 122. For instance, one or more processors 106 of controller 102 may generate a set of fuel smear densities associated with a set of pins of a fuel assembly 124 of the simulated BOC core 120 of the nuclear reactor utilizing one or more design variables of each of the set of regions 122. In another instance, one or more processors 106 of controller 102 may generate a set of fissile content values (i.e., relative amount of fissile material in each pin) associated with a set of pins of a fuel assembly 124 of the simulated BOC core 120 of the nuclear reactor utilizing one or more design variables of each of the set of regions 122. In another instance, one or more processors 106 of controller 102 may generate a set of fertile content values (i.e., relative amount of fertile material in each pin) associated with a set of pins of a fuel assembly 124 of the simulated BOC core 120 of the nuclear reactor utilizing one or more design variables of each of the set of regions 122. In another instance, one or more processors 106 of controller 102 may generate a set of non-fissile/non-fertile content values (i.e., relative amount of non-fissile/non-fertile material in each pin (e.g., amount of zirconium in each pin)) associated with a set of pins of a fuel assembly 124 of the simulated BOC core 120 of the nuclear reactor utilizing one or more design variables of each of the set of regions 122. By way of another example, as shown in FIGS. 1A through 2D, one or more processors 106 of controller 102 may generate an initial set of pin composition values as a function of position and/or fuel assembly location across the simulated BOC core of the nuclear reactor utilizing one or more design variables of each of the set of regions 122. In this regard, the one or more processors 106 of controller 102 may control both the fuel composition of each pin of the fuel assemblies of the simulated BOC core and the manner in which the fuel composition varies across the various fuel assemblies of the simulated BOC core.

Figure 47:
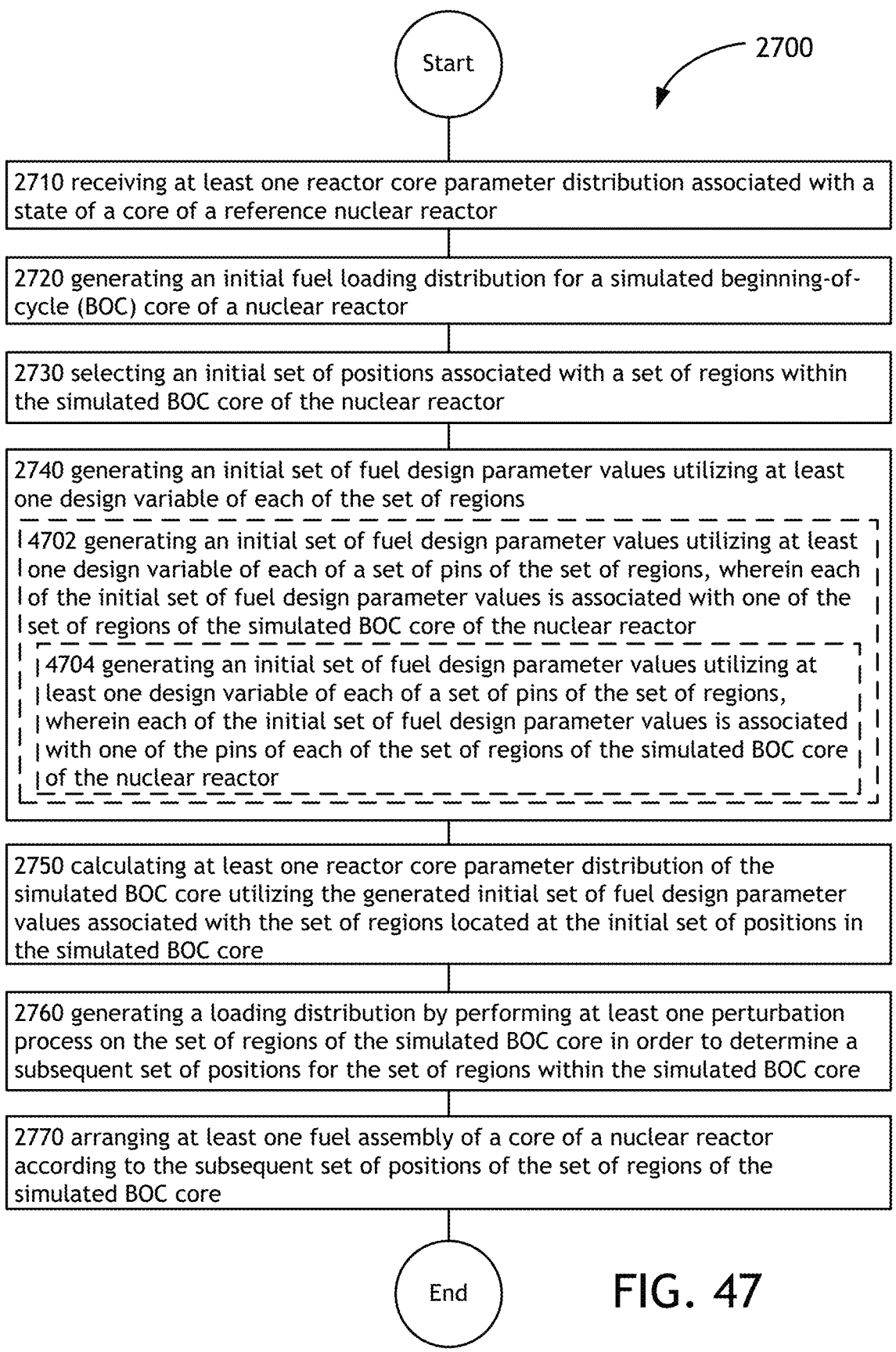

FIG. 47 illustrates alternative embodiments of the example operational flow 2700 of FIG. 27A. FIG. 47 illustrates example embodiments where the generating operation 2740 may include at least one additional operation. Additional operations may include an operation 4702 and/or 4704.

The operation 4702 illustrates generating an initial set of fuel design parameter values utilizing at least one design variable of each of a set of pins of the set of regions, wherein each of the initial set of fuel design parameter values is associated with one of the set of regions of the simulated BOC core of the nuclear reactor. For example, as shown in FIGS. 1A through 2D, one or more processors 106 of controller 102 may generate an initial set of fuel design parameter values associated with one of the set of regions of the simulated BOC core 120 utilizing at least one design variable for each of the set of pins. Further, each of the initial set of fuel design parameter values may be associated with one of the set of regions of the simulated BOC core of the nuclear reactor. In this regard, the initial set of fuel design parameter values may be generated at the "multi-pin" level (i.e., region including multiple pins) using pin-level inputs for the one or more design variables.

The operation 4704 illustrates generating an initial set of fuel design parameter values utilizing at least one design variable of each of a set of pins of the set of regions, wherein each of the initial set of fuel design parameter values is associated with one of the pins of each of the set of regions of the simulated BOC core of the nuclear reactor. For example, as shown in FIGS. 1A through 2D, one or more processors 106 of controller 102 may generate an initial set of fuel design parameter values associated with a set of pins of a fuel assembly 124 of the simulated BOC core 120 utilizing at least one design variable of each of the set of pins. Further, each of the initial set of fuel design parameter values may be associated with one of the pins of each of the set of regions of the simulated BOC core of the nuclear reactor. In this regard, the initial set of fuel design parameter values may be generated at the "pin-level" (i.e., each region includes a single pin) of the simulated reactor core using pin-level inputs for the one or more design variables.

Figure 48:
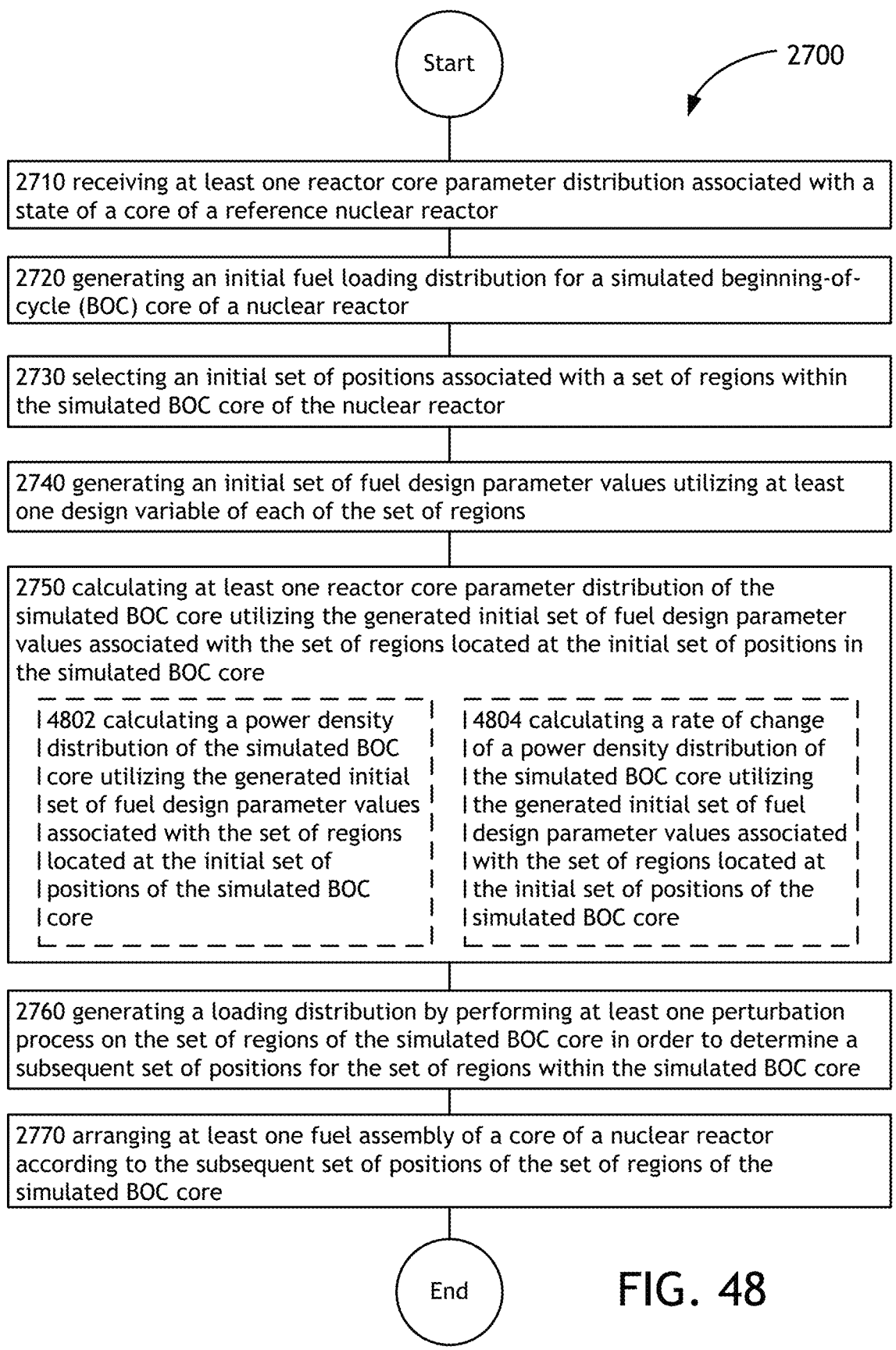

FIG. 48 illustrates alternative embodiments of the example operational flow 2700 of FIG. 27A. FIG. 48 illustrates example embodiments where the calculating operation 2750 may include at least one additional operation. Additional operations may include an operation 4802 and/or 4804.

The operation 4802 illustrates calculating a power density distribution of the simulated BOC core utilizing the generated initial set of fuel design parameter values associated with the set of regions located at the initial set of positions of the simulated BOC core. For example, as shown in FIGS. 1A through 2D, using the generated initial set of fuel design parameter values corresponding to the regions 122 located at the initial positions of the simulated BOC core 120, the one or more processors 106 of controller 102 may calculate a power density distribution for the simulated BOC core 120.

In another embodiment, 4804 illustrates calculating a rate of change of a power density distribution of the simulated BOC core utilizing the generated initial set of fuel design parameter values associated with the set of regions located at the initial set of positions of the simulated BOC core. For example, as shown in FIGS. 1A through 2D, using the generated initial set of fuel design parameter values corresponding to the regions 122 located at the initial positions of the simulated BOC core 120, the one or more processors 106 of controller 102 may calculate a rate-of-change of power density distribution for the simulated BOC core 120.

Figure 49:
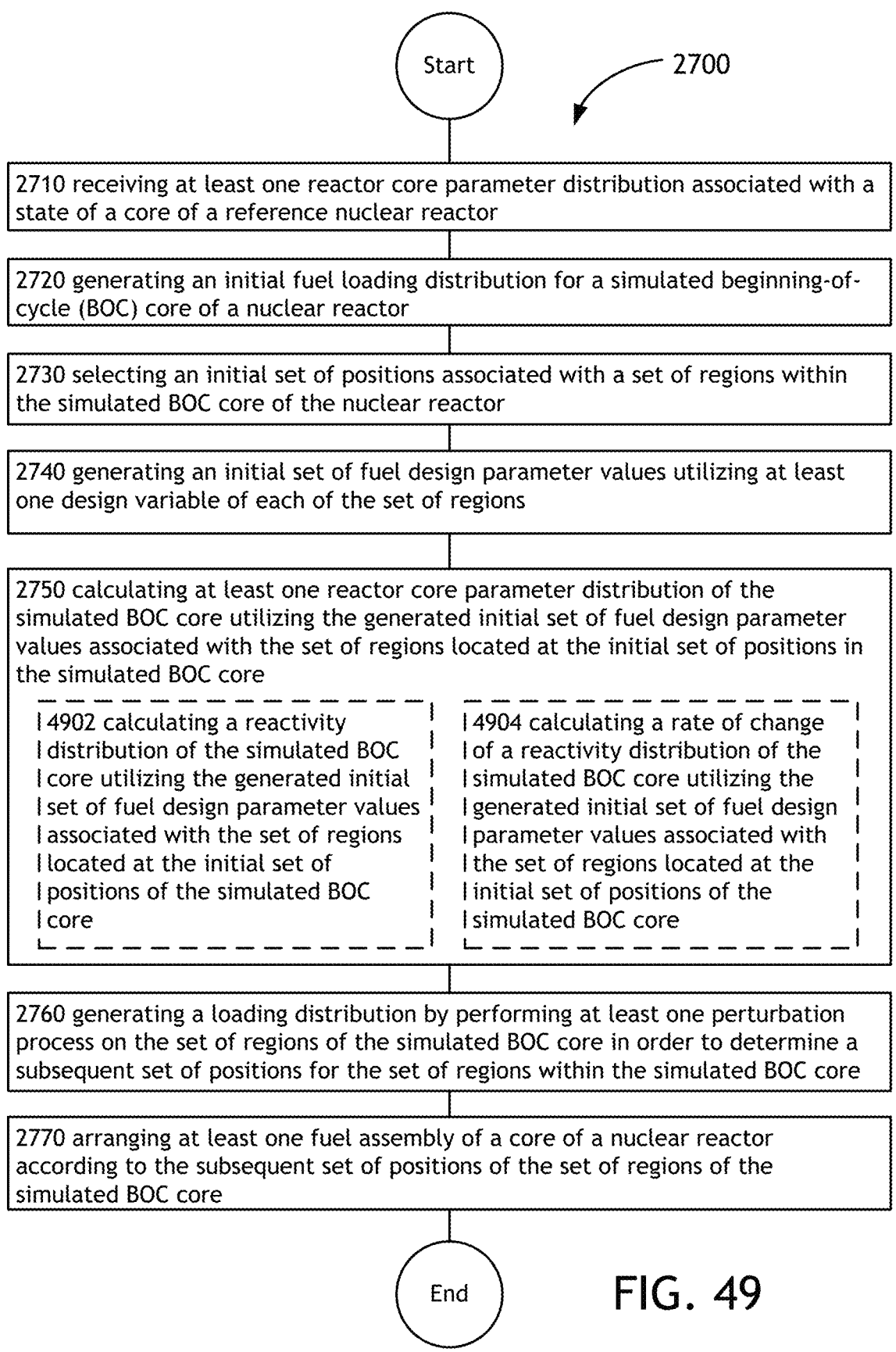

FIG. 49 illustrates alternative embodiments of the example operational flow 2700 of FIG. 27A. FIG. 49 illustrates example embodiments where the calculating operation 2750 may include at least one additional operation. Additional operations may include an operation 4902 and/or 4904.

The operation 4902 illustrates calculating a reactivity distribution of the simulated BOC core utilizing the generated initial set of fuel design parameter values associated with the set of regions located at the initial set of positions of the simulated BOC core. For example, as shown in FIGS. 1A through 2D, using the generated initial set of fuel design parameter values corresponding to the regions 122 located at the initial positions of the simulated BOC core 120, the one or more processors 106 of controller 102 may calculate a reactivity distribution for the simulated BOC core 120.

In another embodiment, operation 4904 illustrates calculating a rate of change of a reactivity distribution of the simulated BOC core utilizing the generated initial set of fuel design parameter values associated with the set of regions located at the initial set of positions of the simulated BOC core. For example, as shown in FIGS. 1A through 2D, using the generated initial set of fuel design parameter values corresponding to the regions 122 located at the initial positions of the simulated BOC core 120, the one or more processors 106 of controller 102 may calculate a rate-of-change of reactivity distribution for the simulated BOC core 120.

Figure 50:
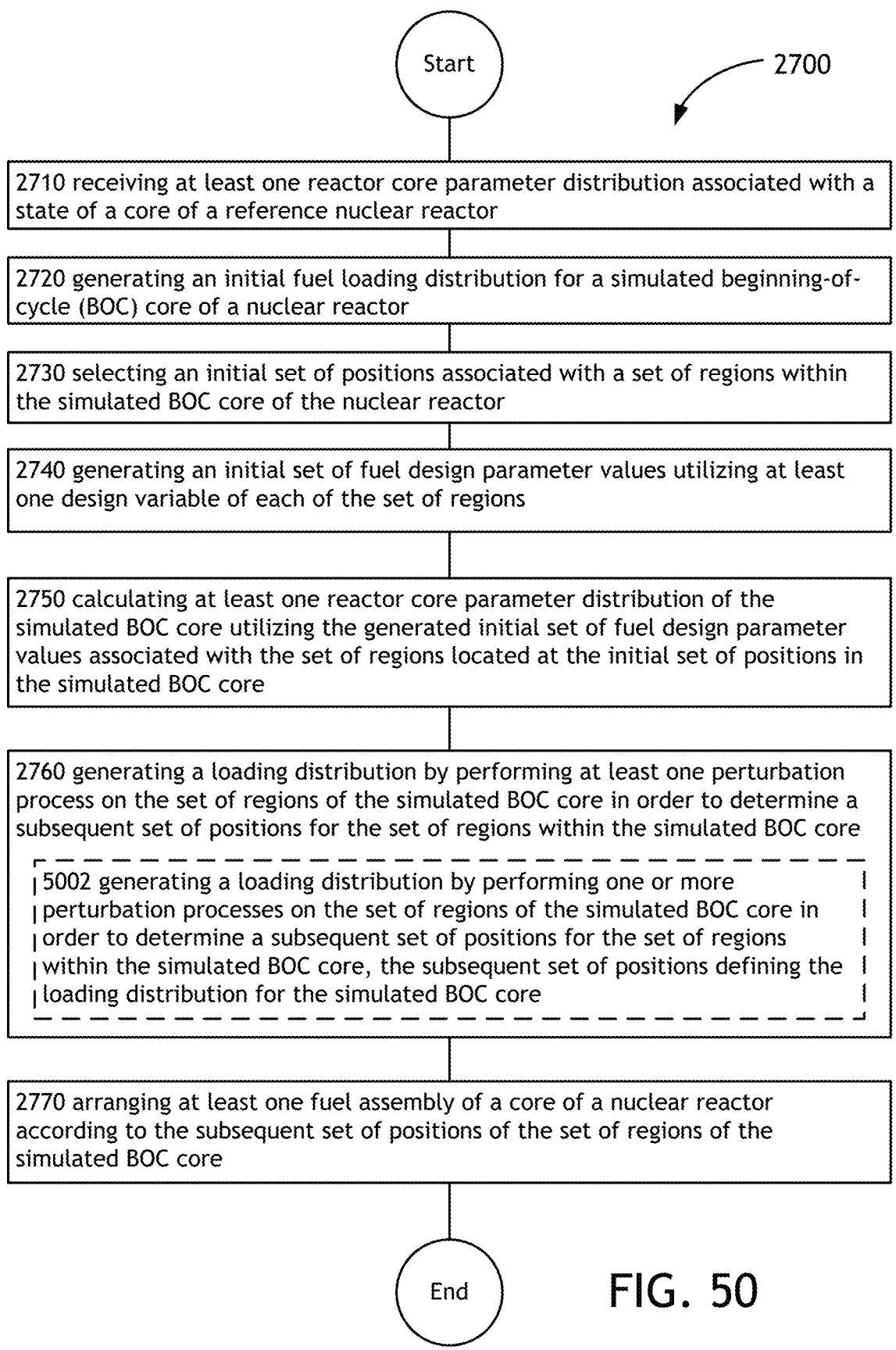

FIG. 50 illustrates alternative embodiments of the example operational flow 2700 of FIG. 27A. FIG. 50 illustrates example embodiments where the generating operation 2760 may include at least one additional operation. Additional operations may include an operation 5002.

The operation 5002 illustrates generating a loading distribution by performing at least one perturbation process on the set of regions of the simulated BOC core in order to determine a subsequent set of positions for the set of regions within the simulated BOC core, the subsequent set of positions defining the loading distribution for the simulated BOC core. For example, as shown in FIGS. 1A through 2D, the one or more processors 106 of the controller 102 may generate a loading distribution by performing at least one perturbation process on the set of regions 122 of the simulated BOC core 120 in order to determine a subsequent set of positions for the set of regions within the simulated BOC core, the subsequent set of positions defining the loading distribution for the simulated BOC core 120. For instance, the subsequent positions of regions 122 outputted from the perturbation process 170 may serve to define a loading distribution (i.e., spatial distribution of fertile and non-fertile components of nuclear fuel in reactor core) for the simulated BOC core 120.

Figure 51:
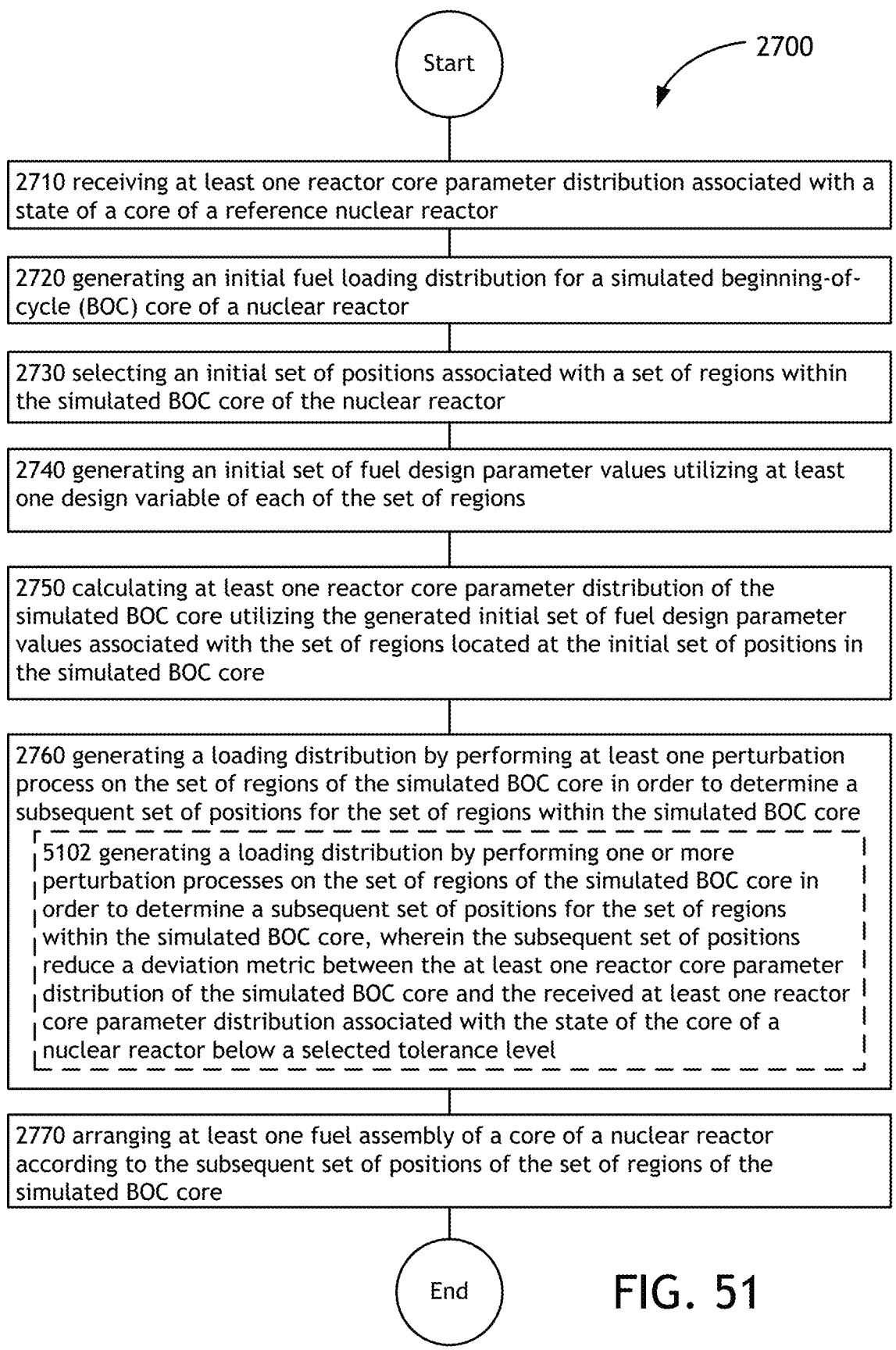

FIG. 51 illustrates alternative embodiments of the example operational flow 2700 of FIG. 27A. FIG. 51 illustrates example embodiments where the generating operation 2760 may include at least one additional operation. Additional operations may include an operation 5102.

The operation 2502 illustrates generating a loading distribution by performing at least one perturbation process on the set of regions of the simulated BOC core in order to determine a subsequent set of positions for the set of regions within the simulated BOC core, wherein the subsequent set of positions reduce a deviation metric between the at least one reactor core distribution of the simulated BOC core and the received at least one reactor core parameter distribution associated with a state of a core of a nuclear reactor below a selected tolerance level. For example, as shown in FIGS. 1A through 2D, the one or more processors 106 of the controller 102 may generate a loading distribution by performing at least one perturbation process on the set of regions 122 of the simulated BOC core 120 in order to determine a subsequent set of positions for the set of regions 122 within the simulated BOC core 120. Further, the subsequent set of positions may serve to reduce a deviation metric between the at least one reactor core distribution of the simulated BOC core and the received at least one reactor core parameter distribution associated with a state of a core of a nuclear reactor below a selected tolerance level. For instance, as shown in FIG. 1P, the perturbation procedure 170 may iteratively vary the positions of the regions 122 within the simulated core 120 until a deviation metric (e.g., difference, spatially averaged difference, maximum difference, minimum difference, aggregated global deviation metric and the like) between the one or more calculated reactor core distributions of the simulated BOC core and the received one or more reactor core parameter distributions associated with a state of a core of a reference nuclear reactor is reduced below a selected tolerance level.

FIG. 52A illustrates alternative embodiments of the example operational flow 2700 of FIG. 27A. FIG. 52A illustrates example embodiments where the arranging operation 2770 may include at least one additional operation. Additional operations may include an operation 5202 and/or 5204.

The operation 5202 illustrates, responsive to the loading distribution determination, arranging at least one fuel assembly of the core of the nuclear reactor according to the subsequent set of simulated positions of the set of regions of the simulated BOC nuclear reactor core. For example, as shown in FIGS. 1A through 2D, upon determining the loading distribution of the simulated BOC core 120, one or more processors 106 of the controller 102 may direct the fuel handler 204 to arrange one or more fuel assemblies 208 of the reactor core 202 of reactor 101 in accordance with the subsequent set of simulated positions of the set of regions 122 of the simulated BOC nuclear reactor core 120. For instance, one or more processors 106 of the controller 102 may transmit a command signal 207 indicative of the set of subsequent set of positions of the set of regions of the simulated BOC nuclear reactor core 120 to the fuel handler controller 206. In turn, the fuel handler controller 206 may transmit a command signal 209 encoded with instructions necessary for the fuel handler 204 to arrange one or more fuel assemblies 208 of the reactor core 202 of reactor 101 in accordance with the subsequent set of positions of the set of regions 122 of the simulated BOC nuclear reactor core 120.

In another embodiment, the operation 5204 illustrates, responsive to a user input, arranging at least one fuel assembly of the core of the nuclear reactor according to the subsequent set of simulated positions of the set of regions 122 of the simulated BOC nuclear reactor core 120. For example, as shown in FIGS. 1A through 2D, in response to a signal from a user input device 118, one or more processors 106 of the controller 102 may direct the fuel handler 204 to arrange one or more fuel assemblies 208 of the reactor core 202 of reactor 101 in accordance with the subsequent set of simulated positions of the set of regions 122 of the simulated BOC nuclear reactor core 120. For instance, upon receiving a command signal from a user input device 118 indicative of a user selection, one or more processors 106 of the controller 102 may transmit a command signal 207 indicative of the subsequent set of simulated positions of the set of regions 122 of the simulated BOC nuclear reactor core 120 to the fuel handler controller 206. In turn, the fuel handler controller 206 may transmit a command signal 209 encoded with instructions necessary for the fuel handler 204 to arrange one or more fuel assemblies 208 of the reactor core 202 of reactor 101 in accordance with the subsequent set of simulated positions of the set of regions 122 of the simulated BOC nuclear reactor core 120.

Figure 52B:
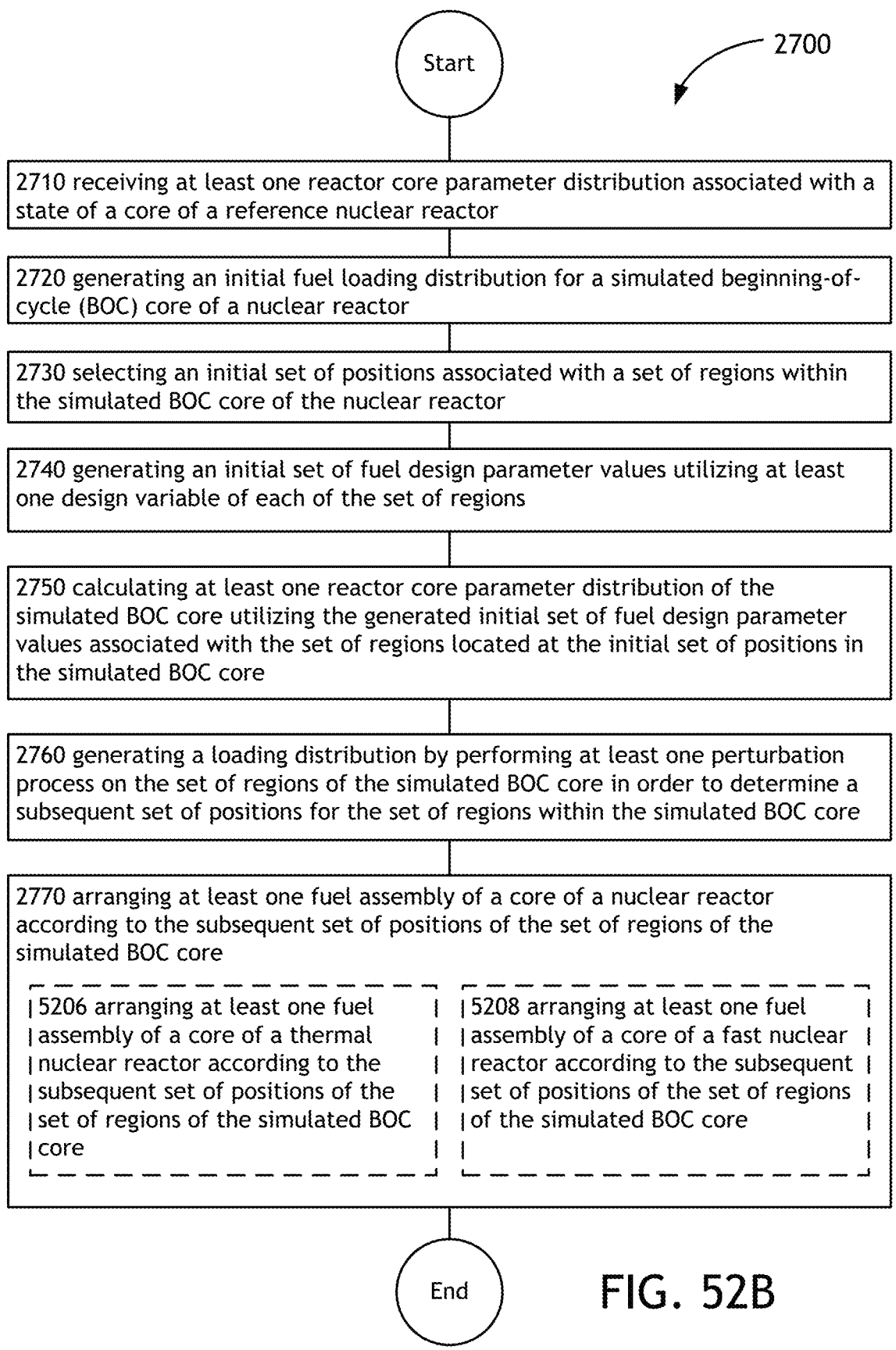

FIG. 52B illustrates alternative embodiments of the example operational flow 2700 of FIG. 27A. FIG. 52B illustrates example embodiments where the arranging operation 2770 may include at least one additional operation. Additional operations may include an operation 5206 and/or 5208.

The operation 5206 illustrates arranging at least one fuel assembly of a core of a thermal nuclear reactor according to the set of simulated positions of the set of regions of the simulated BOC nuclear reactor core. For example, as shown in FIGS. 1A through 2D, one or more processors 106 of the controller 102 may direct the fuel handler 204 to arrange one or more fuel assemblies 208 of the reactor core 202 of a thermal nuclear reactor in accordance with the subsequent set of simulated positions of the set of regions 122 of the simulated BOC nuclear reactor core 120. For instance, one or more processors 106 of the controller 102 may transmit a command signal 207 indicative of the subsequent set of simulated positions of the set of regions 122 of the simulated BOC nuclear reactor core 120 to the fuel handler controller 206. In turn, the fuel handler controller 206 may transmit a command signal 209 encoded with instructions necessary for the fuel handler 204 to arrange one or more fuel assemblies 208 of the reactor core 202 of a thermal nuclear reactor in accordance with the subsequent set of simulated positions of the set of regions 122 of the simulated BOC nuclear reactor core 120.

The operation 5208 illustrates arranging at least one fuel assembly of a core of a fast nuclear reactor according to the set of simulated positions of the set of regions of the simulated BOC nuclear reactor core. For example, as shown in FIGS. 1A through 2D, one or more processors 106 of the controller 102 may direct the fuel handler 204 to arrange one or more fuel assemblies 208 of the reactor core 202 of a fast nuclear reactor in accordance with the subsequent set of simulated positions of the set of regions 122 of the simulated BOC nuclear reactor core 120. For instance, one or more processors 106 of the controller 102 may transmit a command signal 207 indicative of the subsequent set of simulated positions of the set of regions 122 of the simulated BOC nuclear reactor core 120 to the fuel handler controller 206. In turn, the fuel handler controller 206 may transmit a command signal 209 encoded with instructions necessary for the fuel handler 204 to arrange one or more fuel assemblies 208 of the reactor core 202 of a fast nuclear reactor in accordance with the subsequent set of simulated positions of the set of regions 122 of the simulated BOC nuclear reactor core 120.

Figure 52C:
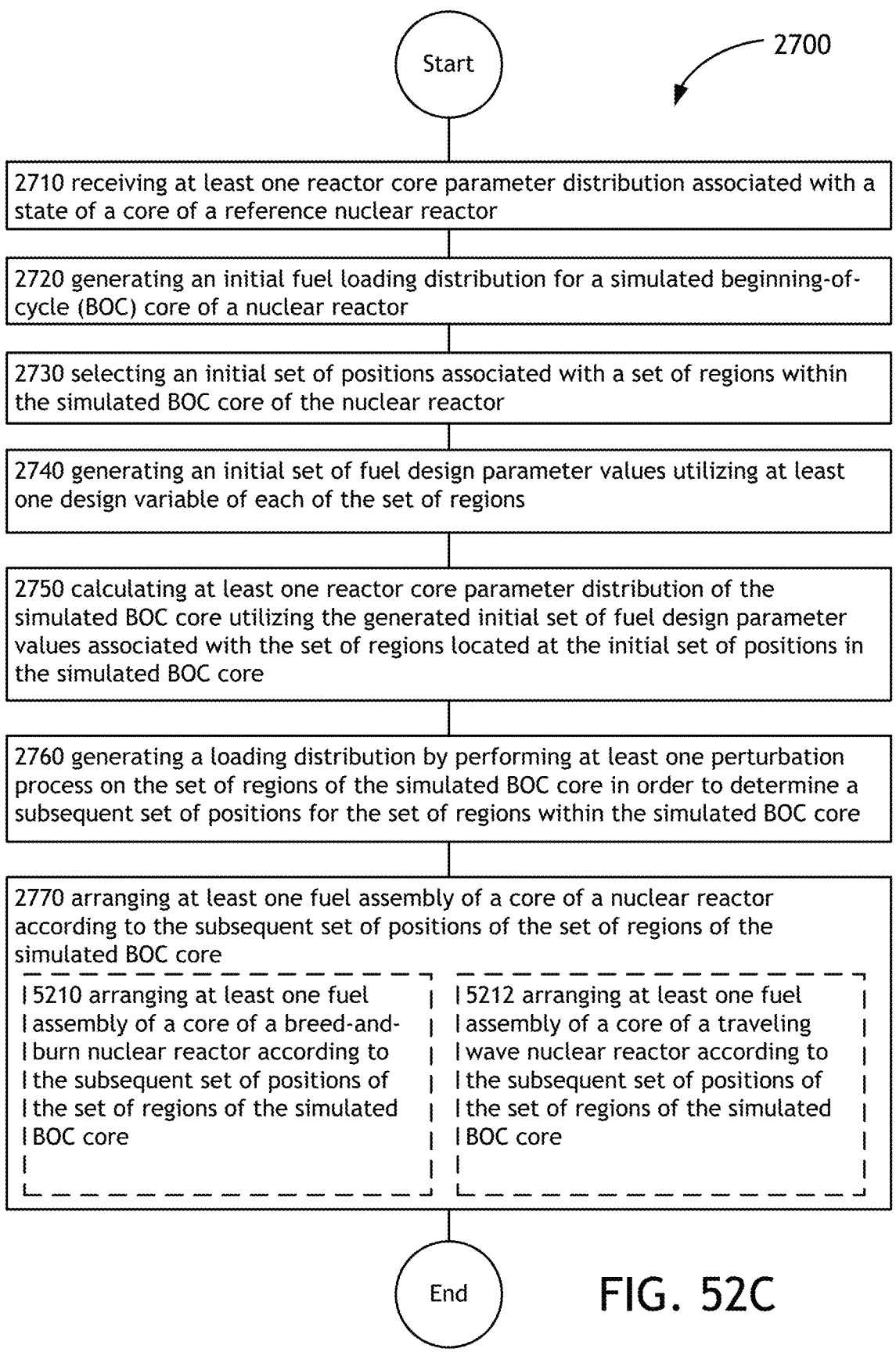

FIG. 52C illustrates alternative embodiments of the example operational flow 2700 of FIG. 27A. FIG. 52C illustrates example embodiments where the arranging operation 2770 may include at least one additional operation. Additional operations may include an operation 5210 and/or 5212.

The operation 5210 illustrates arranging at least one fuel assembly of a core of a breed-and-burn nuclear reactor according to the set of simulated positions of the set of regions of the simulated BOC nuclear reactor core. For example, as shown in FIGS. 1A through 2D, one or more processors 106 of the controller 102 may direct the fuel handler 204 to arrange one or more fuel assemblies 208 of the reactor core 202 of a breed-and-burn nuclear reactor in accordance with the subsequent set of simulated positions of the set of regions 122 of the simulated BOC nuclear reactor core 120. For instance, one or more processors 106 of the controller 102 may transmit a command signal 207 indicative of the subsequent set of simulated positions of the set of regions 122 of the simulated BOC nuclear reactor core 120 to the fuel handler controller 206. In turn, the fuel handler controller 206 may transmit a command signal 209 encoded with instructions necessary for the fuel handler 204 to arrange one or more fuel assemblies 208 of the reactor core 202 of a breed-and-burn nuclear reactor in accordance with the subsequent set of simulated positions of the set of regions 122 of the simulated BOC nuclear reactor core 120.

In another embodiment, the operation 5212 illustrates arranging at least one fuel assembly of a core of a traveling wave nuclear reactor according to the set of simulated positions of the set of regions of the simulated BOC nuclear reactor core. For example, as shown in FIGS. 1A through 2D, one or more processors 106 of the controller 102 may direct the fuel handler 204 to arrange one or more fuel assemblies 208 of the reactor core 202 of a traveling wave nuclear reactor in accordance with the subsequent set of simulated positions of the set of regions 122 of the simulated BOC nuclear reactor core 120. For instance, one or more processors 106 of the controller 102 may transmit a command signal 207 indicative of the subsequent set of simulated positions of the set of regions 122 of the simulated BOC nuclear reactor core 120 to the fuel handler controller 206. In turn, the fuel handler controller 206 may transmit a command signal 209 encoded with instructions necessary for the fuel handler 204 to arrange one or more fuel assemblies 208 of the reactor core 202 of a traveling wave nuclear reactor in accordance with the subsequent set of simulated positions of the set of regions 122 of the simulated BOC nuclear reactor core 120.

Figure 52D:
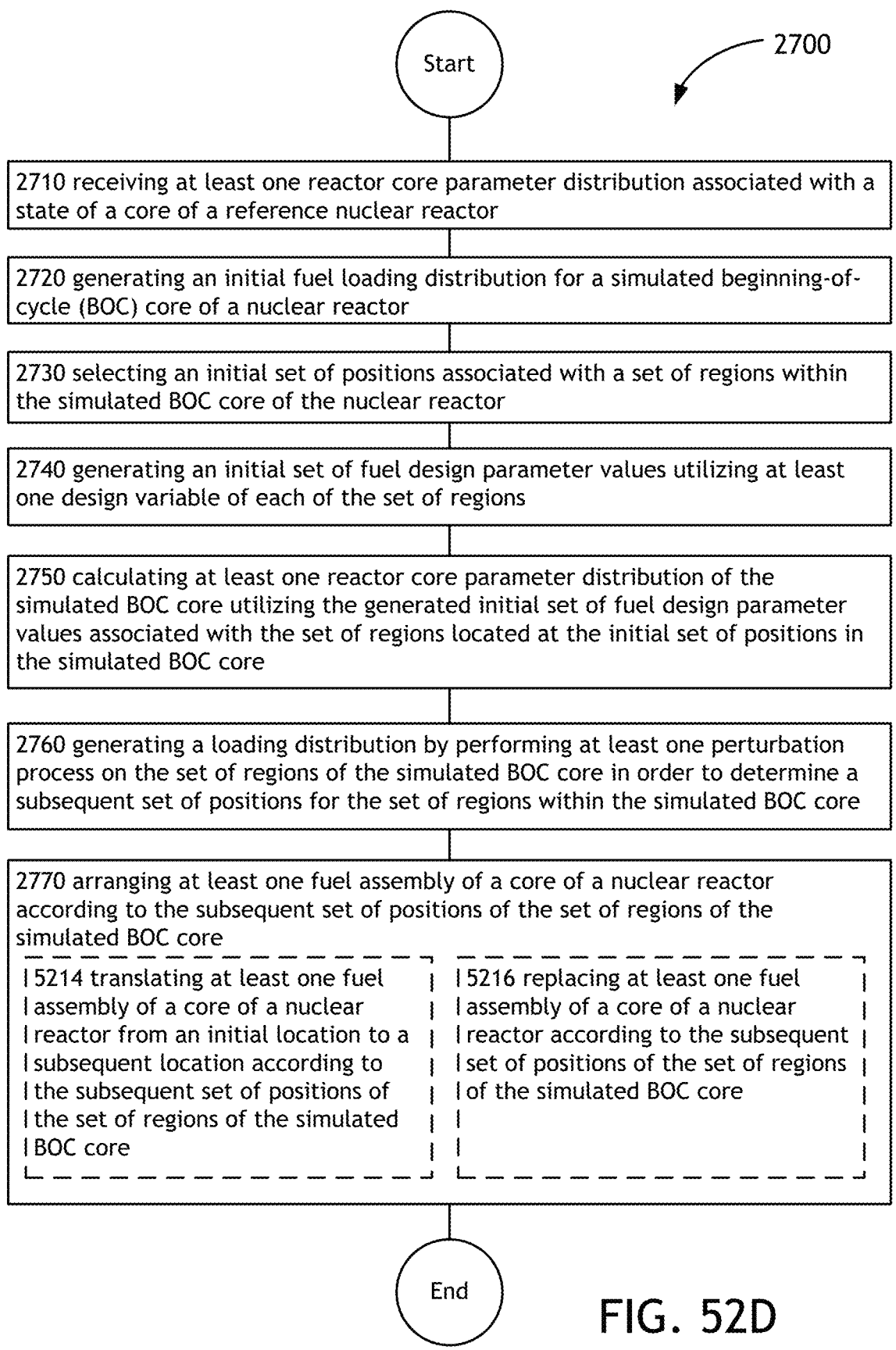

FIG. 52D illustrates alternative embodiments of the example operational flow 2700 of FIG. 27A. FIG. 52D illustrates example embodiments where the arranging operation 2770 may include at least one additional operation. Additional operations may include an operation 5214 and/or 5216.

The operation 5214 illustrates translating at least one fuel assembly of the core of the nuclear reactor from an initial location to a subsequent location according to the subsequent set of positions of the set of regions of the simulated BOC core. For example, as shown in FIGS. 1A through 2D, one or more processors 106 of the controller 102 may direct the fuel handler 204 to translate one or more fuel assemblies 208 of the core 202 of the nuclear reactor 101 from an initial location to a subsequent location according to the subsequent set of positions of the set of regions 122 of the simulated BOC nuclear reactor core 120. For instance, one or more processors 106 of the controller 102 may direct the gripper 214 of fuel handler 204 to withdraw a selected fuel assembly 212 and move the selected fuel assembly to a new location within the nuclear reactor core 202 according to the subsequent set of simulated positions of the set of regions 122 of the simulated BOC nuclear reactor core 120.

In another embodiment, the operation 5216 illustrates replacing at least one fuel assembly of the core of the nuclear reactor according to the subsequent set of simulated positions of the set of regions of the simulated BOC core. For example, as shown in FIGS. 1A through 2D, one or more processors 106 of the controller 102 may direct the fuel handler 204 to replace one or more fuel assemblies 208 of the core 202 of the nuclear reactor 101 according to the subsequent set of positions of the set of regions 122 of the simulated BOC nuclear reactor core 120. For instance, one or more processors 106 of the controller 102 may direct the gripper 214 of fuel handler 204 to withdraw a selected fuel assembly 212 and move the selected fuel assembly to a storage location outside of the reactor core 202. In turn, the one or more processors 106 may direct the gripper 214 (or an additional gripper) to insert a new fuel assembly into the reactor core 202 at the location of the removed fuel assembly 212. It is noted herein that by repeating this process the system 200 may form (or re-assemble) the reactor core 202 in accordance with the set of simulated positions of the set of regions of the simulated BOC nuclear reactor core.

Figure 53:
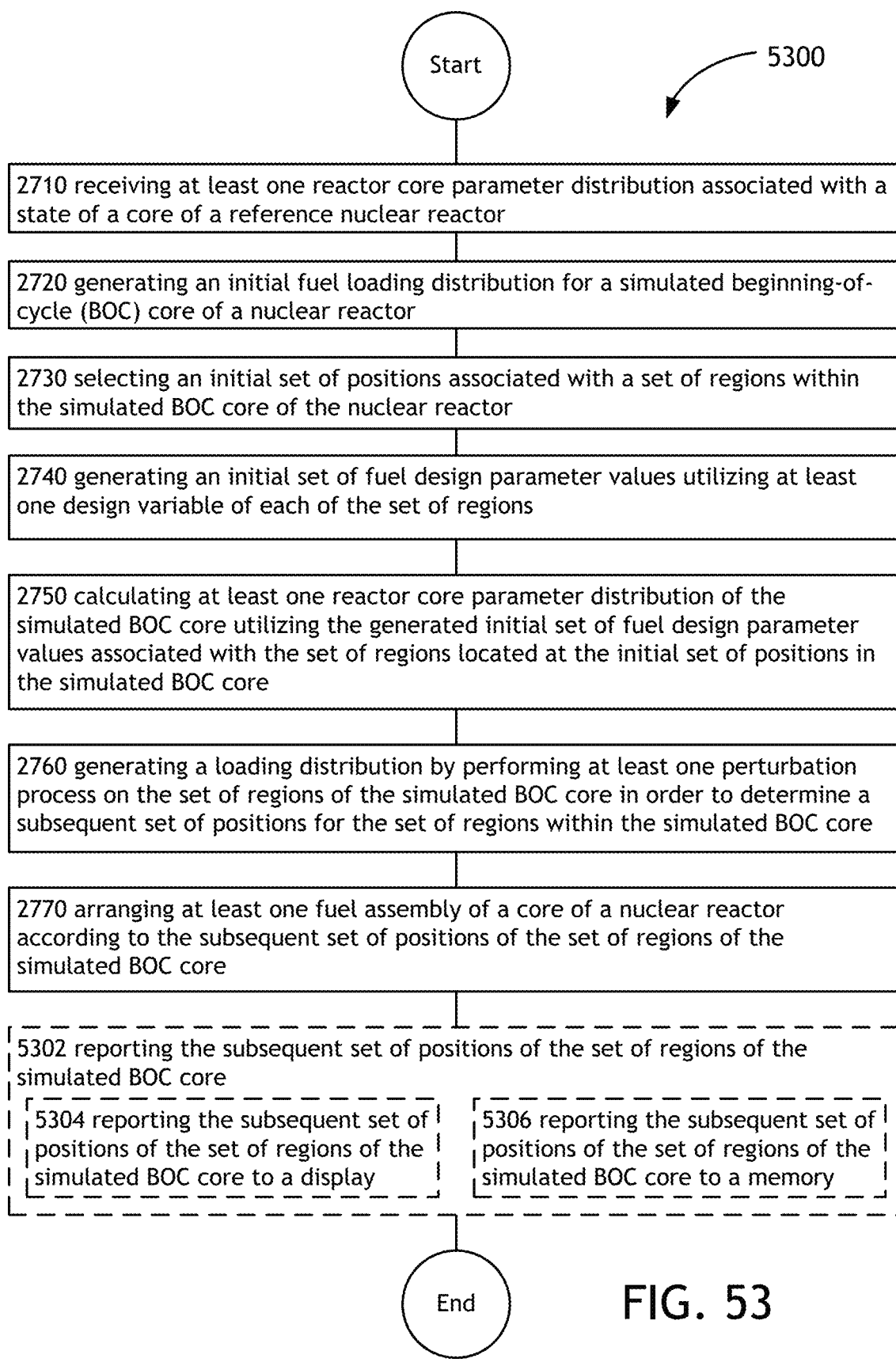

FIG. 53 illustrates an operational flow 5300 representing example operations related to arranging one or more fuel assemblies of a nuclear reactor core according to a generated nuclear reactor core loading distribution. FIG. 53 illustrates an example embodiment where the example operational flow 5300 of FIG. 53 may include at least one additional operation. Additional operations may include reporting operations 5302, 5304 and/or 5306.

The operation 5302 illustrates reporting the subsequent set of positions of the set of regions of the simulated BOC core. For example, as shown in FIGS. 1A through 2D, the one or more processors 106 of controller 102 may report the subsequent set of positions of the set of regions of the simulated BOC core to a destination. For instance, the one or more processors 106 of controller 102 may transmit one or more signals indicative of the subsequent set of positions of the set of regions of the simulated BOC core to a destination.

In another embodiment, the operation 5304 illustrates reporting the subsequent set of positions of the set of regions of the simulated BOC core to a display. For example, as shown in FIGS. 1A through 2D, the one or more processors 106 of controller 102 may report the subsequent set of positions of the set of regions of the simulated BOC core 120 to a display (e.g., audio or visual display). For instance, the one or more processors 106 of controller 102 may transmit one or more signals indicative of the subsequent set of positions of the set of regions of the simulated BOC core 120 to a display unit 116.

In another embodiment, the operation 5306 illustrates reporting the subsequent set of positions of the set of regions of the simulated BOC core to a memory. For example, as shown in FIGS. 1A through 2D, the one or more processors 106 of controller 102 may report the subsequent set of positions of the set of regions of the simulated BOC core to a memory device. For instance, the one or more processors 106 of controller 102 may transmit one or more signals indicative of the subsequent set of positions of the set of regions of the simulated BOC core 120 to a memory device 108.

Figure 54:
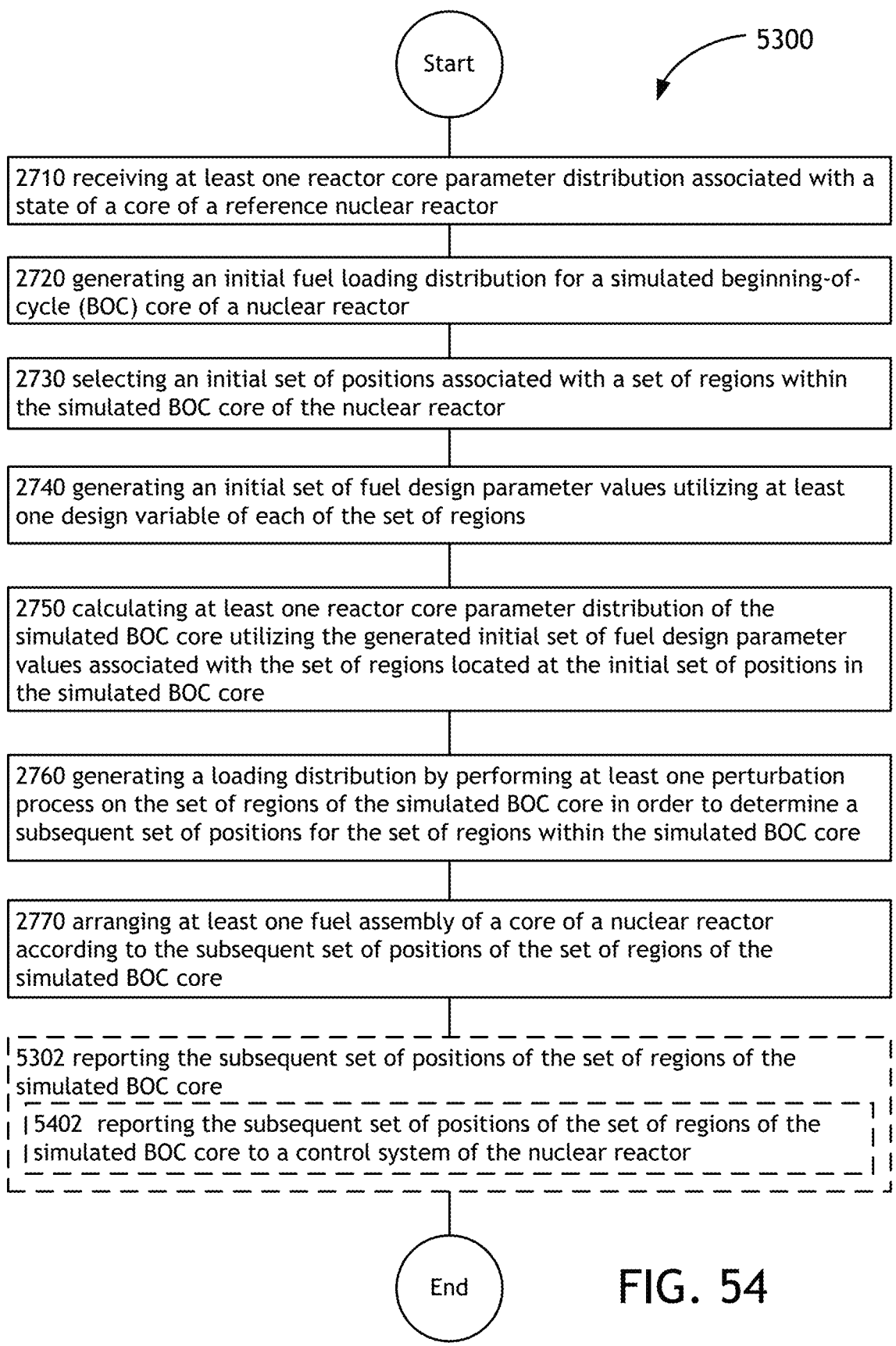

FIG. 54 illustrates alternative embodiments of the example operational flow 5300 of FIG. 53. FIG. 54 illustrates example embodiments where the reporting operation 5302 may include at least one additional operation. Additional operations may include an operation 5402.

The operation 5402 illustrates reporting the subsequent set of positions of the set of regions of the simulated BOC core to a control system of the nuclear reactor. For example, as shown in FIGS. 1A through 2D, the one or more processors 106 of controller 102 may report the subsequent set of positions of the set of regions of the simulated BOC core 120 to a control system 180 of the nuclear reactor 101. For instance, the one or more processors 106 of controller 102 may transmit one or more signals indicative of the subsequent set of positions of the set of regions of the simulated BOC core 120 to a control system 180 of the nuclear reactor 101.

Figure 55:
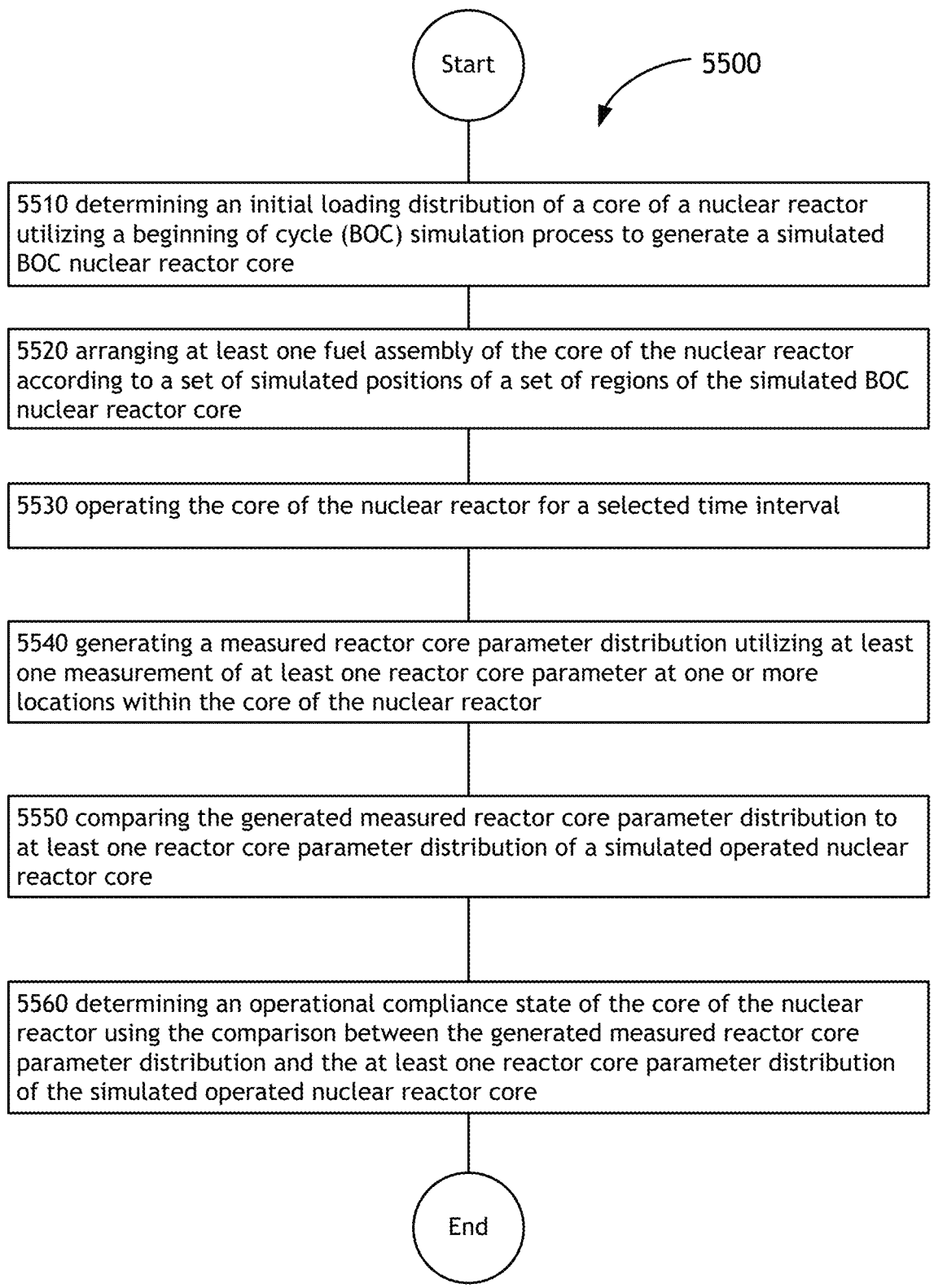
FIG. 55 is a high-level flowchart of a method for determining a state of operation compliance of a nuclear reactor core.

FIG. 55 illustrates an operational flow 5500 representing example operations related to determining an operation compliance state of a core of a nuclear reactor. In FIG. 55 and in following figures that include various examples of operational flows, discussion and explanation may be provided with respect to the above-described examples of FIGS. 1A through 3D, and/or with respect to other examples and contexts. However, it should be understood that the operational flows may be executed in a number of other environments and contexts, and/or in modified versions of FIGS. 1A through 3D. Also, although the various operational flows are presented in the sequence(s) illustrated, it should be understood that the various operations may be performed in other orders than those which are illustrated, or may be performed concurrently.

After a start operation, the operational flow 5500 moves to an initial loading distribution determining operation 5510. The determining operation 5510 depicts determining an initial loading distribution of a core of a nuclear reactor utilizing a BOC simulation process to generate a simulated BOC nuclear reactor core. For example, as shown in FIGS. 1A through 3D, one or more processors 106 of the controller 102 are configured to determine an initial loading distribution of a core of a nuclear reactor utilizing a BOC simulation process to generate a simulated BOC nuclear reactor core 120. For instance, the one or more processors 106 of controller 102 may implement a process, such as, but not limited to process 400 of the present disclosure in order to generate a simulated BOC nuclear reactor core.

Then, arranging step operation 5520 depicts arranging at least one fuel assembly of the core of the nuclear reactor according to a set of simulated positions of a set of regions of the simulated BOC nuclear reactor core. For example, as shown in FIGS. 1A through 3D, one or more processors 106 of the controller 102 may direct the fuel handler 204 of system 300 to arrange (e.g., translate or replace) one or more fuel assemblies 208 of reactor core 202 according to a set of simulated positions of a set of regions of the simulated BOC nuclear reactor core 120.

Then, core operating operation 5530 depicts operating the core of the nuclear reactor for a selected time interval. For example, as shown FIGS. 1A through 3D, the nuclear reactor system 300 may operate the core 202 of nuclear reactor 101. Following operation of the reactor core 202 for a selected time interval, the one or more processors 106 of the controller 102 may execute a core measuring step.

Then, measured core parameter distribution generating operation 5540 depicts generating a measured reactor core parameter distribution utilizing at least one measurement of at least one reactor core parameter at one or more locations within the core of the nuclear reactor. For example, as shown in FIGS. 1A through 3D, the system 300 may include a reactor core measurement system 302 configured to measure one or more reactor core parameters at one or more locations of the nuclear reactor core 202. Then, based on the measurements from the reactor core measurement system 302, the one or more processors 106 of the controller 102 may generate a measured reactor core parameter distribution. For instance, based on the measurements from the reactor core measurement system 302, the one or more processors 106 of controller 102 may generate at least one of a measured power density distribution, a measured power density rate-of-change distribution, a measured reactivity distribution, a measured reactivity rate-of-change distribution.

Then, comparing operation 5550 depicts comparing the generated measured reactor core parameter distribution to at least one reactor core parameter distribution of a simulated operated nuclear reactor core. For example, FIGS. 1A through 3D, the one or more processors 106 of controller 102 may generate a simulated operated nuclear reactor core representative of an operated state of the initial simulated nuclear reactor core 120. In turn, the one or more processors 106 of the controller 102 may compare one or more generated measured reactor core parameter distributions to one or more reactor core parameter distribution of the simulated operated nuclear reactor core.

Then, operation compliance determining step 5560 depicts determining an operational compliance state of the core of the nuclear reactor using the comparison between the generated measured reactor core parameter distribution and the at least one reactor core parameter distribution of the simulated operated nuclear reactor core. For example, FIGS. 1A through 3D, the one or more processors 106 of the controller 102 determine an operational compliance state of the core 202 of the nuclear reactor 101 based on the results of the comparison between the one or more generated measured reactor core parameter distributions and the one or more reactor core parameter distributions of the simulated operated nuclear reactor core.

Figure 56:
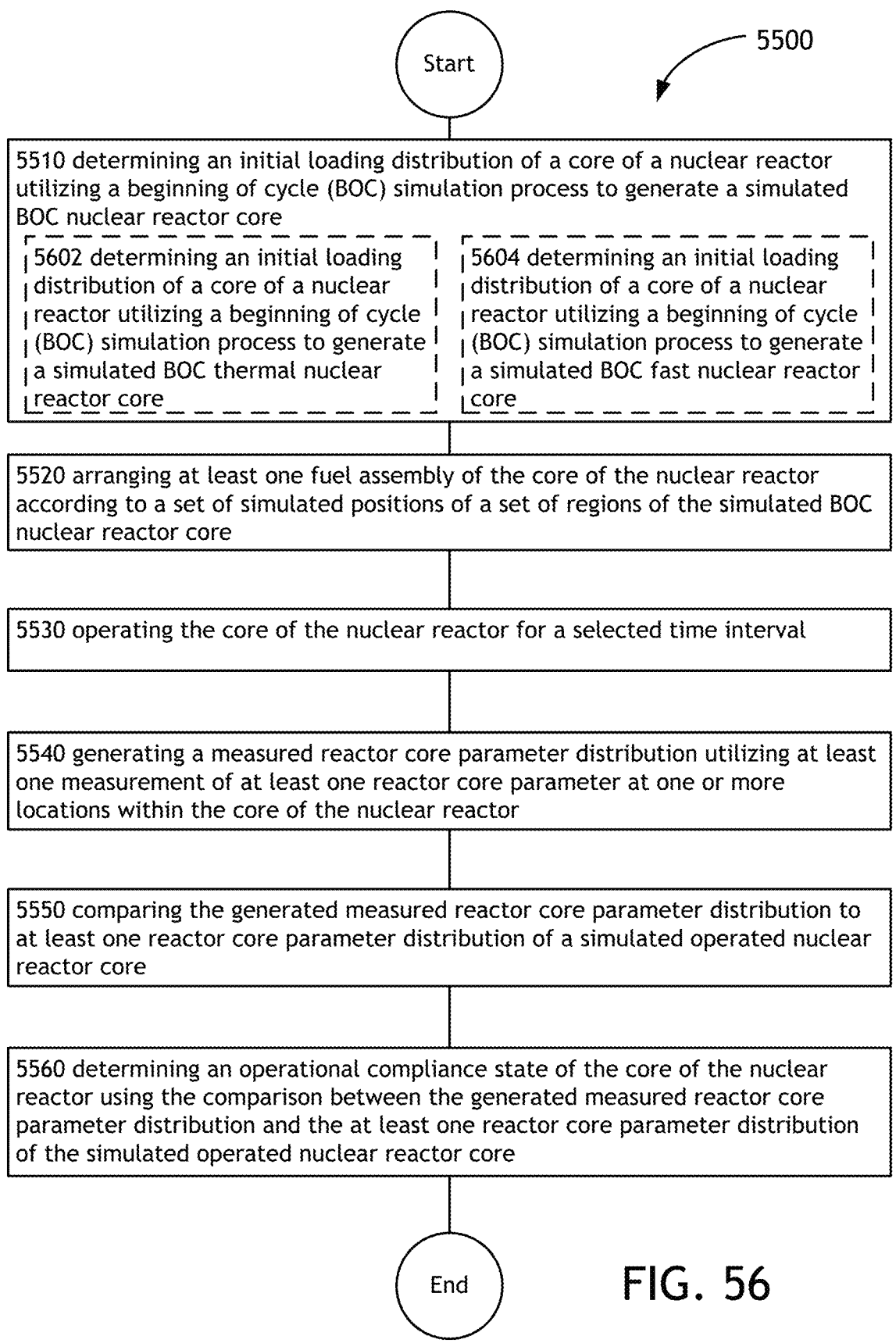

FIG. 56 illustrates alternative embodiments of the example operational flow 5500 of FIG. 55. FIG. 56 illustrates example embodiments where the initial loading distribution determining operation 5510 may include at least one additional operation. Additional operations may include operation 5602 and/or 5604.

The operation 5602 illustrates determining an initial loading distribution of a core of a nuclear reactor utilizing a BOC simulation process to generate a simulated BOC thermal nuclear reactor core. For example, as shown in FIGS. 1A through 3D, one or more processors 106 of the controller 102 are configured to determine an initial loading distribution of a core of a nuclear utilizing a BOC simulation process to generate a simulated BOC thermal nuclear reactor core. For instance, the one or more processors 106 of controller 102 may implement a process, such as, but not limited to process 400 of the present disclosure in order to generate a simulated BOC thermal nuclear reactor core.

In another embodiment, the operation 5604 illustrates determining an initial loading distribution of a core of a nuclear reactor utilizing a BOC simulation process to generate a simulated BOC fast nuclear reactor core. For example, as shown in FIGS. 1A through 3D, one or more processors 106 of the controller 102 are configured to determine an initial loading distribution of a core of a nuclear utilizing a BOC simulation process to generate a simulated BOC fast nuclear reactor core. For instance, the one or more processors 106 of controller 102 may implement a process, such as, but not limited to process 400 of the present disclosure in order to generate a simulated BOC fast nuclear reactor core.

Figure 57:
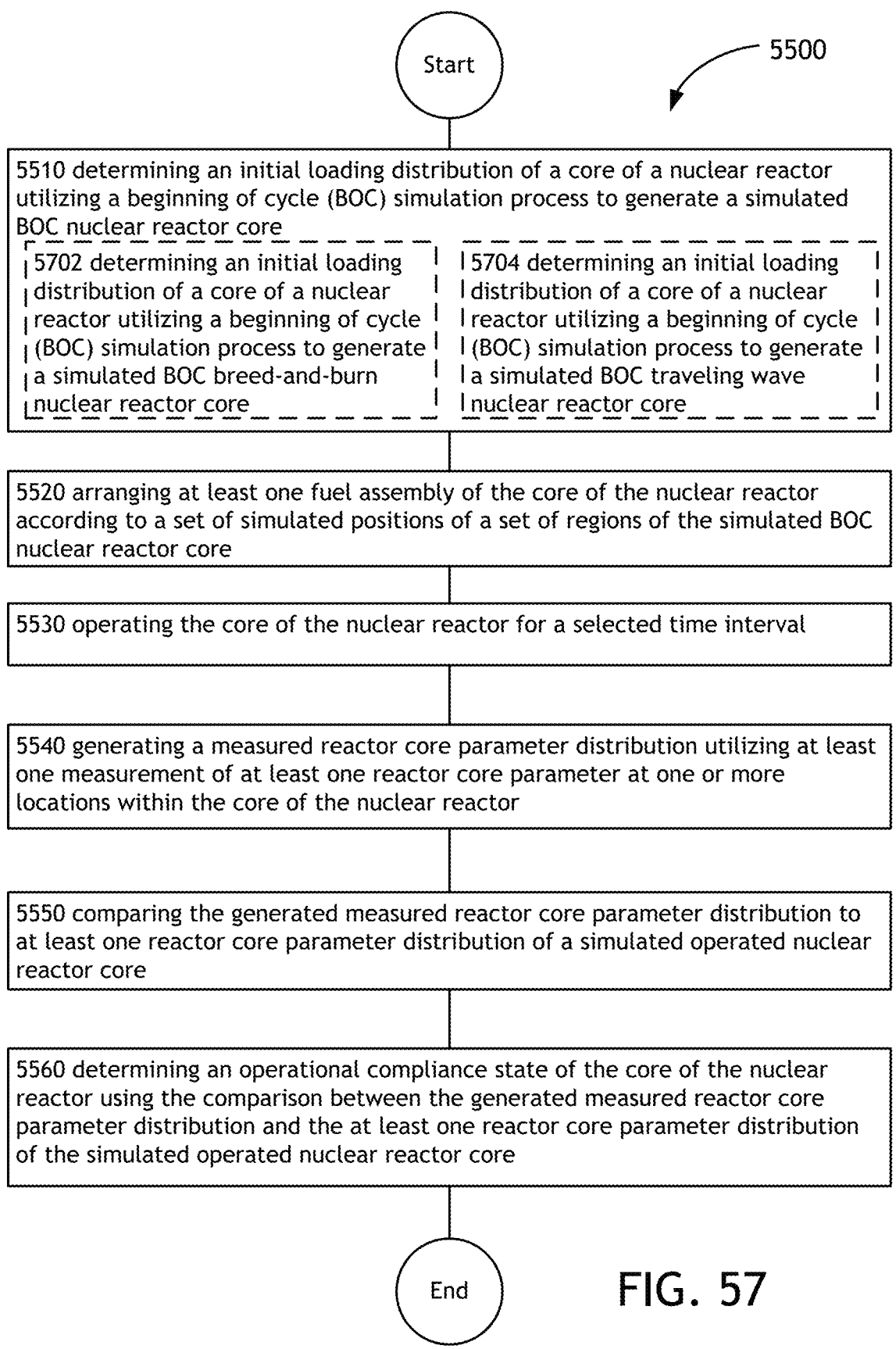

FIG. 57 illustrates alternative embodiments of the example operational flow 5500 of FIG. 55. FIG. 57 illustrates example embodiments where the initial loading distribution determining operation 5510 may include at least one additional operation. Additional operations may include operation 5702 and/or 5704.

The operation 5702 illustrates determining an initial loading distribution of a core of a nuclear reactor utilizing a BOC simulation process to generate a simulated BOC breed-and-burn nuclear reactor core. For example, as shown in FIGS. 1A through 3D, one or more processors 106 of the controller 102 are configured to determine an initial loading distribution of a core of a nuclear utilizing a BOC simulation process to generate a simulated BOC breed-and-burn nuclear reactor core. For instance, the one or more processors 106 of controller 102 may implement a process, such as, but not limited to process 400 of the present disclosure in order to generate a simulated BOC breed-and-burn nuclear reactor core.

In another embodiment, the operation 5704 illustrates determining an initial loading distribution of a core of a nuclear reactor utilizing a BOC simulation process to generate a simulated BOC traveling wave nuclear reactor core. For example, as shown in FIGS. 1A through 3D, one or more processors 106 of the controller 102 are configured to determine an initial loading distribution of a core of a nuclear utilizing a BOC simulation process to generate a simulated BOC traveling wave nuclear reactor core. For instance, the one or more processors 106 of controller 102 may implement a process, such as, but not limited to process 400 of the present disclosure in order to generate a simulated BOC traveling wave nuclear reactor core.

Figure 58:
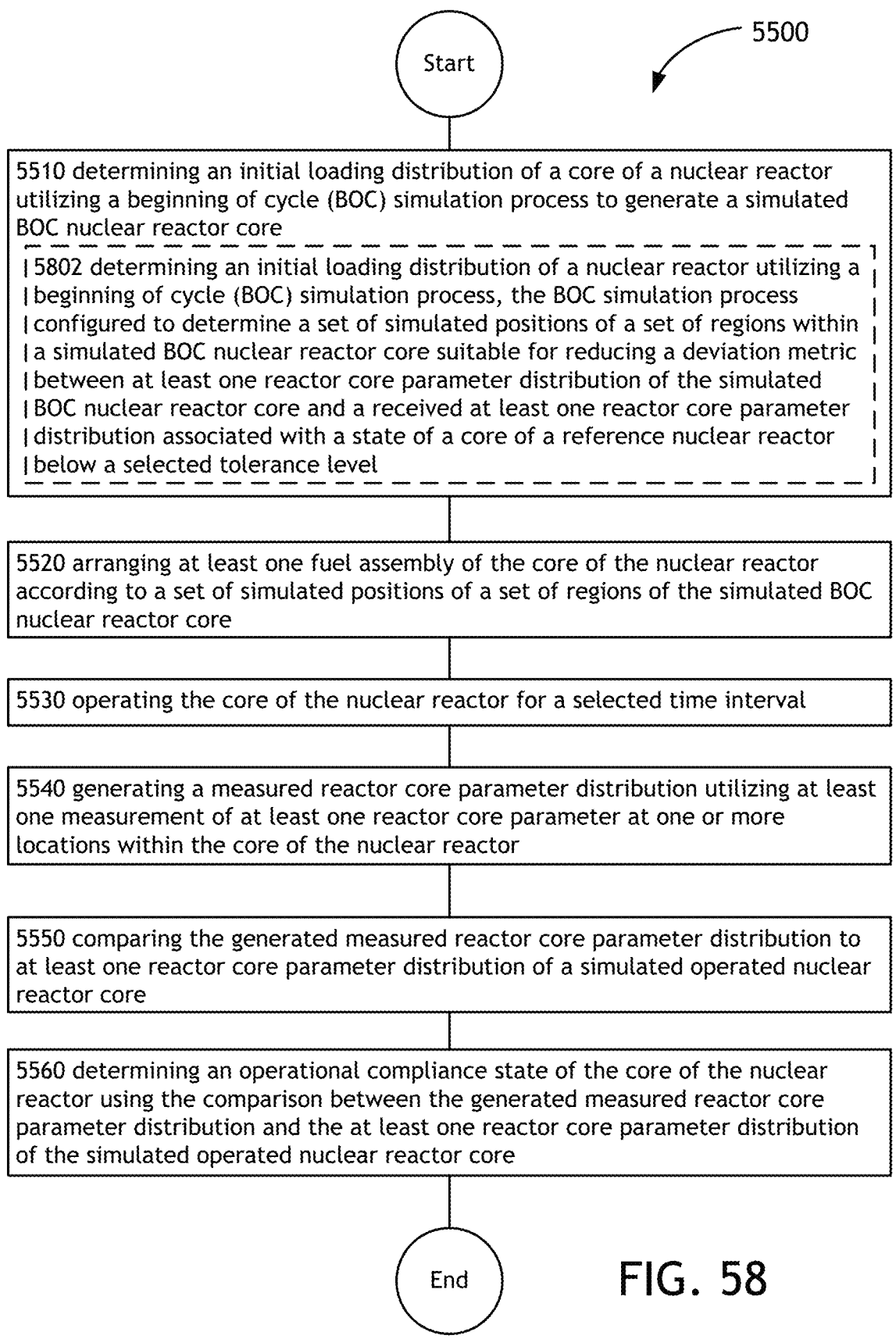

FIG. 58 illustrates alternative embodiments of the example operational flow 5500 of FIG. 55. FIG. 58 illustrates example embodiments where the initial loading distribution determining operation 5510 may include at least one additional operation. Additional operations may include operation 5802.

The operation 5802 illustrates determining an initial loading distribution of a nuclear reactor utilizing a beginning of cycle (BOC) simulation process, the BOC simulation process configured to determine a set of simulated positions of a set of regions within a simulated BOC nuclear reactor core suitable for reducing a deviation metric between at least one reactor core parameter distribution of the simulated BOC nuclear reactor core and a received at least one reactor core parameter distribution associated with a state of a core of a reference nuclear reactor below a selected tolerance level. For example, as shown in FIGS. 1A through 3D, one or more processors 106 of the controller 102 are configured to determine an initial loading distribution of a nuclear reactor utilizing a beginning of cycle (BOC) simulation process, the BOC simulation process configured to determine a set of simulated positions of a set of regions within a simulated BOC nuclear reactor core suitable for reducing a deviation metric between at least one reactor core parameter distribution of the simulated BOC nuclear reactor core and a received at least one reactor core parameter distribution associated with a state of a core of a reference nuclear reactor below a selected tolerance level.

Figure 59A:
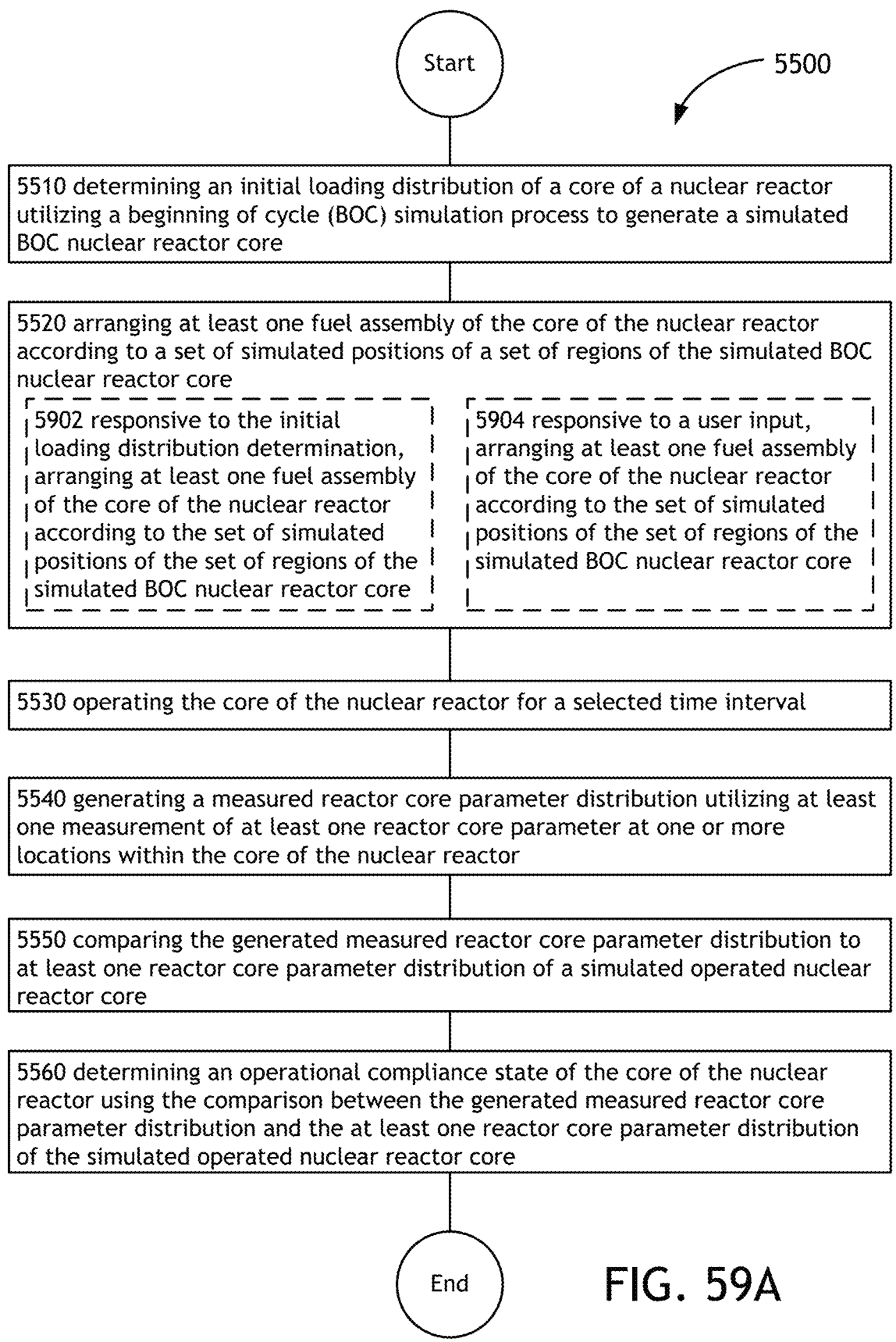

FIG. 59A illustrates alternative embodiments of the example operational flow 5500 of FIG. 55. FIG. 59A illustrates example embodiments where the arranging operation 5520 may include at least one additional operation. Additional operations may include operation 5902 and/or 5904.

The operation 5902 illustrates, responsive to the initial loading distribution determination, arranging at least one fuel assembly of the core of the nuclear reactor according to the set of simulated positions of the set of regions of the simulated BOC nuclear reactor core. For example, as shown in FIGS. 1A through 3D, upon determining the initial loading distribution of the simulated BOC core (e.g., simulated core 120), one or more processors 106 of the controller 102 may direct the fuel handler 204 to arrange one or more fuel assemblies 208 of the reactor core 202 of reactor 101 in accordance with the set of simulated positions of the set of regions of the simulated BOC nuclear reactor core. For instance, upon determining the initial loading distribution of the simulated BOC core, one or more processors 106 of the controller 102 may transmit a command signal 207 (see FIG. 2A) indicative of the set of simulated positions of the set of regions of the simulated BOC nuclear reactor core to the fuel handler controller 206. In turn, the fuel handler controller 206 may transmit a command signal 209 encoded with instructions necessary for the fuel handler 204 to arrange one or more fuel assemblies 208 of the reactor core 202 of reactor 101 in accordance with the set of simulated positions of the set of regions of the simulated BOC nuclear reactor core.

In another embodiment, the operation 5904 illustrates, responsive to a user input, arranging at least one fuel assembly of the core of the nuclear reactor according to the set of simulated positions of the set of regions of the simulated BOC nuclear reactor core. For example, as shown in FIGS. 1A through 3D, in response to a signal from a user input device 118, one or more processors 106 of the controller 102 may direct the fuel handler 204 to arrange one or more fuel assemblies 208 of the reactor core 202 of reactor 101 in accordance with the set of simulated positions of the set of regions of the simulated BOC nuclear reactor core. For instance, upon receiving a command signal from a user input device 118 indicative of a user selection, one or more processors 106 of the controller 102 may transmit a command signal 207 (see FIG. 2A) indicative of the set of simulated positions of the set of regions of the simulated BOC nuclear reactor core to the fuel handler controller 206. In turn, the fuel handler controller 206 may transmit a command signal 209 encoded with instructions necessary for the fuel handler 204 to arrange one or more fuel assemblies 208 of the reactor core 202 of reactor 101 in accordance with the set of simulated positions of the set of regions of the simulated BOC nuclear reactor core.

Figure 59B:
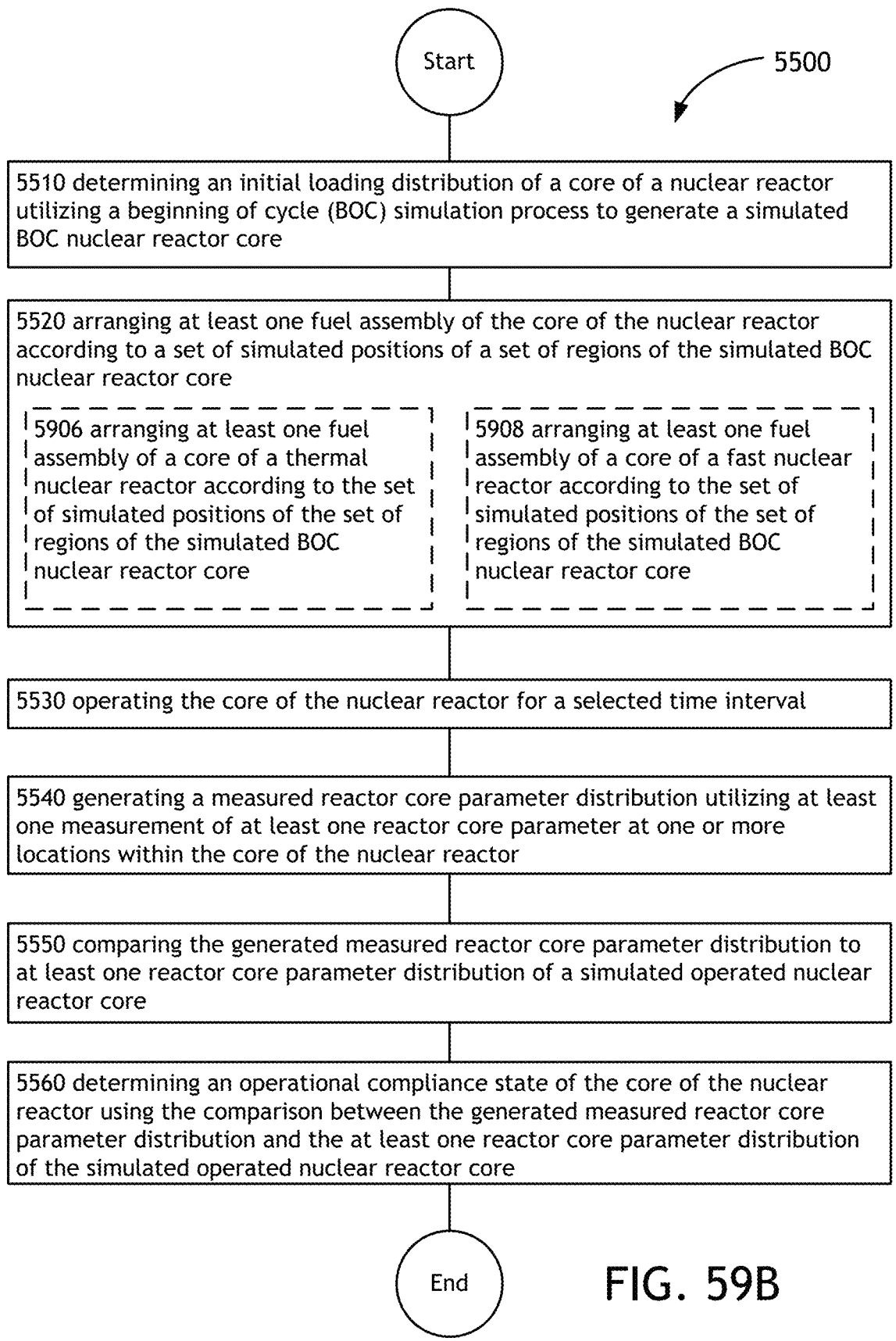

FIG. 59B illustrates alternative embodiments of the example operational flow 5500 of FIG. 55. FIG. 59B illustrates example embodiments where the arranging operation 5520 may include at least one additional operation. Additional operations may include operation 5906 and/or 5908.

The operation 5906 illustrates arranging at least one fuel assembly of a core of a thermal nuclear reactor according to the set of simulated positions of the set of regions of the simulated BOC nuclear reactor core. For example, as shown in FIGS. 1A through 3D, one or more processors 106 of the controller 102 may direct the fuel handler 204 to arrange one or more fuel assemblies 208 of the reactor core 202 of a thermal nuclear reactor in accordance with the set of simulated positions of the set of regions of the simulated BOC nuclear reactor core. For instance, one or more processors 106 of the controller 102 may transmit a command signal 207 indicative of the set of simulated positions of the set of regions of the simulated BOC nuclear reactor core to the fuel handler controller 206. In turn, the fuel handler controller 206 may transmit a command signal 209 encoded with instructions necessary for the fuel handler 204 to arrange one or more fuel assemblies 208 of the reactor core 202 of a thermal nuclear reactor in accordance with the set of simulated positions of the set of regions of the simulated BOC nuclear reactor core.

In another embodiment, the operation 5908 illustrates arranging at least one fuel assembly of a core of a fast nuclear reactor according to the set of simulated positions of the set of regions of the simulated BOC nuclear reactor core. For example, as shown in FIGS. 1A through 3D, one or more processors 106 of the controller 102 may direct the fuel handler 204 to arrange one or more fuel assemblies 208 of the reactor core 202 of a fast nuclear reactor in accordance with the set of simulated positions of the set of regions of the simulated BOC nuclear reactor core. For instance, one or more processors 106 of the controller 102 may transmit a command signal 207 indicative of the set of simulated positions of the set of regions of the simulated BOC nuclear reactor core to the fuel handler controller 206. In turn, the fuel handler controller 206 may transmit a command signal 209 encoded with instructions necessary for the fuel handler 204 to arrange one or more fuel assemblies 208 of the reactor core 202 of a fast nuclear reactor in accordance with the set of simulated positions of the set of regions of the simulated BOC nuclear reactor core.

FIG. 59C illustrates alternative embodiments of the example operational flow 5500 of FIG. 55. FIG. 59C illustrates example embodiments where the arranging operation 5520 may include at least one additional operation. Additional operations may include operation 5910 and/or 5912.

The operation 5910 illustrates arranging at least one fuel assembly of a core of a breed-and-burn nuclear reactor according to the set of simulated positions of the set of regions of the simulated BOC nuclear reactor core. For example, as shown in FIGS. 1A through 3D, one or more processors 106 of the controller 102 may direct the fuel handler 204 to arrange one or more fuel assemblies 208 of the reactor core 202 of a breed-and-burn nuclear reactor in accordance with the set of simulated positions of the set of regions of the simulated BOC nuclear reactor core. For instance, one or more processors 106 of the controller 102 may transmit a command signal 207 indicative of the set of simulated positions of the set of regions of the simulated BOC nuclear reactor core to the fuel handler controller 206. In turn, the fuel handler controller 206 may transmit a command signal 209 encoded with instructions necessary for the fuel handler 204 to arrange one or more fuel assemblies 208 of the reactor core 202 of a breed-and-burn nuclear reactor in accordance with the set of simulated positions of the set of regions of the simulated BOC nuclear reactor core.

In another embodiment, the operation 5912 illustrates arranging at least one fuel assembly of a core of a traveling wave nuclear reactor according to the set of simulated positions of the set of regions of the simulated BOC nuclear reactor core. For example, as shown in FIGS. 1A through 3D, one or more processors 106 of the controller 102 may direct the fuel handler 204 to arrange one or more fuel assemblies 208 of the reactor core 202 of a traveling wave nuclear reactor in accordance with the set of simulated positions of the set of regions of the simulated BOC nuclear reactor core. For instance, one or more processors 106 of the controller 102 may transmit a command signal 207 indicative of the set of simulated positions of the set of regions of the simulated BOC nuclear reactor core to the fuel handler controller 206. In turn, the fuel handler controller 206 may transmit a command signal 209 encoded with instructions necessary for the fuel handler 204 to arrange one or more fuel assemblies 208 of the reactor core 202 of a traveling wave nuclear reactor in accordance with the set of simulated positions of the set of regions of the simulated BOC nuclear reactor core.

FIG. 59D illustrates alternative embodiments of the example operational flow 5500 of FIG. 55. FIG. 59D illustrates example embodiments where the arranging operation 5520 may include at least one additional operation. Additional operations may include operation 5914 and/or 5916.

The operation 5914 illustrates translating at least one fuel assembly of the core of the nuclear reactor from an initial location to a subsequent location according to the set of simulated positions of a set of regions of the simulated BOC nuclear reactor core. For example, as shown in FIGS. 1A through 3D, one or more processors 106 of the controller 102 may direct the fuel handler 204 to translate one or more fuel assemblies 208 of the core 202 of the nuclear reactor 101 from an initial location to a subsequent location according to the set of simulated positions of the set of regions of the simulated BOC nuclear reactor core. For instance, one or more processors 106 of the controller 102 may direct the gripper 214 of fuel handler 204 to withdraw a selected fuel assembly 212 and move the selected fuel assembly to a new location within the nuclear reactor core 202 according to the set of simulated positions of the set of regions of the simulated BOC nuclear reactor core.

In another embodiment, the operation 5916 illustrates replacing at least one fuel assembly of the core of the nuclear reactor according to the set of simulated positions of a set of regions of the simulated BOC nuclear reactor core. For example, as shown in FIGS. 1A through 3D, one or more processors 106 of the controller 102 may direct the fuel handler 204 to replace one or more fuel assemblies 208 of the core 202 of the nuclear reactor 101 according to the set of simulated positions of a set of regions of the simulated BOC nuclear reactor core. For instance, one or more processors 106 of the controller 102 may direct the gripper 214 of fuel handler 204 to withdraw a selected fuel assembly 212 and move the selected fuel assembly to a storage location outside of the reactor core 202. In turn, the one or more processors 106 may direct the gripper 214 (or an additional gripper) to insert a new fuel assembly into the reactor core 202 at the location of the removed fuel assembly 212. It is noted herein that by repeating this process the system 300 may form (or re-assemble) the reactor core 202 in accordance with the set of simulated positions of the set of regions of the simulated BOC nuclear reactor core.

Figure 60:
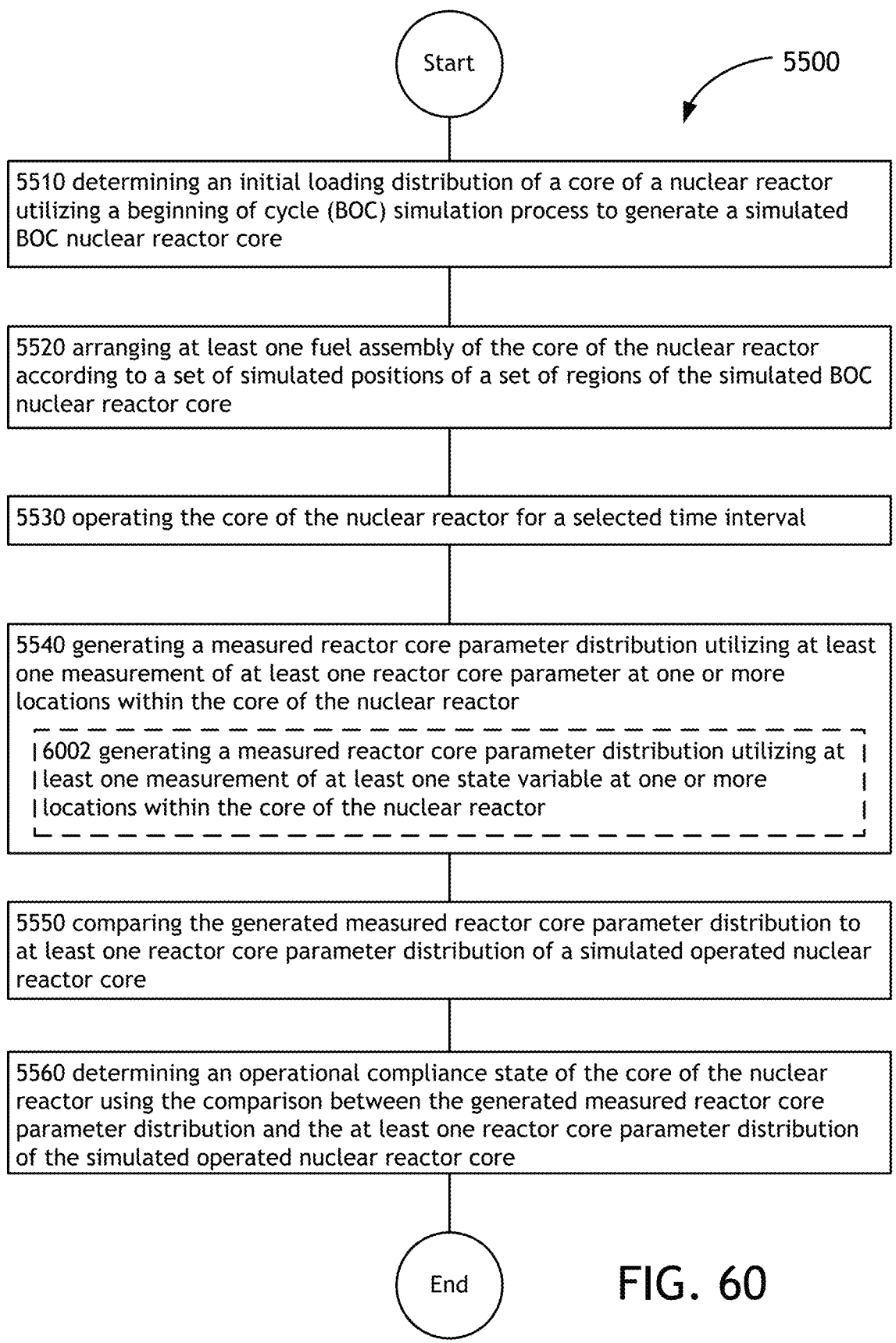

FIG. 60 illustrates alternative embodiments of the example operational flow 5500 of FIG. 55. FIG. 60 illustrates example embodiments where the generating operation 5540 may include at least one additional operation. Additional operations may include operation 6002.

The operation 6002 illustrates generating a measured reactor core parameter distribution utilizing at least one measurement of at least one state variable at one or more locations within the core of the nuclear reactor. For example, as shown in FIGS. 1A through 3D, the system 300 may include a reactor core measurement system 302 configured to measure one or more state variable (e.g., temperature, rate-of-change of temperature, pressure, rate-of-change of pressure, neutron flux, rate-of-change of neutron flux and the like) values at one or more locations within the nuclear reactor core 202. Then, based on the measurements from the reactor core measurement system 302, the one or more processors 106 of the controller 102 may generate a measured reactor core parameter distribution. For instance, based on one or more measured values acquired by the reactor core measurement system 302, the one or more processors 106 of controller 102 may generate at least one of a measured power density distribution, a measured power density rate-of-change distribution, a measured reactivity distribution and a measured reactivity rate-of-change distribution.

Figure 61A:
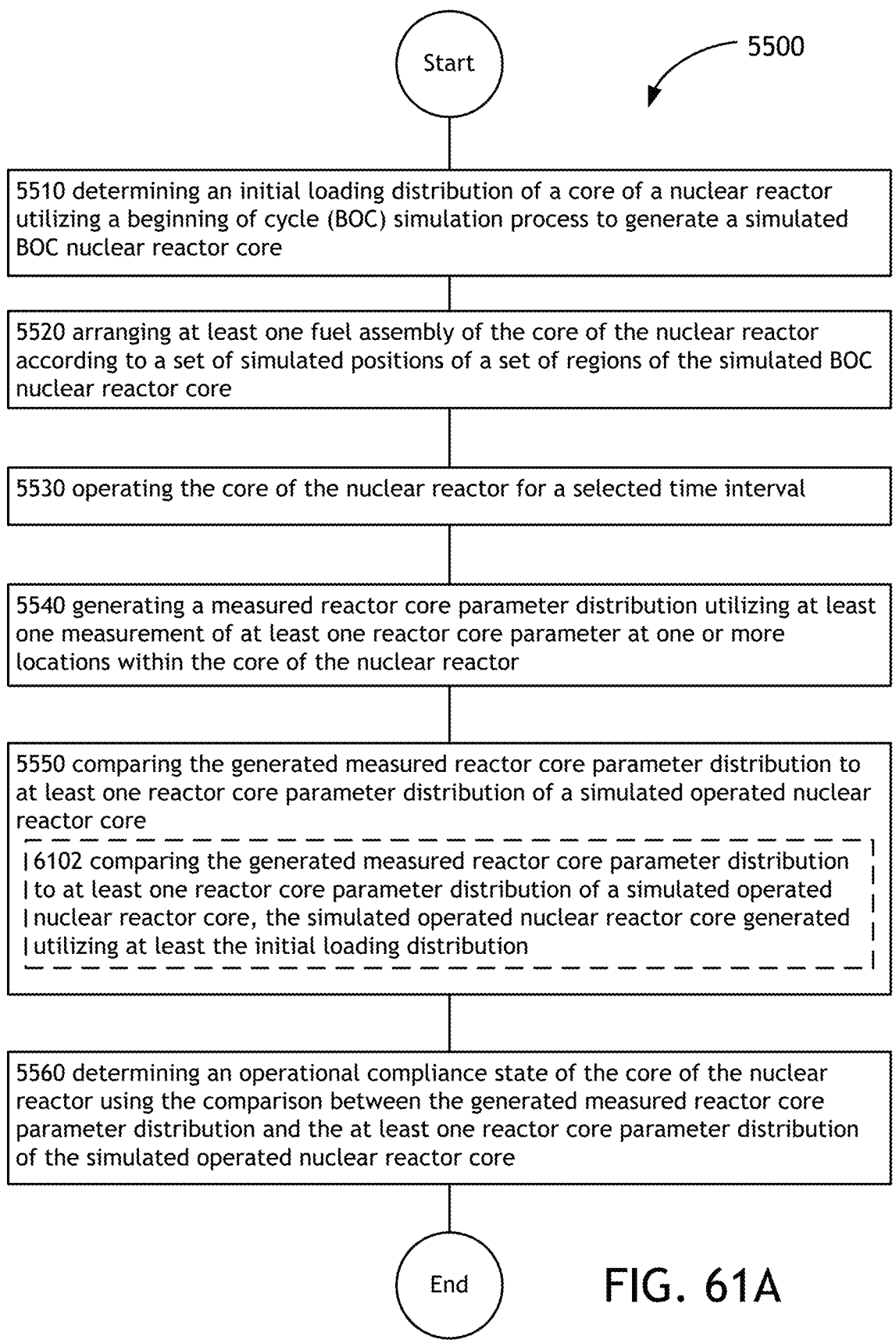

FIG. 61A illustrates alternative embodiments of the example operational flow 5500 of FIG. 55. FIG. 61A illustrates example embodiments where the comparing operation 5550 may include at least one additional operation. Additional operations may include operation 6102.

The operation 6102 illustrates comparing the generated measured reactor core parameter distribution to at least one reactor core parameter distribution of a simulated operated nuclear reactor core, the simulated operated nuclear reactor core generated utilizing at least the initial loading distribution. For example, as shown in FIGS. 1A through 3D, the one or more processors 106 of controller 102 may generate a simulated operated core representative of an operational state of the initial simulated core 120, described previously herein. In this regard, the one or more processors 106 may utilize the initial loading distribution of reactor core 202 as an input to the model routine implemented to determine the time-evolved simulated operate core. It is recognized herein that the initial loading distribution of reactor core 202 may correspond with the simulated BOC core 120, as described previously herein. Then, the one or more processors 106 may compare the generated measured reactor core parameter distribution to the one or more reactor core parameter distributions of the simulated operated nuclear reactor core.

FIG. 61B illustrates alternative embodiments of the example operational flow 5500 of FIG. 55. FIG. 61B illustrates example embodiments where the comparing operation 5550 may include at least one additional operation. Additional operations may include operation 6104.

The operation 6104 illustrates calculating a deviation metric between the generated measured reactor core parameter distribution and at least one reactor core parameter distribution of a simulated operated nuclear reactor core. For example, as shown in FIGS. 1A through 3D, the one or more processors 106 of controller 102 may calculate a deviation metric between the generated measured reactor core parameter distribution and the one or more reactor core parameter distributions of the simulated operated nuclear reactor core. Further, the deviation metric may include, but is not limited to, a difference (e.g., difference at a common position), a relative difference, a ratio, an averaged difference (e.g., spatially averaged difference), maximum difference (e.g., maximum difference between any two or more common positions), minimum difference (e.g., minimum difference between two or more common positions), aggregated deviation (e.g., global deviation metric) or any other deviation metric known in the art.

FIG. 62 illustrates alternative embodiments of the example operational flow 5500 of FIG. 55. FIG. 62 illustrates example embodiments where the comparing operation 5550 may include at least one additional operation. Additional operations may include operation 6202 and/or 6204.

The operation 6202 illustrates comparing the generated measured reactor core power density distribution to at least one reactor core power density distribution of a simulated operated nuclear reactor core. For example, as shown in FIGS. 1A through 3D, the one or more processors 106 of controller 102 may generate a power density distribution for a simulated operated core representative of a time-lapsed operational state of the initial simulated core 120, described previously herein. Then, the one or more processors 106 may compare the generated measured reactor core power density distribution to the one or more reactor core power density distributions of the simulated operated nuclear reactor core.

In another embodiment, the operation 6204 illustrates comparing the generated measured reactor core power density rate-of-change distribution to at least one reactor core power density rate-of-change distribution of a simulated operated nuclear reactor core. For example, as shown in FIGS. 1A through 3D, the one or more processors 106 of controller 102 may generate a power density rate-of-change distribution for a simulated operated core representative of a time-lapsed operational state of the initial simulated core 120. Then, the one or more processors 106 may compare the generated measured reactor core power density rate-of-change distribution to the one or more reactor core power density rate-of-change distributions of the simulated operated nuclear reactor core.

Figure 63:
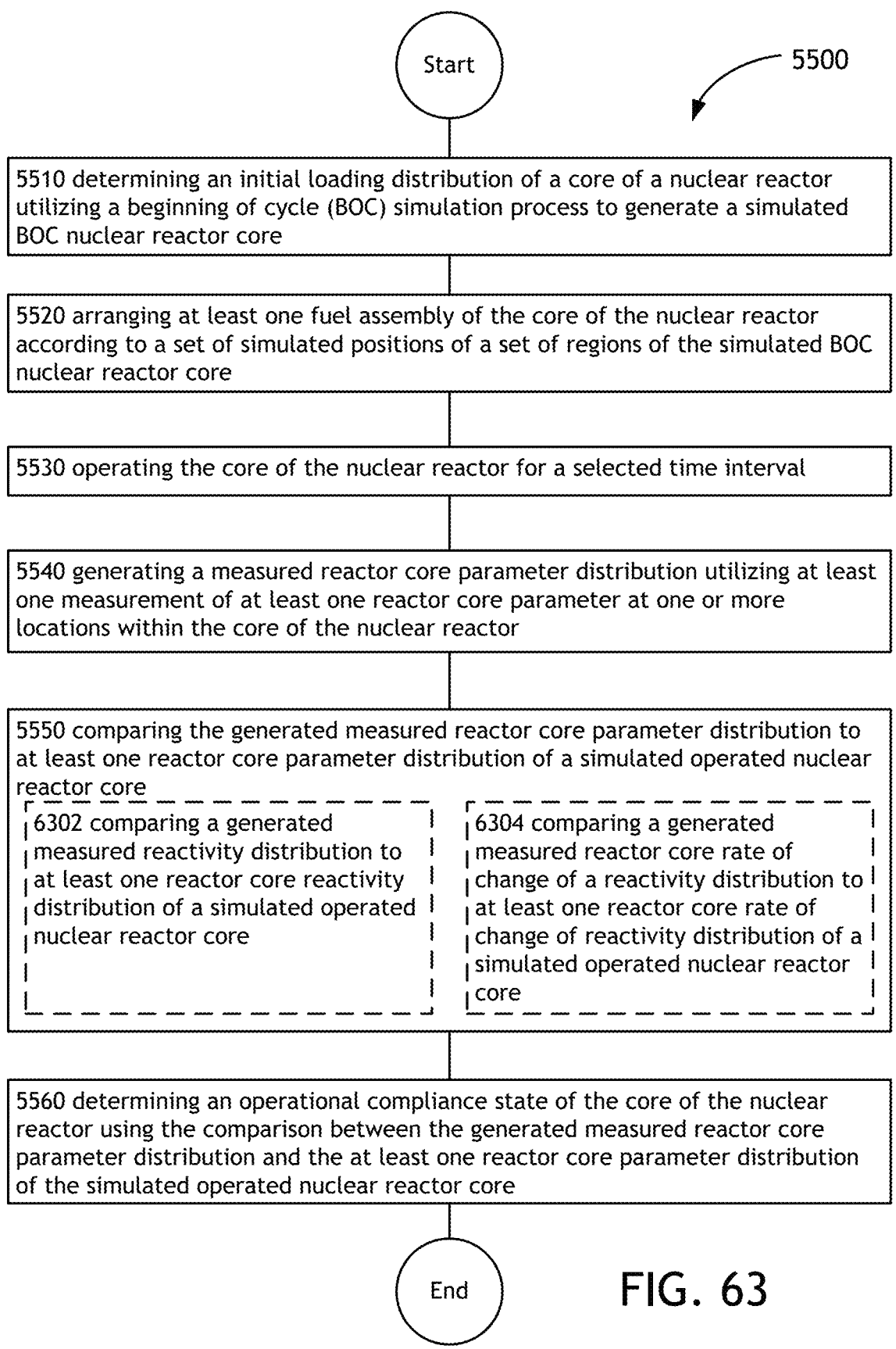

FIG. 63 illustrates alternative embodiments of the example operational flow 5500 of FIG. 55. FIG. 63 illustrates example embodiments where the comparing operation 5550 may include at least one additional operation. Additional operations may include operation 6302 and/or 6304.

The operation 6302 illustrates comparing the generated measured reactor core reactivity distribution to at least one reactor core reactivity distribution of a simulated operated nuclear reactor core. For example, as shown in FIGS. 1A through 3D, the one or more processors 106 of controller 102 may generate a reactivity distribution for a simulated operated core representative of a time-lapsed operational state of the initial simulated core 120. Then, the one or more processors 106 may compare the generated measured reactor core reactivity distribution to the one or more reactor core reactivity distributions of the simulated operated nuclear reactor core.

In another embodiment, the operation 6304 illustrates comparing the generated measured reactor core reactivity rate-of-change distribution to at least one reactor core reactivity rate-of-change distribution of a simulated operated nuclear reactor core. For example, as shown in FIGS. 1A through 3D, the one or more processors 106 of controller 102 may generate a reactivity rate-of-change distribution for a simulated operated core representative of a time-lapsed operational state of the initial simulated core 120. Then, the one or more processors 106 may compare the generated measured reactor core reactivity rate-of-change distribution to the one or more reactor core reactivity rate-of-change distributions of the simulated operated nuclear reactor core.

Figure 64:
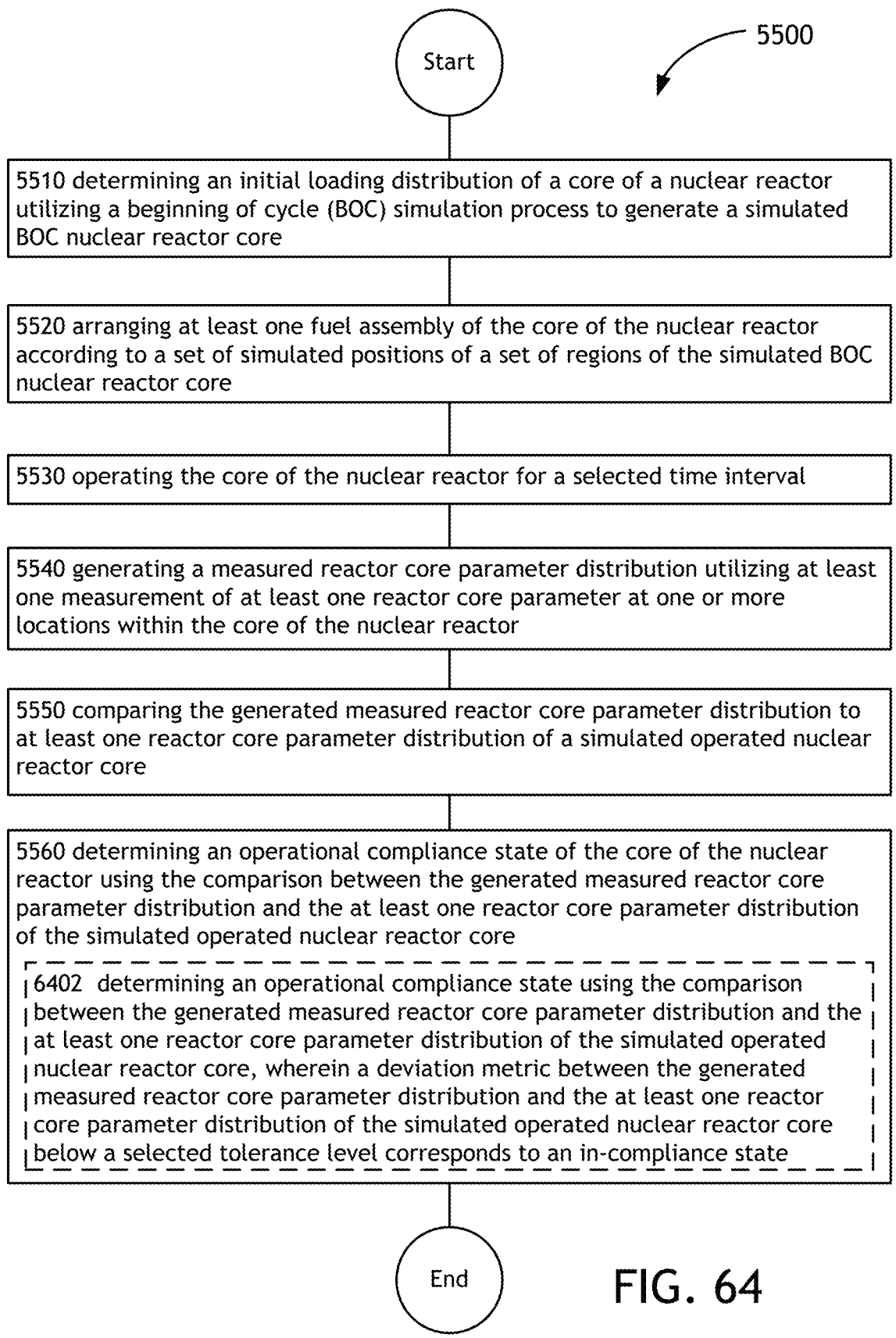

FIG. 64 illustrates alternative embodiments of the example operational flow 5500 of FIG. 55. FIG. 64 illustrates example embodiments where the operational compliance determining operation 5560 may include at least one additional operation. Additional operations may include operation 6402.

The operation 6402 illustrates determining an operational compliance state using the comparison between the generated measured reactor core parameter distribution and the at least one reactor core parameter distribution of the simulated operated nuclear reactor core, wherein a deviation metric between the generated measured reactor core parameter distribution and the at least one reactor core parameter distribution of the simulated operated nuclear reactor core below a selected tolerance level corresponds to an in-compliance state. For example, the one or more processors 106 of controller 102 may determine whether a deviation metric calculated between the generated measured reactor core parameter distribution and the one or more reactor core parameter distributions of the simulated operated nuclear reactor core corresponds to an in-compliance state. For instance, a determination that the deviation metric is at or below the selected tolerance level may correspond with an in-compliance state for the nuclear reactor core 202.

Figure 65:
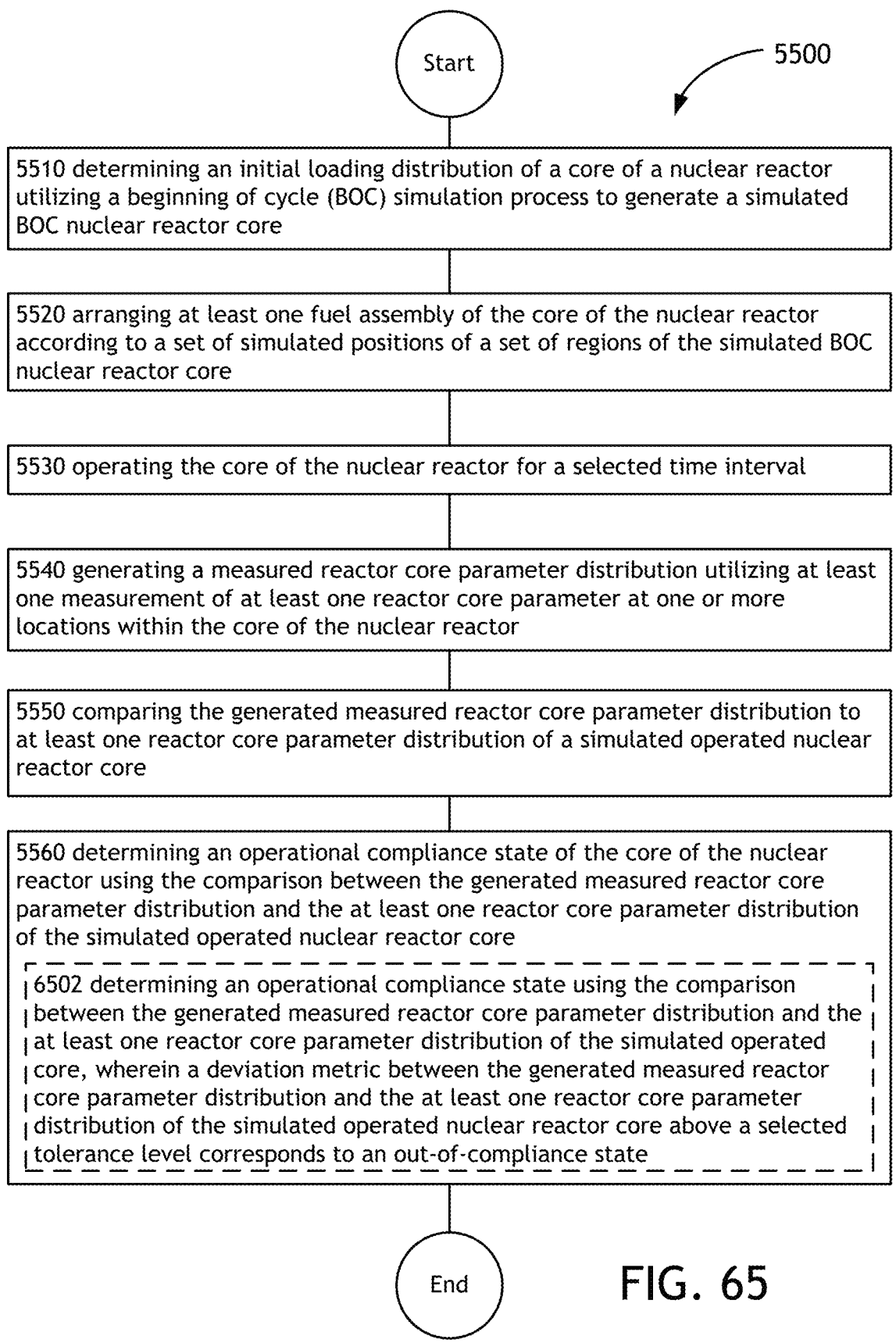

FIG. 65 illustrates alternative embodiments of the example operational flow 5500 of FIG. 55. FIG. 65 illustrates example embodiments where the operational compliance determining operation 5560 may include at least one additional operation. Additional operations may include operation 6502.

The operation 6502 illustrates determining an operational compliance state using the comparison between the generated measured reactor core parameter distribution and the at least one reactor core parameter distribution of the simulated operated nuclear reactor core, wherein a deviation metric between the generated measured reactor core parameter distribution and the at least one reactor core parameter distribution of the simulated operated nuclear reactor core above a selected tolerance level corresponds to an out-of-compliance state. For example, as shown in FIGS. 1A-3D, the one or more processors 106 of controller 102 may determine whether a deviation metric calculated between the generated measured reactor core parameter distribution and the one or more reactor core parameter distributions of the simulated operated nuclear reactor core corresponds to an out-of-compliance state. For instance, a determination that the deviation metric above the selected tolerance level may correspond with an out-of-compliance state for the nuclear reactor core 202.

Figure 66:
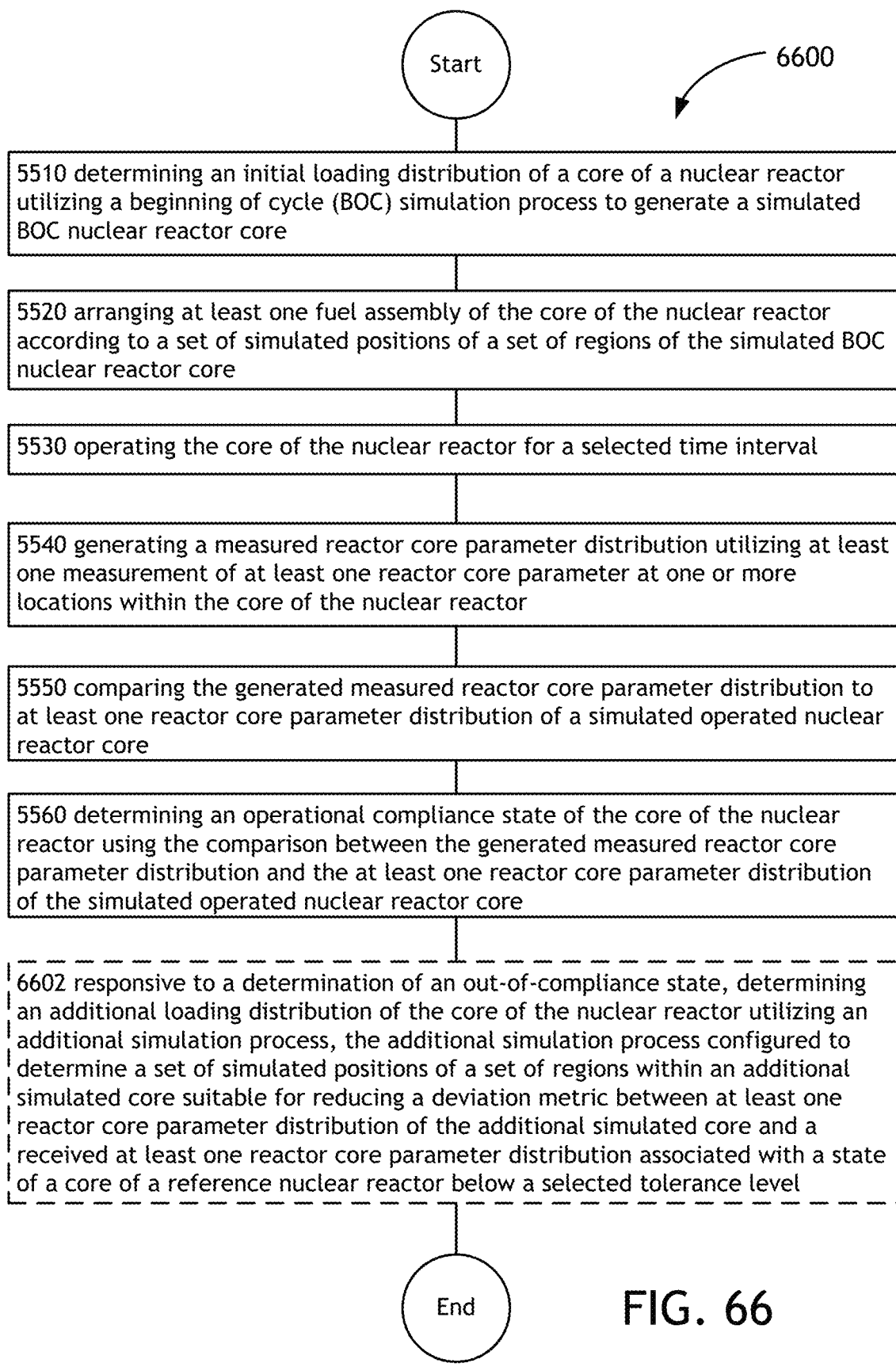

FIG. 66 illustrates an operational flow 6600 representing example operations related to determining an operation compliance state of a core of a nuclear reactor. FIG. 66 illustrates an example embodiment where the example operational flow 6600 of FIG. 66 may include at least one additional operation. Additional operations may include an additional loading distribution determining step 6602.

The operation 6602 illustrates, responsive to a determination of an out-of-compliance state, determining an additional loading distribution of the core of the nuclear reactor utilizing an additional simulation process, the additional simulation process configured to determine a set of simulated positions of a set of regions within an additional simulated core suitable for reducing the deviation metric between at least one reactor core parameter distribution of the additional simulated core and the received at least one reactor core parameter distribution associated with a state of a core of a reference nuclear reactor below a selected tolerance level. For example, as shown in FIGS. 1A-3D, the one or more processors 106 of controller 102 may determine an additional loading distribution of the core 202 via an additional core simulation process configured to determine a set of simulated positions of a set of regions within an additional simulated core suitable for reducing the deviation metric between one or more reactor core parameter distributions of the additional simulated core and the received one or more reactor core parameter distributions associated with a state (e.g., equilibrium state) of a core of a reference nuclear reactor below a selected tolerance level.

Figure 67:
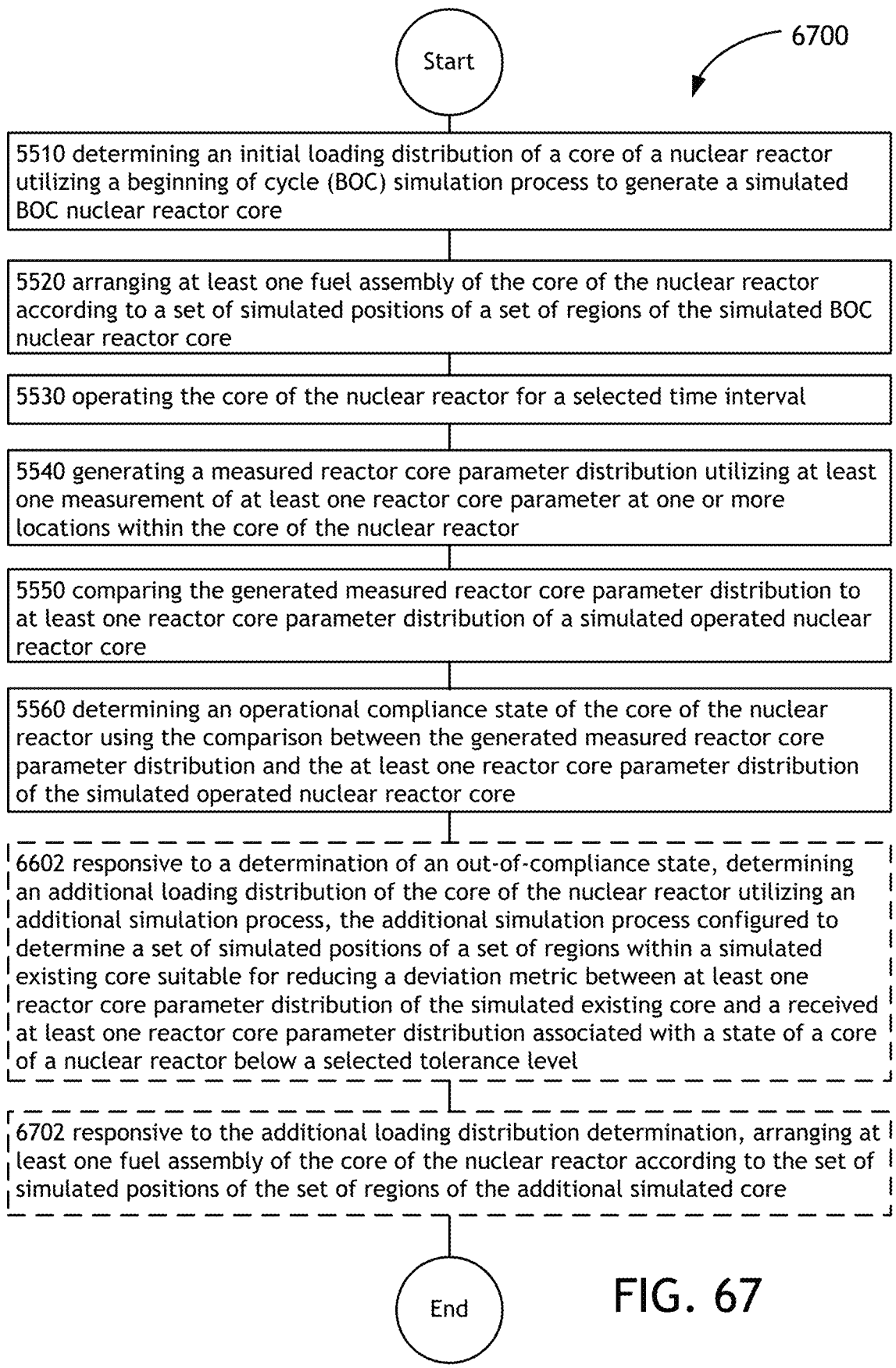

FIG. 67 illustrates an operational flow 6700 representing example operations related to determining an operation compliance state of a core of a nuclear reactor. FIG. 67 illustrates an example embodiment where the example operational flow 6700 of FIG. 67 may include at least one additional operation. Additional operations may include an arranging step 6702.

The operation 6702 illustrates, responsive to the additional loading distribution determination, arranging at least one fuel assembly of the core of the core of the nuclear reactor according to the set of simulated positions of the set of regions of the simulated additional core. For example, as shown in FIGS. 1A through 3D, upon determining the additional loading distribution of the additional simulated core, one or more processors 106 of the controller 102 may direct the fuel handler 204 to arrange one or more fuel assemblies 208 of the reactor core 202 of reactor 101 in accordance with the set of simulated positions of the set of regions of the additional simulated core of a nuclear reactor core. For instance, upon determining the initial additional distribution of the additional simulated core, one or more processors 106 of the controller 102 may transmit a command signal 307 (see FIG. 3A) indicative of the set of simulated positions of the set of regions of additional simulated core of a nuclear reactor to the fuel handler controller 206. In turn, the fuel handler controller 206 may transmit a command signal 309 encoded with instructions necessary for the fuel handler 204 to arrange one or more fuel assemblies 208 of the reactor core 202 of reactor 101 in accordance with the set of simulated positions of the set of regions of the additional simulated nuclear reactor core.

Figure 68:
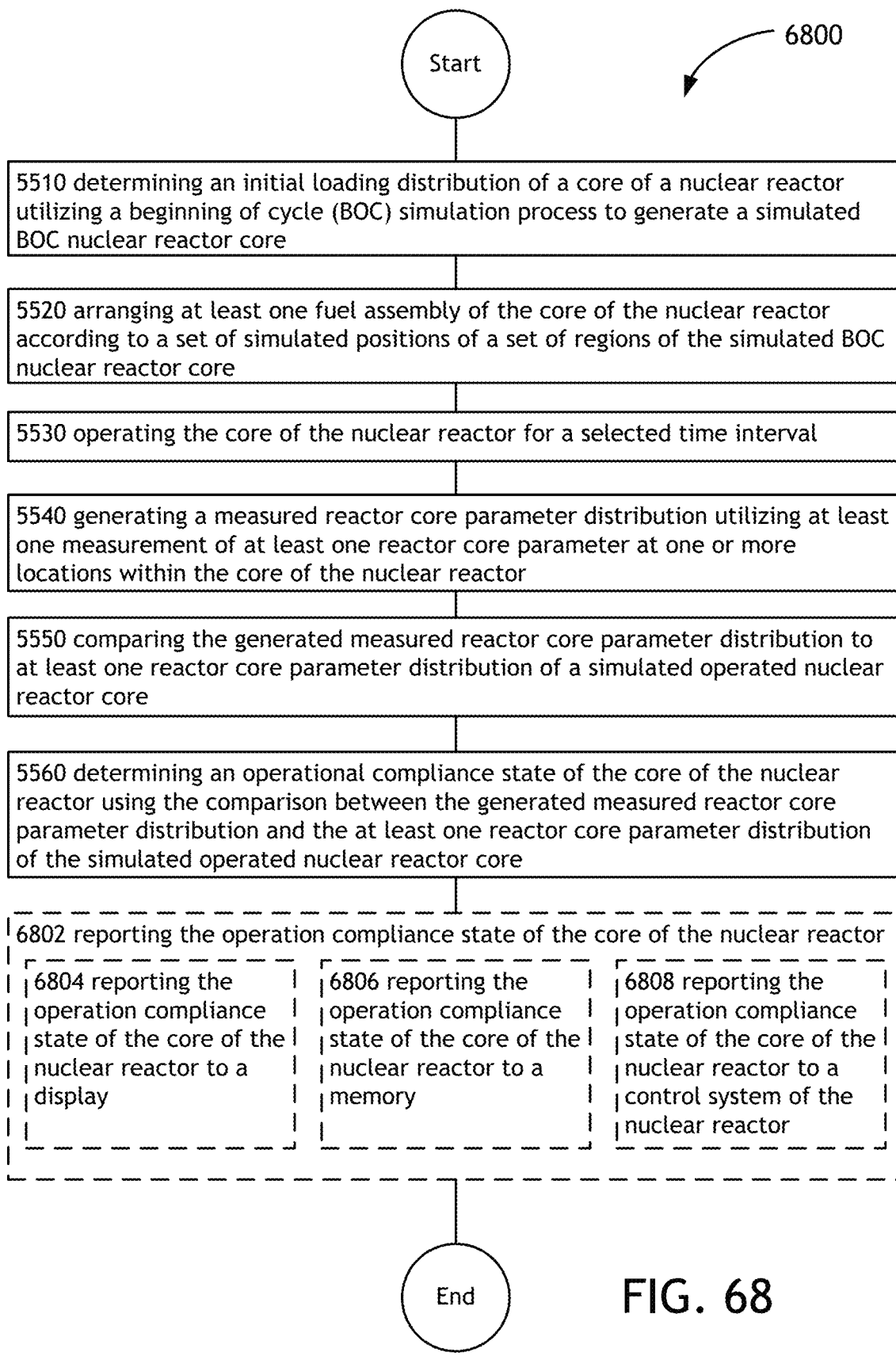

FIG. 68 illustrates an operational flow 6800 representing example operations related to determining an operation compliance state of a core of a nuclear reactor. FIG. 68 illustrates an example embodiment where the example operational flow 6800 of FIG. 68 may include at least one additional operation. Additional operations may include reporting operations 6802, 6804, 6806 and/or 6808.

The operation 6802 illustrates reporting the operation compliance state of the core of the nuclear reactor. For example, as shown in FIGS. 1A through 3D, the one or more processors 106 of controller 102 may report the operation compliance state of the core of the nuclear reactor to a destination. For instance, the one or more processors 106 of controller 102 may transmit one or more signals indicative of the operational compliance state of the core 202 of the nuclear reactor 101 to a destination.

In another embodiment, the operation 6804 illustrates reporting the operation compliance state of the core of the nuclear reactor of the core of the nuclear reactor to a display. For example, as shown in FIGS. 1A through 3D, the one or more processors 106 of controller 102 may report the operation compliance state of the core of the nuclear reactor to a display (e.g., audio or visual display). For instance, the one or more processors 106 of controller 102 may transmit one or more signals indicative of the operational compliance state of the core 202 of the nuclear reactor 101 to a display unit 116.

In another embodiment, the operation 6806 illustrates reporting the operation compliance state of the core of the nuclear reactor of the core of the nuclear reactor to a memory. For example, as shown in FIGS. 1A through 3D, the one or more processors 106 of controller 102 may report the operation compliance state of the core of the nuclear reactor to a memory device. For instance, the one or more processors 106 of controller 102 may transmit one or more signals indicative of the operational compliance state of the core 202 of the nuclear reactor 101 to a memory device 108.

In another embodiment, the operation 6806 illustrates reporting the operation compliance state of the core of the nuclear reactor to a control system of the nuclear reactor. For example, as shown in FIGS. 1A through 3D, the one or more processors 106 of controller 102 may report the operation compliance state of the core of the nuclear reactor to control system 180 of the nuclear reactor 101. For instance, the one or more processors 106 of controller 102 may transmit one or more signals indicative of the operational compliance state of the core 202 of the nuclear reactor 101 to control system 180 of the nuclear reactor 101.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device-detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although a user is shown/described herein as a single illustrated figure, those skilled in the art will appreciate that the user may be representative of a human user, a robotic user (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

The invention claimed is:

1. A computer-implemented method comprising:
receiving at least one reactor core parameter distribution associated with a state of a core of a reference nuclear reactor;
generating an initial fuel loading distribution for a simulated beginning-of-cycle (BOC) core of a nuclear reactor, the simulated BOC core of the nuclear reactor including a simulated beginning-of-life (BOL) core of the nuclear reactor;
selecting an initial set of positions associated within a set of regions within the simulated BOC core of the nuclear reactor, wherein the initial set of positions correspond to the set of regions;
generating an initial set of fuel design parameter values utilizing at least one design variable of at least one of the set of regions;
calculating at least one reactor core parameter distribution of the simulated BOC core utilizing the initial set of fuel design parameter values associated with the set of regions located at the initial set of positions of the simulated BOC core;
generating a loading distribution by performing at least one perturbation process on the set of regions of the simulated BOC core in order to determine a subsequent set of positions for the set of regions within the simulated BOC core; and
causing a fuel handler to arrange one or more fuel assemblies in a core of the nuclear reactor according to the loading distribution.

2. The method of claim 1, wherein the receiving the at least one reactor core parameter distribution associated with the state of the core of the reference nuclear reactor includes:
receiving at least one reactor core parameter distribution associated with an equilibrium state of the core of the reference nuclear reactor.

3. The method of claim 1, wherein the reference nuclear reactor includes:
at least one of a reference thermal nuclear reactor, a reference fast nuclear reactor, a reference breed-and-burn nuclear reactor, or a reference traveling wave reactor.

4. The method of claim 1, wherein the core of the reference nuclear reactor includes:
at least one fuel assembly.

5. The method of claim 4, wherein the at least one fuel assembly of the core of the reference nuclear reactor includes at least one pin.

6. The method of claim 1, wherein the at least one reactor core parameter distribution associated with the state of the core of the reference nuclear reactor includes:
at least one of a power density distribution, a rate of change of a power density distribution, a reactivity distribution, or a rate of change of a reactivity distribution associated with the state of the core of the reference nuclear reactor.

7. The method of claim 1, wherein at least a portion of the BOC core includes at least one of recycled nuclear fuel, unburned nuclear fuel, or enriched nuclear fuel.

8. The method of claim 1, wherein the generating an initial fuel loading distribution for a simulated beginning-of-cycle (BOC) core of a nuclear reactor includes:
randomly generating the initial fuel loading distribution for the simulated BOC core of the nuclear reactor.

9. The method of claim 1, wherein the simulated BOC core of the nuclear reactor includes a plurality of simulated fuel assemblies.

10. The method of claim 1, wherein the at least one of the set of regions encompasses at least one fuel assembly.

11. The method of claim 1, wherein the at least one of the set of regions is a three-dimensional region having at least one of a selected volume, a selected shape, or a selected number of regions.

12. The method of claim 1, wherein the at least one design variable of the at least one of the set of regions includes a thermodynamic variable of the at least one of the set of regions.

13. The method of claim 1, wherein the generating the initial set of fuel design parameter values utilizing the at least one design variable of the at least one of the set of regions includes:
generating the initial set of fuel design parameter values utilizing a neutronic parameter of the at least one of the set of regions.

14. The method of claim 13, wherein the utilizing the neutronic parameter of the at least one of the set of regions includes:
generating the initial set of fuel design parameter values utilizing a k-infinity value of the at least one of the set of regions.

15. The method of claim 1, wherein the generating the initial set of fuel design parameter values utilizing the at least one design variable of the at least one of the set of regions includes:
generating an initial set of enrichment values utilizing the at least one design variable of the at least one of the set of regions.

16. The method of claim 1, wherein the generating the initial set of fuel design parameter values utilizing the at least one design variable of the at least one of the set of regions includes:
generating an initial set of pin dimension values associated with a set of pins of a fuel assembly of the simulated BOC core of the nuclear reactor utilizing the at least one design variable of the at least one of the set of regions.

17. The method of claim 16, wherein the generating the initial set of pin dimension values associated with the set of pins of the fuel assembly of the simulated BOC core of the nuclear reactor utilizing the at least one design variable of the at least one of the set of regions includes:
generating at least one of an initial set of pin configuration values, an initial set of pin geometry values, or an initial set of pin composition values associated with the set of pins of the fuel assembly of the simulated BOC core of the nuclear reactor utilizing the at least one design variable of the at least one of the set of regions.

18. The method of claim 1, wherein the at least one design variable of the at least one of the set of regions includes:
at least one design variable of each of a set of pins of the set of regions, wherein each of the initial set of fuel design parameter values is associated with one of the set of regions of the simulated BOC core of the nuclear reactor.

19. The method of claim 18, wherein each of the initial set of fuel design parameter values is associated with one of the pins of the at least one of the set of regions of the simulated BOC core of the nuclear reactor.

20. The method of claim 1, wherein the calculating the at least one reactor core parameter distribution of the simulated BOC core utilizing the initial set of fuel design parameter values associated with the set of regions located at the initial set of positions of the simulated BOC core includes:
calculating at least one of a power density distribution, a rate of change of a power density distribution, a reactivity distribution, or a rate of change of a reactivity distribution of the simulated BOC core utilizing the initial set of fuel design parameter values associated with the set of regions located at the initial set of positions of the simulated BOC core.

21. The method of claim 1, wherein the subsequent set of positions define the loading distribution for the simulated BOC core.

22. The method of claim 1, wherein the subsequent set of positions reduce a deviation metric between the at least one reactor core distribution of the simulated BOC core and the received at least one reactor core parameter distribution associated with the state of the core of the reference nuclear reactor below a selected tolerance level.

23. The method of claim 1, further comprising:
reporting the subsequent set of positions of the set of regions of the simulated BOC core.

24. A non-transitory computer-readable medium comprising program instructions, wherein the program instructions are executable to:
receive at least one reactor core parameter distribution associated with a state of a core of a reference nuclear reactor;
generate an initial fuel loading distribution for a simulated beginning-of-cycle (BOC) core of a nuclear reactor, the simulated BOC core of a nuclear reactor including a simulated beginning-of-life (BOL) core of the nuclear reactor;
select an initial set of positions associated with a set of regions within the simulated BOC core of the nuclear reactor, wherein the initial set of positions correspond to the set of regions;
generate an initial set of fuel design parameter values utilizing at least one design variable of at least one of the set of regions;
calculate at least one reactor core parameter distribution of the simulated BOC core utilizing the initial set of fuel design parameter values associated with the set of regions located at the initial set of positions of the simulated BOC core;
generate a subsequent loading distribution by performing at least one perturbation process on the set of regions of the simulated BOC core in order to determine a subsequent set of positions for the set of regions within the simulated BOC core; and
cause a fuel handler to arrange one or more fuel assemblies in a core of the nuclear reactor according to the subsequent loading distribution.

25. A system comprising:
a controller including one or more processors operable to execute program instructions maintained on a non-transitory computer-readable medium, the program instructions configured to:
receive at least one reactor core parameter distribution associated with a state of a core of a reference nuclear reactor;
generate an initial fuel loading distribution for a simulated beginning-of-cycle (BOC) core of a nuclear reactor;
select an initial set of positions associated with a set of regions within the simulated BOC core of the nuclear reactor, each of the initial set of positions corresponding to one of the set of regions;
generate an initial set of fuel design parameter values utilizing at least one design variable of at least one of the set of regions, wherein each of the initial set of fuel design parameter values is associated with one of the set of regions of the simulated BOC core of the nuclear reactor;

calculate at least one reactor core parameter distribution of the simulated BOC core utilizing the initial set of fuel design parameter values associated with the set of regions located at the initial set of positions of the simulated BOC core;

generate a subsequent loading distribution by performing at least one perturbation process on the set of regions of the simulated BOC core in order to determine a subsequent set of positions for the set of regions within the simulated BOC core, the subsequent set of positions defining the loading distribution for the simulated BOC core, wherein the subsequent set of positions reduce the difference between the at least one reactor core parameter distribution of the simulated BOC core and the received at least one reactor core parameter distribution associated with the state of the core of the reference nuclear reactor below a selected tolerance level; and cause a fuel handler to arrange one or more fuel assemblies in a core of the nuclear reactor according to the subsequent loading distribution.

26. The system of claim 25, wherein the at least one reactor core parameter distribution is associated with an equilibrium state of the core of the reference nuclear reactor.

27. The system of claim 25, wherein the reference nuclear reactor comprises at least one of a reference thermal nuclear reactor, a reference fast nuclear reactor, a reference breed-and-burn nuclear reactor, or a reference traveling wave reactor.

28. The system of claim 25, wherein the at least one reactor core parameter distribution associated with the state of the core of the reference nuclear reactor includes:

at least one of a power density distribution, a rate of change of the power density distribution, a reactivity distribution, or a rate of change of the reactivity distribution associated with the state of the core of the reference nuclear reactor.

29. The system of claim 25, wherein the reference nuclear reactor includes at least one fuel assembly.

30. The system of claim 25, wherein the reference nuclear reactor comprises at least one fuel assembly including at least one fuel pin.

31. The system of claim 25, wherein at least a portion of the simulated BOC core includes at least one of recycled nuclear fuel, unburned nuclear fuel, or enriched nuclear fuel.

32. The system of claim 25, wherein the simulated BOC core includes a plurality of simulated fuel assemblies.

33. The system of claim 25, wherein the generating the initial set of fuel design parameter values utilizing the at least one design variable of the at least one of the set of regions includes:

utilizing a thermodynamic variable of the at least one of the set of regions.

34. The system of claim 25, wherein the generating the initial set of fuel design parameter values utilizing the at least one design variable of the at least one of the set of regions includes utilizing a neutronic parameter of the at least one of the set of regions.

35. The system of claim 34, wherein the utilizing the neutronic parameter of the at least one of the set of regions includes utilizing a k-infinity value of the at least one of the set of regions.

36. The system of claim 25, wherein the generating the initial set of fuel design parameter values utilizing the at least one design variable of the at least one of the set of regions includes:

generating an initial set of enrichment values utilizing the at least one design variable of the at least one of the set of regions.

37. The system of claim 25, wherein the generating the initial set of fuel design parameter values utilizing the at least one design variable of the at least one of the set of regions includes:

generating an initial set of pin dimension values associated with a set of pins of a fuel assembly of the simulated BOC core of the nuclear reactor utilizing at least one design variable of the at least one of the set of regions.

38. The system of claim 25, wherein each of the initial set of fuel design parameter values is associated with one of the set of regions of the simulated BOC core of the nuclear reactor.

39. The system of claim 38, wherein the generating the initial set of fuel design parameter values utilizing the at least one design variable of the at least one of the set of regions includes:

utilizing at least one design variable of each of a set of pins of the set of regions, wherein each of the initial set of fuel design parameter values is associated with one of the pins of the one of the set of regions of the simulated BOC core of the nuclear reactor.

40. The system of claim 25, wherein the calculating the at least one reactor core parameter distribution of the simulated BOC core utilizing the initial set of fuel design parameter values associated with the set of regions located at the initial set of positions of the simulated BOC core includes:

calculating at least one of a power density distribution, a rate of change of the power density distribution, a reactivity distribution, or a rate of change of the reactivity distribution of the simulated BOC core utilizing the initial set of fuel design parameter values associated with the set of regions located at the initial set of positions of the simulated BOC core.

41. The method of claim 1, wherein causing the fuel handler to arrange the one or more fuel assemblies in the core of the nuclear reactor according to the loading distribution comprises causing the fuel handler to grip a selected fuel assembly and move the selected fuel assembly from a first location to a second location.

42. The non-transitory computer-readable medium of claim 24, wherein the program instructions are executable to cause the fuel handler to arrange the one or more fuel assemblies in the core of the nuclear reactor according to the subsequent loading distribution by causing the fuel handler to grip a selected fuel assembly and move the selected fuel assembly from a first location to a second location.

43. The system of claim 25, wherein the program instructions are configured to cause the fuel handler to arrange the one or more fuel assemblies in the core of the nuclear reactor according to the subsequent loading distribution by causing the fuel handler to grip a selected fuel assembly and move the selected fuel assembly from a first location to a second location.

* * * * *